US007827118B1

(12) United States Patent
Smith, III et al.

(10) Patent No.: US 7,827,118 B1
(45) Date of Patent: Nov. 2, 2010

(54) ONLINE, MULTI-CARRIER, MULTI-SERVICE PARCEL SHIPPING MANAGEMENT FUNCTIONAL ALIGNMENT OF COMPUTER DEVICES

(75) Inventors: William W. Smith, III, Medina, WA (US); Charles D. Mentzer, Redmond, WA (US); Paul R. McLaughlin, Redmond, WA (US); Harland Fred Maier, Jr., Bellevue, WA (US)

(73) Assignees: Stamps.com Inc., Los Angeles, CA (US); iShip Inc., Atlanta, GA (US)

( * ) Notice: Subject to any disclaimer, the term of this patent is extended or adjusted under 35 U.S.C. 154(b) by 1607 days.

(21) Appl. No.: 09/684,010

(22) Filed: Oct. 6, 2000

Related U.S. Application Data

(60) Provisional application No. 60/158,179, filed on Oct. 6, 1999, provisional application No. 60/170,186, filed on Dec. 10, 1999, provisional application No. 60/170,504, filed on Dec. 13, 1999, provisional application No. 60/192,692, filed on Mar. 28, 2000, provisional application No. 60/192,723, filed on Mar. 27, 2000, provisional application No. 60/193,899, filed on Mar. 31, 2000, provisional application No. 60/195,748, filed on Apr. 6, 2000.

(51) Int. Cl.
*G06Q 30/00* (2006.01)

(52) U.S. Cl. ...................................... 705/333; 705/335

(58) Field of Classification Search .................. 705/22, 705/28, 401, 408, 410, 1
See application file for complete search history.

(56) References Cited

U.S. PATENT DOCUMENTS

| | | | | |
|---|---|---|---|---|
| 3,951,221 A * | 4/1976 | Rock | | 177/1 |
| 4,024,380 A | 5/1977 | Gunn | | 235/61.9 A |
| 4,351,033 A | 9/1982 | Uchimura et al. | | |
| 4,495,581 A * | 1/1985 | Piccione | | 705/402 |
| 4,868,757 A | 9/1989 | Gil | | 364/464.03 |
| 4,958,280 A | 9/1990 | Pauly et al. | | |
| 5,072,397 A | 12/1991 | Barns-Slavin et al. | | 364/464.02 |
| 5,081,529 A | 1/1992 | Collette | | |
| 5,117,364 A * | 5/1992 | Barns-Slavin et al. | | 705/402 |

(Continued)

FOREIGN PATENT DOCUMENTS

EP 0858057 A2 8/1998

(Continued)

OTHER PUBLICATIONS

PRNewswire: "TanData™ Corporation Announces Progistics CS™, Their Newest, Internet-Enabled Shipping and Rating Software"; Jul. 21, 1997.*

(Continued)

*Primary Examiner*—Jamisue A Plucinski
(74) *Attorney, Agent, or Firm*—Khorsandi Patent Law Group, A Law Corp.; Marilyn R. Khorsandi

(57) ABSTRACT

The present invention provides a computer system for managing shipping of a plurality of parcels by a plurality of users using a plurality of carriers that functionally aligns each server computer device of a plurality of server computer devices so that each server computer device performs a plurality of activities in support of a primary function.

8 Claims, 92 Drawing Sheets

U.S. PATENT DOCUMENTS

| | | | | |
|---|---|---|---|---|
| 5,222,018 | A | 6/1993 | Sharpe et al. | |
| 5,233,532 | A | 8/1993 | Ramsden | 364/464.03 |
| 5,293,310 | A | 3/1994 | Carroll et al. | 364/408 |
| 5,310,997 | A | 5/1994 | Roach et al. | |
| 5,315,508 | A | 5/1994 | Bain et al. | 364/401 |
| 5,331,118 | A | 7/1994 | Jensen | |
| 5,337,246 | A | 8/1994 | Carroll et al. | 364/464.02 |
| 5,413,383 | A | 5/1995 | Laurash et al. | |
| 5,414,809 | A | 5/1995 | Hogan et al. | |
| 5,481,464 | A | 1/1996 | Ramsden | 364/464.03 |
| 5,485,369 | A | 1/1996 | Nicholls et al. | 364/401 |
| 5,491,637 | A | 2/1996 | Kraemer et al. | |
| 5,513,112 | A | 4/1996 | Herring et al. | 364/464.02 |
| 5,586,037 | A | 12/1996 | Gil et al. | 364/464.03 |
| 5,592,378 | A | 1/1997 | Cameron et al. | |
| 5,602,742 | A * | 2/1997 | Solondz et al. | 705/410 |
| 5,615,120 | A | 3/1997 | Schwartz et al. | 364/464.17 |
| 5,618,064 | A | 4/1997 | Main | |
| 5,631,827 | A | 5/1997 | Nicholls et al. | 395/228 |
| 5,656,799 | A | 8/1997 | Ramsden et al. | |
| 5,675,493 | A | 10/1997 | Schwartz et al. | 364/464.03 |
| 5,699,258 | A * | 12/1997 | Thiel | 705/409 |
| 5,710,887 | A | 1/1998 | Chelliah et al. | 395/226 |
| 5,724,595 | A | 3/1998 | Gentner | |
| 5,729,459 | A | 3/1998 | Brandien et al. | |
| 5,758,329 | A | 5/1998 | Wojcik et al. | |
| 5,774,660 | A * | 6/1998 | Brendel et al. | 709/201 |
| 5,778,348 | A | 7/1998 | Manduley et al. | 705/409 |
| 5,781,634 | A | 7/1998 | Cordery et al. | |
| 5,787,400 | A | 7/1998 | Weber | 705/1 |
| 5,832,459 | A | 11/1998 | Cameron et al. | |
| 5,855,006 | A | 12/1998 | Huemoeller et al. | |
| 5,869,819 | A | 2/1999 | Knowles et al. | 235/375 |
| 5,870,717 | A | 2/1999 | Wiecha | |
| 5,914,463 | A | 6/1999 | Dlugos | |
| 5,960,408 | A | 9/1999 | Martin et al. | |
| 5,971,587 | A | 10/1999 | Kato et al. | |
| 5,995,950 | A | 11/1999 | Barnes-Slain et al. | |
| 6,003,065 | A | 12/1999 | Yan et al. | |
| 6,006,100 | A | 12/1999 | Koenck et al. | |
| 6,006,332 | A | 12/1999 | Rabne et al. | |
| 6,009,416 | A | 12/1999 | Pintsov | |
| 6,012,065 | A | 1/2000 | Boucher et al. | 707/103 |
| 6,015,167 | A | 1/2000 | Savino et al. | |
| 6,018,725 | A | 1/2000 | Boucher et al. | 705/401 |
| 6,029,140 | A | 2/2000 | Martin et al. | 705/11 |
| 6,035,291 | A | 3/2000 | Thiel | |
| 6,041,308 | A | 3/2000 | Walker et al. | |
| 6,047,264 | A | 4/2000 | Fisher et al. | |
| 6,047,271 | A | 4/2000 | Danford-Klein et al. | |
| 6,047,273 | A | 4/2000 | Vaghi | 705/410 |
| 6,058,373 | A | 5/2000 | Blinn et al. | |
| 6,061,667 | A | 5/2000 | Danford-Klein et al. | |
| 6,064,981 | A | 5/2000 | Barni et al. | 705/26 |
| 6,078,889 | A | 6/2000 | Boucher et al. | 705/1 |
| 6,078,936 | A | 6/2000 | Martin et al. | |
| 6,105,014 | A | 8/2000 | Ramsden et al. | |
| 6,134,561 | A | 10/2000 | Brandien et al. | |
| 6,175,825 | B1 | 1/2001 | Fruechtel | |
| 6,192,400 | B1 | 2/2001 | Hanson et al. | |
| 6,213,518 | B1 | 4/2001 | Raming | |
| 6,220,509 | B1 * | 4/2001 | Byford | 235/375 |
| 6,233,568 | B1 * | 5/2001 | Kara | 705/410 |
| 6,246,967 | B1 | 6/2001 | Libicki et al. | |
| 6,263,317 | B1 | 7/2001 | Sharp et al. | |
| 6,285,916 | B1 | 9/2001 | Kadaba | |
| 6,321,214 | B1 | 11/2001 | Thiel | |
| RE37,521 | E | 1/2002 | Laurash et al. | |
| 6,356,882 | B1 | 3/2002 | Carroll et al. | |
| 6,369,840 | B1 * | 4/2002 | Barnett et al. | 715/853 |
| 6,462,286 | B1 | 10/2002 | Schwartz et al. | |
| 6,466,948 | B1 * | 10/2002 | Levitsky et al. | 707/104.1 |
| 6,470,327 | B1 * | 10/2002 | Carroll et al. | 705/401 |
| 6,523,027 | B1 | 2/2003 | Underwood | |
| 6,525,835 | B1 | 2/2003 | Gulati | |
| 6,526,393 | B1 | 2/2003 | Fredman | |
| 6,546,377 | B1 * | 4/2003 | Gravell et al. | 705/60 |
| 6,571,213 | B1 | 5/2003 | Altendahl et al. | |
| 6,616,189 | B2 | 9/2003 | Raming | |
| 6,621,532 | B1 | 9/2003 | Mandt | |
| 7,117,170 | B1 | 10/2006 | Bennett et al. | |
| 7,197,465 | B1 | 3/2007 | Hu et al. | |
| 7,359,887 | B1 | 4/2008 | Hu et al. | |
| 7,421,400 | B2 | 9/2008 | Bilibin et al. | |
| 7,454,356 | B2 | 11/2008 | Fields et al. | |
| 2001/0032147 | A1 | 10/2001 | Siegel | |
| 2001/0047315 | A1 | 11/2001 | Siegel | |
| 2002/0022983 | A1 * | 2/2002 | Barton | 705/7 |
| 2002/0065738 | A1 | 5/2002 | Riggs et al. | |
| 2004/0254808 | A1 | 12/2004 | Bennett et al. | |
| 2005/0038758 | A1 * | 2/2005 | Hilbush et al. | 705/402 |
| 2005/0197892 | A1 | 9/2005 | Bilibin | |
| 2005/0246359 | A1 * | 11/2005 | Robbins | 707/100 |
| 2007/0299686 | A1 | 12/2007 | Hu et al. | |

FOREIGN PATENT DOCUMENTS

| | | | |
|---|---|---|---|
| EP | 0858057 | A3 | 8/1998 |
| EP | 943904 | A1 | 9/1999 |
| JP | 05-276353 | A * | 10/1993 |
| WO | WO89/01831 | A1 | 3/1989 |
| WO | WO 8901831 | * | 3/1989 |
| WO | WO 97/40617 | A1 * | 10/1997 |
| WO | WO 99/21330 | | 4/1999 |
| WO | WO 99/52026 | A2 | 10/1999 |
| WO | WO 99/52026 | A3 | 10/1999 |
| WO | WO 00/46718 | | 8/2000 |
| WO | WO 00/46728 | | 8/2000 |
| WO | WO 00/70519 | | 11/2000 |
| WO | WO01/13261 | A1 | 2/2001 |

OTHER PUBLICATIONS

PRNewswire: "WorldWide Merchant Announces InterShipper 4.0 'The Internet Sipping Center'"; Mar. 23, 1999.*

Williams, Martyn, Internet Update, Feb. 18, 1998, Newsbytes, pp. 1-3.*

Brown, Judy, As Web pages proliferate, finding that you're after gets more difficult, Feb. 8, 1999, Milwaukee Journal Sentinel (Wisconsin), Business p. 2 Connected, pp. 1-2.*

Web Site Offers Money-Saving Service for Free; Save Money by Calculating Actual Shipping Costs, Feb. 16, 1998, Business Wire, pp. 1-2.*

Kewill Systems, Inc. "Kewill Systems PLC Acquires Leading U.S. Shipping and Receiving E-Commerce Software Firm for $18 Million", Aristo Computers Press Releases and Product Development, Jul. 27, 1999, pp. 1-3 of 13, Marlborough, Mass.

Kewill Systems, Inc., "USPS Delivery Confirmation Support Now Available in Aristo's Economical APSS® Lite Shipping System", Aristo Computers Press Releases and Product Development, Jun. 23, 1999, p. 3 of 13. , Beaverton, Oregon.

Kewill Systems, Inc., "Aristo Parcel Shipping System® Certified by USPS to Support New Express Mail Manifesting", Aristo Computers Press Releases and Product Development, Jun. 21, 1999, pp. 3 and 4 of 13, Beaverton, Oregon.

Kewill Systems, Inc., "Aristo Parcel Shipping System® Certified UPS OnLine® Compatible to Support UPS International Shipping", Aristo Computers Press Releases and Product Development, May 12, 1999, pp. 4 and 5 of 13, Beaverton, Oregon.

Kewill Systems, Inc., "Aristo Parcel Shipping System® Certified to Fully Support FedEx PowerShip® Server," Aristo Computers Press Releases and Product Development, May 10, 1999, pp. 5 and 6 of 13, Beaverton, Oregon.

Kewill Systems, Inc., "Aristo Computers Names AllPoints Systems Strategic Partner" *AllPoints Systems to Integrate Aristo shipping*

*functionality into its Demand Chian Software*, Aristo Computers Press Releases and Product Development, Apr. 13, 1999, pp. 6 and 7 of 13, Beaverton, Oregon and Dedham, Massatuchutes.

Kewill Systems, Inc., "Midgard Information Systems and Aristo-Integrated Shipping Solutions for Today's Marketplace", Aristo Computers Press Releases and Product Development Jan. 19, 1999, pp. 7-9 of 13, Charlotte, North Carolina.

Kewill Systems, Inc., "Aristo's OLE Server Provides Shipping & Manifesting Engine for Third Party Developers", Aristo Computers Press Releases and Product Development, Jul. 28, 1998, pp. 9 and 10 of 13, Beaverton, Oregon.

Kewill Systems, Inc., "Aristo Computers Adds New Economical Shipping Solution to Its Product Line", Aristo Computers Press Releases and Product Development, Apr. 30, 1998, p. 10 of 13, Beaverton, Oregon.

Kewill Systems, Inc., "Aristo announces latest APSS® developments!", Aristo Computers Press Releases and Product Development, Jun. 9, 1997, pp. 10 and 11 of 13, Beaverton, Oregon.

Kewill Systems, Inc., "Aristo launches APSS® for Windows", Aristo Computers Press Releases and Product Development, Oct. 20, 1996, pp. 11-13 of 13, Beaverton, Oregon.

"Netscape and FDX Unveil Plans for Next Generation Internet Package Delivery Center", Netscape Press Release, Apr. 7, 1999, 3 pages, Mt.View, California and Memphis, Tennessee.

"TanData Announces Release of ChainLink™ Applications Suite" TanData Press Release, Dec. 8, 1999, 2 pages, Tulsa, Oklahoma.

UPS Extends Capability of iCat Electronic Commerce Software, TanData Press Release, Oct. 26, 1998, 2 pages, Atlanta, Georgia.

Andy Wang, "FedEx and Netscape Build Shipping Portal", E-Commerce Times, Apr. 8, 1999, 2 pages.

Mary Hillebrand, "From2.Com Gives International E-Commerce A Hand", E-Commerce Times, Jul. 9, 1999, 3 pages.

Tim Wilson, "Shippers Repackaged As E-Providers", InformationWeek, Issue: 758, Section: Transportation Transformation: A Special Report From Internetweek, Oct. 25, 1999, 6 pages.

James Hollander, UPS Boosts E-Commerce Strategy with New Web Tools, E-Commerce Times, Apr. 6, 1999, 3 pages.

Collection of Screen Printouts (undated) from "anythingovernight.com" referring to shipping product Shiplet, entitled "Shiplet", 4 pages, "About Us", 1 page, "Shipping", 1 page, "Reporting", 1 page, "User Profile" 1 page, "Shipments to Me", 1 page, and "API", 1 page, Dec. 12, 2000.

Lisa Corbin, "Electronic Commerce Strategies", Government Executive Magazine, Aug. 30, 1999, 5 pages.

Computer Support, Inc. (CSI), p. 10 of 117 listed in "Electronic Data Interchange (EDI): Software Profiles" Datapro, Jul. 1998) 177 pages.

TradePoint Systems LLC, International Trade and Transportion, and Transportation Concepts and Services, Inc. (TCS), p. 19 of 177 listed in "Electronic Data Interchange (EDI): Software Profiles" Datapro, Jul. 1998) 177 pages.

Carrier Quality Performance Software p. 39 of 177 listed in "Electronic Data Interchange (EDI): Software Profiles" Datapro, Jul. 1998) 177 pages.

Late Delivery Quality Monitor Software (for Federal Exress Shipments) p. 97 of 177 listed in "Electronic Data Interchange (EDI): Software Profiles" Datapro, Jul. 1998) 177 pages.

Scheme Software Order Entry/Billing 5.0 p. 156 of 177 listed in "Electronic Data Interchange (EDI): Software Profiles" Datapro, Jul. 1998) 177 pages.

Software for International Trade p. 157 of 177 listed in "Electronic Data Interchange (EDI): Software Profiles" Datapro, Jul. 1998) 177 pages.

Brandon Fleming, "Hot List for Electronic Data Interchange (EDI)", usatrade.gov/us/annarbor/hot_list_for_EDI.htm, 9 pages, © 1999; Revised Feb. 1, 2000.

Microsoft Corporation, "Microsoft Internet Commerce Strategy: A Foundation for Doing Business on the Internet", May 1997, 27 pages.

Survey of E-Commerce Companies & Products: Business Logistics, Customer Service, Supply Chain Management, pages.hotbot.com/biz/jayml/BP9.html, 28 pages, Richard Karpinski, Appendix II Feb. 9, 1999 on p. 26.

FedEx Standardizes on Netscape, News Source: Mountain View, Calif., Jun. 11/PRNewswire; News Date Jun. 12, 1996 12:55 pm; Keywords: Federal Express, Electronic Commerce; 3 pages.

Email Message; From SmartShip Online Support, To: smartshippers@smartship.com; subject: You can ship online now! Sent: Tuesday, Dec. 15, 1998 11:53 am; 1 page.

Declaration by John Dietz, entitled "Verified Statement (Declaration) No. 1 in Support of Information Disclosure Statement in U.S. Appl. Nos. 09/684,010, 09/684,871, 09/684,870, 09/684,808, 09/684,869, 09/685,078, 09/680,649, 09/680,654, 09/684,865, 09/685,077, 09/684,014, 09/684,861, 09/684,152, 09/684,866, 09/820,377, and 09/820,292", executed Jul. 20, 2001, pp. 1-8 (with Exhibits A-J attached).

Declaration by John Dietz, entitled "Verified Statement (Declaration) No. 2 in Support of Information Disclosure Statement in U.S. Appl. Nos. 09/684,010, 09/684,871, 09/684,870, 09/684,808, 09/684,869, 09/685,078, 09/680,649, 09/680,654, 09/684,865, 09/685,077, 09/684,014, 09/684,861, 09/684,152, 09/684,866, 09/820,377, and 09/820,292", executed Jul. 20, 2001, pp. 1-6 (with Exhibits A and B attached).

"Smartship.com Announces Multi-Carrier Shipping and Tracking Function for E-Commerce", SmartShip.com Press Release, Apr. 3, 2000, 2 pages, Irvine California.

Appendix A (throughout) to U.S. Appl. No. 09/820,377, William et al. (titled: Apparatus, Systems and Methods for Online, Multi-Parcel, Multi-Carrier, Multi-Service Enterprise Parcel Shipping Management) filed Mar. 27, 2001, submitted in Accordance with MPEP § 724.02 showing in brackets material redacted under 37 C.F. R.§ 1.217.

ABF Freight System, Inc. Announces the Release of Q-Rate® for Windows, May 26, 1999 (abfs.com/about/news/1999/p052699.asp?bhcp=1).

"After Disconnection from Internet of Recovery from Error, Return to Unitform Resource Locator": 1B Technical Disclosure Bulleti, Oct. 1, 1997, vol. 40, No. 10, pp. 153-154.

FedEx® Services (fedex.com) Archived on Jan. 16, 1997.

Material Logistics System, (NN86091526) IBM Technical Disclosure Bulletin, Sep. 1986, US, vol. 26, Issue 4, Page No. 1526-1530.

UPS Service Guide, (upd.com) Archived on Dec. 6, 1998.

United States Patent Office; Office Action dated Mar. 24, 2004 for Bennett, et al.; Apparatus, Systems And Methods for Online, Multi-Carrier, Multi-Service Parcel Shipping Management Featuring Shipping Location Comparison Across Multiple Carriers; U.S. Appl. No. 09/684,871, filed Oct. 6, 2000.

United States Patent Office; Office Action dated Mar. 25, 2004 for Bennett, et al.; Apparatus, Systems and Methods for Online, Multi-Carrier, Multi-Service Parcel Shipping Management Featuring Parcel Handling Rules Comparison Across Multiple Carriers; U.S. Appl. No. 09/684,870, filed Oct. 6, 2000.

United States Patent Office; Office Action dated Mar. 23, 2004 for Bennett, et al,; Apparatus, Systems and Methods for Online, Multi-Carrier, Multi-Service Parcel Shipping Management Featuring Notification Service Option Comparison for Multiple Carriers; U.S. Appl. No. 09/685,078, filed Oct. 6, 2000.

United States Patent Office; Office Action dated Nov. 25, 2003 for Bennett, et al.;Apparatus, Systems and Methods for Online, Multi-Carrier, Multi-Service Parcel Shipping Management Featuring Delivery Service Option Comparison for Multiple Carriers; U.S. Appl. No. 09/680,649, filed Oct. 6, 2000.

United States Patent Office; Office Action dated Mar. 31, 2004 for Bennett, et al.; Apparatus, Systems and Methods for Online, Multi-Carrier, Multi-Service Parcel Shipping Management Featuring Shipping Rate and Delivery Schedule Comparison for Multiple Carriers; U.S. Appl. No. 09/680,654, filed Oct. 6, 2000.

United States Patent Office; Office Action dated Nov. 18, 2002 for Bennett, et al.; Apparatus, Systems and Methods for Applying Billing Options for Multiple Carriers for Online, Multi-Carrier, Multi-Service Parcel Shipping Management; U.S. Appl. No. 09/684,865, filed Oct. 6, 2000.

United States Patent Office; Office Action dated Mar. 26, 2004 for Bilbin, et al.; Apparatus, Systems and Methods for Online, Multi- Carrier, Multi-Service Parcel Shipping Management Determination of Ratable Weight for Multiple Carriers; U.S. Appl. No. 09/684,077, filed Oct. 6, 2000.
United Stated Patent Office; Office Action dated Feb. 18, 2004 for Bilbin, et al.; Apparatus, Systems and Methods for Zone Level Rating for Each of Multiple Carriers; U.S. Appl. No. 09/684,014, filed Oct. 6, 2000.
United States Patent Office; Office Action dated Dec. 24, 2003 for Bilbin, et al.; Apparatus, Systems and Methods for Determining Delivery Time Schedules for Each of Multiple Carriers; U.S. Appl. No. 09/684,861, filed Oct. 6, 2000.
United States Patent Office; Office Action dated Apr. 5, 2004 for Williams, et al.; Apparatus, Systems and Methods for Online, Multi-Parcel, Multi-Carrier, Multi-Service Enterprise Parcel Shipping Management; U.S. Appl. No. 09/820,377, filed Mar. 27, 2001.
United States Patent Office; Office Action dated Feb. 10, 2004 for Bennett, et al.; Postal Shipping Label; U.S. Appl. No. 10/211,802, filed Aug. 1, 2002.
United States Patent Office; Office Action dated Jan. 13, 2004 for Bennett, et al; Reporting Shipping Rates and Delivery Schedules For Multiple Services and Multiple Carriers; U.S. Appl. No. 09/684,869, filed Oct. 6, 2000.
United States Patent Office; Office Action dated Jul. 19, 2004 for Bennett, et al.;Apparatus, Systems and Methods for Online, Multi-Carrier, Multi-Service Parcel Shipping Management Featuring Delivery Service Option Comparison for Multiple Carriers; U.S. Appl. No. 09/680,649, filed Oct. 6, 2000.
United States Patent Office; Office Action dated Sep. 13, 2004 for Bilbin, et al.; Apparatus, Systems and Methods for Determining Delivery Time Schedules for Each of Multiple Carriers; U.S. Appl. No. 09/684,861, filed Oct. 6, 2000.
United States Patent Office; Office Action dated Jul. 6, 2004 for Sean Hu et al.; Apparatus, Systems and Methods for Printing Dimensionally Accurate Symbologies on Laser Printers Configured with Remote Client Computer Devices; U.S. Appl. No. 09/684,152, filed Oct. 6, 2000.
United States Patent Office; Office Action dated Mar. 11, 2004 for Bennett, et al.; Apparatus, Systems and Methods for Online, Multi-Carrier, Multi-Service Parcel Shipping Management; U.S. Appl. No. 09/684,866, filed Oct. 6, 2000.
Microsoft and iShip.com make comparing shipping services Easy on MSN.com, PR Newswire, Nov. 4, 1998 (retreived Jun. 29, 2005) pp. 1-2, retreived from: Dialog, file 20.
U.S. Postal Service, www.usps.com, Apr. 28, 1999, pp. 1-20, [reported for U.S. Appl. No. 09/684,861 as retrieved Jun. 29, 2005; reported as retrieved from: Google.com and archive.org].
UPS Offers Free Shipping Cost Calculator Software, Newsbytes News Network, Feb. 8, 1996, pp. 1-2, [reported for U.S. Appl. No. 09/684,861 as retrieved Jun. 29, 2005; reported as retrieved from Dialog, file 9].
"iship.com raises 3.4 Million", PR Newswire, Jul. 20, 1998, pp. 1-2, [reported for U.S. Appl. No. 09/684,861 as retrieved Jun. 29, 2005; reported as retrieved from Dialog, file 20].
iship.com launches first complete web-based shipping service, PR Newswire, Jan. 18, 1999, pp. 1-4, [reported for U.S. Appl. No. 09/684,861, as retrieved Jun. 29, 2005; reported as retrieved from: Proquest Direct].
United States Patent Office; Office Action dated Aug. 1, 2005 for Apparatus, Systems and Methods for Online. Multi-Carrier, Multi-Service Parcel Shipping Management Featuring Shipping Location Comparison Across Multiple Carriers; U.S. Appl. No. 09/684,871, filed Oct. 6, 2000.
United States Patent Office; Office Action dated May 27, 2005 for Bennett, et al.; Apparatus, Systems and Methods for Online, Multi-Carrier, Multi-Service Parcel Shipping Management Featuring Parcel Handling Rules Comparison Across Multiple Carriers, U.S. Appl. No. 09/684,870, filed Oct. 6, 2000.
United States Patent Office: Office Action dated Aug. 1, 2005 for Bennett, et al.; Apparatus, Systems and Methods for Online, Multi-Carrier, Multi-Service Parcel Shipping Management Featuring Notification Service Option Comparison for Multiple Carriers; U.S. Appl. No. 09/685,078, filed Oct. 6, 2000.
United States Patent Office: Office Action dated Aug. 3, 2005 for Bennett, et al.; Apparatus, Systems and Methods for Online, Multi-Carrier, Multi-Service Parcel Shipping Management Featuring Shipping Rate and Delivery Schedule Comparison for Multiple Carriers: U.S. Appl. No. 09/680,654, filed Oct. 6, 2000.
United States Patent Office: Office Action dated Jul. 6, 2005 for Bilibln, et al.; Apparatus, Systems and Methods for Determining Delivery Time Schedules for Each of Multiple Carriers; U.S. Appl. No. 09/684,861, filed Oct. 6, 2000.
United States Patent Office: Office Action dated Aug. 1, 2005 for Hu, et al.; Apparatus, Systems and Methods for Printing Dimensionally Accrate Symbologies on Laser Printers Configured With Remote Client Computer Devices; U.S. Appl. No. 09/684,152, filed Oct. 6, 2000.
United States Patent Office; Office Action dated Apr. 25, 2005 for Hu, et al.; Apparatus, Systems and Methods for Interfacing With Digital Scales Configured With Remote Client Computer Devices; U.S. Appl. No. 09/684,808, filed Oct. 6, 2000.
United States Patent Office; Office Action dated May 20, 2005 for Bilibin, et al; Apparatus, Systems and Methods for Online, Multi-Carrier, Multi-Service Parcel Shipping Management Determination of Ratable Weight for Multiple Carriers; U.S. Appl. No. 09/685,077, filed Oct. 6, 2000.
United States Patent Office; Office Action dated Mar. 7, 2005 for Bennett, et al.; Apparatus, Systems and Methods for Online, Multi-Carrier, Multi-Service Parcel Shipping Management Featuring Shipping Location Comparison Across Multiple Carriers;U.S. Appl. No. 09/684,871, filed Oct. 6, 2000.
United States Patent Office: Office Action dated Mar. 7, 2005 for Bennett, et al.; Apparatus, Systems and Methods for Online, Multi-Carrier, Multi-Service Parcel Shipping Management Featuring Notification Service Option Comparison for Multiple Carriers; U.S. Appl. No. 09/685,078, filed Oct. 6, 2000.
United States Patent Office: Office Action dated Mar. 4, 2005 for Bilibin, et al.; Apparatus, Systems and Methods for Zone Level Rating for Each of Multiple Carriers; U.S. Appl. No. 09/684,014, filed Oct. 6, 2000.
United States Patent Office: Office Action dated Mar. 7, 2005 for Bennett, et al.; Apparatus, Systems and Methods for Online, Multi-Carrier, Multi-Service Parcel Shipping Management; U.S. Appl. No. 09/684,866, filed Oct. 6, 2000.
United States Patent Office; Office Action dated Dec. 7, 2004 for Bennett, et al.; Apparatus, Systems and Methods for Online, Multi-Carrier, Multi-Service Parcel Shipping Management Featuring Shipping Location Comparison Across Multiple Carriers; U.S. Appl. No. 09/684,871, filed Oct. 6, 2000.
United States Patent Office; Office Action dated Nov. 29, 2004 for Bennett, et al.; Apparatus, Systems and Methods for Online, Multi-Carrier, Multi-Service Parcel Shipping Management Featuring Parcel Handling Rules Comparison Across Multiple Carriers; U.S. Appl. No. 09/684,870, filed Oct. 6, 2000.
United States Patent Office; Office Action dated Jan. 13, 2005 for Bennett, et al; Reporting Shipping Rates and Delivery Schedules for Multiple Services and Multiple Carriers; U.S. Appl. No. 09/684,869, filed Oct. 6, 2000.
United States Patent Office; Office Action dated Nov. 30, 2004 for Bennett, et al.; Apparatus, Systems and Methods for Online, Multi-Carrier, Multi-Service Parcel Shipping Management Featuring Notification Service Option Comparison for Multiple Carriers; U.S. Appl. No. 09/685,078, filed Oct. 6, 2000.
United States Patent Office; Office Action dated Feb. 4, 2005 for Bennett, et al.; Apparatus, Systems and Methods for Online, Multi-Carrier, Multi-Service Parcel Shipping Management Featuring Shipping Rate and Delivery Schedule Comparison for Multiple Carriers; U.S. Appl. No. 09/680,654, filed Oct. 6, 2000.
United States Patent Office; Office Action dated Nov. 29, 2004 for Bilibin, et al.; Apparatus, Systems and Methods for Online, Multi-Carrier, Multi-Service Parcel Shipping Management Determination of Ratable Weight for Multiple Carriers; U.S. Appl. No. 09/685,077, filed Oct. 6, 2000.

United States Patent Office; Office Action dated Dec. 7, 2004 for Bilibin, et al.; Apparatus, Systems and Methods for Zone Level Rating for Each of Multiple Carriers; U.S. Appl. No. 09/684,014, filed Oct. 6 2000.
United States Patent Office; Office Action dated Jan. 11, 2005 for Bilibin, et al.; Apparatus, Systems and Methods for Determining Delivery Time Schedules for Each of Multiple Carriers; U.S. Appl. No. 09/684,861, filed Oct. 6, 2000.
United States Patent Office; Office Action dated Feb. 10, 2005 for Sean Hu, et al.; Apparatus, Systems and Methods for Printing Dimensionally Accurate Symbologies on Laser Printers Configured with Remote Client Computer Devices; U.S. Appl. No. 09/684,152, filed Oct. 6, 2000.
United States Patent Office; Office Action dated Jan. 27, 2006 for Bennett, et al.; Apparatus, Systems and Methods for Online, Multi-Carrier, Multi-Service Parcel Shipping Management Featuring Shipping Location Comparison Across Multiple Carriers; U.S. Appl. No. 09/684,871, filed Oct. 6, 2000.
United States Patent Office; Office Action dated Nov. 18, 2005 for Bennett et al.; Apparatus, Systems, and Methods for Online, Multi-Carrier, Multi-Service Parcel Shipping Management Featuring Parcel Handling Rules Comparison Across Multiple Carriers; U.S. Appl. No. 09/684,870, filed Oct. 6, 2000.
United States Patent Office; Office Action dated Nov. 17, 2005 for Hu, et al.; Apparatus, Systems and Methods for Interfacing With Digital Scales Configured With Remote Client Computer Devices; U.S. Appl. No. 09/684,808, filed Oct. 6, 2000.
United States Patent Office; Office Action dated Dec. 9, 2005 for Bennett, et al.; Reporting Shipping Rates and Delivery Schedules for Multiple Services and Multiple Carriers; U.S. Appl. No. 09/684,869, filed Oct. 6, 2000.
United States Patent Office; Office Action dated Jan. 27, 2006; Apparatus, Systems and Methods for Online, Multi-Carrier, Multi-Service Parcel Shipping Management Featuring Shipping Rate and Delivery Schedule Comparison for Multiple Carriers; U.S. Appl. No. 09/680,654, filed Oct. 6, 2000.
United States Patent Office; Office Action dated Nov. 17, 2005 for Bilibin, et al.; Apparatus, Systems and Methods for Online, Multi-Carrier, Multi-Service Parcel Shipping Management Determination of Ratable Weight for Multiple Carriers; U.S. Appl. No. 09/685,077, filed Oct. 6, 2000.
United States Patent Office; Office Action dated Dec. 20, 2005 for Bilibin, et al.; Apparatus, Systems and Methods for Determining Delivery Time Schedules for Each of Multiple Carriers; U.S. Appl. No. 09/684,861, filed Oct. 6, 2000.
United States Patent Office; Office Action dated Jan. 11, 2006 for Bennett, et al.; Apparatus, Systems and Methods for Online, Multi-Carrier, Multi-Service Parcel Shipping Management; U.S. Appl. No. 09/684,866, filed Oct. 6, 2000.
White, Ron; "How Computers Work"; 1999, pp. 214-215.
FedEx, www.FedEx.com, Jan. 12, 1998 [retrieved Dec. 12, 2005], pp. 1-15, retrieved from: Google.com and archive.org.
McCandless, Michael, "Let's Go Shopping", IEEE Intelligent Systems, Jan./Feb. 1999, pp. 2-4, United States.
Yesil, Magdalena, Creating the Virtual Store, John Wiley & Sons, Inc., 1997, pp. 188-189, United States.
Kosiur, David, "Understanding Electronic Commerce", Strategic Technology Series, Microsoft Press, 1997, pp. 16-18, Redmond, Washington, United States.
"Innovative web resource to promote wider understanding and adaption of E-commerce solutions", May 28, 1998, p. 1., M2 Presswire, UPS.
United States Patent Office; Office Action dated May 3, 2006 for Hu, et al.; Apparatus, Systems and Methods for Interfacing With Digital Scales Configured With Remote Client Computer Devices; U.S. Appl. No. 09/684,808, filed Oct. 6, 2000.
United States Patent Office; Office Action dated May 8, 2007 for Hu, et al.; Apparatus, Systems and Methods for Interfacing With Digital Scales Configured With Remote Client Computer Devices; U.S. Appl. No. 09/684,808, filed Oct. 6, 2000.
United States Patent Office; Office Action dated Nov. 10, 2006 for Hu, et al.; Apparatus, Systems and Methods for Printing Dimensionally Accurate Symbologies on Laser Printers Configured with Remote Client Computer Devices; U.S. Appl. No. 09/684,152, filed Oct. 6, 2000.
United States Patent Office; Office Action dated May 4, 2006 for Bennett, et al.; Apparatus, Systems and Methods for Online, Multi-Carrier, Multi-Service Parcel Shipping Management; U.S. Appl. No. 09/684,866, filed Oct. 6, 2000.
United States Patent Office; Office Action dated Aug. 17, 2006 for Bennett, et al.; Apparatus, Systems and Methods for Online, Multi-Carrier, Multi-Service Parcel Shipping Management Featuring Shipping Location Comparison Across Multiple Carriers; U.S. Appl. No. 09/684,871, filed Oct. 6, 2000.
United States Patent Office; Office Action dated Jul. 27, 2007 for Bennett, et al.; Apparatus, Systems and Methods for Online, Multi-Carrier, Multi-Service Parcel Shipping Management Featuring Shipping Location Comparison Across Multiple Carriers; U.S. Appl. No. 09/684,871, filed Oct. 6, 2000.
United States Patent Office; Examiner's Answer, dated May 1, 2008 for Bennett, et al.; Apparatus, Systems and Methods for Online, Multi-Carrier, Multi-Service Parcel Shipping Management Featuring Shipping Location Comparison Across Multiple Carriers; U.S. Appl. No. 09/684,871, filed Oct. 6, 2000.
United States Patent Office; Office Action dated Jul. 18, 2007 for Bennett, et al.; Reporting Shipping Rates and Delivery Schedules for Multiple Services and Multiple Carriers; U.S. Appl. No. 09/684,869, filed Oct. 6, 2000.
United States Patent Office; Office Action dated Jun. 12, 2008 for Bennett, et al.; Reporting Shipping Rates and Delivery Schedules for Multiple Services and Multiple Carriers; U.S. Appl. No. 09/684,869, filed Oct. 6, 2000.
United States Patent Office; Office Action dated Jun. 20, 2006 for Bennett, et al.; Reporting Shipping Rates and Delivery Schedules for Multiple Services and Multiple Carriers; U.S. Appl. No. 09/684,869, filed Oct. 6, 2000.
United States Patent Office; Office Action dated Dec. 20, 2006 for Bennett, et al.; Reporting Shipping Rates and Delivery Schedules for Multiple Services and Multiple Carriers; U.S. Appl. No. 09/684,869, filed Oct. 6, 2000.
United States Patent Office; Office Action dated Jun. 18, 2007 for Bennett, et al.; Reporting Shipping Rates and Delivery Schedules for Multiple Services and Multiple Carriers; U.S. Appl. No. 09/684,869, filed Oct. 6, 2000.
United States Patent Office; Office Action dated Nov. 29, 2007 for Bennett, et al.; Reporting Shipping Rates and Delivery Schedules for Multiple Services and Multiple Carriers; U.S. Appl. No. 09/684,869, filed Oct. 6, 2000.
United States Patent Office; Office Action dated Jun. 16, 2008 for Bennett, et al.; Reporting Shipping Rates and Delivery Schedules for Multiple Services and Multiple Carriers; U.S. Appl. No. 09/684,869, filed Oct. 6, 2000.
United States Patent Office: Office Action dated Mar. 3, 2006 for Bennett, et al.; Apparatus, Systems and Methods for Online, Multi-Carrier, Multi-Service Parcel Shipping Management Featuring Notification Service Option Comparison for Multiple Carriers; U.S. Appl. No. 09/685,078, filed Oct. 6, 2000.
United States Patent Office: Office Action dated May 21, 2007 for Bennett, et al.; Apparatus, Systems and Methods for Online, Multi-Carrier, Multi-Service Parcel Shipping Management Featuring Notification Service Option Comparison for Multiple Carriers; U.S. Appl. No. 09/685,078, filed Oct. 6, 2000.
United States Patent Office: Office Action dated Feb. 20, 2008 for Bennett, et al.; Apparatus, Systems and Methods for Online, Multi-Carrier, Multi-Service Parcel Shipping Management Featuring Notification Service Option Comparison for Multiple Carriers; U.S. Appl. No. 09/685,078, filed Oct. 6, 2000.
United States Patent Office; Examiner's Answer dated Nov. 30, 2006; Apparatus, Systems and Methods for Online, Multi-Carrier, Multi-Service Parcel Shipping Management Featuring Shipping Rate and Delivery Schedule Comparison for Multiple Carriers; U.S. Appl. No. 09/680,654, filed Oct. 6, 2000.
United States Patent Office; Notice of Allowance dated Dec. 22, 2004 for Bennett, et al.; Apparatus, Systems and Methods for Applying Billing Options for Multiple Carriers for Online Multi-Carrier, Multi-Service Parcel Shipping Management, U.S. Appl. No. 09/684,865, filed Oct. 6, 2000.

United States Patent Office; Office Action dated Dec. 14, 2006 for Bilibin, et al.; Apparatus, Systems and Methods for Online, Multi-Carrier, Multi-Service Parcel Shipping Management Determination of Ratable Weight for Multiple Carriers; U.S. Appl. No. 09/685,077, filed Oct. 6, 2000.

United States Patent Office; Examiner's Answer dated Nov. 29, 2006 for Bilibin, et al.; Apparatus, Systems and Methods for Determining Delivery Time Schedules for Each of Multiple Carriers; U.S. Appl. No. 09/684,861, filed Oct. 6, 2000.

United States Patent Office; Notice of Allowance dated Aug. 10, 2006 for Sean Hu, et al.; Apparatus, Systems and Methods for Printing Dimensionally Accurate Symbologies on Laser Printers Configured with Remote Client Computer Devices; U.S. Appl. No. 09/684,152, filed Oct. 6, 2000.

United States Patent Office; Office Action dated Jun. 4, 2007 for Bennett, et al.; Apparatus, Systems and Methods for Online, Multi-Carrier, Multi-Service Parcel Shipping Management; U.S. Appl. No. 09/684,866, filed Oct. 6, 2000.

United States Patent Office; Office Action dated Mar. 6, 2008 for Bennett, et al.; Apparatus, Systems and Methods for Online, Multi-Carrier, Multi-Service Parcel Shipping Management; U.S. Appl. No. 09/684,866, filed Oct. 6, 2000.

United States Patent Office; Notice of Allowance dated Jan. 7, 2008 for Bilibin, et al.; Apparatus, Systems and Methods for Zone Level Rating for Each of Multiple Carriers; U.S. Appl. No. 11/123,536, filed May 7, 2005.

UPS® "On Call Air Pickup," http://web.archive.org/web/19990508182528/wwwapps.ups.com/servlet/ODSServlet/; 1 page.

Examiner's Answer for co-pending case U.S. Appl. No. 09/684,870, dated Feb. 19, 2009, pp. 1-18, USPTO.

Office Action for co-pending case U.S. Appl. No. 09/684,869, dated Dec. 10, 2008, pp. 1-13, USPTO.

Examiner's Answer for co-pending case U.S. Appl. No. 09/685,078, dated Oct. 16, 2008, pp. 1-18, USPTO.

Examiner's Answer for co-pending case U.S. Appl. No. 09/685,077, dated Dec. 9, 2008, pp. 1-16, USPTO.

Office Action for co-pending case U.S. Appl. No. 09/684,866, dated Mar. 31, 2009, pp. 1-18, USPTO.

Office Action for co-pending case U.S. Appl. No. 10/838,031, dated Jun. 10, 2009, pp. 1-34, USPTO.

UPS Home Page; http://web.archive.org/web/19981205132745/http://ups.com/; UPS; Copyright 1994-1998; 1 page.

UPS Quick Cost Calculator; http://web/archive.org/web/19990220223708/ups.com/using/services/rave/rate.html; UPS; Copyright 1994-1999; 1 page.

Quick Cost Calculator; http://web.archive.org/web/19981203124546/ups.com/using/services/rave/rate.html; UPS; Copyright 1994-1998; 2 pages.

UPS Worldwide Time-In-Transit; http://web.archive.org/web/19991013000531/ups.com/wwtransit/engtimetran.html; UPS; Copyright 1994-1999; 1 page.

UPS Worldwide Time-In Transit; http://web.archive.org/web/19991001213457/wwwapps.ups.com/wwtransit/wwtimetran.cgi; UPS; Copyright 1994-1999; 1 page.

UPS Registration; UPS; as of Jun. 7, 1999; 1 page.

UPS Registration, Member Information; UPS; Copyright 1994-1999; 1 page.

UPS Registration, Thank You; UPS; Copyright 1994-1999; 1 page.

UPS Log In; UPS; as of Jun. 7, 1999; 1 page.

UPS Shipping Information; UPS; as of Jun. 7, 1999; 1 page.

UPS Shipping Information (continued); UPS; as of Jun. 7, 1999; 1 page.

UPS Shipment Summary (UPS 2nd Day Air); UPS; as of Jun. 7, 1999; 1 page.

UPS Shipment Summary ((continued) 2nd Day Air); UPS; as of Jun. 7, 1999; 1 page.

UPS Shipping Preferences; UPS; Copyright 1994-1999; 1 page.

UPS Payment Method; UPS; as of Jun. 7, 1999; 1 page.

UPS Payment Method (continued); UPS; Copyright 1994-1999; 1 page.

UPS Address Book; UPS; as of Jun. 7, 1999; 1 page.

UPS Address Validation; UPS; Copyright 1994-1999; 1 page.

UPS Shipment Summary (UPS Ground Package); UPS; as of Jun. 7, 1999; 1 page.

UPS Shipment Summary ((continued); UPS Ground Package); UPS; Copyright 1994-1999; 1 page.

Office Action for U.S. Appl. No. 09/684,869; pp. 1-18, dated Aug. 18, 2009, USPTO.

Notice of Allowance for U.S. Appl. No. 09/684,866; pp. 1-14, dated Oct. 1, 2009, USPTO.

Office Action for U.S. Appl. No. 11/895,994; pp. 1-36, dated Sep. 2, 2009, USPTO.

* cited by examiner

```
<a target="_new"
href="http://iship.com/commerce/default.asp?K=A6V1XZ
&W=10&V=0&H=0">View Tour Shipping Costs!</a>
```

```
<a href="http://iship.com/Sellit/buyer.asp?
pid=f429b0d0abc411d39f8000902789280b"
>Click here to use iShip.com to view your shipping charges.</a>
```

220 (pid=f429b0d0abc411d39f8000902789280b")

FIG. 32 iShip.com
The Internet Package Shipper

RATES & DELIVERY TIMES - Place cursor over square next to the rate to view carrier and service.

|        | THU<br>12 NOV 98 | FRI<br>13 NOV 98 | MON<br>16 NOV 98 | WED<br>18 NOV 98 | Carriers |
|--------|------------------|------------------|------------------|------------------|----------|
| 10:30 AM | ☒ $52.25 |        |        |        | ☒ Airborne |
| 12:00 PM |        | ☒ $29.35 |        |        | ☒ FedEx |
| 3:00 PM | ☒ $40.10 |        |        |        | ☐ UPS |
| 5:00 PM |        | ☒ $21.25 | ☐ $16.40 | ☐ $7.28 | ☐ USPS |

USPS Priority Mail — 320

Enter your Zip Code and other options, then click Get Rates

- The Zip Code where the item would be delivered is: [80302]
- The delivery address for the item would be:
  ⦿ Business  ○ Residence
- I want the service to have a guaranteed delivery time:
  ○ Yes  ⦿ No Click the "Back" on your browser to return to item page.

Shipping services and rates provided by iShip.com, The Internet Package Shipper

[Get Rates]  [Help]

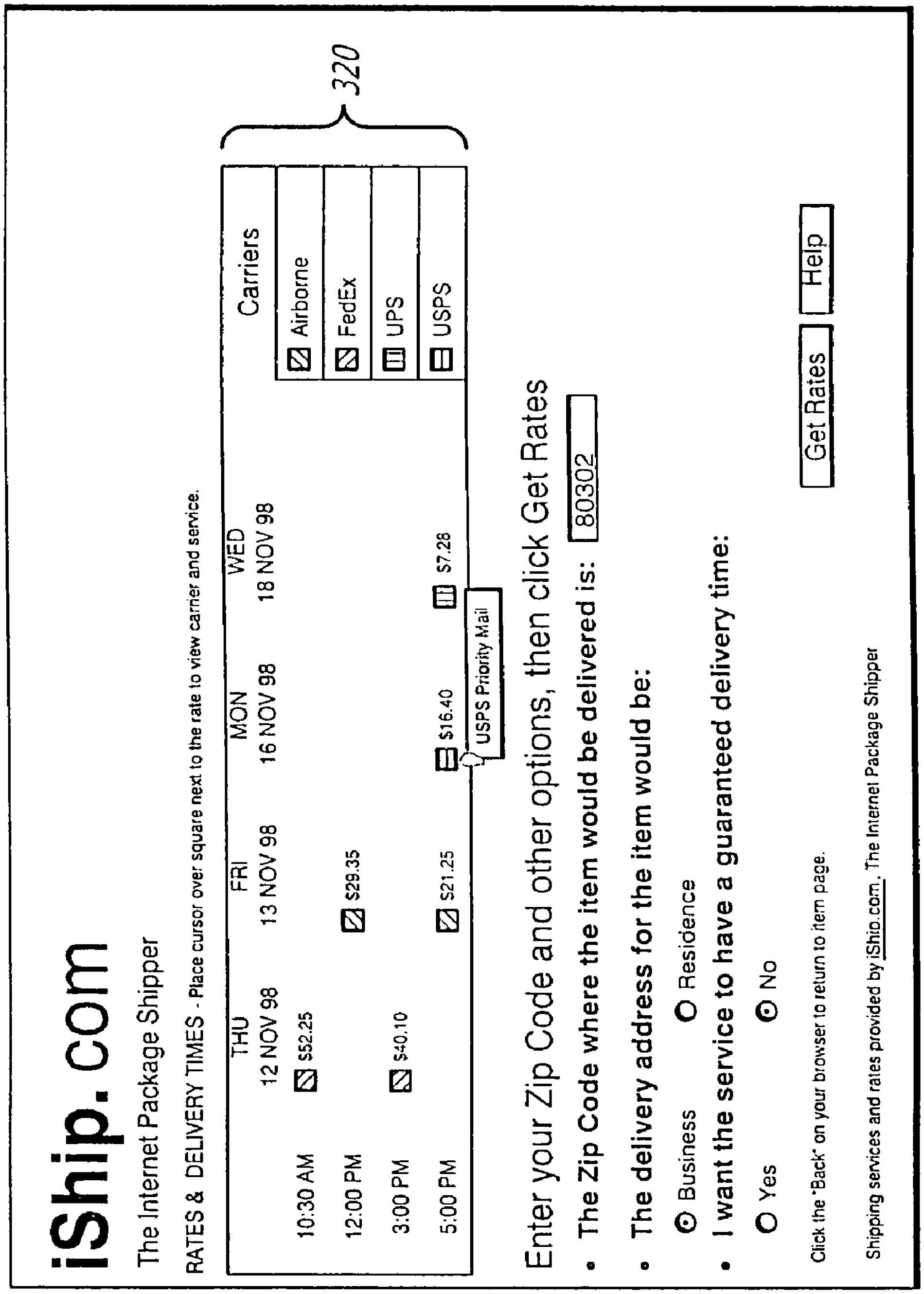

FIG. 40 iShip.com

The Internet Package Shipper

Enter your shipping address, then click Next. — 389

🔒 This is a secure transaction!

Company/Name: _____ 390/391
Attention: _____ 392
Street: _____ 393
Floor/Room: _____ 394
Department: _____ 395
City: _____ 397
State: [▽] 396-1   Zip Code: _____ 396-2 / 399
Telephone: (888)888-8888 — 398    Fax: (888)888-8889

This address is a:  ○ Business — 400   ○ Residence — 401

[<< Back] 117   [Next >>] 102   [Help] 105 iShip.com
The Internet Package Shipper

Verify the information and select Payment Method, then click Send.

🔒 This is a secure transaction!

Address

Some Company
1234 X Ave.
Suite 4567
Marketing
Someplace, WA. 12345
Phone (888)888-8888
Fax (888)888-8889

Service

Carrier: UPS
Service: Ground

Charges

The Shipping Charges are: $ 7.28
The Item Cost is: $ 500.00

The total amount you owe is: $ 507.28

Payment

Please select how you will pay for this item.

Payment Method: ▽

Card No.:

Expiration Date: ▽ ▽

If the cardholder Name and Billing Address are not the same as the Shipping Address entered, click Cardholder Information.

[ << Back ]  [ Cardholder Information ]  [ Send ]  [ Help ]

Shipping services and rates provided by: iShip.com, The Internet Shipper

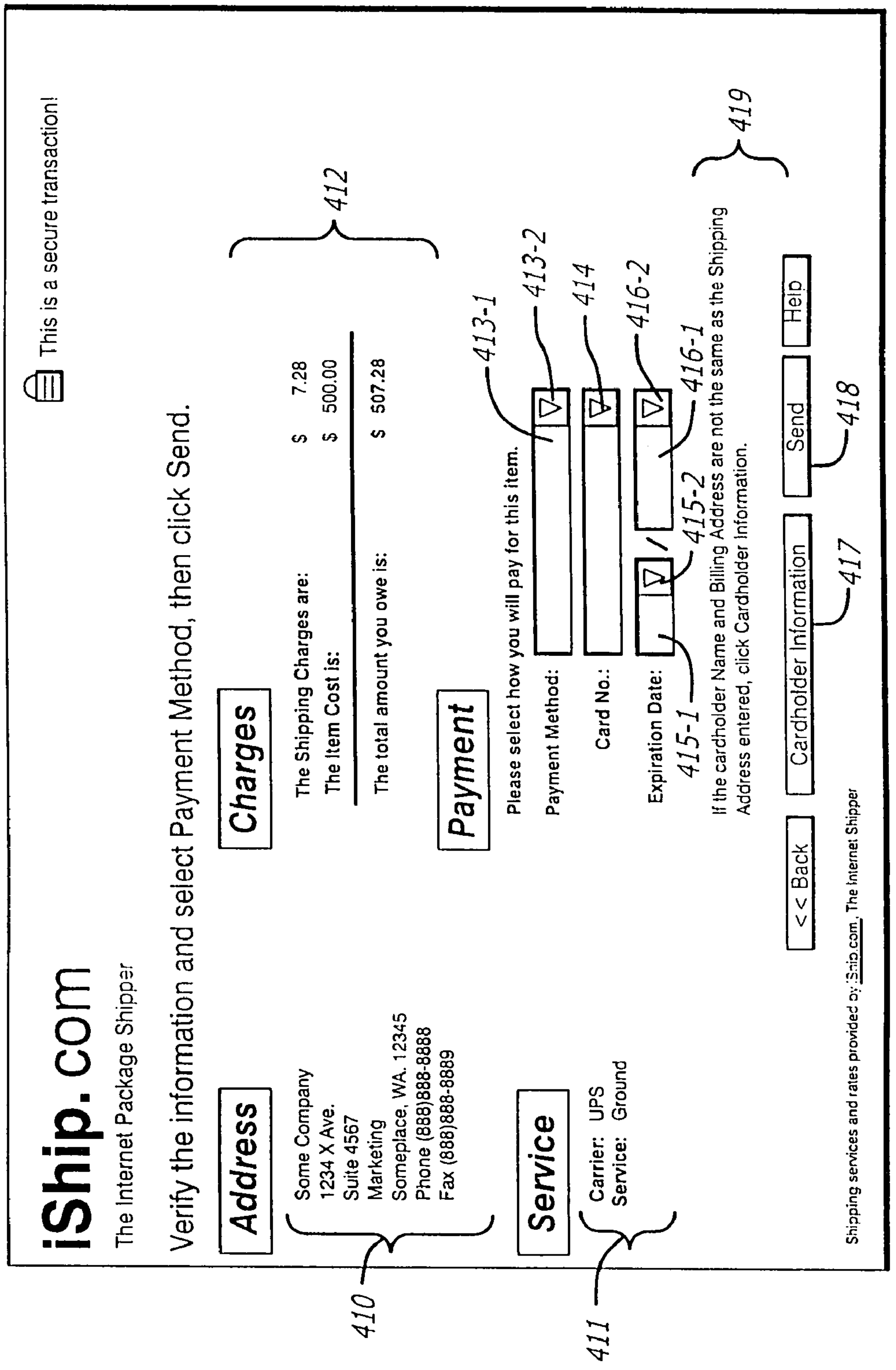

FIG. 47

Summary

- Origin Zip: 98005
- Destination Zip: 80302
- Est. Weight: 5 lbs.   Billed Weight: 5 lbs
- Service: FedEx Priority Overnight
- Service Options: Declared Value $750.00
  - E-Mail Notification
  - Signature not required
  - Service must be guaranteed
  - Verbal Notification
- Package will be shipped from:
  - Any Company
  - 2515 140th Ave. NE
  - Suite E110
  - Any Town, WA 98005 iShip.com
The Internet Package Shipper

Charges

| | |
|---|---|
| Base Service Charger | $57.50 |
| Declared Value | $6.00 |
| Verbal Notification | $7.50 |
| E-Mail Notification | $0.25 |
| Total Charge | $71.25 |

If you would like to ship this package, press "Next"

*Compare Services*   [<<Back] [Next>>] [Reset] [Cancel] [Help]

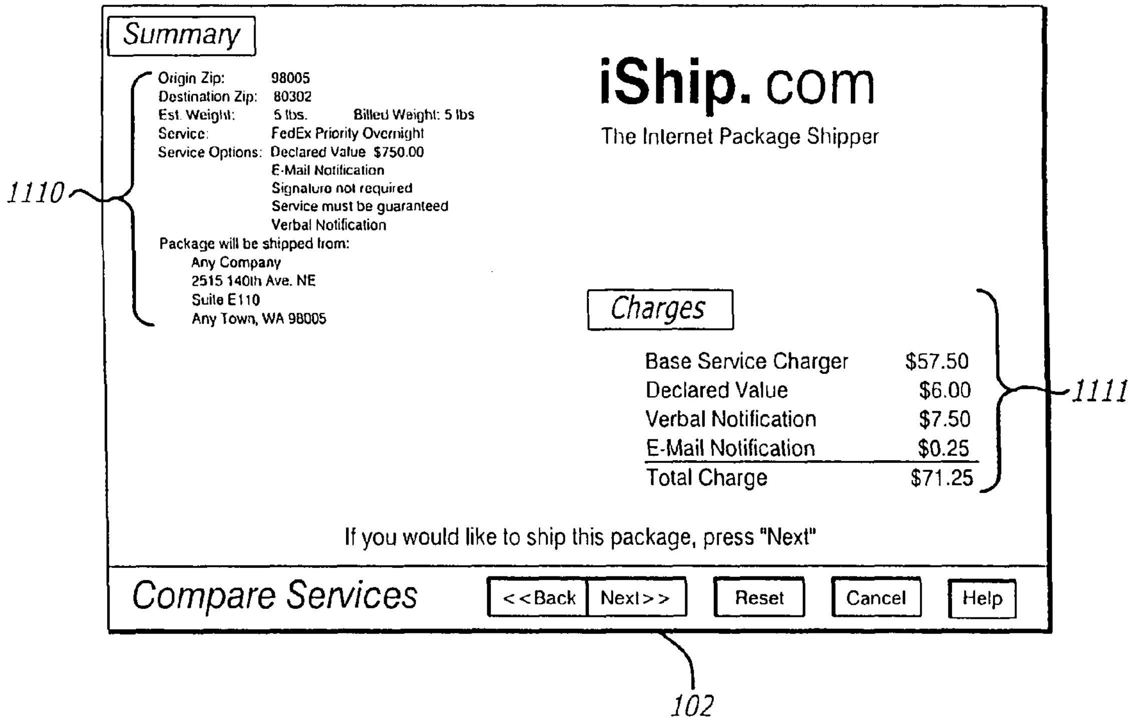

FIG. 48

VOID PACKAGE

Package — Confirm that this is the correct package before continuing.

Recipient:
  Mary Jones
  Some Company
  28 Your St. SW
  Any Town, IL 60600

Est. Weight: 5 lbs.    Billed Weight: 5 lbs.
Packaging: Other L 25.5 in. W 25.5 in. H 25.5 in.
Service: FedEx Priority Overnight
Service Options: Declared Value $ 750.00
  E-Mail Notification
  Signature not required
  Service must be guaranteed
  Verbal Notification
Reference #1: ABCDEFGHIJKLMNO
Reference #2: 123456789012345
Desc. of Goods: 20 Anti-Roadrunner Heat Seeking missiles
  ARHS Mobile Launch System

[View Details] — 451
— 452

If the package above is the package you want to void, press the "Void Package" button.

453

VOID PACKAGE    [Void Package]  [Cancel]  [Help]

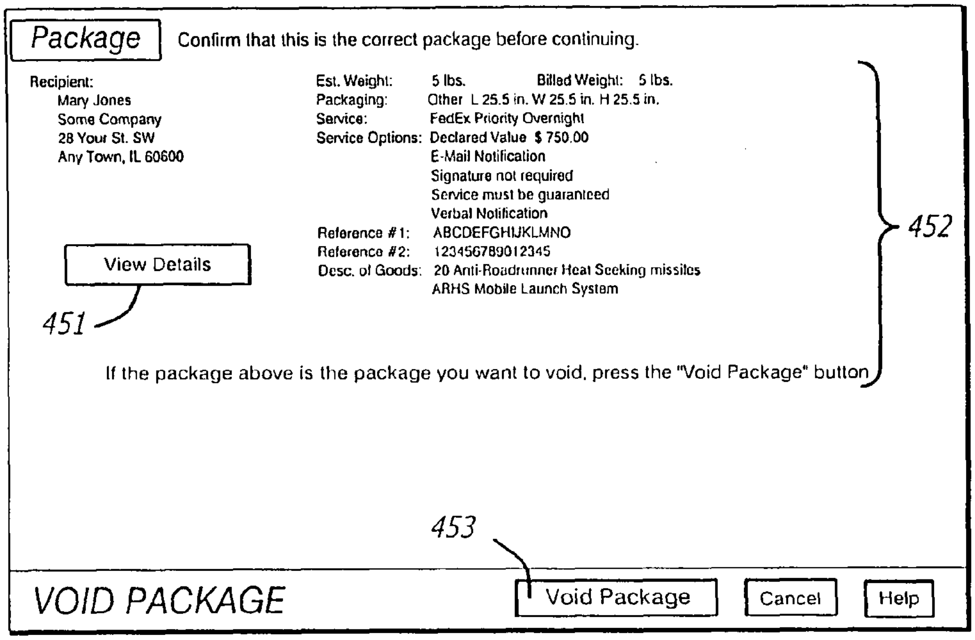

Reprint Label

Package — Confirm that this is the correct package before continuing.

Recipient:
  Mary Jones
  Some Company
  28 Your St. SW
  Any Town, IL 60600

Est. Weight: 5 lbs.    Billed Weight: 5 lbs.
Packaging: Other L 25.5 in. W 25.5 in. H 25.5 in.
Service: FedEx Priority Overnight
Service Options: Declared Value $ 750.00
  E-Mail Notification
  Signature not required
  Service must be guaranteed
  Verbal Notification
Reference #1: ABCDEFGHIJKLMNO
Reference #2: 123456789012345
Desc. of Goods: 20 Anti-Roadrunner Heat Seeking missiles
  ARHS Mobile Launch System

[View Details] — 451
— 454

To Reprint your shipping label:
  1. Make sure your printer is running, has paper and is setup to print in "Portrait" mode.
  2. Press the "Generate Label" button below.
  3. Using your browser's "Print" command, print the shipping label.

455

Reprint Label    [Generate Label]  [Cancel]  [Help]

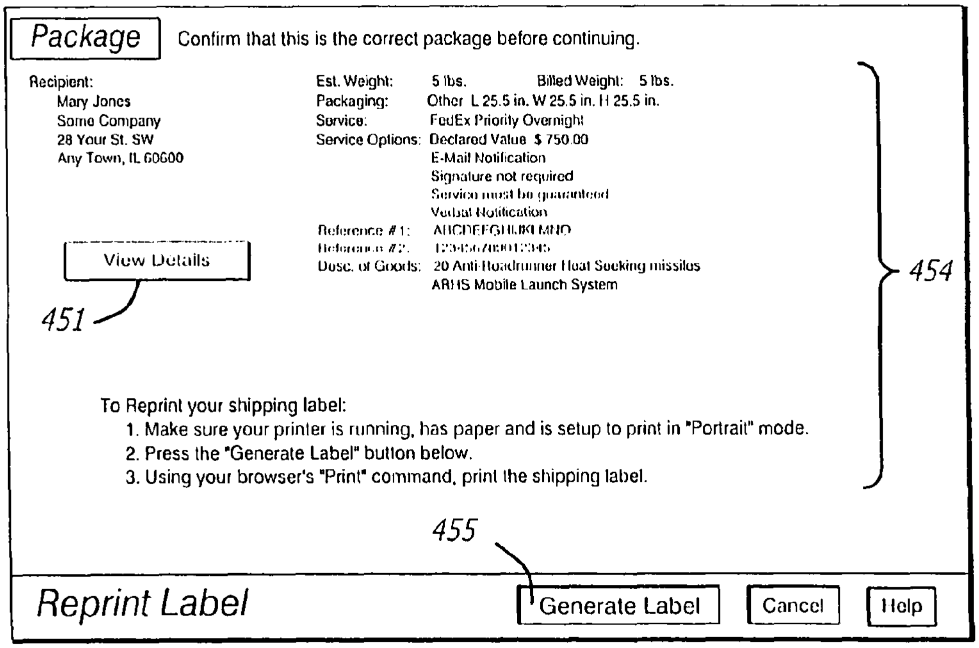

FIG. 53

```
<iship.com.request xmins="x-schema:http://iship.com/api/schema/trackrequest.xmi"
transactionid="3855BD2185E111d3984400A0C9D6C226">
        <header mode="interactive">
                <version major="0" minor="1"/>
            <batch id="AE5E54F08E2311d3984900A0C9D6C226"
            url="http://shasta/api/track/trackresponse.asp" email="bob@iship.com"/>
        </header>
        <sigon sessionid="" userid="test" password="7777777"/>
        <trackit>
                <package sequencenumber="1">
                        <trackingnumber carrier="ups">
                                1Z1812530202075466
                        </trackingnumber>
                </package>
        </trackit>
        <logoff/>
</iship.com.request>
```

FIG. 66

```
<iship.com.response transactionid="3855BD2185E111d3984400A0C9D6C226">
        <status ishiprcode="0" signonrcode="0" trackitrcode="0" parsercode="0"
        systemrcode="0"/>
        <trackit>
                <package sequencenumber="1" packagercode="0">
                        <deliveredto></deliveredto>
                        <deliverylocation>LEFT AT 3S</deliverylocation>
                        <signedby>HOWARD</signby>
                        <lastscan>9/1/99 1:50:00 PM DELIVERY </lastscan
                        <status>Delivered</status>
                        <deliverytime>9/1/99 1:50:00 PM</deliverytime>
                        <carrier>UPS</carrier>
                        <service>2ND DAY AIR</service>
                        <shipdate>8/28/99 </shipdate>
                        <trackingnumber>1Z1812530202075466</trackingnumber>
                        <scanlocation>FORT HAMILTON, NY US</scanlocation>
                        <weight>400</weight>
                </package>
        </trackit>
<iship.com.response>
```

FIG. 67

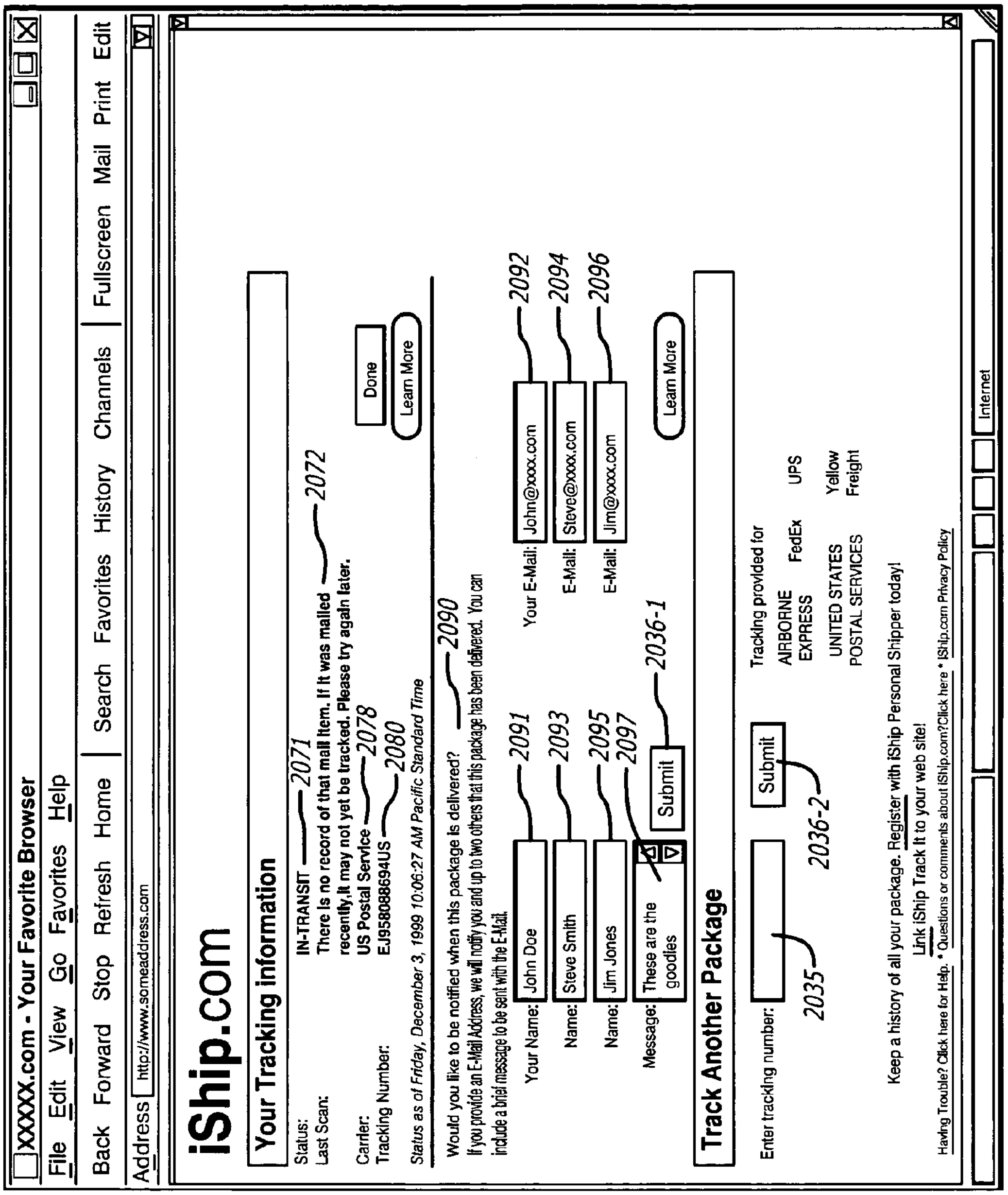

FIG. 72 iShip.com

Your Tracking information

Status: IN-TRANSIT — 2071
Last Scan: There is no record of that mail item. If it was mailed recently, it may not yet be tracked. Please try again later.
Carrier: US Postal Service — 2078
Tracking Number: EJ958086694US — 2080

Status as of Friday, December 3, 1999 10:06:27 AM Pacific Standard Time — 2090

Would you like to be notified when this package is delivered?
If you provide an E-Mail Address, we will notify you and up to two others that this package has been delivered. You can include a brief message to be sent with the E-Mail.

Your Name: John Doe — 2091    Your E-Mail: John@xxxx.com — 2092
Name: Steve Smith — 2093       E-Mail: Steve@xxxx.com — 2094
Name: Jim Jones — 2095         E-Mail: Jim@xxxx.com — 2096
Message: These are the goodies — 2097

Submit — 2036-1    Learn More

Track Another Package

Enter tracking number: ___ — 2035    Submit — 2036-2

Tracking provided for
AIRBORNE EXPRESS    FedEx    UPS
UNITED STATES       Yellow
POSTAL SERVICES     Freight Learn More Keep a history of all your package. Register with iShip Personal Shipper today!
Link iShip Track it to your web site!
Having Trouble? Click here for Help.  * Questions or comments about iShip.com?Click here * iShip.com Privacy Policy

ONLINE, MULTI-CARRIER, MULTI-SERVICE PARCEL SHIPPING MANAGEMENT FUNCTIONAL ALIGNMENT OF COMPUTER DEVICES

CROSS REFERENCE TO RELATED APPLICATIONS

This application claims priority of U.S. Provisional Patent Application Ser. No. 60/158,179, filed on Oct. 6, 1999, U.S. Provisional Patent Application Ser. No. 60/170,186, filed on Dec. 10, 1999, U.S. Provisional Patent Application Ser. No. 60/170,504, filed on Dec. 13, 1999, U.S. Provisional Patent Application Ser. No. 60/192,692, filed on Mar. 28, 2000, U.S. Provisional Patent Application Ser. No. 60/192,723, filed on Mar. 27, 2000, U.S. Provisional Patent Application Ser. No. 60/193,899, filed on Mar. 31, 2000, and U.S. Provisional Patent Application Ser. No. 60/195,748, filed on Apr. 6, 2000. The disclosures of U.S. Provisional Patent Application Ser. No. 60/158,179, filed on Oct. 6, 1999, U.S. Provisional Patent Application Ser. No. 60/170,186, filed on Dec. 10, 1999, U.S. Provisional Patent Application Ser. No. 60/170,504, filed on Dec. 13, 1999, are incorporated for all purposes herein by reference as if fully stated here.

FIELD OF THE INVENTION

The field of the present invention is computer systems, and specifically computer systems for parcel shipping management

BACKGROUND OF THE INVENTION

Individuals, small businesses and major corporations the ("Shipper(s)") ship billions of parcels every year (small office/home office shippers are referred to as "SOHO" Shippers). Each parcel, also sometimes referred to herein as a package, is shipped by a Shipper using at least one parcel carrier (the "carrier(s)", or "Carrier(s)").

Each parcel is characterized by a set of "Parcel Specifications." Parcel specifications include but are not limited to such factors as: parcel dimensions, parcel weight, parcel value, parcel value and the like.

Each Shipper is faced with certain shipping requirements and limitations ("Shipping Requirements"), such as the location from which the parcel is to be shipped, time frame within which the particular parcel must arrive at its destination, the ability of the shipper to drop off the parcel, budgetary constraints with regard to the cost of shipping, insurance against loss, delivery notification, loss protection, and the like.

Each Carrier has its own unique rating schedule, and delivery and pickup rules and schedules for each of a multitude of different services. In some cases, a particular Carrier's rules may be available in a standalone Carrier-provided paper-based or computer system. Many Shippers attempt to work with each of the standalone, individual paper-based and computer Carrier-provided systems ("standalone Carrier system environment") in order to ship a parcel.

A Shipper that uses standalone Carrier systems must sort through the various services offered by each carrier and apply each Carrier's rules to determine whether one or more carriers offer a service with which to deliver a particular parcel according to the Shipper's requirements. If the Shipper determines that more than one carrier offers a service with which to deliver a particular parcel according to the Shipper's requirements, then the particular Shipper might additionally be concerned with selecting a carrier and service that provide shipping services at the optimal price.

Some standalone carrier systems dedicate a single computer device to the performance of all shipping functionalities. Such a configuration does not provide time effective support for a high volume of shipping input and requests by a high volume of users over a global communications network. Accordingly, some way is needed to provide time effective support for a high volume of shipping input and requests by a high volume of users over a global communications network.

SUMMARY OF THE INVENTION

The present invention provides a computer system for managing shipping of a plurality of parcels by a plurality of users using a plurality of carriers that functionally aligns each server computer device of a plurality of server computer devices so that each server computer device performs a plurality of activities in support of a primary function.

The present invention provides a computer system for managing shipping of a plurality of parcels by a plurality of users using a plurality of carriers, wherein each user accesses the computer system over a global communications network using a client computer device, each user client computer device having an individual electronic connection to the global communications network, said computer system comprising: a plurality of server computers, wherein a first server computer is programmed to communicate with each of the plurality of users over multiple telecommunications connections over a global communications network at one time, wherein a second server computer is programmed to obtain data from at least one system database in response to each user input of a request by each particular user to ship a parcel, wherein a third server computer is programmed to use the data obtained for shipping the parcel to calculate a first shipping rate for a first carrier to ship the parcel and to calculate a second shipping rate for a second carrier to ship the parcel, and wherein a fourth server computer is programmed to obtain carrier tracking information from each of a plurality of carrier computer systems accessible over the global communications network.

BRIEF DESCRIPTION OF THE DRAWINGS

These and other features of the present invention are more fully set forth in the following description of exemplary embodiments of the invention. The description is presented with reference to the accompanying drawings in which:

FIG. 31 depicts the text of an exemplary hypertext link such as is created by an exemplary embodiment of the "Create Link" feature in an exemplary embodiment of the System in an independent system eCommerce environment;

FIG. 32 is a graphic representation depicting an alternative embodiment of a hyperlink generated by the System in an exemplary embodiment of the System in an independent system eCommerce environment;

FIG. 40 is a graphic representation depicting an exemplary embodiment of a multi-carrier, multi-service shipping rates comparison Graphic Array in an exemplary embodiment of the System in an independent system eCommerce environment;

FIG. 47 is a graphic representation depicting an exemplary embodiment of a Shipping Summary Screen in an exemplary embodiment of the System in an independent system eCommerce environment;

FIG. 48 is a graphic representation depicting an alternative exemplary embodiment of a Shipping Summary Screen in an exemplary embodiment of the System in an Internet environment;

FIG. 52 is a graphic representation of an exemplary embodiment of a Void Package screen in an exemplary embodiment of the System in an independent system eCommerce environment;

FIG. 53 is a graphic representation of an exemplary embodiment of a Reprint Label screen in an exemplary embodiment of the System in an independent system eCommerce environment;

FIGS. 64A-1, 64A-2, 64B-1 and 64B-2 are System interactivity data and logic flow diagrams depicting an exemplary embodiment of the process by which the System completes the information necessary to ship a package in an exemplary embodiment of the System in an independent system eCommerce environment;

FIG. 66 depicts an exemplary XML formatted request for submitting a tracking request to a Carrier in an exemplary embodiment of the System in an Internet environment;

FIG. 67 depicts an exemplary successful tracking response, also in XML format, returned by the Carrier in an exemplary embodiment of the System in an Internet environment;

FIG. 72 is a graphic representation of an exemplary embodiment of a Successful Tracking Report Screen for a package with non-final status in an exemplary embodiment of the System in an Internet environment;

DETAILED DESCRIPTION OF THE INVENTION

Figure 1:
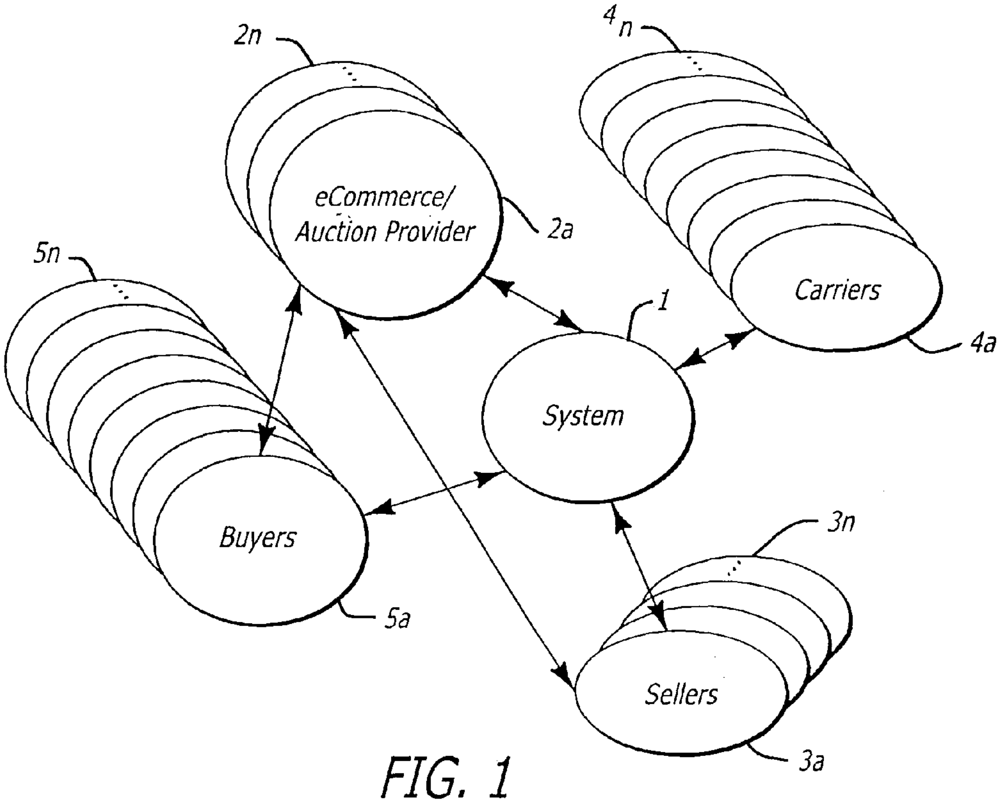
FIG. 1 is an entity relationship diagram depicting the interface relationships provided by the System between Shippers as Sellers, Carriers, Recipients as Buyers, eCommerce/eAuction Providers and the System in an exemplary embodiment of the System in an independent system eCommerce environment.

A portion of the disclosure of this patent document, including but not limited to the renderings of graphic user interface displays in FIGS. 10A through 10E, FIGS. 11 through 22, FIGS. 24 through 26, FIGS. 28 through 30, FIGS. 34 through 35, FIG. 36A, FIG. 36F, FIGS. 40 through 53, FIGS. 56 through 63, FIG. 68, and FIGS. 70 through 82, contains material which is subject to copyright protection by Stamps.com, Inc. Stamps.com, Inc. has no objection to the facsimile reproduction by anyone of the patent document or the patent disclosure, as it appears in the Patent and Trademark Office patent file or records, but otherwise reserves all copyright rights whatsoever.

"iShip.com™" (sometimes also referred to herein as "ISHIP.COM" or simply as "iShip.com"), "iShip™" (sometimes also referred to herein as "ISHIP" or simply as "iShip"), "The Internet Package Shipper™" (sometimes also referred to herein as "THE INTERNET PACKAGE SHIPPER" or simply as "The Internet Package Shipper"), "Price It™" (sometimes also referred to herein as "PRICE IT", or simply as "Price It"), "Sell It™" (sometimes also referred to herein as "SELL IT" or simply as "Sell It"), "Track It™" (sometimes also referred to herein as "TRACK IT" or simply as "Track It"), "Ship It™" (sometimes also referred to herein as "SHIP IT" or simply as "Ship It"), "Shipping Tools™" (sometimes also referred to herein as "SHIPPING TOOLS™" or simply as "Shipping Tools"), "My iShip™" (sometimes also referred to herein as "MY ISHIP" or simply as "My iShip") and associated logos are trademarks of Stamps.com, Inc. The names of actual companies and products mentioned herein may be the trademarks of their respective owners.

A. Contextual Overview of Exemplary Embodiment Types

Two types of exemplary Internet-related embodiments of the invention will be described herein: 1.) an exemplary simplified Internet embodiment; and 2.) an exemplary electronic commerce ("eCommerce") embodiment. Because these two types of embodiments differ somewhat in user interface interaction features and flow, a brief perspective overview of these two exemplary embodiment types is provided below.

1. Exemplary Simplified Internet Embodiment

In the exemplary simplified Internet embodiment of the invention, a system (the "System") exemplifying features of the invention provides a single automated computer interface between users of the system who are shippers of parcels ("Shippers") and multiple carriers of parcels ("Carriers"). Each Shipper, using a client computer device, accesses the System over a global communications network such as the Internet. Each Shipper uses the System to arrange for, and manage the shipment of, one or more parcels. Each shipment arranged by a Shipper is performed by a particular Carrier, using a particular service offered by that particular Carrier. References herein to the words "parcel" and "package" include letters, and larger items (see, e.g., FIG. 15 below and Packaging types 1043 (Carrier Letter), 1044 (Carrier Pak), 1046 (Carrier Box), 1047 (Carrier Tube), and 1045 (Other Packaging)).

Each Carrier may provide one or more types of shipment services, such as, for example, Next Day, Two-Day, etc. Each parcel shipped by the Shipper is shipped to a particular Recipient. Each supported Carrier has a unique rating schedule, delivery and pickup rules and schedules, and certification requirements (the "Carrier Rules").

In the exemplary simplified Internet embodiment, the Shipper provides all information required by the System to facilitate the shipping of each parcel to be shipped by a Carrier designated by the Shipper; the recipient, once provided with a tracking number can access the System to track the status of a package but is not called upon to provide any information necessary to facilitate or manage the shipment. As is further described below, the provision of information by the Shipper in the exemplary simplified Internet embodiment differs from the exemplary eCommerce embodiment, in which both the Shipper (also referred to as the "Seller") and the Recipient (also referred to as the "Buyer") provide information to the System to facilitate and manage a particular shipment.

2. Exemplary eCommerce Embodiment

In an eCommerce embodiment of the invention, the Shipper is a seller (the "Seller") of goods through a particular eCommerce or electronic Auction ("eAuction") provider (eCommerce or eAuction web site). The Seller/Shipper registers with a particular eCommerce/eAuction provider (the "Provider") at the Provider's Web site to sell, advertise, or otherwise describe, one or more items that the Seller/Shipper hopes to sell or award to the highest bidder using an electronic auction facility.

As opposed to the exemplary simplified Internet embodiment where all information necessary for arranging a particular shipment is provided by the Shipper, in the exemplary eCommerce embodiment of the invention, the System prompts different individuals to provide information necessary to rate and ship a particular parcel.

The Seller/Shipper (sometimes referred to herein simply as the "Seller," or as the "Shipper") provides information to the System concerning the particular parcel that the Seller will be selling/auctioning and subsequently shipping. The Seller also describes to the System the Seller's rules by which potential and actual buyers (sometimes referred to herein as "Buyers/Recipients", or simply as "Buyers", or as "Recipients") view the shipping, payment and other options.

A potential Buyer of an item to be purchased from a particular Seller is prompted by the System to initially provide certain limited shipping information (such as a destination zip code) in order to preview shipping rates for the item that the Buyer is considering purchasing.

An actual Buyer is prompted by the System to provide shipping details such as the Buyer's destination address. If the Seller has instructed the System to require the Buyer to pay shipping costs, the System prompts the Buyer to make the final selection of Carrier and Service.

The System in the exemplary eCommerce embodiment provides a communication link between the Buyer and the Seller, sending certain types of notifications and information between them.

Further differences between the exemplary eCommerce embodiment and the exemplary simplified Internet embodiment include, among other things, the typical access entry into the System. In the exemplary simplified Internet embodiment, the Shipper accesses the Shipping site directly. In the exemplary eCommerce embodiment, the Seller/Shipper can additionally "link" to the Shipping site from the relevant eCommerce Provider's Site.

The System and screen flows for the exemplary simplified Internet and eCommerce embodiments differ somewhat. A description of the features that are common between the two types of embodiments of the present invention is provided below as is a description of the differences between the two types of exemplary embodiments.

In the exemplary eCommerce embodiment described below, the present invention is provided as a web-based application service from a common provider, sometimes referred to herein as "iShip.com". As such, the relevant eCommerce Provider does not have to install or manage any server software; the Provider only provides a "link" to the System web site.

B. System Overview

1. Entity Interface Relationships

FIG. 1 is a graphic representation depicting the interface relationships provided by an exemplary eCommerce embodiment of the System 1 of the present invention between electronic Commerce providers 2_a_-2_n_, Sellers/Shippers 3_a_-3_n_, Carriers 4_a_-4_n_, and Buyers/Recipients 5_a_-5_n_. As conceptually depicted in FIG. 1, each Seller/Shipper 3_a_-3_n_ views the System 1 as an individualized automated Shipping System.

It should be noted that the use of suffixes such as "a" through "n" in connection with numbered elements of the FIGURES herein are exemplary and are not a limitation of the invention to any particular number. Rather, the suffixes "a" through "n" and "a" through "z", and similar notations, are used to represent any, but unknown, number of similar elements.

Figure 2:
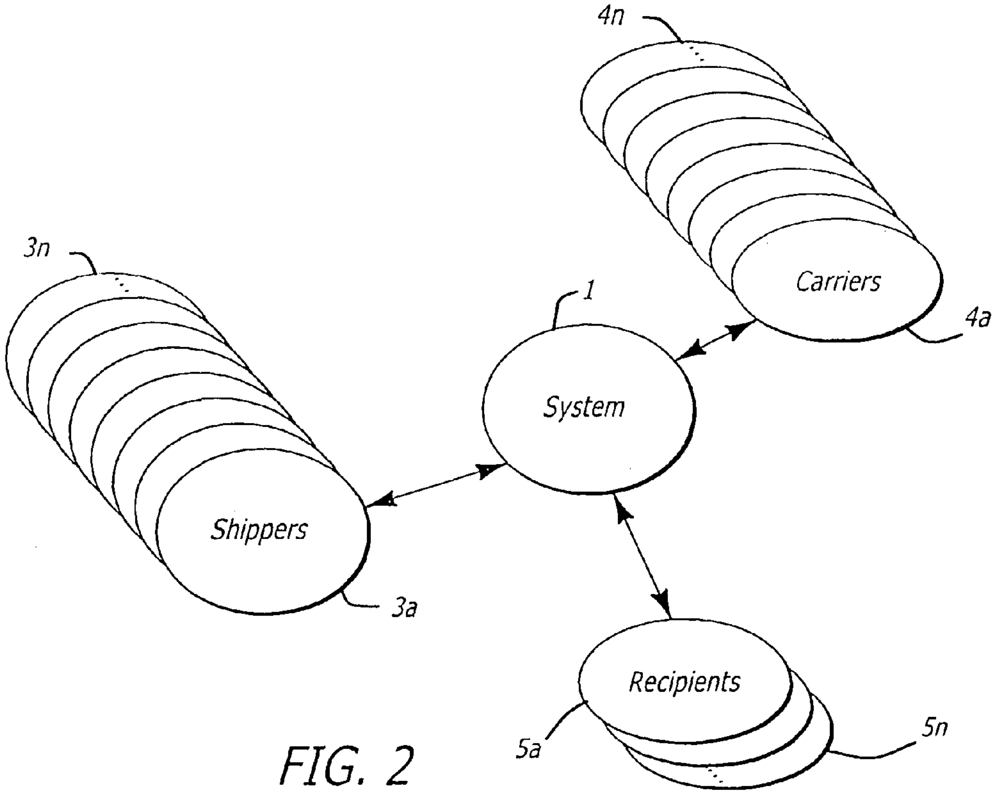
FIG. 2 is an entity relationship diagram depicting the interface relationships provided by the System between Shippers, Carriers, Recipients and the System in an exemplary embodiment of the System in an Internet environment.

FIG. 2 depicts the interface relationships provided by an exemplary simplified Internet embodiment of the System between the Shippers 3_a_-3_n_, Carriers 4_a_-4_n_, and Recipients 5_a_-5_n_. As conceptually depicted in FIG. 2, each Shipper 3_a_-3_n_ views the System 1 as an individualized automated Shipping System.

In both the exemplary eCommerce and simplified Internet embodiments, the System 1 provides Shippers/Users 3_a_-3_n_ with a computerized shipping and tracking system that allows shipment by the same Shipper/User 3_a_-3_n_ of different packages using different services provided by different Carriers 4_a_-4_n_. Carriers 4_a_-4_n_ supported by the System include Carriers such as Airborne, FedEx, United Parcel Service, USPS, and Yellow Freight. The System 1 is completely expandable and scalable to include additional Carriers.

2. System Configuration and Architecture

Figure 3:
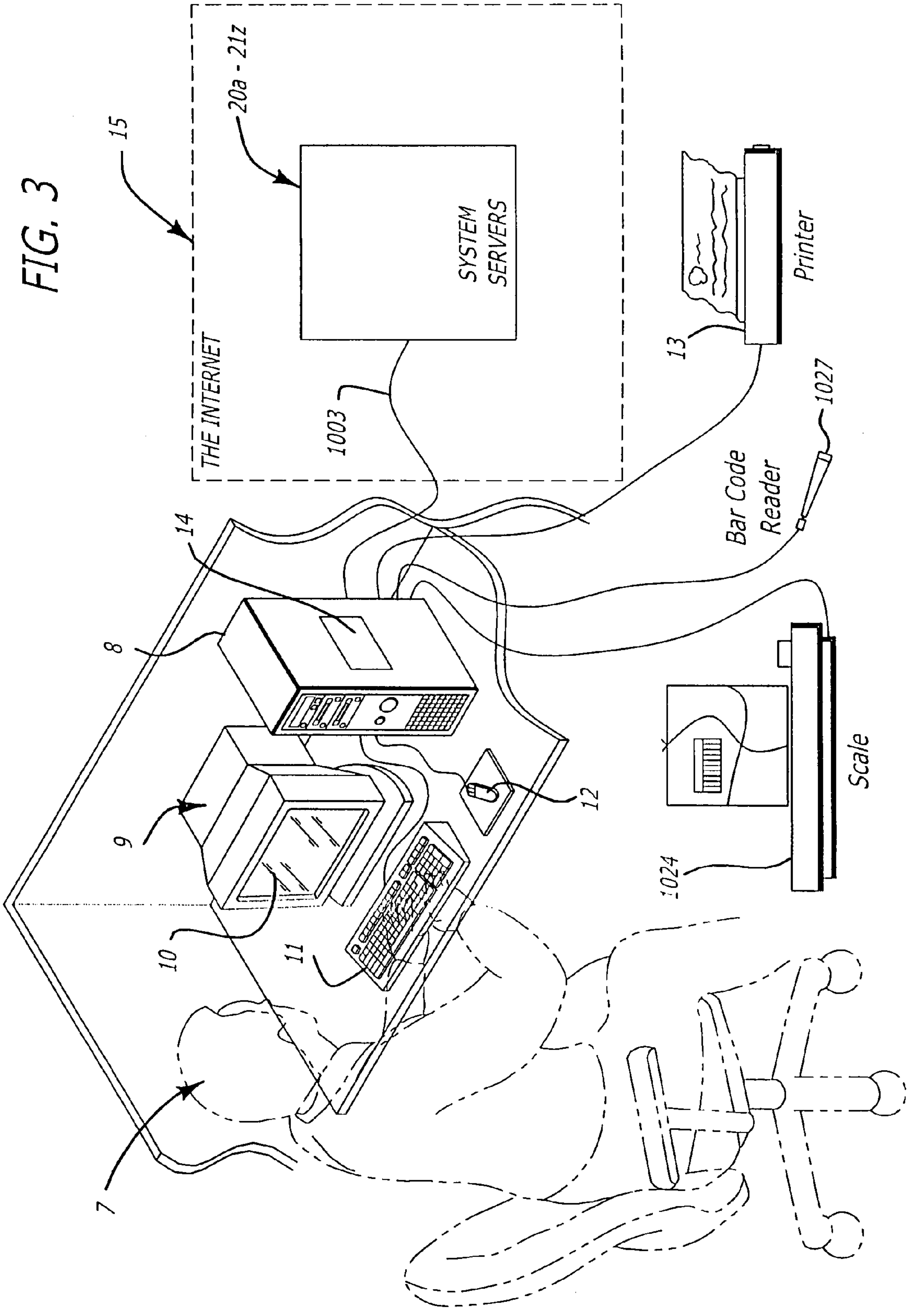
FIG. 3 is a graphic representation depicting an exemplary user computer configuration and the user computer's interface with the System in an Internet environment.

In both the exemplary eCommerce and simplified Internet embodiments, as depicted in FIG. 3, each User 7 (Shipper/Seller or Buyer/Bidder) has access to a computer 8, for instance a personal computer ("PC"). The computer 8 is configured with a display device 9 that provides a display screen 10. The computer 8 is further configured with one or more user input devices, such as, for example, a keyboard 11 and a mouse 12. The computer 8 is also configured with a printing device 13, such as a laser printer. The computer 8 may also be configured with a scale 1024 and a bar code reader 1027.

Users access 1003 and browse the Internet 15 using a web browser 14 that generally resides and is executed on the user's PC 8. The web browser 14 is a computer program or set of computer instructions that allows the Shipper/User 7 to retrieve and render hyper-media content from one or more Server computers, e.g., 20_a_-21_z_ available over the Web. Suitable commercially available web browsers include, e.g., Netscape's Navigator™ (also sometimes referred to herein as "NETSCAPE NAVIGATOR" or simply as "Netscape Navigator") and Microsoft Internet Explorer™ (also sometime referred to herein as "MICROSOFT INTERNET EXPLORER" or simply as "Microsoft Internet Explorer").

Figure 4:
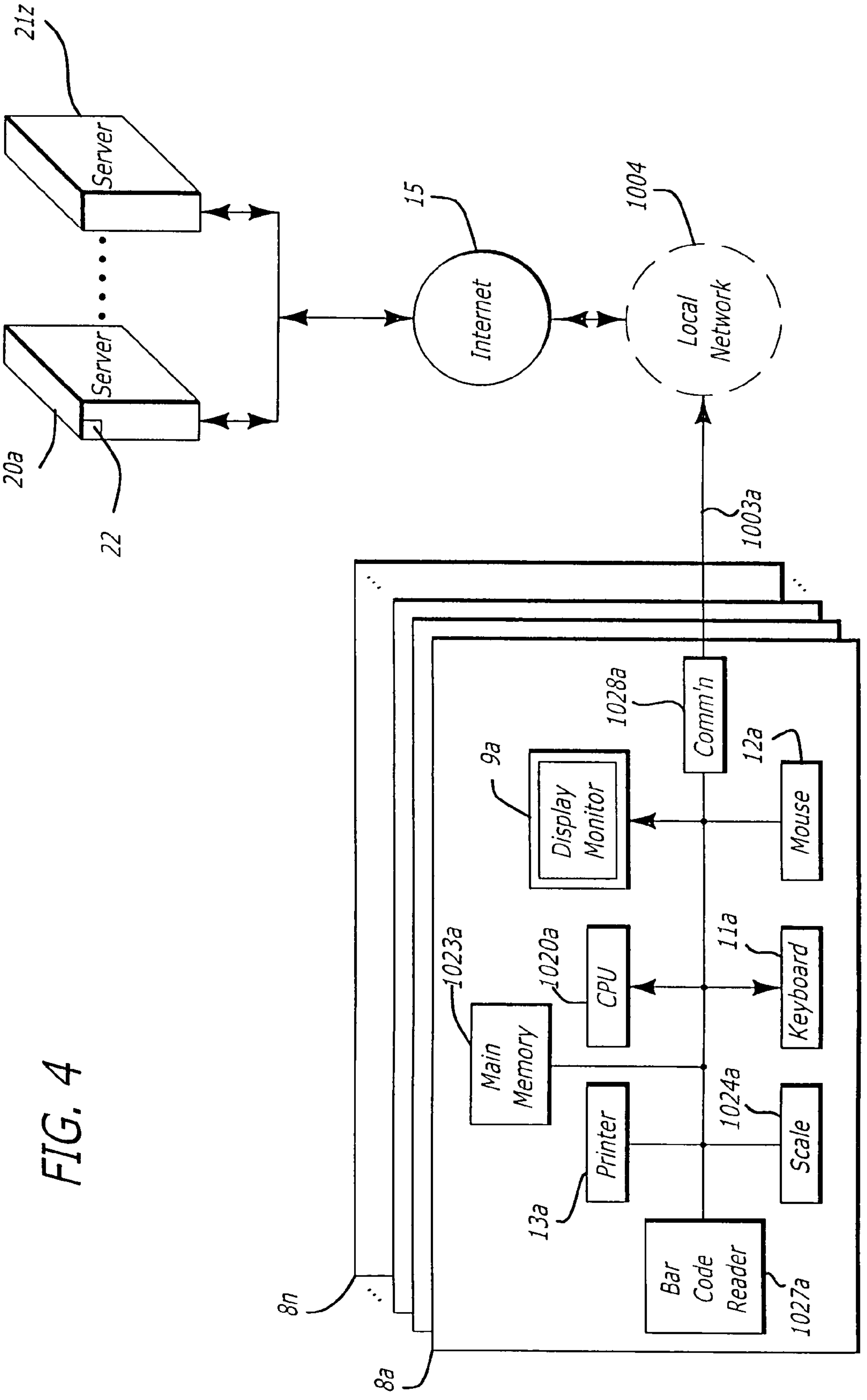
FIG. 4 is a simplified schematic diagram of a user's computer and the interface between the user's computer and the System servers using the Internet in an exemplary embodiment of the invention in an Internet environment.

FIG. 4 is a simplified schematic diagram of a user's computer and the interface between the user's computer and the System servers, such as 20_a_-21_z_ in FIG. 3, using the Internet in an exemplary embodiment of the invention in an Internet environment. PCs 8_a_-8_n_ are used by the Shippers and are connected to the Internet 15 through communication links 1003_a_-1003_n_ respectively. Optionally, a local network 1004 may serve as the connection between some of the PCs 8_a_-8_n_, such as the PC 8_a_, and the Internet 15. Servers 20_a_-21_z_ are also connected to the Internet 15 through respective communication links.

Continuing with FIG. 4, each of the PCs 8_a_-8_n_ includes a central processing unit ("CPU") 1020_a_ for processing and managing data; user input devices such as a keyboard 11_a_ and a mouse 12_a_ for inputting data and a main memory 1023_a_ such as a Random Access Memory ("RAM"). Information in text, graphic and other forms is displayed on the display monitor ("CRT") 9_a_ under the control of the CPU 1020_a_. A communication device 1028_a_, such as a modem, provides access 1003_a_ to the Internet 15. In some embodiments, one or more Input/Output ("I/O") devices, such as a printer 13_a_, scale 1024_a_, or a bar code reader 1027_a_ are configured with the PC.

Figure 5:
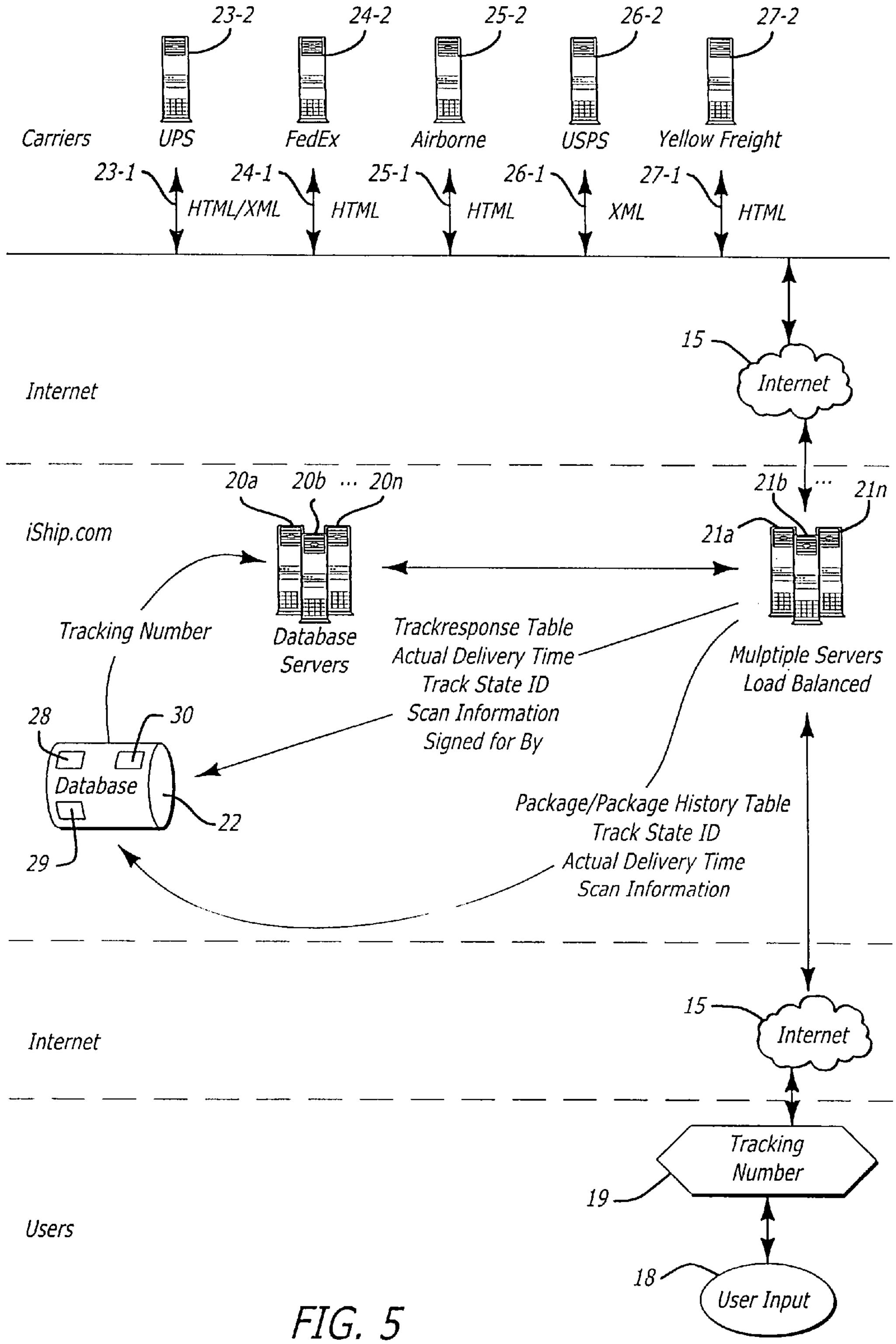
FIG. 5 is a simplified graphic representation of an exemplary configuration of the System, and relationships between the System and Carriers and Users, in an exemplary embodiment of the System in an independent system eCommerce environment.

FIG. 5 is a graphic representation of an exemplary configuration of the System in an exemplary eCommerce embodiment of the invention depicting interfaces with Carriers through Carrier Servers, e.g., 23-2 through 27-2, and Shippers/Users through User Input, e.g., 18. When a Shipper/User ships a package using the System 1, one or more of the System's Servers, e.g., 21*a*-21*n*, create a new System tracking number 19. When a new System tracking number is created, one of the System's Database Servers, e.g., 20*a*-20*n*, adds a new package record with the newly created System tracking number to a Package Table 28. The Package Table 28 resides in the System database 22 and contains package records for System processed packages. The System database may be stored on any storage medium, such as but not limited to, RAM, hard drive, disk drive, tape drive, or other memory device. An exemplary embodiment of the Package Table contains the following information: 1) Package Tracking State ID; 2) Package Shipping State ID; 3) Actual Delivery Time; 4) Delivered To information; 5) Shipping Date; 6) Carrier Tracking Number; 7) System Tracking Number; 8) Carrier ID; 9) Actual Package Weight; 10) Service Description; and 11) Package OD. The content of these fields are described further below.

As depicted in FIG. 5, using the Carrier's Internet URL, the System 1 (labeled "iShip.com" in FIG. 5) then makes an HTTP (HyperText Transfer Protocol) connection over the Internet 15 to the Carrier's web server, e.g., 23-2, 24-2, 25-2, 26-2, or 27-2, using the URL information for the particular Carrier's web server.

The World Wide Web (WWW or Web) is an access protocol for HTTP (HyperText Transfer Protocol is the communication protocol used by the Internet). The unique identifier for a Server computer is called the IP (Internet Protocol) address; the unique identifier for a web site (web page) is called the URL (Uniform Resource Locator). A URL indicates, among other things, where the Server is located, the location of the web site on the Server, the name of the web page and the file type of each document.

Depending upon the Carrier, the System's 1 request and report interface with the Carrier's web server is programmed in HyperText Markup Language ("HTML") (e.g., 24-1, 25-1, 27-1), Extensible Markup Language ("XML") (e.g., 26-1), or both HTML and XML (e.g., 23-1), described by way of example. Examples of XML formatted requests and responses with respect to Carrier interface communications are described below in connection with, and depicted in, FIGS. 66 and 67.

While the Shipper's/Seller's PC is connected to the Internet 15, a Shipper/Seller may enter the System's 1 Internet interface in one of several ways. The two principle ways discussed herein and described below are: 1) by entering an Internet address, e.g., URL, to the System's home page; or 2) by clicking on an HTML link in an eCommerce/eAuction provider's Web site that contains the URL address to one of the System's Internet pages, for instance, an initial User registration page. A User may enter the System 1 in other ways, among which include a direct communication interface between the User's computer system and the System 1.

Figure 6:
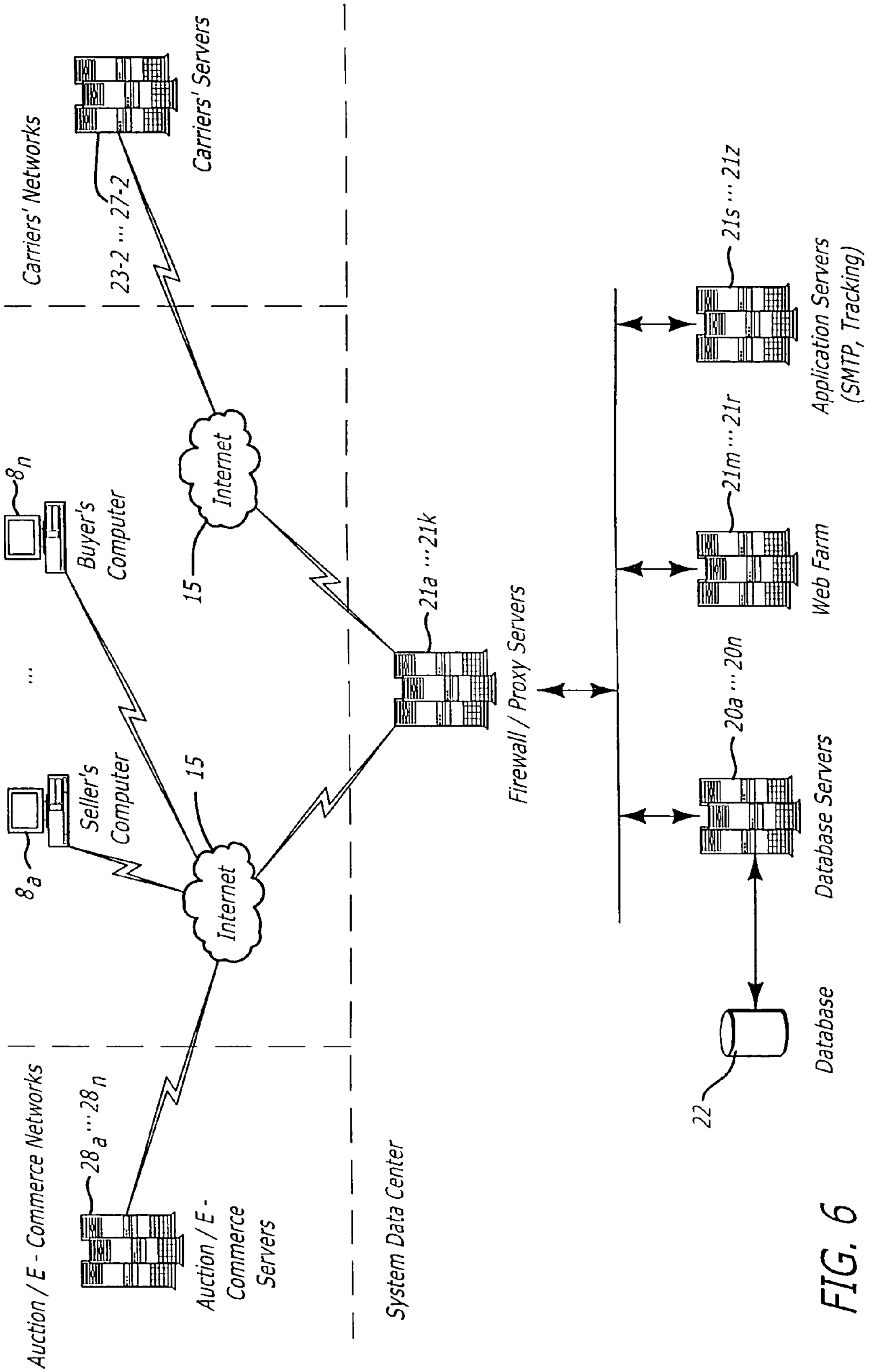
FIG. 6 is a simplified graphic representation depicting an alternate view of the System Data Center and its interfaces in an exemplary embodiment of the System in an independent system eCommerce environment.

FIG. 6 is a graphic representation depicting an alternate view of the System comprising the System Data Center's Server Computers 20*a*-20*n* and 21*a*-21*z*, the System Database 22, and the System's interfaces with Seller and Buyer computers 8*a*-8*n*, Carrier Server computers 23-2 through 27-2, and eCommerce/eAuction Providers 28*a*-28*n*, via the Internet 15.

Figure 7:
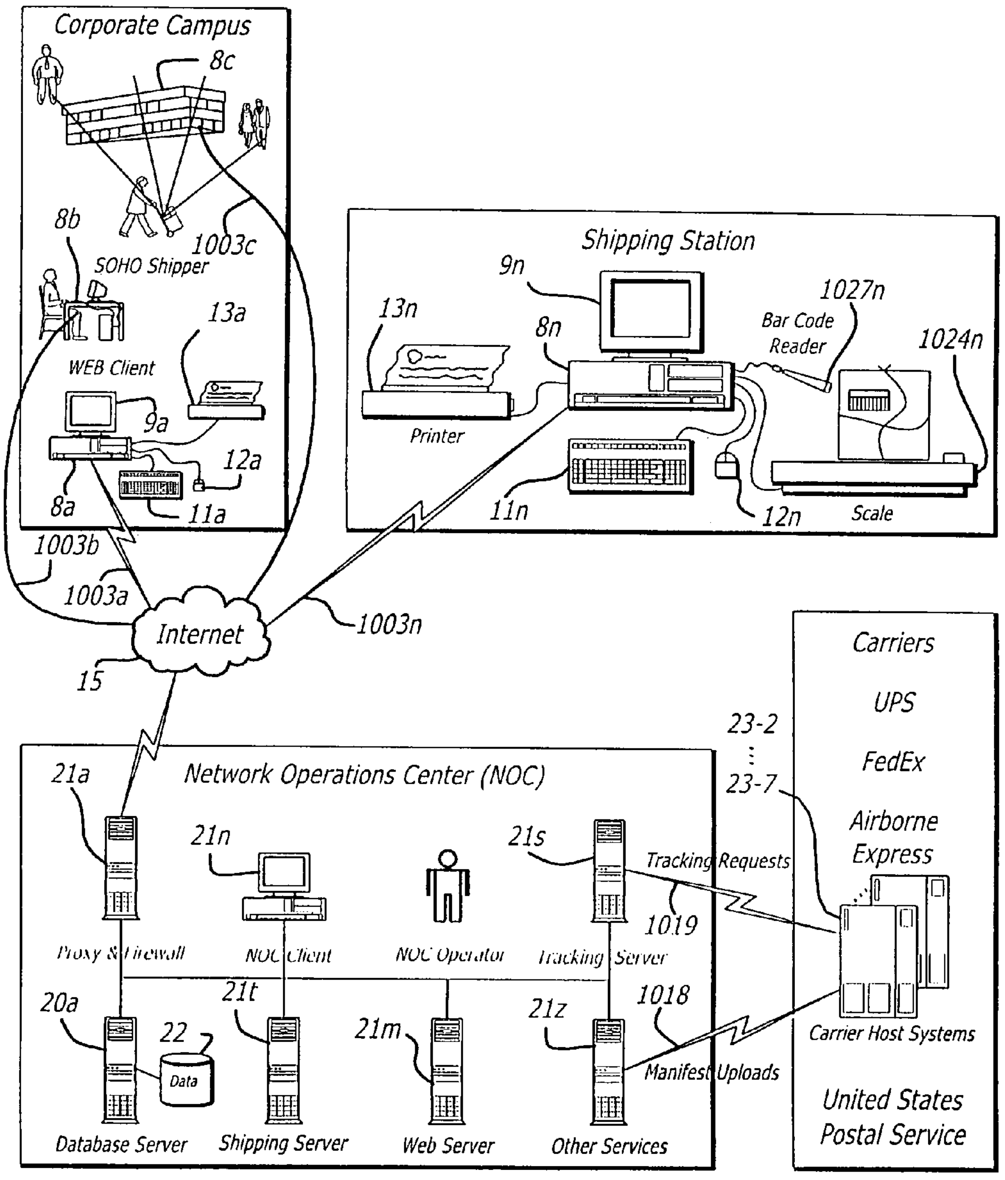
FIG. 7 is a simplified graphic representation of an exemplary configuration of the System, and relationships between the System and Carriers and Shippers/Users, in an exemplary simplified Internet embodiment of the invention.

FIG. 7 is a simplified graphic representation of an exemplary configuration of the System, and relationships between the System and Carriers and Shippers/Users, in an exemplary simplified Internet embodiment of the invention. As depicted in FIG. 7, multiple servers 20*a*-21*z* are provided in a Network Operations Center ("NOC"). At least one of the Servers 20*a*-21*z* can handle multiple telecommunications connections such as over the Internet 15 at one time. In the embodiment of the NOC depicted in FIG. 7, one Server 20*a* provides the computer resources to perform Proxy & Firewall functions between the Internet 15 and the NOC; one Server, e.g., 21*n* provides the computer resources to act as the NOC Client Server; one Server, e.g, 21*s* provides the computer resources to act as the Tracking Server to obtain Carrier tracking information 1019 from the respective carrier's to provide to Shippers over the Internet 15; one Server, e.g, 20*a* provides the computer resources to act as the Database Server to access data from one or more databases 22 of information; one Server, e.g., 21*t* provides the computer resources to act as the Shipping Server; one Server, e.g., 21*m* provides the computer resources to act as the Web Server; and one Server, e.g., 21*z* provides the resources to provide other services, such as the upload of manifest data 1018 to the Carrier Host Systems, 23-2 through 23-7.

It should be understood that the overview configurations of the System depicted in FIGS. 5, 6 and 7 are exemplary. For example, the depiction of Server 20*a* in FIG. 7 as having access to one or more databases 22 is not a limitation of the invention; in alternative embodiments, such as depicted in FIG. 5, any or all of the Servers, 20*a*-20*n*, have access to databases and external storage medium.

Continuing with FIG. 7, the Servers 20*a*-21*z* are connected to or otherwise capable of communicating through, a communications network such as a global communications network such as the Internet 15, which is in turn connected to, or capable of communicating with one or more Personal Computers ("PC") or other like devices, e.g. 8*a*, 8*b*, . . . 8*n*.

Continuing with FIG. 7, Users access and browse the Web using a web browser that generally resides and is executed on the user's PC, e.g., 8*a*, 8*b*, 8*c* . . . 8*n* (and as were depicted in FIG. 4).

The Internet works based on a client/server model. The present invention uses the client/server model to support the communication with and processing for each of multiple Shippers. For example, as depicted in FIG. 7, the Servers 20*a*-21*z* are the server side of the client/server model; each Shipper's PC 8*a*, 8*b*, . . . 8*n* is a client. The present invention uses the web browser with which each Shipper's PC accesses the Internet to perform certain functions as further described herein.

Web sites are locations on Servers, such as one or more of the Servers, 20*a*-21*z*, that are accessible through the Internet 15. The Servers 20*a*-21*z* host one or more web sites which are accessible by Shipper users with PCs (e.g., 8*a*, 8*b*, . . . 8*n*) connected with the Internet 15.

Carrier Rules, Shipper account information and other content is stored by the Servers, e.g., 20*a* in databases e.g. 22. Shippers with PCs (e.g., 8*a*, 8*b*, . . . 8*n*) connected to the Internet 15 access Carrier Rules, Shipper account information and other content that is stored by the Servers, e.g., 20*a* in databases e.g. 22 through a User Interface, which is described in detail below.

Figure 8:
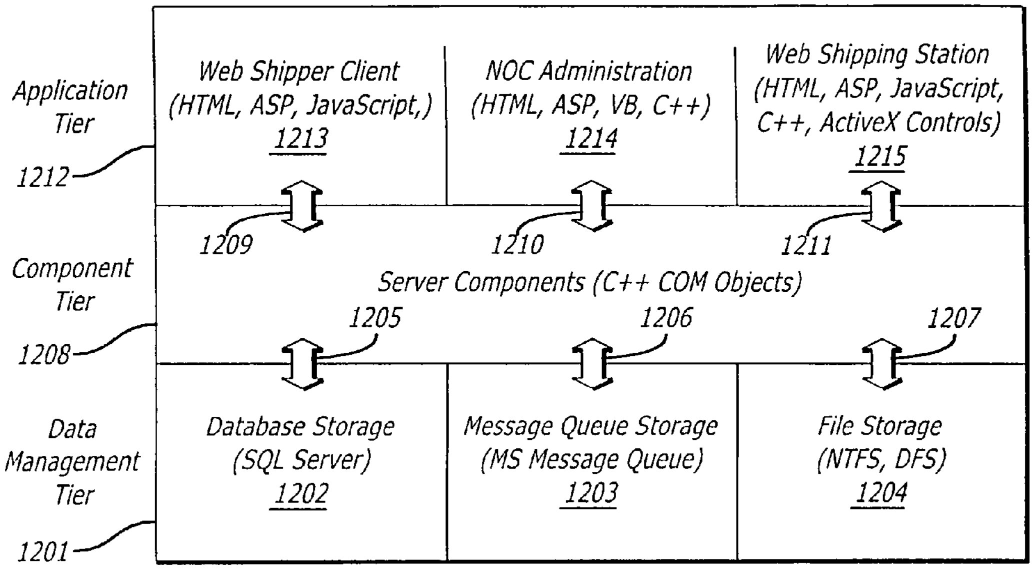
FIG. 8 is a high level System component diagram depicting an exemplary System Architecture in an exemplary embodiment of the System in an Internet environment.

An overview of an exemplary System architecture is depicted in FIG. 8. The overview depicted is exemplary and meant to be illustrative; it is not a limitation of the invention. As depicted in FIG. 8, one embodiment of the invention uses a three-tiered architecture.

The Data Management Tier 1201 is comprised of a Database Storage component 1202 that in the embodiment depicted uses an SQL Server; a Message Queue Storage component 1203 that in the embodiment depicted uses MS Message Queue; and a File Storage component 1204 that in the embodiment depicted uses NTFS, and DFS. Each of the Database Storage component 1202, the Message Queue Storage component 1203, and the File Storage component 1204, communicate with the Component Tier 1208 of the System architecture, communications by each component with the Component Tier 1208 represented by elements 1205, 1206 and 1207 respectively. According to the embodiment depicted in FIG. 8, the Server Components of the Component Tier 1208 use C++ programming language and COM Objects.

The Application Tier 1212 of the System Architecture is comprised of a Web Shipper Client component 1213 (which uses HTML, ASP and JavaScript), the NOC Administration component 1214 (which uses HTML, ASP, VB, and C++), and the Web Shipping Station component 1215 (which uses HTML, ASP, JavaScript, C++, and ActiveX Controls). Each of the Web Shipper Client component 1213, the NOC Administration component 1214, and the Web Shipping Station component 1215 communicate with the Server Components of the Component Tier 1208 as represented by the communication elements 1209, 1210 and 1211 respectively.

In one embodiment, the System is implemented in an NT environment. The description of the System as being implemented in an NT environment is exemplary and is not a limitation of the invention.

3. Menu Architecture

In both the exemplary eCommerce and simplified Internet embodiments, a User can enter the System by entering an Internet address, e.g., a URL, to the System's home page using the User's client web browser.

Figure 9:
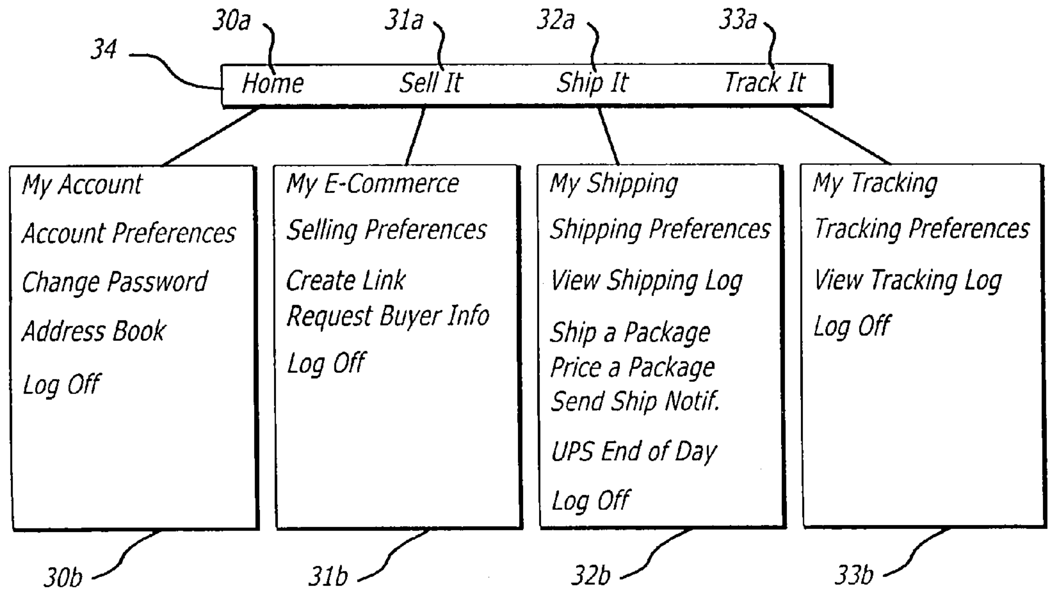
FIG. 9 is a graphic representation of an exemplary menu architecture for the System in an exemplary embodiment of the System in an independent system eCommerce environment.

FIG. 9 is a graphic representation of an exemplary menu architecture as would be displayed on an exemplary home page in an exemplary eCommerce embodiment of the System 1 as viewed by the User on a display device, e.g., 9 and 10 as depicted in FIGS. 3 and 9*a* as depicted in FIG. 4, connected to the User's Computer, e.g., 8 as depicted in FIGS. 3 and 8*a* as depicted in FIG. 4. The term display as used herein will be understood by those with ordinary skill in the art to include visual display on a display device, e.g., 9 and 10 as depicted in FIGS. 3 and 9*a* as depicted in FIG. 4, connected to the User's Computer, e.g., 8 as depicted in FIGS. 3 and 8*a* as depicted in FIG. 4.

Other menu configurations and descriptions can be implemented without departing from the spirit of the invention. As depicted in FIG. 9, a main menu bar 34 presents several selection options, including Home 30*a*, Sell It 31*a*, Ship It 32*a*, and Track It 33*a*. If a User selects, such as by using a keyboard device 11 as shown in FIG. 3, 11*a* as shown in FIG. 4, or a mouse device 12 as shown in FIG. 3, 12*a* as shown in FIG. 4, the Home 30*a* option, the System 1 will display a Home submenu 30*b*.

References to a User selecting will be understood by those with reasonable skill in the art to include selection using a user input device, such as a keyboard device 11 as shown in FIG. 3, 11*a* as shown in FIG. 4, or a mouse device 12 as shown in FIG. 3, 12*a* as shown in FIG. 4, connected to the User's Computer, e.g., 8 as depicted in FIGS. 3 and 8*a* as depicted in FIG. 4.

Using the exemplary menu architecture depicted in FIG. 9, if the User selects the Sell It 31*a* option, the System 1 will display a Sell It submenu 31*b*. If the User selects the Ship It option, the System 1 will display a Ship It submenu 32*b*. If the User selects the Track It 33*a* option, the System 1 will display a Track It submenu 33*b*.

In an exemplary simplified Internet embodiment of the invention, the Main Menu would not provide a Sell It 31*a* application or the submenus and screens associated with the Sell It 31*a* application.

C. The Seller's Experience

In an exemplary eCommerce embodiment of the System, if the User enters the System through a link from a Provider, the System 1 will ask the User to log in. (A User that is a Buyer/Bidder that enters the System with a particular Buyer/Bidder URL (Universal Resource Locator), such as through a hypertext e-mail link as is discussed below, is not required to follow the log in procedure.) The log in and registration processes described below are also provided in a similar manner by some simplified Internet embodiments.

When a User attempts to log in, the System 1 will attempt to validate the User's log in identification and password. If the User's log in is successful, the System 1 will prompt the User to select one of the available menu options. Otherwise, the System 1 will prompt the User to register and will display the first of several information collection screens to prompt the User through the registration process. Following is a description of the registration User Interface and the associated System 1 processing in an exemplary eCommerce embodiment of the invention.

FIGS. 10A through 10E are high level logic flow diagrams depicting the logic flow for processing both Shipper/Seller and Buyer/Bidder information in an exemplary eCommerce embodiment of the invention. An overview of FIGS. 10A through 10E is provided immediately below for context. However, the detailed description of FIGS. 10A through 10E is provided in conjunction with the detailed user interface screens depicted in summary on FIGS. 10A through 10E. Accordingly, the description of FIGS. 10A through 10E is provided gradually below with intervening descriptions of the details concerning the user interface screens described in more detailed FIGURES that are also described below.

Figure 10A:
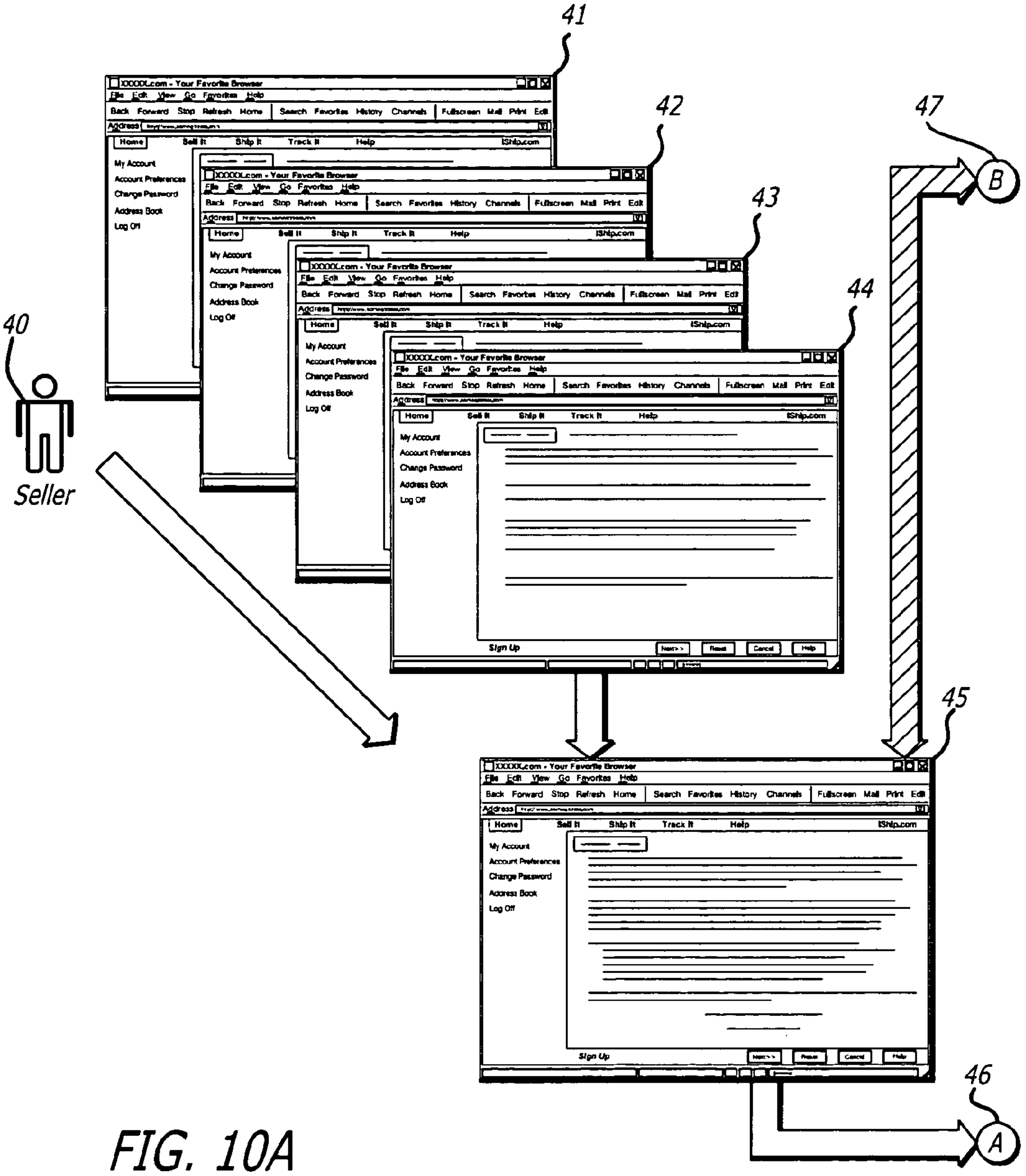
FIGS. 10A through 10E are high level logic flow diagrams depicting the logic flow for processing both Shipper/Seller and Buyer/Bidder information in an exemplary embodiment of the System in an independent system eCommerce environment.
Figure 10B:
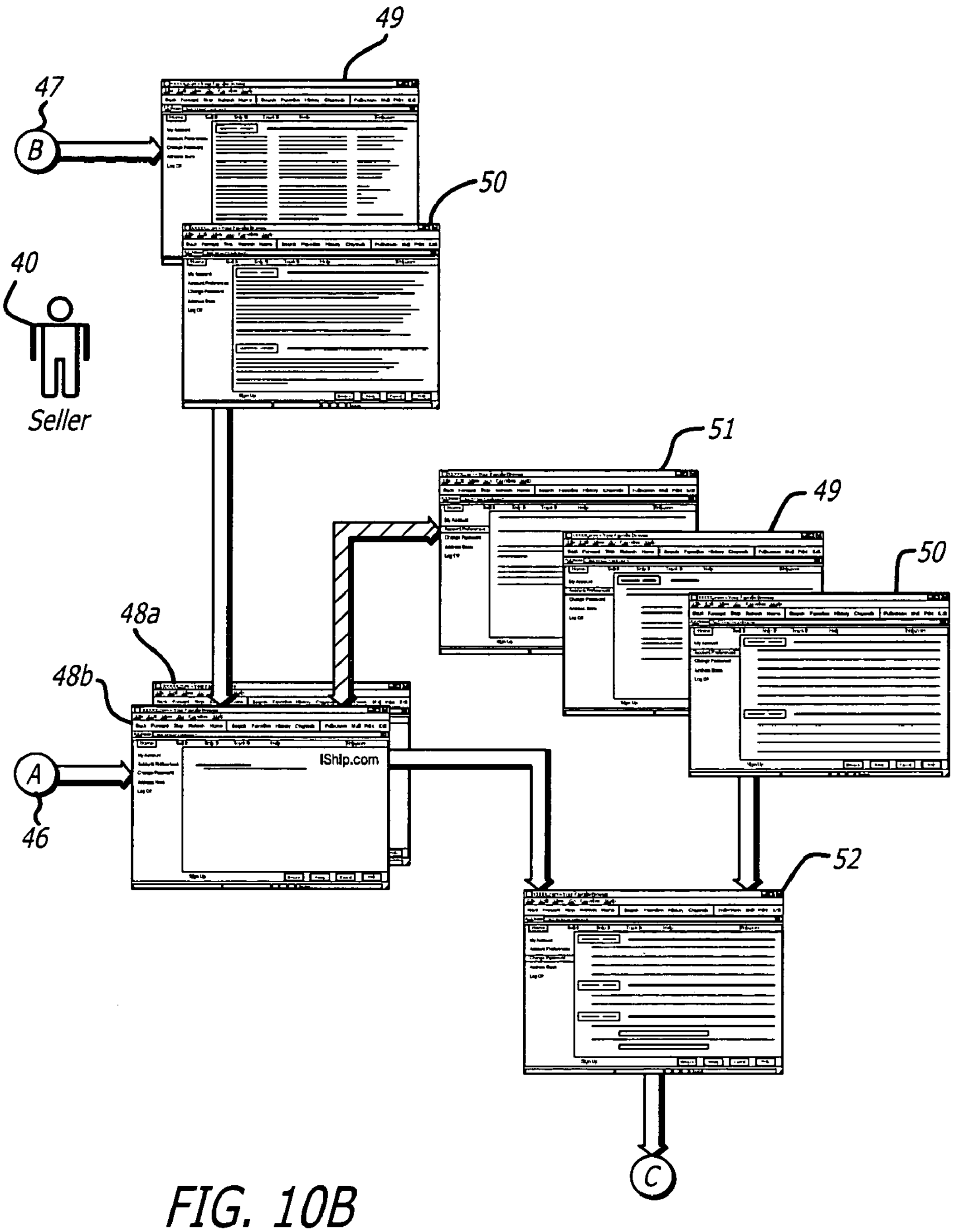
Figure 10C:
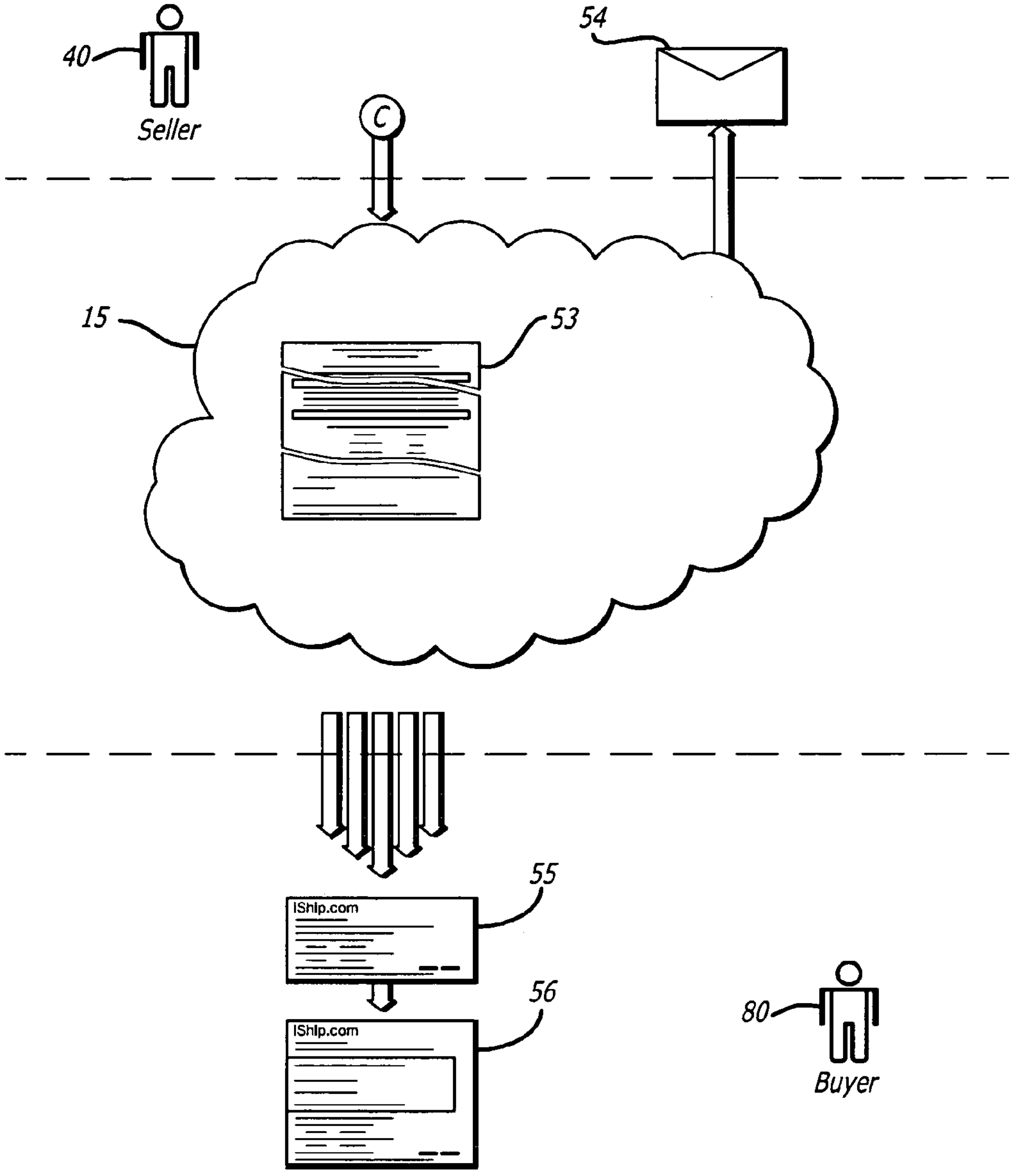
Figure 10D:
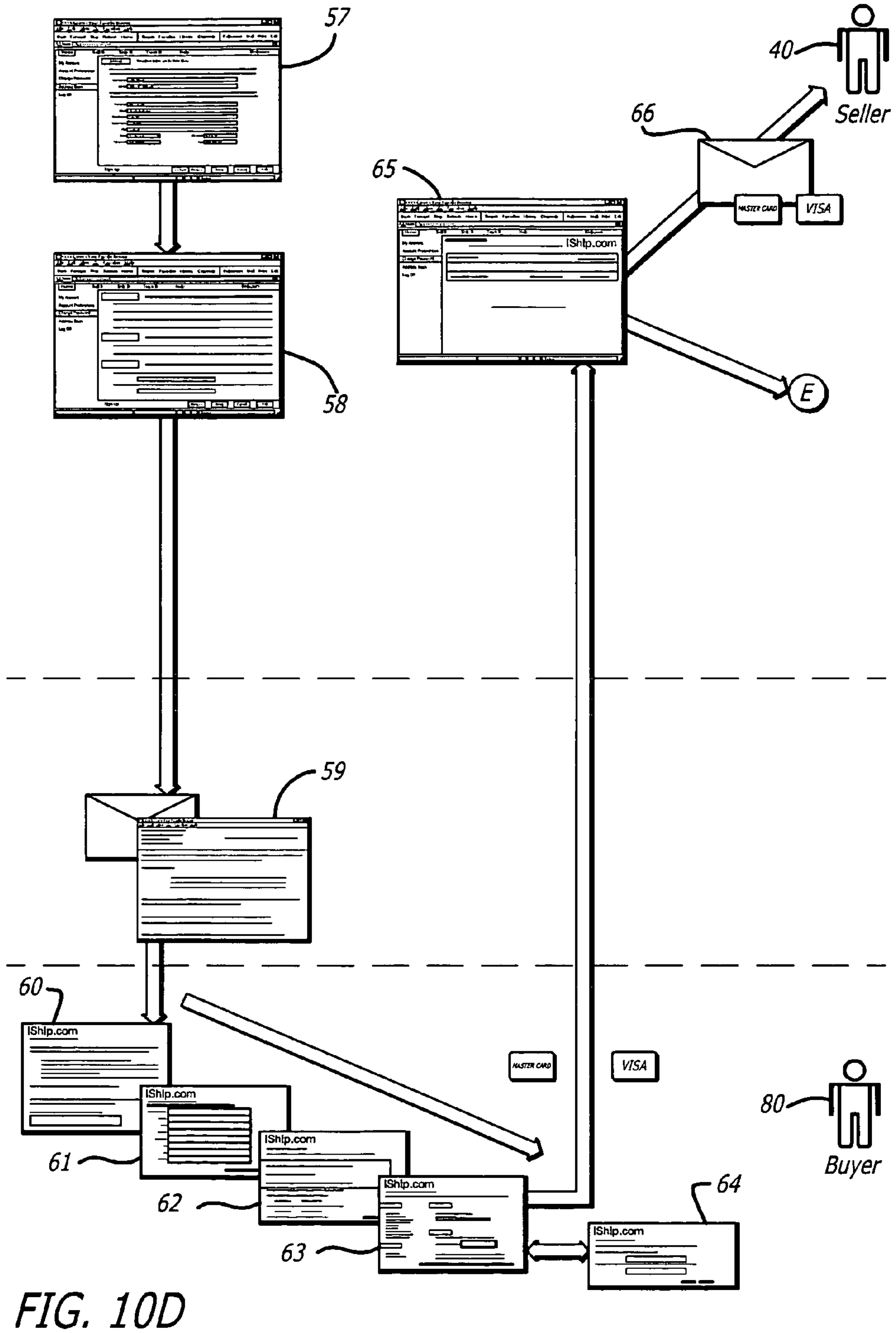
Figure 10E:
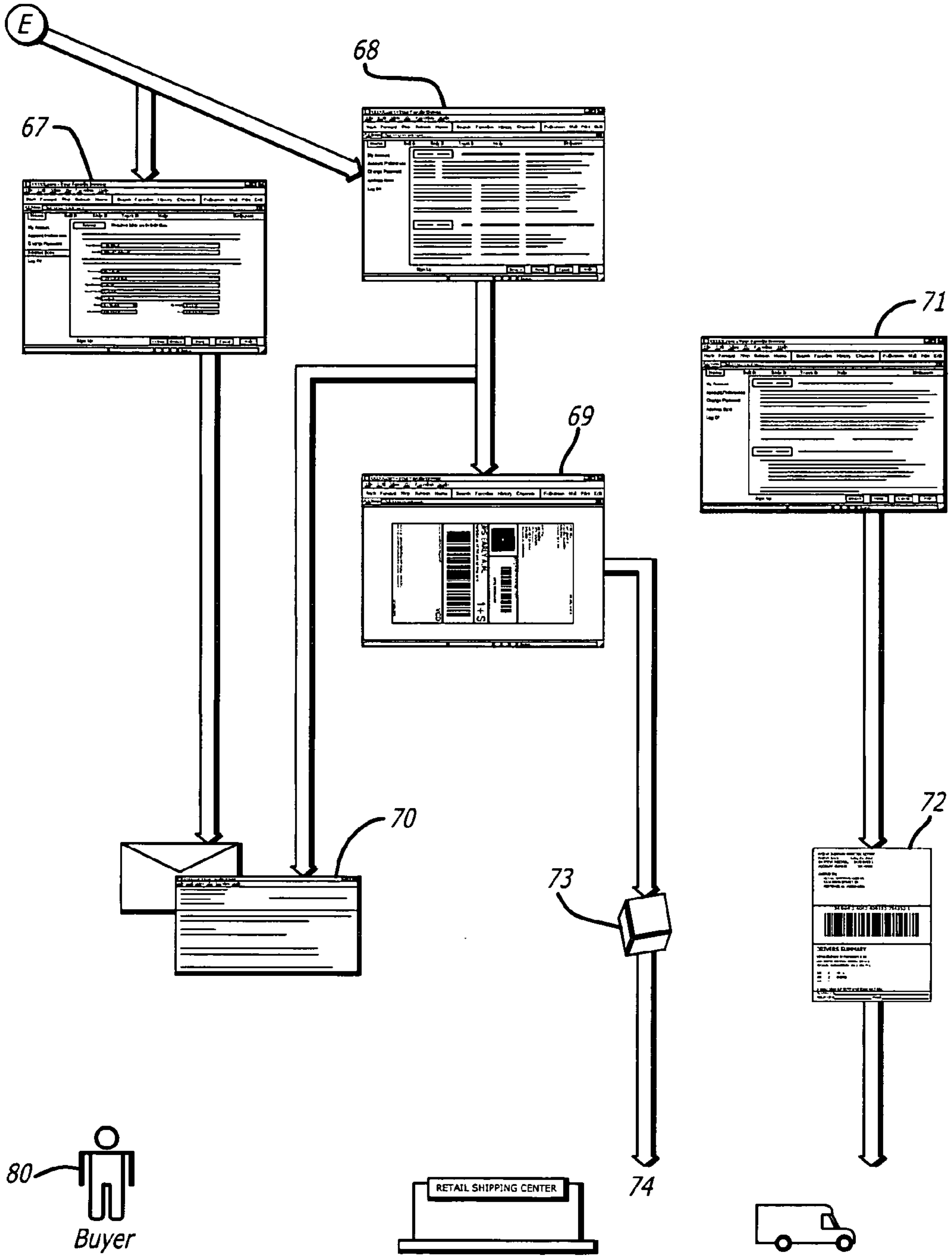

FIG. 10A depicts general Seller/Shipper/User registration procedures. FIG. 10B depicts eCommerce/eAuction Seller registration procedures, including the Creation of a Link that the Seller can copy and paste in the Seller's Web page description of the item to be sold/shipped. FIG. 10C depicts the actual sales of the item to be shipped and depicts the Buyer 80 experience of viewing the shipping rates and times comparison provided by the System and purchasing or bidding on the item as the case may be. FIG. 10D depicts the collection of shipping and payment information by the Seller and the System 1 from the Buyer 80. FIG. 10E depicts post sale shipment and payment processing, tracking and notification. The components of each of FIGS. 10A through 10E are discussed in detail below.

FIG. 10A depicts general User registration procedures. As depicted in FIG. 10A, the System 1 displays a registration introduction screen 41 to prompt a new eCommerce/eAuction Seller 40 to register with the System 1.

Figure 11:
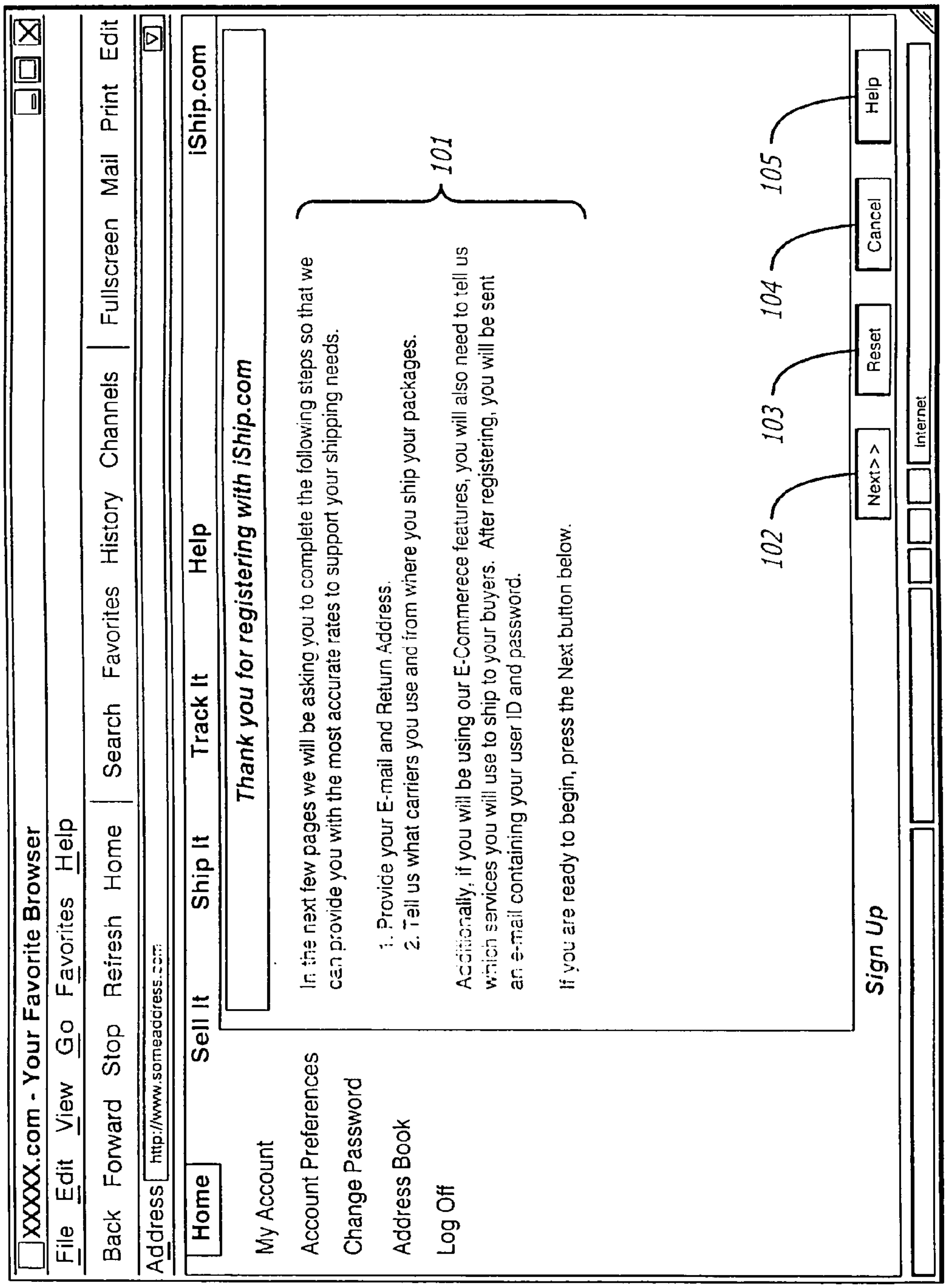
FIG. 11 is a graphic representation depicting an exemplary embodiment of a registration introduction screen in an exemplary embodiment of the System in an independent system eCommerce environment.

FIG. 11 is a graphic representation depicting an exemplary embodiment of a registration introduction screen 41 depicted in FIG. 10A. As depicted in FIG. 11, the registration introduction screen 41 displays introductory text 101 that prompts the User to proceed to the Next screen to provide certain information, such as the User's e-mail and return address and to identify the Carriers with which the User wishes to ship. The User is instructed to press the Next button 102 if the User is ready to proceed with registration. It will be understood by those with ordinary skill in the art that a User "presses" or "clicks" an onscreen button by using a user input device, such as a keyboard device 11 as shown in FIG. 3, 11*a* as shown in FIG. 4, or a mouse device 12 as shown in FIG. 3, 12*a* as shown in FIG. 4, connected to the User's Computer, e.g., 8 as depicted in FIGS. 3 and 8*a* as depicted in FIG. 4.

Alternatively, the User can "press", or "click", on the Reset button 103 which, when clicked, re-initializes the registration application and returns the User to the Introduction page; the Cancel button 104, which when clicked returns the User to the Logged Off Home page; or the Help button 105, which when clicked, displays contextual help text in a pop-up window.

If the User clicks on Next button 102, if the User is using a browser that is not supported by the System 1, the System 1 prevents the User from continuing and displays a message to the User that the User's browser is unsupported. Otherwise, if the User clicks the Next button 102, the System 1 will display the next screen 42 in the registration process as depicted in FIG. 10*a*, which is a User address collection screen.

Figure 12:
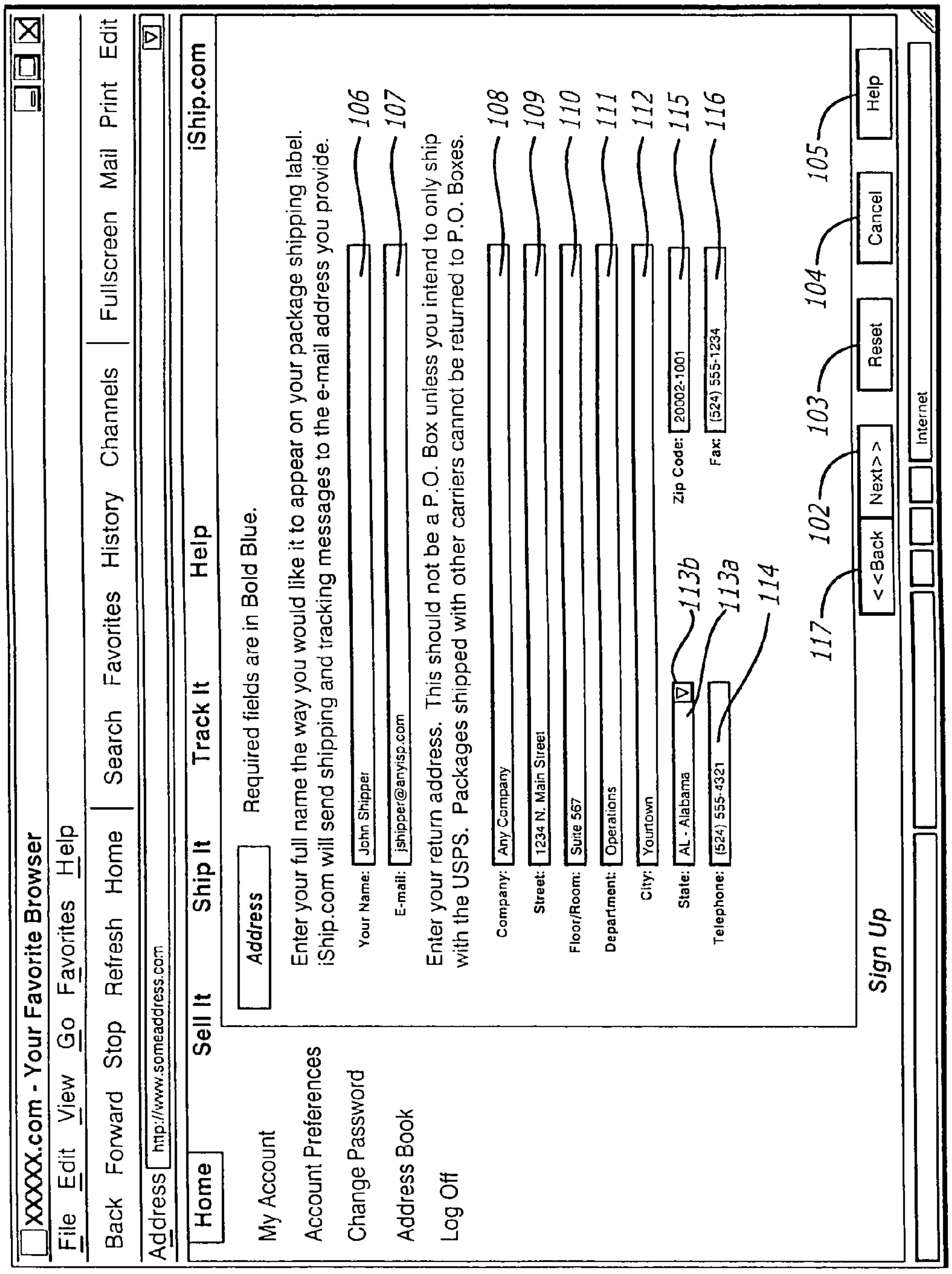
FIG. 12 is a graphic representation depicting an exemplary embodiment of a User address collection screen in an exemplary embodiment of the System in an independent system eCommerce environment.

FIG. 12 is a graphic representation depicting an exemplary embodiment of a User address collection screen. As depicted in FIG. 12, the System prompts the User to provide the User's name 106, e-mail address 107, company name 108, street address 109, floor/room number 110, department name 111, city 112, state 113*a* (using a pull down menu button 113*b*), telephone number 114, zip code 115, and fax number 116. As with the previous registration introduction screen 41, the Next 102, Reset 103, Cancel 104, and Help 105 buttons are provided with results similar in nature to the operations of these respective buttons as described above. In addition, a Back button 117 is provided. If the User clicks the Back button 117, the System returns the User to the screen from which the User entered the present screen, in this case, the registration information screen 41. If the User clicks the Next button 102, the System performs validation edits on the data entered. If any required fields have not been completed, or if any fields contain data found to be in error, the System notifies the User and requests that corrected data be entered. Because of the similar nature from screen to screen in the System with which the Back 117, Next 102, Reset 103, Cancel 104 and Help 105 buttons operate, the operation of these buttons will not be further described.

Figure 13:
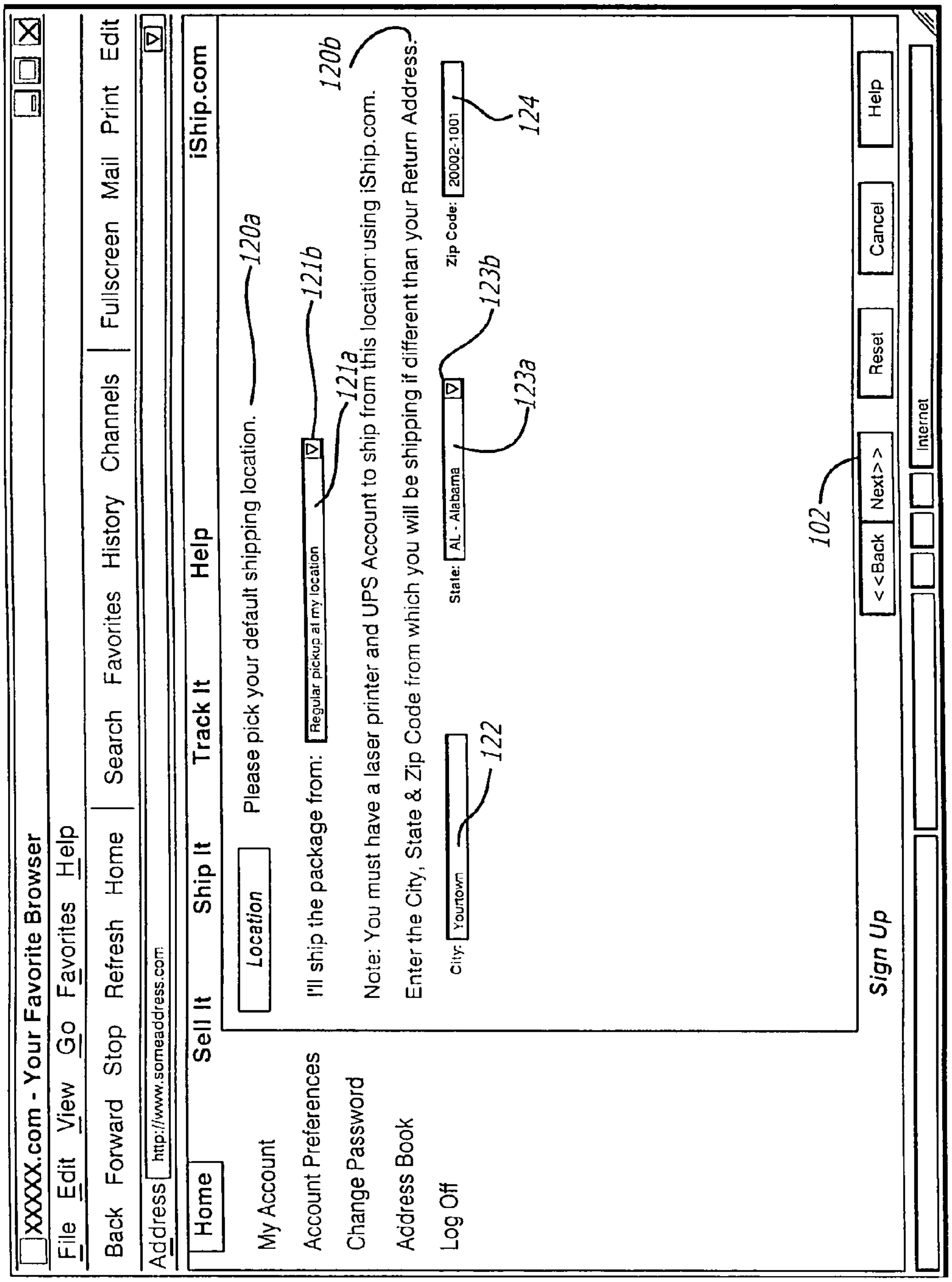
FIG. 13 is a graphic representation of an exemplary embodiment of a Shipping Location screen in an exemplary embodiment of the System in an independent system eCommerce environment.

If the data entered is successfully validated, the System displays the next screen, which in this case is the Shipping Location screen 43 as depicted in FIG. 10A. FIG. 13 is a graphic representation of an exemplary embodiment of a Shipping Location screen 43. In the Shipping Location screen 43, the System prompts the User to identify a default location 120*a* from which the User will typically ship packages and to provide the city 122, state 123*a*-123*b*, and zip code 124 of that location 120*b*. The Shipping Location screen provides a shipping location input field 121*a* and a shipping location pull down menu button 121*b*. If the user clicks on the shipping location pull down menu button 121*b*, the System will display a selection menu of possible shipping locations. Example shipping location selection options include: self-service center/drop box; staffed shipping counter; my location by calling for pickup; my location through regular pickup; and my local Mail Boxes Etc. center. Exemplary shipping location options are described further below with regard to FIG. 26.

Figure 14:
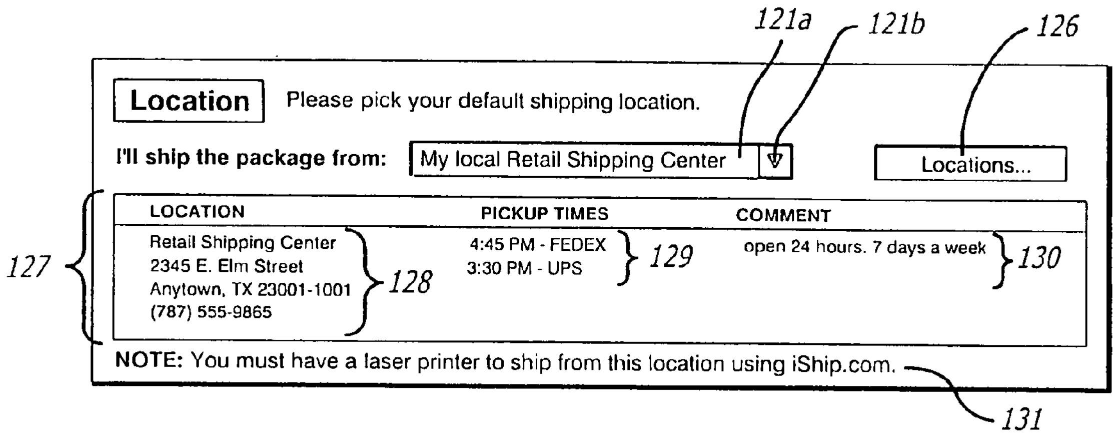
FIG. 14 is a graphic representation depicting an exemplary embodiment of a Locations screen in an exemplary embodiment of the System in an independent system eCommerce environment.

If the User selects the "my local Mail Boxes Etc. center" then a Locations screen is displayed. FIG. 14 is a graphic representation depicting an exemplary embodiment of a Locations screen. The Locations screen displays a Locations button 126, that when clicked, causes the System to display a list 127 of Mail Boxes Etc. centers in the area in and around the User's zip code. Each entry in the list 127 contains the name and address of the location 128, pickup times 129, and comments 130. The User will be asked to highlight and thereby select one of the centers. According to the User's selection, the System will display additional comments if appropriate, e.g., 131. Otherwise, for the other shipping location selection options, the User is required to enter the city, state, and zip code of the location.

Figure 15:
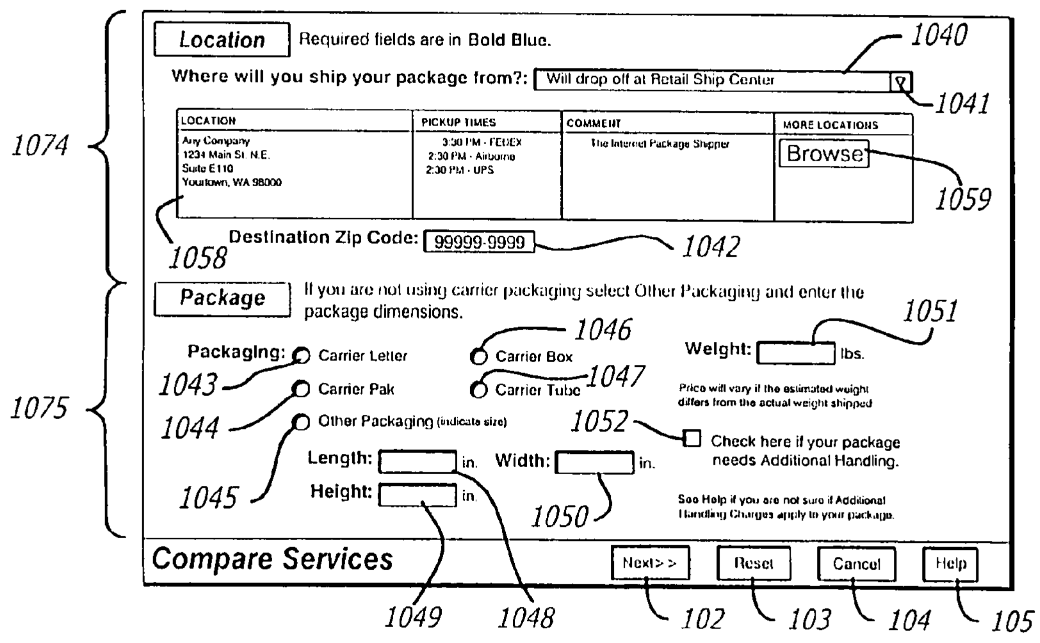
FIG. 15 is a graphic representation depicting an alternative exemplary embodiment of a Locations screen inset in an alternative exemplary embodiment of the System in an Internet environment.

FIG. 15 depicts an alternative exemplary embodiment of a Locations screen as a screen inset. If the Shipper selects a particular "ship center" type from a shipping location pull down menu (not shown) as the shipping location, the User Interface will display, as shown in FIG. 15, three elements: 1) a table 1058 with the Location Address, Pickup Times and Comments Area; 2) a Browse button 1059; and 3) a destination Zip Code field 1042. Clicking the Browse button 1059 will display additional Drop Off Locations in a Pop-up window (not shown).

Figure 16:
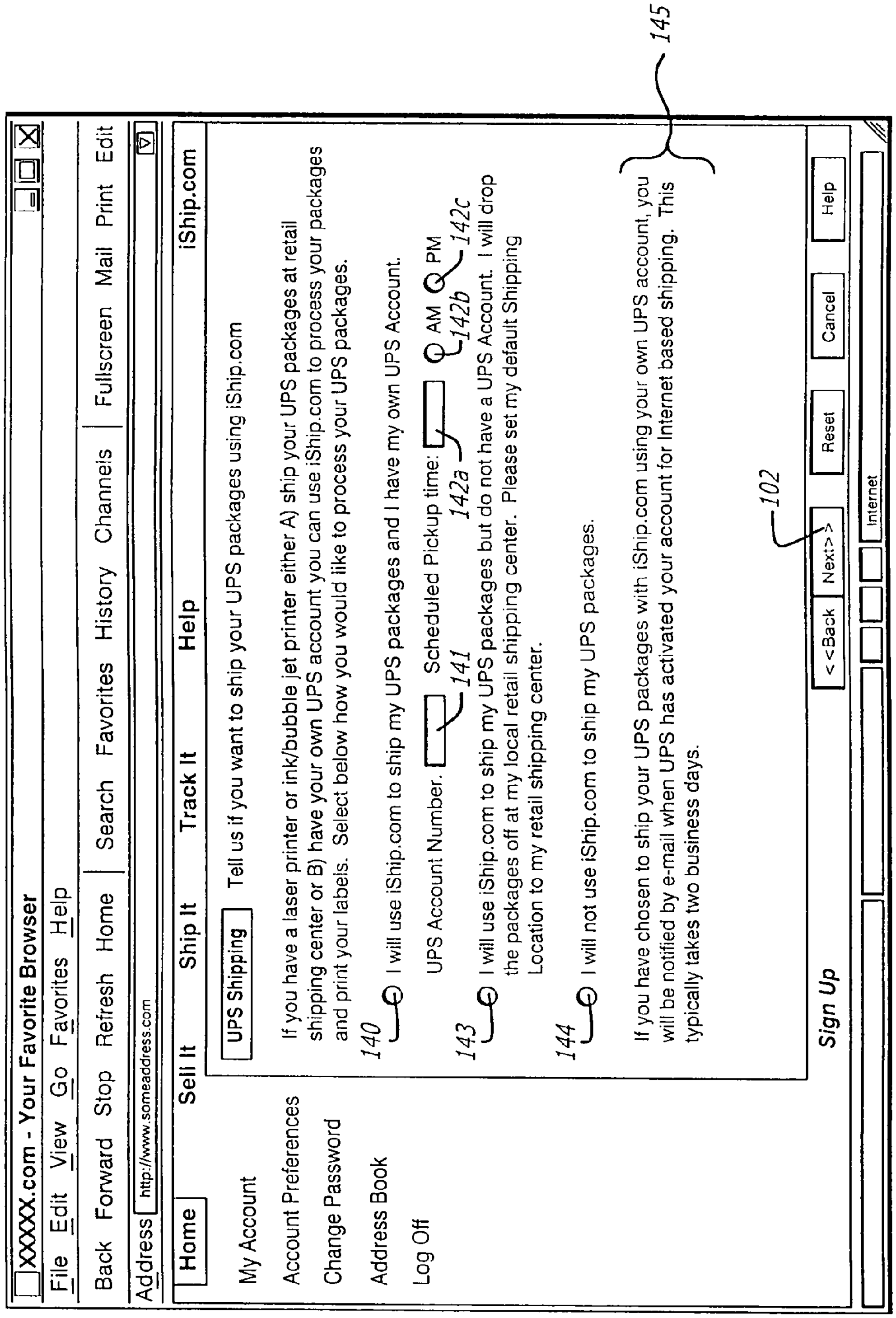
FIG. 16 is a graphic representation of an exemplary embodiment of a UPS registration screen in an exemplary embodiment of the System in an independent system eCommerce environment.

Returning to FIG. 14, if the User clicks the Next button 102, and if the data entered in the Shipping Locations screen is successfully validated, the System displays the next screen, which in this case is the UPS registration screen 44 as depicted in FIG. 10A. FIG. 16 is a graphic representation of an exemplary embodiment of a UPS registration screen 44. If the User indicates that the User will ship through the System using UPS and that the User already has a UPS account 140, the User will be asked to provide the UPS account number 141 and the scheduled pickup time 142*a*, a.m. 142*b*, and p.m. 142*c*. The System provides the User with other UPS shipping options, such as dropping the UPS shipments at a shipping center such as a Mail Boxes Etc 143, or not using the System for shipping UPS 144. Depending on the User's selection, the System provides appropriate special circumstance notification 145 if required.

Figure 17:
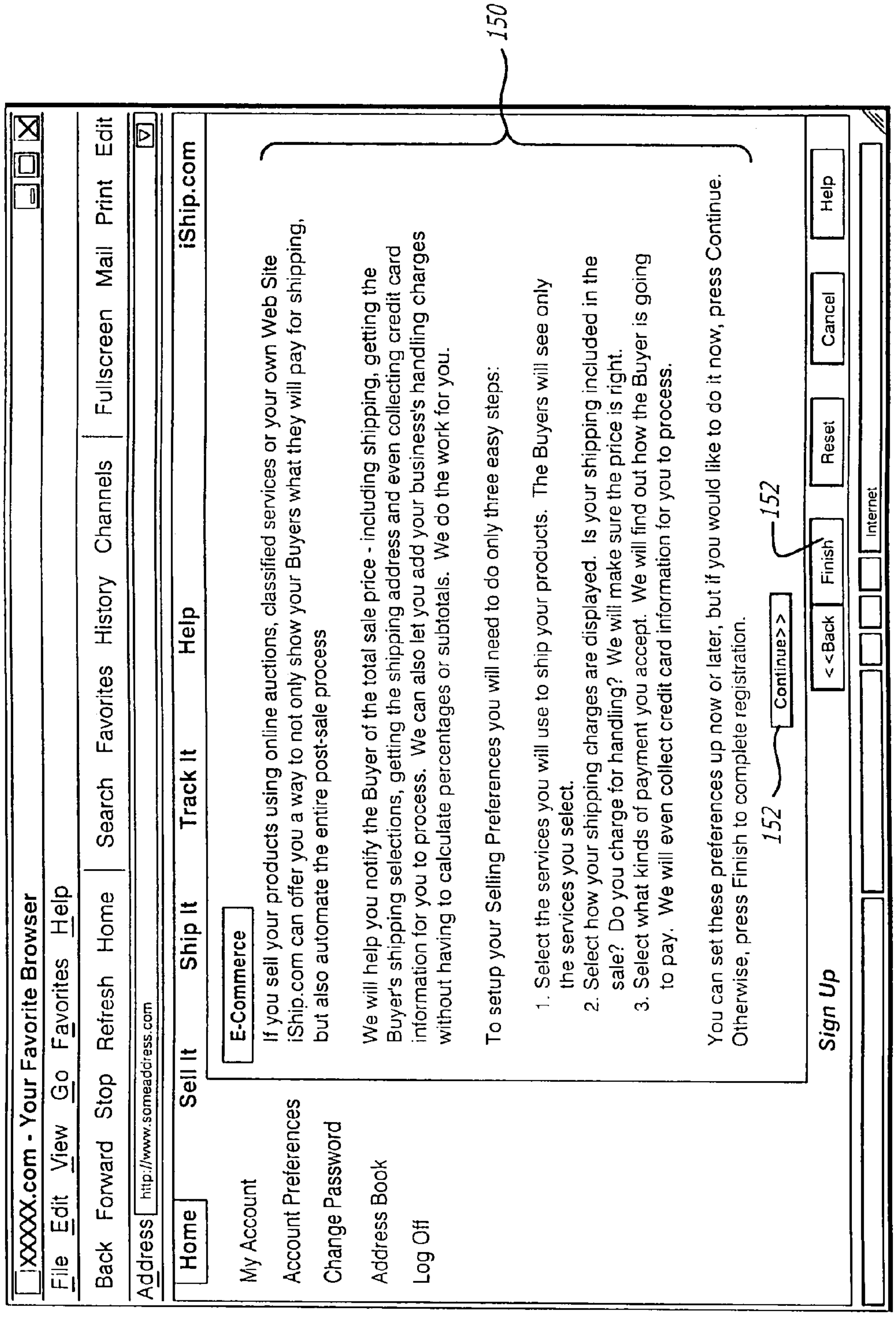
FIG. 17 is a graphic representation of an exemplary embodiment of an eCommerce registration introduction screen in an exemplary embodiment of the System in an independent system eCommerce environment.

If User clicks the Next button 102, and if the data entered in the UPS registration screen is successfully validated, the System displays the next screen, which in this case is the eCommerce registration introduction screen 45 as depicted in FIG. 10A. FIG. 17 is a graphic representation of an exemplary embodiment of an eCommerce registration introduction screen 45. The eCommerce registration introduction screen 45 provides a textual description 150 of the procedure to setup selling preferences for eCommerce transactions.

If the user clicks the Finish button 152 on the eCommerce registration introduction screen 45, the System finalizes the registration process 46 and sends the User to a registration complete screen 48*a* as depicted in FIGS. 10A and 10B. FIG. 10B depicts eCommerce/eAuction Seller registration procedures, including the Creation of a Link that the Seller can copy and paste in the Seller's Web page description of the item to be sold/shipped.

Figure 18:
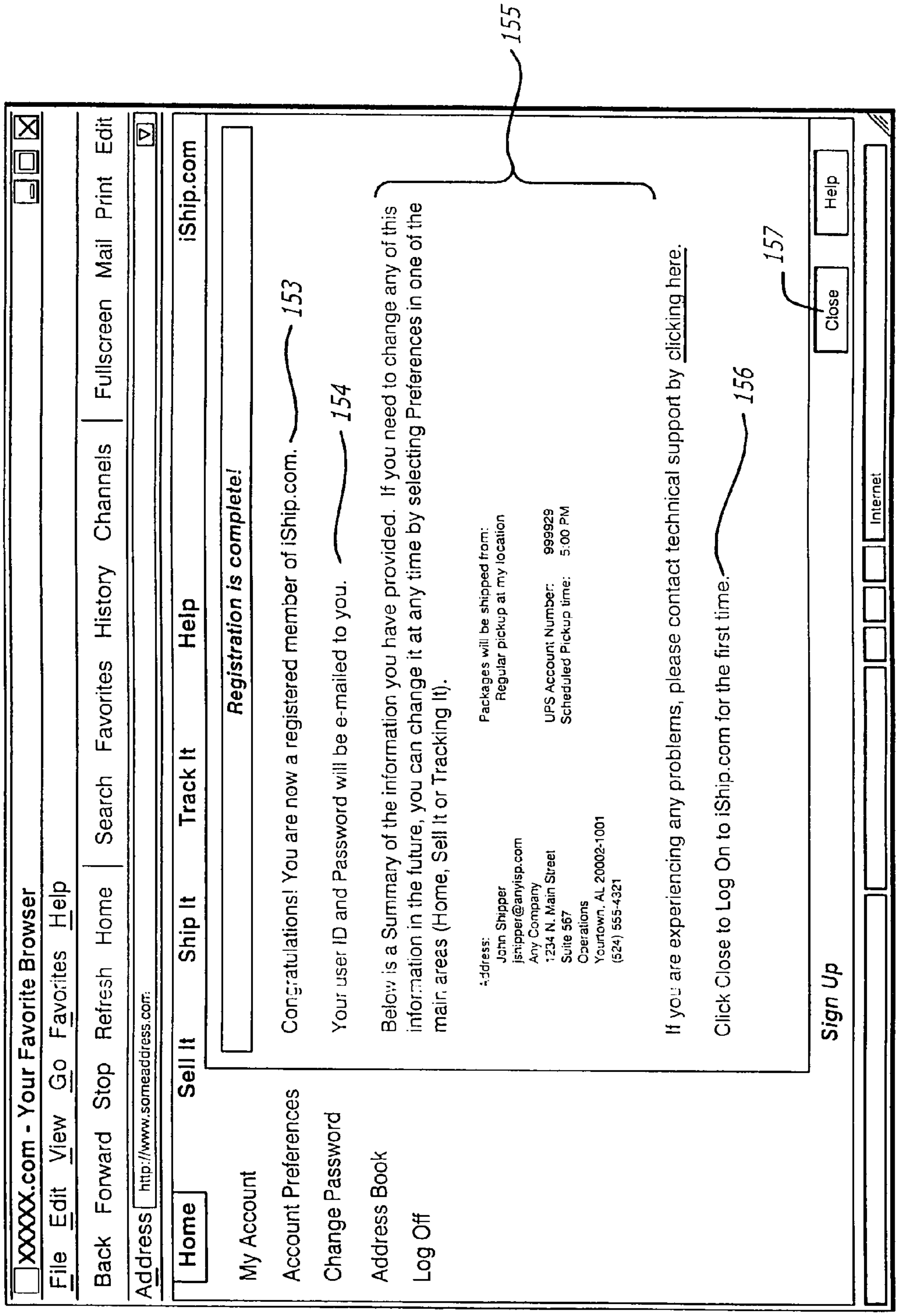
FIG. 18 is a graphic representation of a registration complete screen in an exemplary embodiment of the System in an independent system eCommerce environment.

FIG. 18 is a graphic representation of a registration complete screen 48*a*. The System informs the User that the User is registered 153 and that the User's ID and password will be e-mailed to the User 154. The System summarizes the registration information for the User 155 and instructs the User 156 to click on the Close button 157 to log on to the System for the first time. If the User clicks on the Close button 157 and logs on to the system, a Welcome screen, e.g., 48*b* as depicted in FIG. 10*b*, is displayed from which the User can request that a Seller's Link be created.

If the user clicks the Continue button 151 on the eCommerce registration introduction screen 45, the System will display 47 the next screen, which is an eCommerce registration screen 49 as depicted in FIGS. 10A and 10B.

Figure 19:
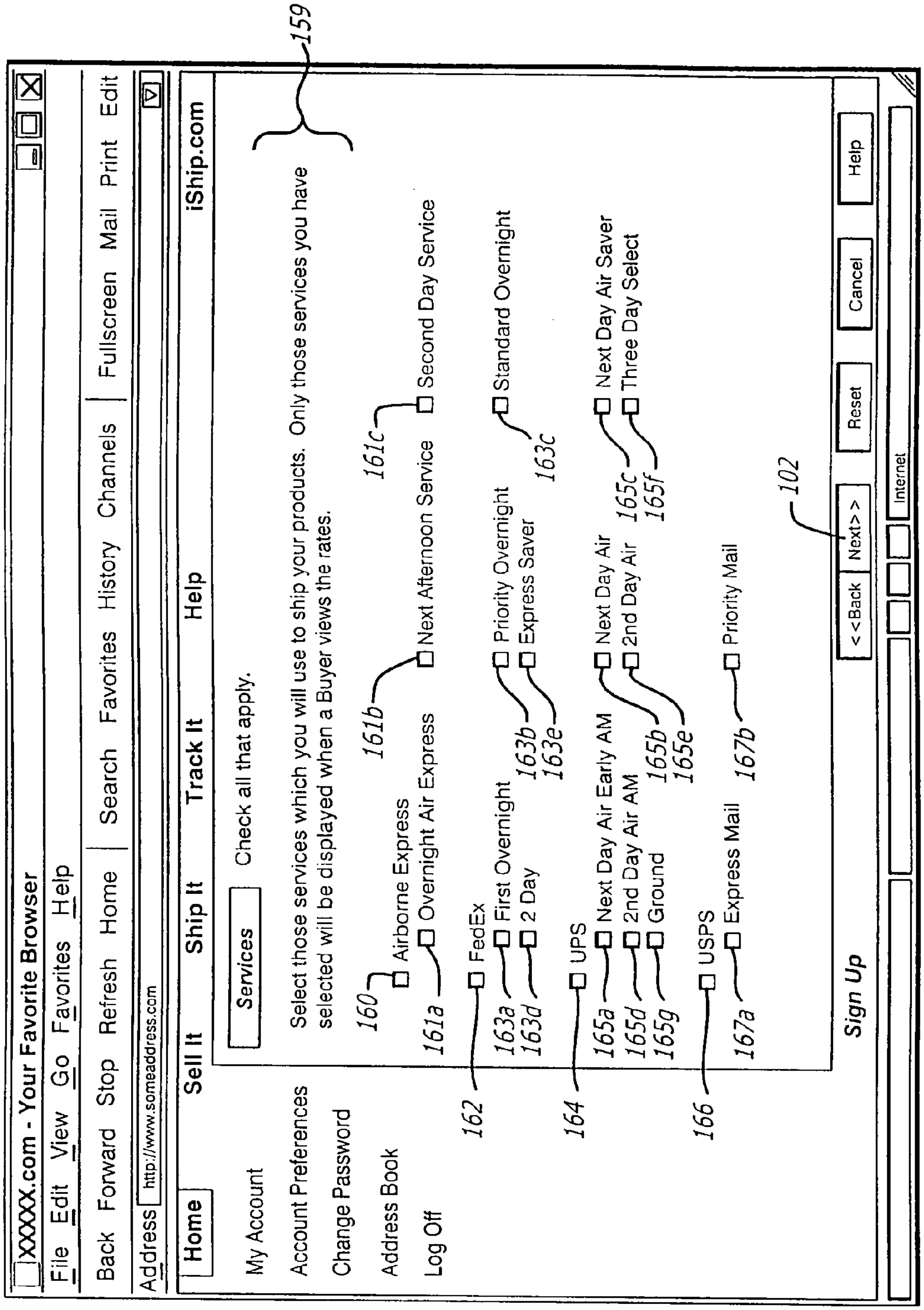
FIG. 19 is a graphic representation of an exemplary embodiment of the Seller's Carrier/Service Preferences Screen in an exemplary embodiment of the System in an independent system eCommerce environment.

FIG. 19 is a graphic representation of an exemplary embodiment of the Seller's Carrier/Service Preferences Screen 49 as depicted in FIG. 10B. With the Seller's Carrier/Service Preferences Screen 49, the System requests 159 the User to identify the Carriers and the Services of each Carrier (e.g. Overnight Air Express 161*a*, Next Afternoon Service 161*b* and Second Day Service 161*c* for Airborne Express 160; First Overnight 163*a*, Priority Overnight 163*b*, Standard Overnight 163*c*, 2 Day 163*d* and Express Saver 163*e* for FedEx 162; Next Day Air Early AM 165*a*, Next Day Air 165*b*, Next Day Air Saver 165*c*, 2nd Day Air AM 165*d*, 2nd Day Air 165*e*, Three Day Select 165*f* and Ground 165*g* for UPS 164; and Express Mail 167*a* and Priority Mail 167*b* for USPS 166) that the User is willing to allow Buyers/Bidders to choose for shipping the item(s) to be shipped. Each supported Carrier, e.g., Airborne Express 160, FedEx 162, UPS 164, and USPS 166 is available for selection by the User. Further, each service offered by a particular Carrier is also available for User selection. For example, for Airborne Express, Overnight Air Express 161*a*, Next Afternoon Service 161*b*, and Second Day Service 161*c* are available for User selection. The User selects a Carrier or a service by clicking on the selection button, e.g., 160.

Figure 20:
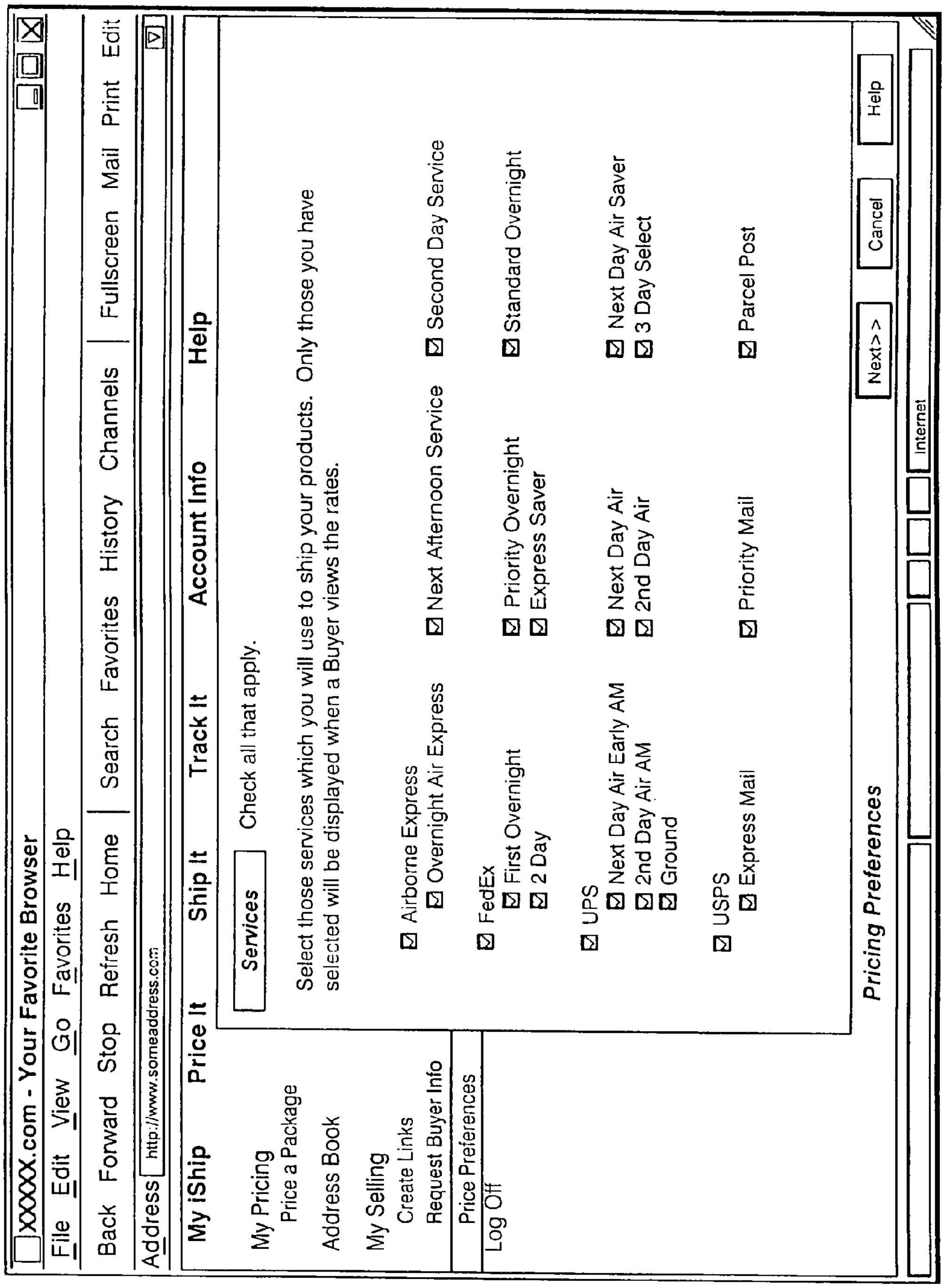
FIG. 20 is a graphic representation of an alternative embodiment of the Seller's Carrier/Service Preferences Screen in an exemplary embodiment of the System in an independent system eCommerce environment.

FIG. 20 is a graphic representation of an alternative embodiment of the Seller's Carrier/Service Preferences Screen 49. In the example depicted in FIG. 20, the User has selected all Carriers and all services for all Carriers.

Figure 21:
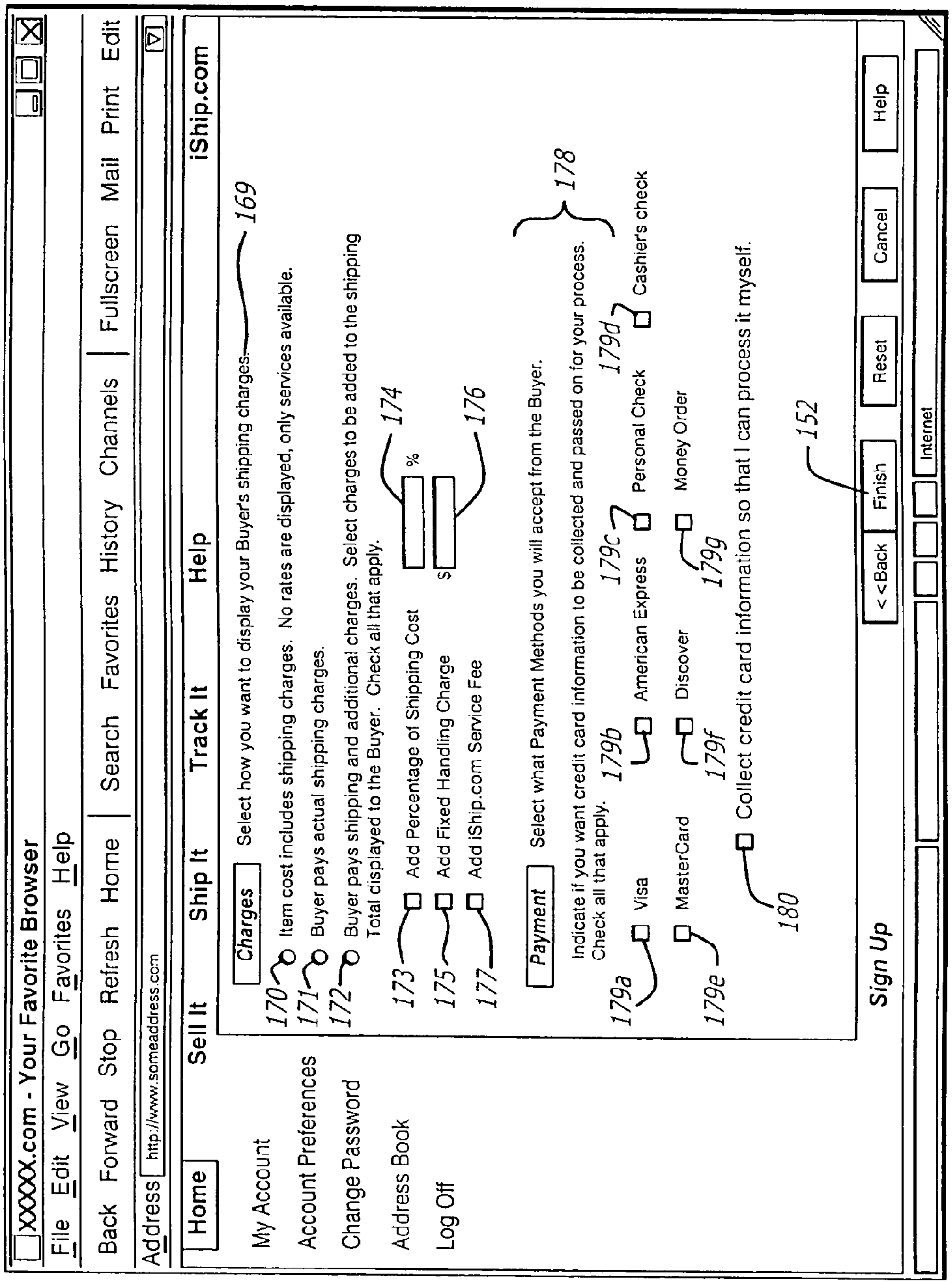
FIG. 21 is a graphic representation of an exemplary embodiment of a Seller's Charges and Payment Preferences Screen in an exemplary embodiment of the System in an independent system eCommerce environment.

If the User clicks the Next button 102 on the Seller's Carrier/Service Preferences Screen 49, the System will display the next screen, which is Seller's Charges and Payment Preferences Screen 50 as depicted in FIG. 10B. FIG. 21 is a graphic representation of an exemplary embodiment of a Seller's Charges and Payment Preferences Screen 50. The System asks the User to select a format for presentation of shipping charges to the Buyer/Bidder 169. The User can select any one of the following choices: 1) the item cost includes shipping charges 170; 2) buyer pays actual shipping charges 171; or 3) buyer pays shipping plus additional charges 172.

If the User chooses the option that the buyer pays shipping charges plus additional charges, then the User must select the types of additional charges that apply, and the value to be added: 1) add percentage of shipping cost 173 and specify percentage 174; 2) add fixed handling charge 175 and specify the amount of the handling charge 176; and/or 3) add System Service Fee 177.

The System also requires that the User select at least one payment method 178: Visa 179*a*, American Express 179*b*, Personal Check 179*c*, Cashier's Check 179*d*, MasterCard 179*e*, Discover 179*f*, and/or Money Order 179*g*. The User is also given the option of requesting that the System collect credit card information and provide the information to the User so that the User can process the information 180.

If the User clicks the Finish button 152 on the Seller's Charges and Payment Preferences Screen 50, then the System will display the Registration Completion Screen 48*a* previously described above.

Figure 22:
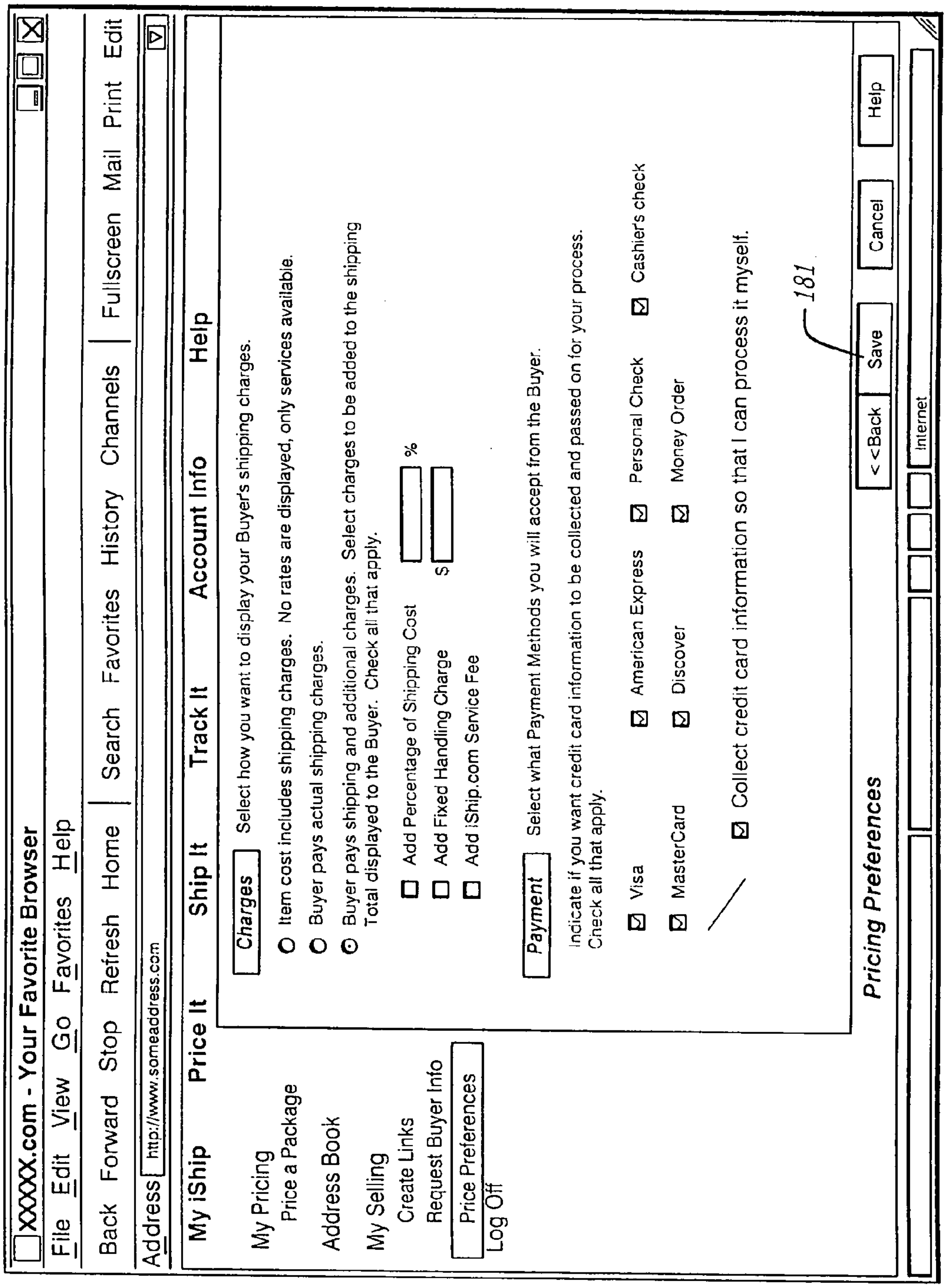
FIG. 22 is a graphic representation of an alternative embodiment of the Seller's Charges and Payment Preferences Screen in an exemplary embodiment of the System in an independent system eCommerce environment.

FIG. 22 is a graphic representation of an alternative embodiment of the Seller's Charges and Payment Preferences Screen 50 depicting User selections of some of the available options. If the User clicks the Save button 181, the System validates the information, saves the User's choices and specifications, and completes the registration process.

Similarly, with respect to FIG. 21, if the user clicks the Finish button 152 on the Seller's Charges and Payment Preferences Screen 50, the System finalizes the registration process and displays the registration complete screen 48*a* as depicted in FIG. 10B. As was previously described above, in the registration complete screen 48*a*, the System summarizes the registration information for the User 155 and instructs the User 156 to click on the Close button 157 to log on to the System for the first time. If the User clicks on the Close button 157 and logs on to the system, a Welcome screen, e.g., 48*b* as depicted in FIG. 10B, is displayed from which the User can request that a Seller's Link be created.

Figure 23:
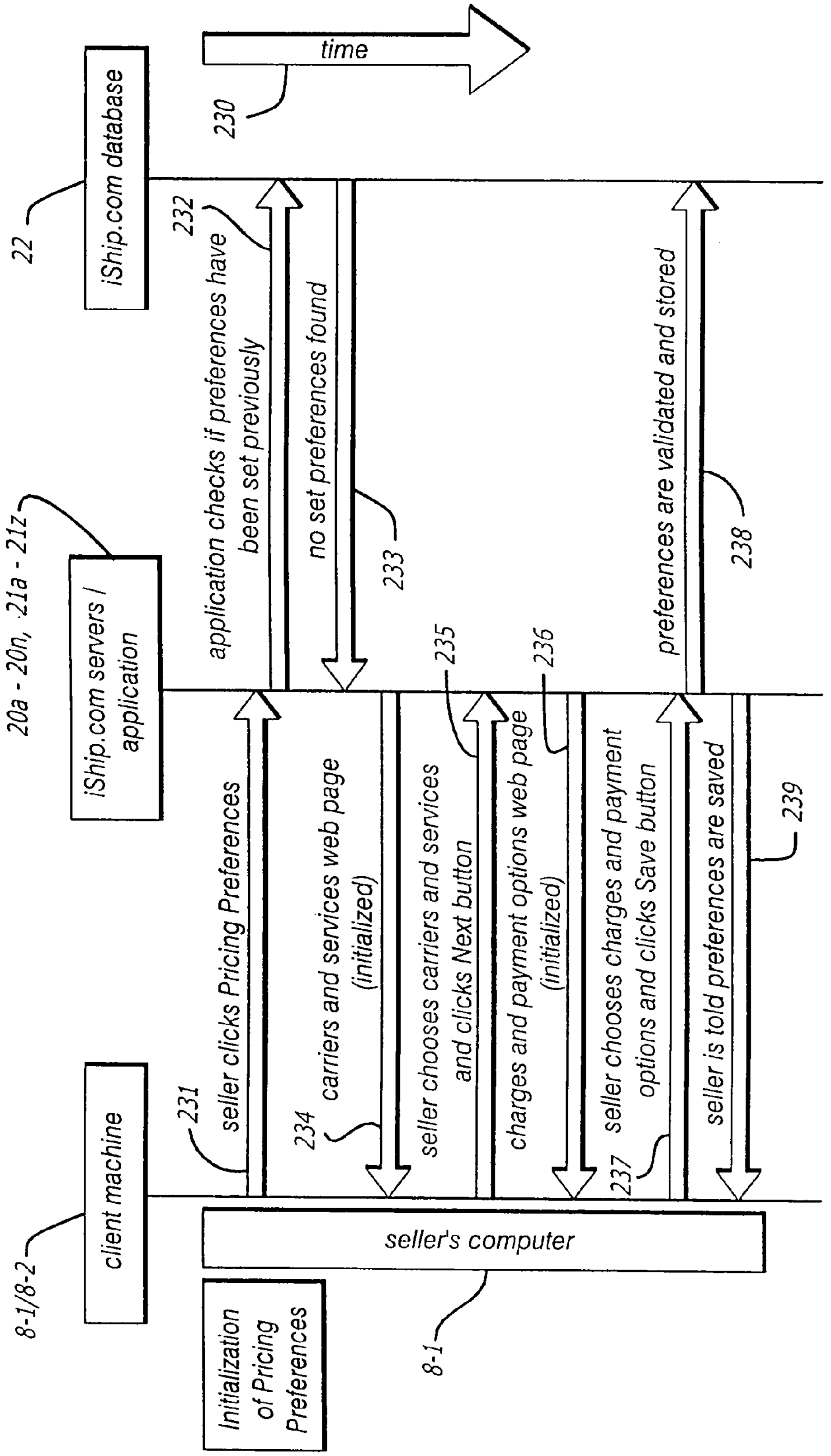
FIG. 23 is a System interactivity data and logic flow diagram depicting an exemplary embodiment of the Seller's eCommerce Registration process in an exemplary embodiment of the System in an independent system eCommerce environment.

FIG. 23 is a System interactivity data and logic flow diagram depicting an exemplary embodiment of the Seller's eCommerce Registration process. FIG. 23 depicts the interactivity between the User's client machine (Seller's computer) 8 and the System's server computers 20*a*-21*z*. Also depicted are the data accesses to the System database 22. An arrow 230 extending from the top of the diagram and pointing down towards the bottom of the figure graphically represents the passage of time.

Figure 24:
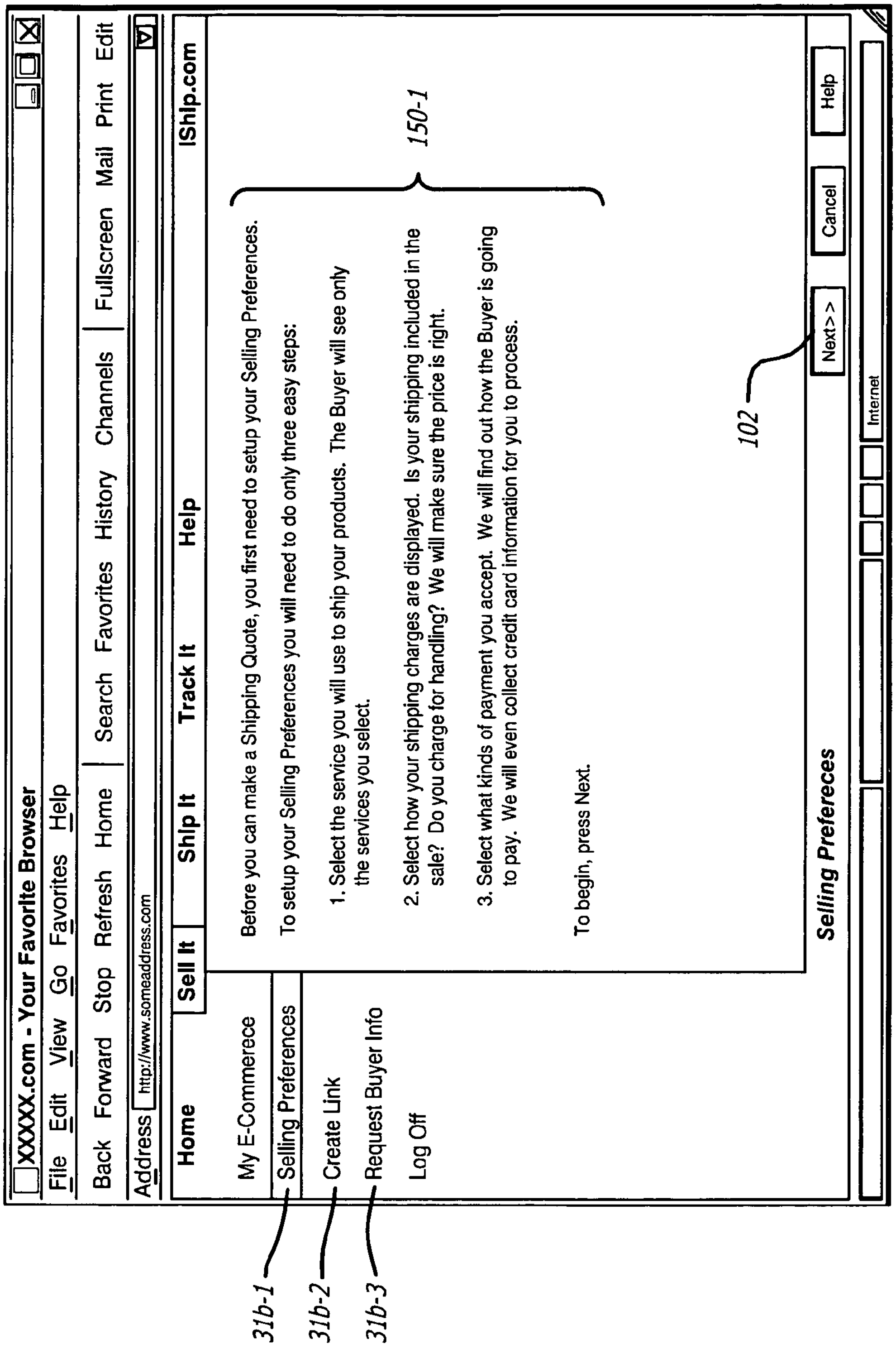
FIG. 24 is a graphic representation of a Registration Needs Completion Screen in an exemplary embodiment of the System in an independent system eCommerce environment.

As depicted in FIG. 23, the Seller clicks on the Pricing Preferences submenu option 231 (equivalent to 31*b*-1 as depicted in FIG. 24 under the Sell It option 31*a* of the main menu 34 as depicted in FIG. 9). The System servers 20*a*-20*n* then access the System database 22 to determine whether the Seller's preferences have previously been set 232. In the case that no preferences are found for the specified Seller 233, the System servers 21*a*-21*z* generate the signals necessary to display the Carriers and Services Screen 234 to the Seller's computer 8. The Seller selects the Seller's preferred Carriers and Services and clicks the Next button 235 returning control to the System servers 21*a*-21*z*. The System servers 21*a*-21*z* next generate the signals necessary to display the Charges and Payment screen 236 to the Seller's computer 8. The Seller selects the Charges and Payment options and clicks the Save button 237. The System servers 21*a*-21*z* validate the Seller preference information and the System servers 20*a*-20*n* store 238 the information on the System database 22. The System servers generate the signals necessary to notify the Seller at the Seller's computer 8 that the Seller's preferences have been saved 239.

There are different ways by which a User can request the System to create a Seller's Link. One way is for the User to enter the System's home page, log in 48*b*, e.g., as depicted in FIG. 10B, and click on the Sell It 31*a*, or equivalent, application on the main selection bar 34 as depicted in FIG. 9. Another way is to click on the System logo icon as provided in an eCommerce/eAuction Provider's web site. There are other ways that a User can enter the System. For instance, the eCommerce/eAuction Provider might provide a hyperlink to the System web site.

If the User enters the System Web site, and clicks on the Sell It selection 31*a*, the System presents either a submenu such as 31*b* as depicted in FIG. 9, or displays a default first screen in the Sell It application, depending on the embodiment.

If the User has not completely registered for the System and for eCommerce shipping processing, then the System prompts the User to complete the necessary registration process by displaying a Registration Needs Completion screen 51 as depicted in FIG. 10B.

FIG. 24 is a graphic representation of a Registration Needs Completion Screen 51. Similar to the screen depicted in FIG. 17, the System requests the User to provide the necessary information by completing the information requested in subsequent screens 150-1. If the User clicks the Next button 102, the System displays the Seller's Carrier/Service Preferences Screen 49, and the Seller's Charges and Payment Preferences Screen 50 as depicted in FIG. 10B.

Figure 25:
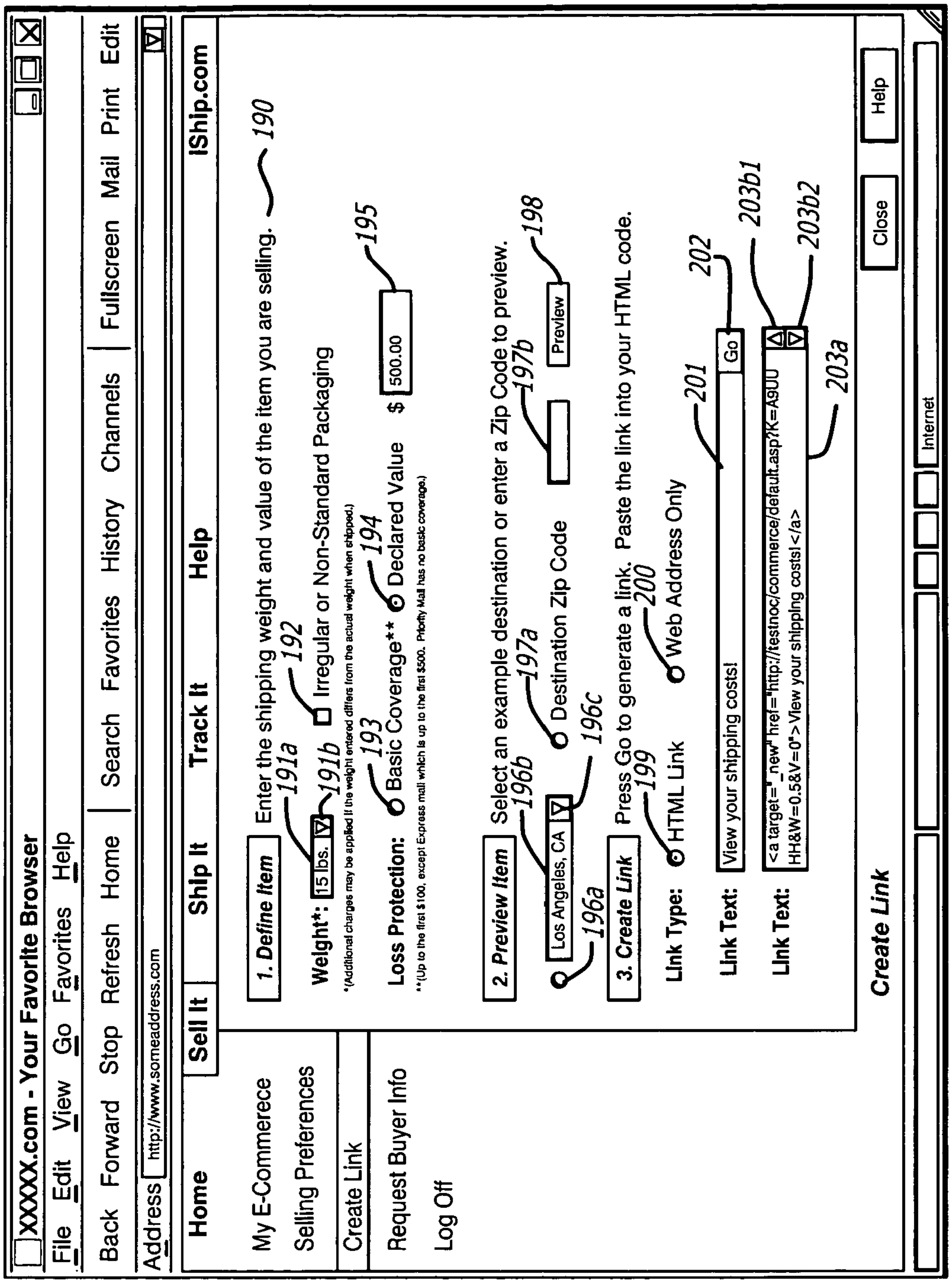
FIG. 25 is a graphic representation of an exemplary embodiment of a Create a Seller's Link Screen in an exemplary embodiment of the System in an independent system eCommerce environment.

Once the User has completed registration for the System and for eCommerce shipping processing, the System allows the User to select the Create Link submenu option 31*b*-2 in the Sell It Application 31*a* of the System. If the User selects the Create Link option 31*b*-2, the System displays a Create a Seller's Link Screen 52 as depicted in FIG. 10B. FIG. 25 is a graphic representation of an exemplary embodiment of a Create a Seller's Link Screen 52.

Before the System can create a Seller's link, the User must tell the System information about the particular package that will be shipped. Accordingly, as depicted in FIG. 25, the System asks the User to enter the shipping weight and value of the item to be shipped 190. The User is asked to enter the Shipping Weight 191*a*.

Figure 26:
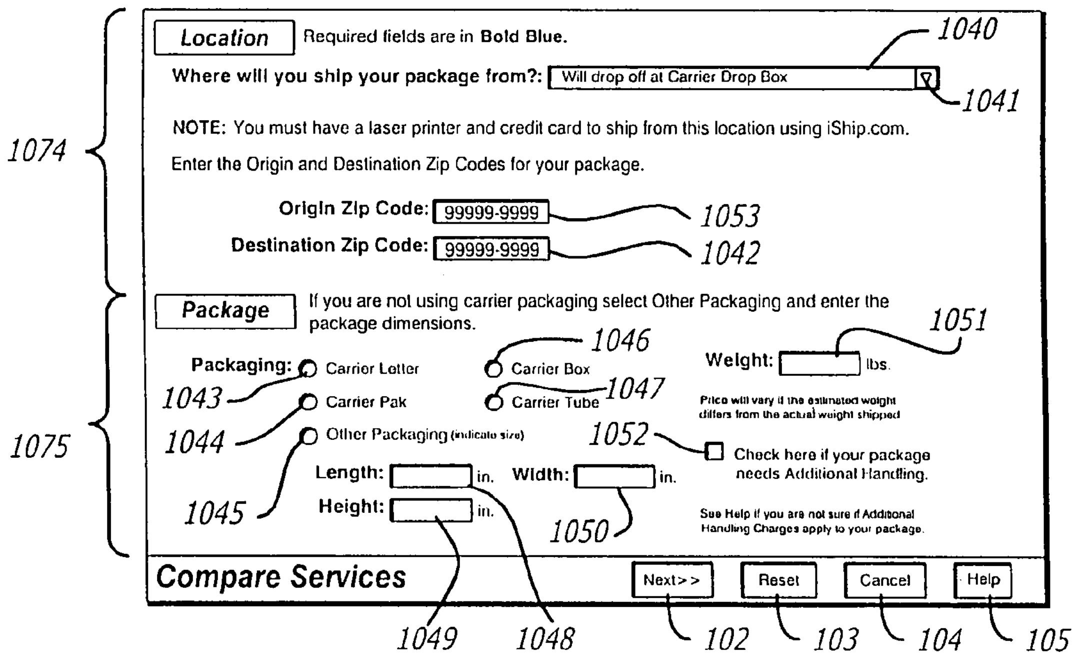
FIG. 26 is a graphic representation of an alternative online screen that collects a user's shipping specifications and preferences in an alternative exemplary embodiment of the System in an Internet environment.

FIG. 26 depicts an exemplary alternative embodiment of a screen for the input of Shipper Parcel Specifications, which in the exemplary alternative embodiment depicted is titled the Location and Package Screen. The Location and Package Screen depicted in FIG. 26 collects Shipper input similar to a portion of the information that which was described in connection with FIGS. 13 and 25.

As shown in FIG. 26, the Shipper is asked to input the location 1040 from which the parcel will be shipped. A pull down menu activation mechanism 1041 is provided to allow the user to pull down a menu (not shown) of different shipping locations. It should be noted that the exemplary selection mechanisms, e.g., "pull down menu", "drop down selection", and others, described herein are used for illustrative purposes and are not a limitation of the invention.

The Shipper activates the pull down menu by placing the cursor of the Shipper's PC over the pull down menu activation mechanism 1041 and leaving the cursor in the same position for a certain period of time (this method of activating a selection mechanism will be referred to herein as a "Pause Activation"). In alternative embodiments, the Shipper activates the pull down menu by placing the cursor of the Shipper's PC over the pull down menu activation mechanism 1041 and clicking the Shipper's user input device (this method of activating a selection mechanism will be referred to herein as a "Click Activation"). It should be understood that for each activation mechanism depicted in the User Interface of the Present Invention, that the exemplary embodiments of the User Interface depicted herein use the Pause Activation method; alternative embodiments use the Click Activation method.

References herein to "clicking" mean that the Shipper places the cursor of the Shipper's PC on the subject item and clicks the Shipper's user input device.

If the Shipper activates the pull down menu activation mechanism 1041, a menu of different shipping locations (not shown) appears in the Location area 1074 of the screen. The Shipper then selects one of the shipping locations by placing the cursor of the Shipper's PC over a particular shipping location in the shipping location menu and clicking the Shipper's user input device, e.g., mouse.

It should be understood that for each selection mechanism depicted in the exemplary embodiments of the invention, selection of a particular choice from such a selection menu is made by the Shipper clicking the Shipper's user input device.

There are two types of shipping locations, ship centers and customer drop offs. Ship centers are those locations which refer to a database of specific locations, from which a specific location from the available locations must be selected to determine rates, such as an "iShip Center". Customer drop offs are those shipping locations from which a specific location need not be selected to determine rates, such as a "drop box", "carrier counter" or "call for pickup". The shipping location pull down menu displays each shipping location category, e.g., iShip Center, other specific shipping center types, drop box, carrier counter, call for pickup, etc.

As was described with regard to FIG. 15 above, if the Shipper selects a particular "ship center" type from the shipping location pull down menu (not shown) as the shipping location, the User Interface will display, as shown in FIG. 15, three elements: 1) a table 1058 with the Location Address, Pickup Times and Comments Area; 2) a Browse button 1059; and 3) a destination Zip Code field 1042. Clicking the Browse button 1059 will display additional Drop Off Locations in a Pop-up window (not shown).

Returning to FIG. 26, if the Shipper selects a "customer drop off" as the shipping location, the User Interface will display, as shown in FIG. 26, two elements: 1) Origin Zip Code Field 1053; and 2) Destination Zip Code Field 1042.

For either class of shipping location, if an iShip Shipping Station will not be present at the selected shipping location, the System displays a notice (not shown) to the customer telling them that they must have a laser printer to ship using the specified location.

If the Shipper is Logged On to the System and has established an account, the System will default the Shipping Location to the Shipper's specified Preferences which the Shipper inputs (not shown) the first time that the Shipper logs into the System. If the Shipper's specified Preference is a "customer drop off" location, the System populates the Origin Zip Code with the Shipper's default Zip Code which the Shipper inputs (not shown) the first time that the Shipper logs into the System.

If no location is selected by the Shipper, the System displays a message (not shown) asking the Shipper to select a shipping location.

In the Package area 1075 of the screen depicted in FIG. 26 there are the following controls or control groups: 1) "Packaging" which includes various types of parcel packaging, as shown in item numbers 1043-1047 and includes Length 1048, Width 1050 and Height 1049 which are required data fields for parcels designated by the Shipper as the type "Other Packaging"; 2) Weight 1051 (If the Shipper specifies one of the recognized carrier packaging types (Letter, Pak, Box, Tube) the field will be auto filled with "letter", "pak", etc.); and 3) additional handling 1052. If "Letter" is selected the weight will be set by the System to 0.5 lbs. Otherwise, weight may be input by the Shipper (612, FIG. 27*a*) using a user input device such as a keyboard, with weights ranging from 1 to 150 lbs. If a specific weight is selected or input, the Packaging Type will be set to Carrier Box.

Figure 27A:
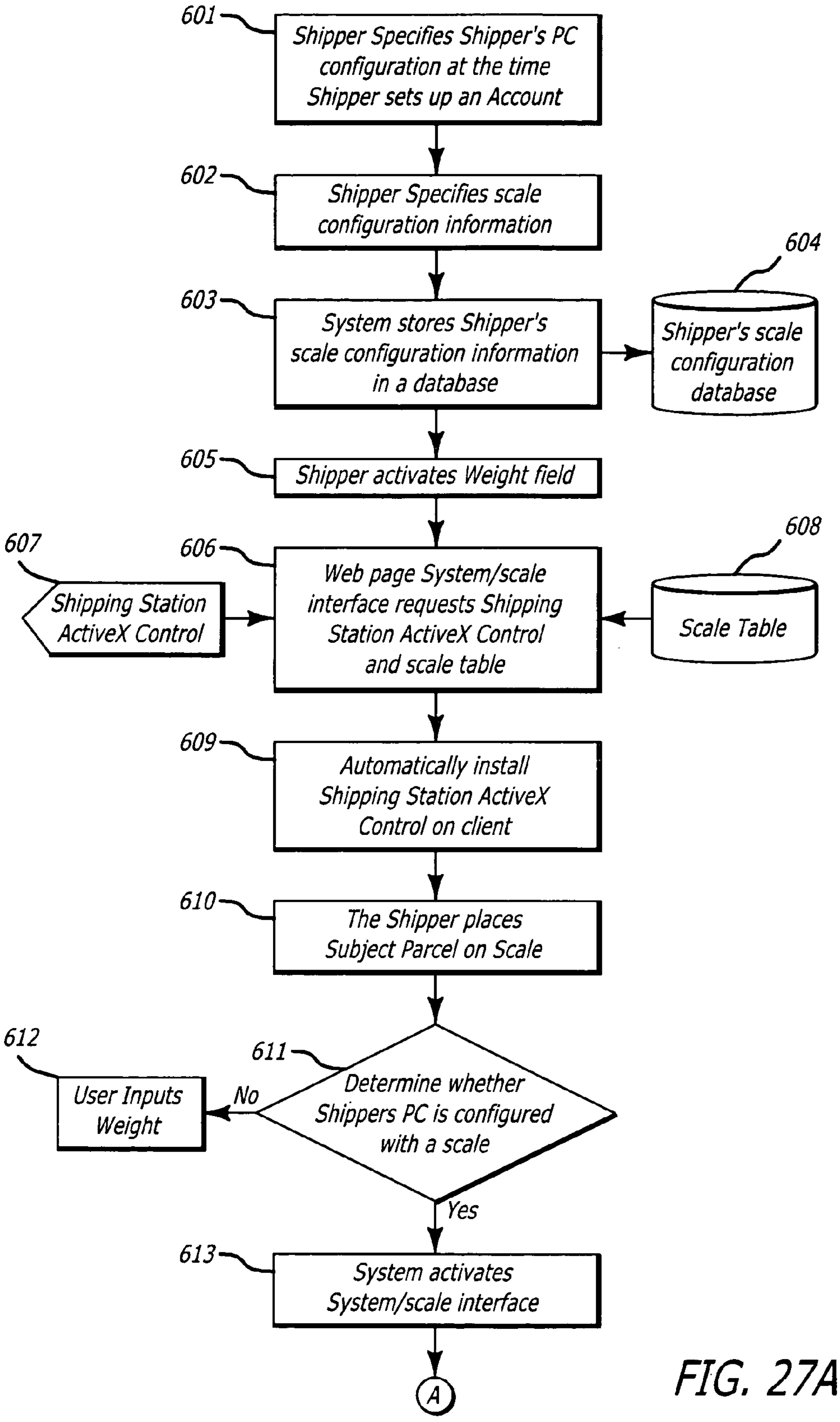
FIGS. 27A through 27C are high level logic flow diagrams control communications with client machine peripheral devices in an exemplary embodiment of the System in an Internet environment.
Figure 27B:
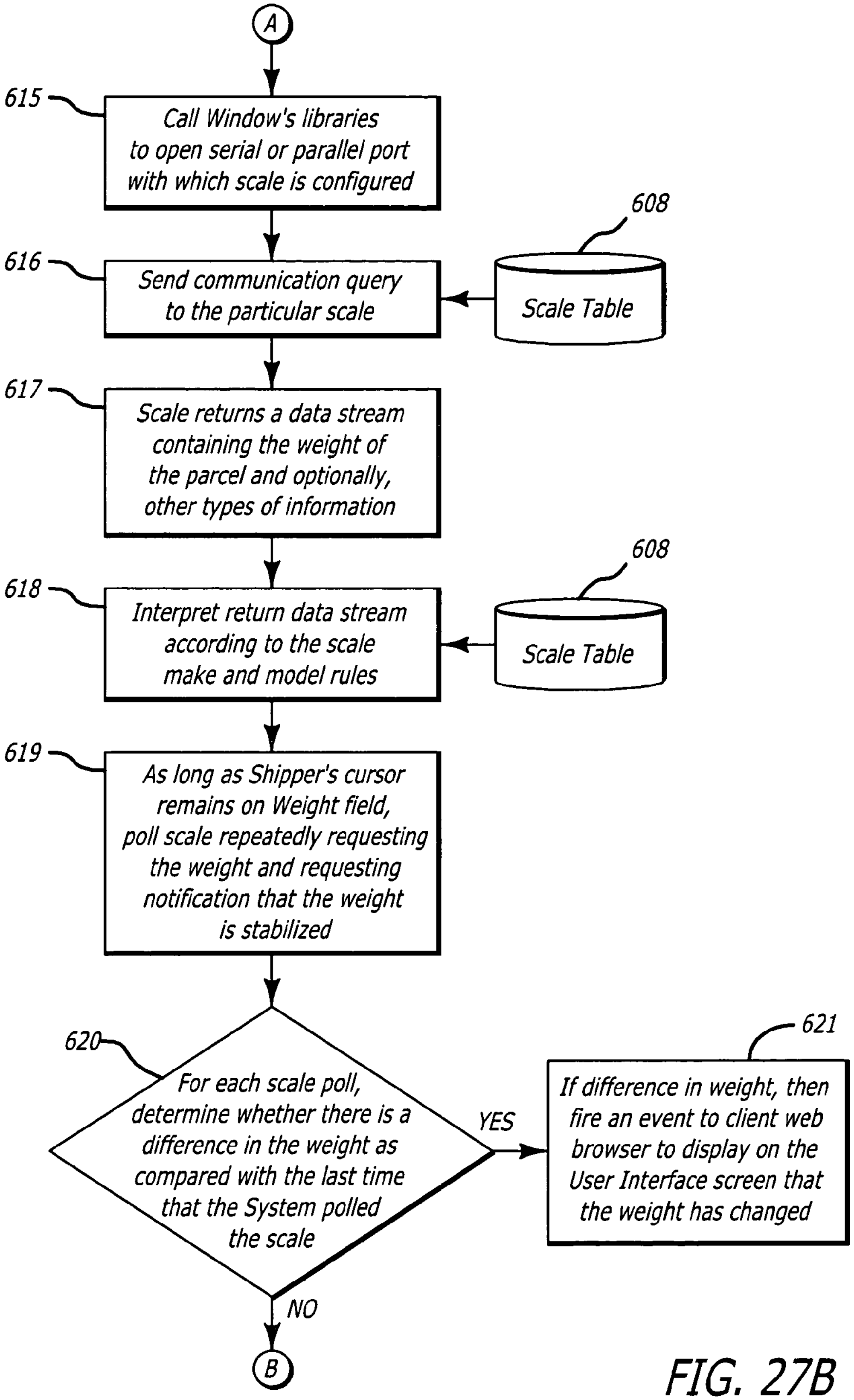
Figure 27C:
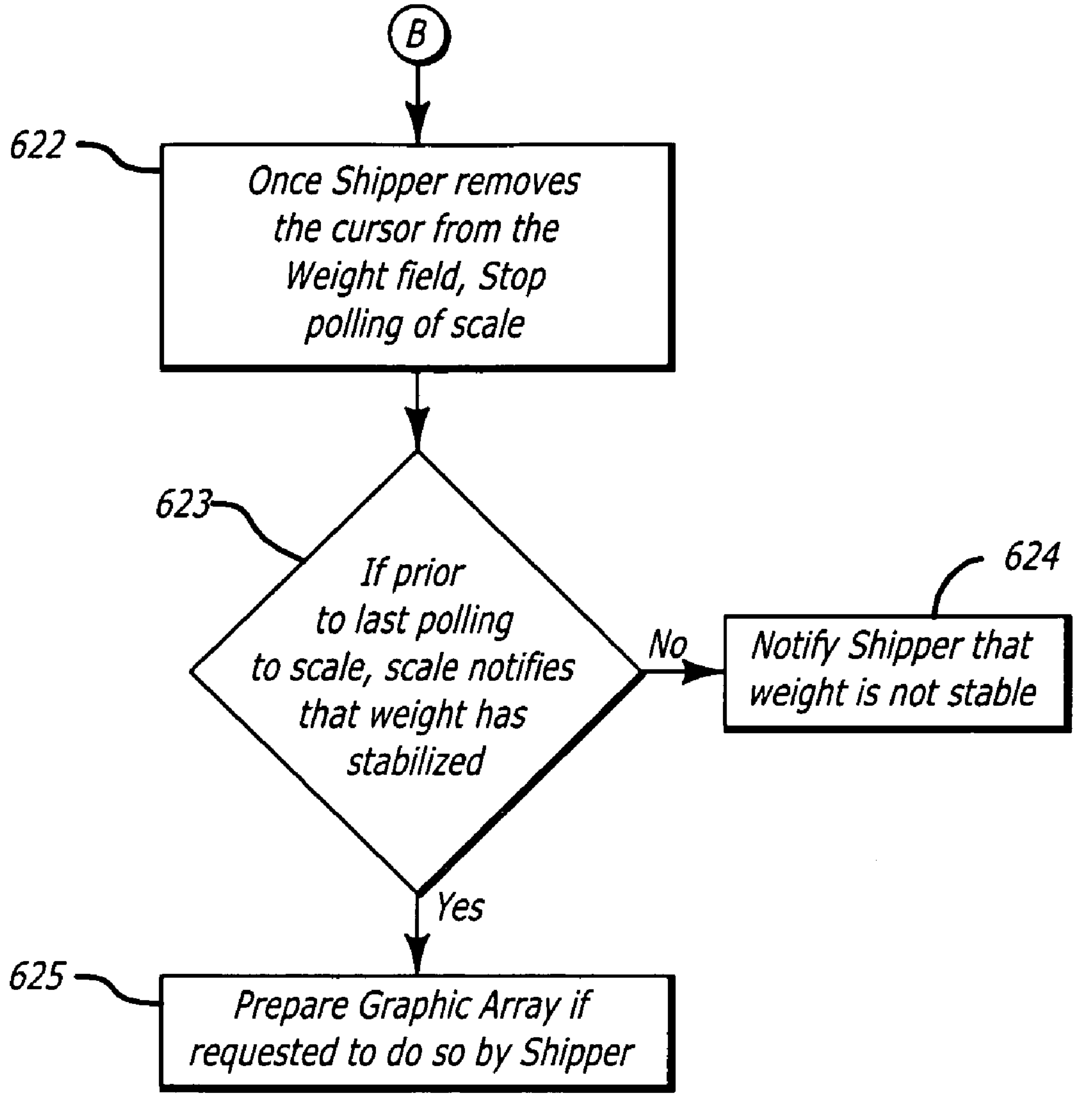

In order to identify the weight of the parcel to the System, in one embodiment of the invention, the Shipper's PC is configured with a scale and the System communicates with the Shipper's scale using the user's client web browser. FIGS. 27A through 27C depict the logic flow for communications between the System and a Shipper's PC and a scale configured with the Shipper's PC. As depicted in FIGS. 27A through 27C, the Shipper establishes in the System certain information about the Shipper's PC configuration at the time the Shipper sets up an Account 601. If the Shipper's PC is configured with a scale, the Shipper specifies scale configuration information 602 such as: the make and model of scale, and the type of port (e.g., serial or parallel) with which the scale is configured with the PC. Further, the System provides storage and access 603 for the Shipper's scale configuration information in a database 604.

Continuing with FIGS. 27A through 27C, the System supports various makes and models of scales. Each scale make and model has a set of features and requirements for which the System must be programmed in order for the System to communicate properly with each particular scale. The System provides an ActiveX control dedicated to communications with peripheral devices configured with client PCs ("Shipping Station ActiveX Control") 607. Contained within the Shipping Station ActiveX Control is a table (the "scale table")

608 containing entries for each supported scale make and model and provides logic to process the communication information for each scale make and model as appropriate. It should be understood by someone skilled in the art that the Shipping Station ActiveX Control facilitates communications with various devices on the client machine. The Shipping Station ActiveX Control 607 and the scale table 608 are requested 606 by the web page (the "System/scale interface") containing the Weight field 1051 at the time that the Shipper activates 605 the Weight field 1051. Once the web page requests the Shipping Station ActiveX Control 607, the Shipping Station ActiveX Control 607 is automatically installed on the client 609. In the event that the Shipping Station ActiveX Control is updated to facilitate the support of additional scale makes and models, the Shipping Station ActiveX Control is automatically reinstalled on the particular client PC the next time that the Shipper activates the Shipping Station ActiveX Control.

Continuing with FIGS. 27A through 27C, the Shipper places 610 the Subject Parcel on the scale, such as, e.g., the scale 1024*a* depicted in FIG. 4, and 1024*n* depicted in FIG. 7. The Shipper activates the Shipping Station ActiveX Control by placing the cursor of the Shipper's PC on the Weight field 1051 (such as the Weight field 1051 depicted in FIGS. 15 and 26). The System checks the Shipper's scale configuration information to determine 611 whether the Shipper's PC is configured with a scale. If so, the System activates the System/scale interface 613. Otherwise, the user may input the weight 612 in the Weight field 1051 as depicted in e.g., FIG. 26.

In one embodiment of the System/scale interface aspect of the invention, the System uses ActiveX control language and the client's web browser, such as Internet Explorer browser. Continuing with FIGS. 27A through 27C, using the Shipper's scale configuration information, the System calls Windows libraries 615 to open the serial or parallel port with which the scale is configured, as the case may be and as is specified in the Shipper's scale configuration information. Windows is an operating system used with most PCs.

Continuing with FIGS. 27A through 27C, the System uses the information for the particular scale make and model from the scale table 608 of scale makes and models to send a communication query to the particular scale 616. Typically, the communication query information required by a particular scale make and model is a particular set of characters. Each scale make and model recognizes a unique set of characters as a request for a weight. Accordingly, the appropriate set of characters that means a request for weight to a particular scale make and model is stored in the scale table for a particular scale make and model.

Continuing with FIGS. 27A through 27C, after a proper query, a scale will return a data stream containing the weight of the parcel 617. Depending on the scale make and model, other types of information may be contained in the return data stream. The System accesses the scale table 608 to interpret 618 the return data stream according to the scale make and model rules as stored in the scale table and as programmed in the Shipping Station ActiveX Control.

Other scale communication information is contained in the scale table for each scale make and model, including, for example: the character string that communicates a request as to whether or not the weight is stabilized; the default contents of the return data stream of the weight from a particular scale make and model; and the character string to request that the scale send the weight mode with the return data stream. Weight mode is the mode with which the scale measures weight (e.g., pounds, kilograms, etc.).

In one embodiment, if no weight difference is determined, as long as the Shipper's cursor remains on the Weight field 1051 (such as the Weight field 1051 depicted in FIGS. 15 and 26), the System polls the scale repeatedly requesting the weight and requesting notification that the weight is stabilized 619. Each time the System polls the scale, the System tests to determine 620 whether or not there is a difference in the weight as compared with the last time that the System polled the scale. If the System determines a difference in weight, then the System uses the Shipping Station ActiveX Control to fire an event 621 to the client web browser to display on the User Interface screen that the weight has changed.

In one embodiment, once the Shipper removes the cursor from the Weight field 1051, the System stops polling the scale 622. If prior to the last polling to the scale, the scale notifies the System that the weight has stabilized 623, the System will proceed with preparing the Graphic Array if requested to do so by the Shipper 625. Otherwise, if the System determines a difference in weight, the System notifies the Shipper that the weight is not stable 624.

Figure 36A:
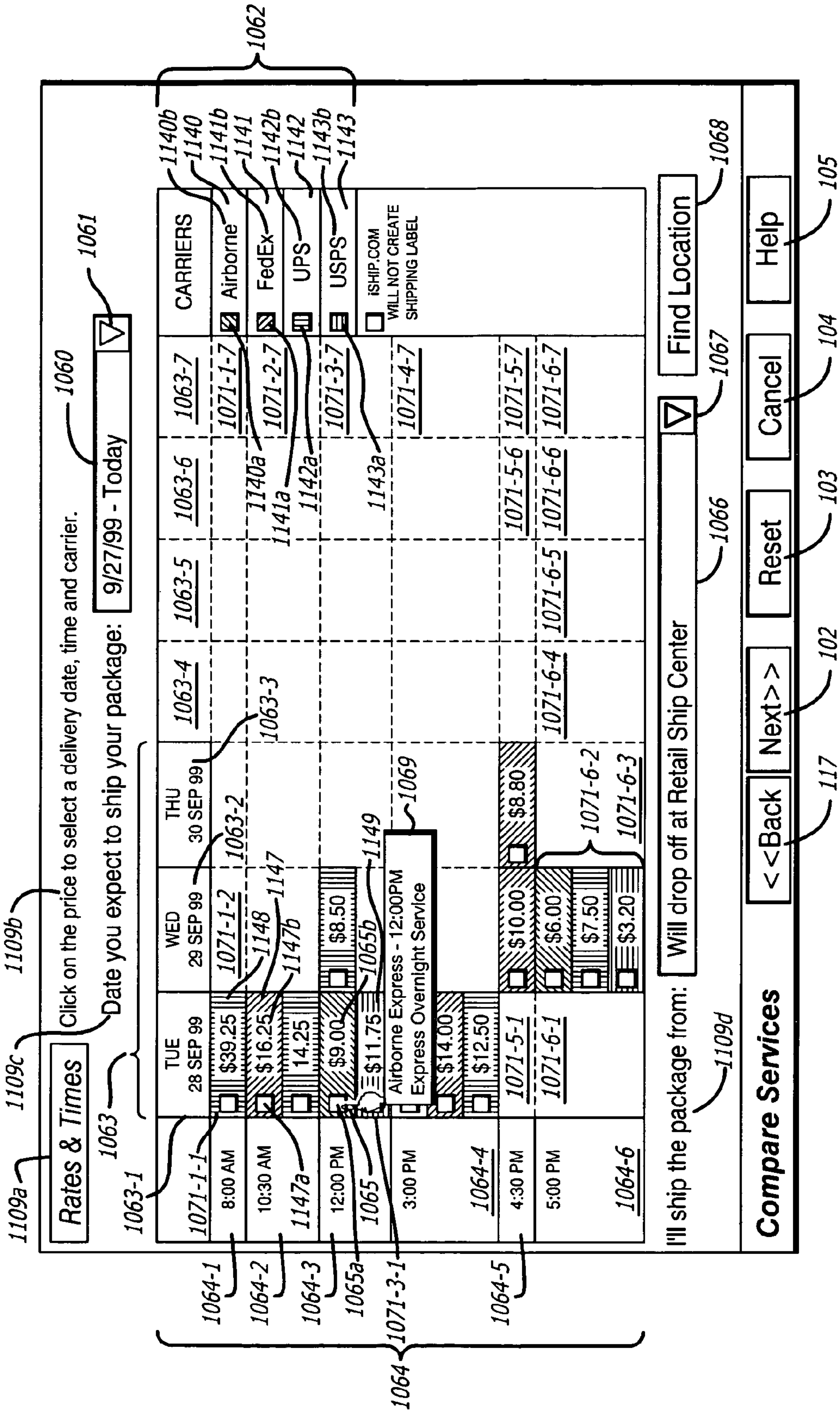
FIG. 36A is a graphic representation depicting an exemplary embodiment of a dynamically dimensioned, multi-carrier, multi-service shipping rates comparison Graphic Array in an exemplary embodiment of the System in an independent system eCommerce environment.

The Shipper can use the Shipper's input device connected to the Shipper's PC, such as a mouse 12*a*, as depicted in FIG. 4, to position the cursor on one of the navigational buttons 102-105 shown at the bottom of the screen as depicted in FIG. 26 described above. If the Shipper clicks the "Next" button 102, the System will display the next Screen, which, in the embodiment depicted, is the Rates and Times Screen (an exemplary embodiment of which is depicted in FIG. 36A described below). If the Shipper clicks the "Reset" button 103, the System will clear the values displayed on the current screen. If the Shipper clicks the "Cancel" button 104, the System will cancel the Shipper's Parcel Specifications and the Shipper's service request. If the Shipper clicks the "Help" button 105, the System will display help text to explain to the Shipper the appropriate possible actions.

Returning to FIG. 25, Shipping Weight can be input by clicking the Shipping Weight pull down menu button 191*b* which will cause a display of commonly selected weights, such as "Letter—0.5 lbs" and weights from 1 to 150 lbs. Alternatively, in one exemplary embodiment, the User inputs the weight of the package by placing the actual package on a scale that is configured with the User's computer and with which the System is programmed to interact as disclosed above.

The User is also asked to identify whether the item is irregular or requires non-standard packaging 192. Regarding Loss Protection, the default is Basic Coverage 193. If the User instead selects Declared Value 194, the User is required to enter a value 195 greater than $0.00 and less than or equal to $50,000.00.

Once the User has entered the package specific information 191*a*-195, as described above, the User can request the System to preview the shipping charges that will be presented to a Buyer/Bidder. To do so, the User may either: 1) choose an example destination 196*a* and uses the destination pull down menu button 196*c* to select a sample destination city 196*b* from a list of cities; or 2) choose to enter an example zip code 197*a* by entering a sample zip code 197*b*. Then the user clicks the Preview button 198 to display the sample charges. If a sample destination city was selected from the pull down list of cities, once the User clicks the Preview button 198, the System identifies the appropriate zip code for the selected city and moves that zip code into the Destination Zip code field 197*b*.

Figure 28:
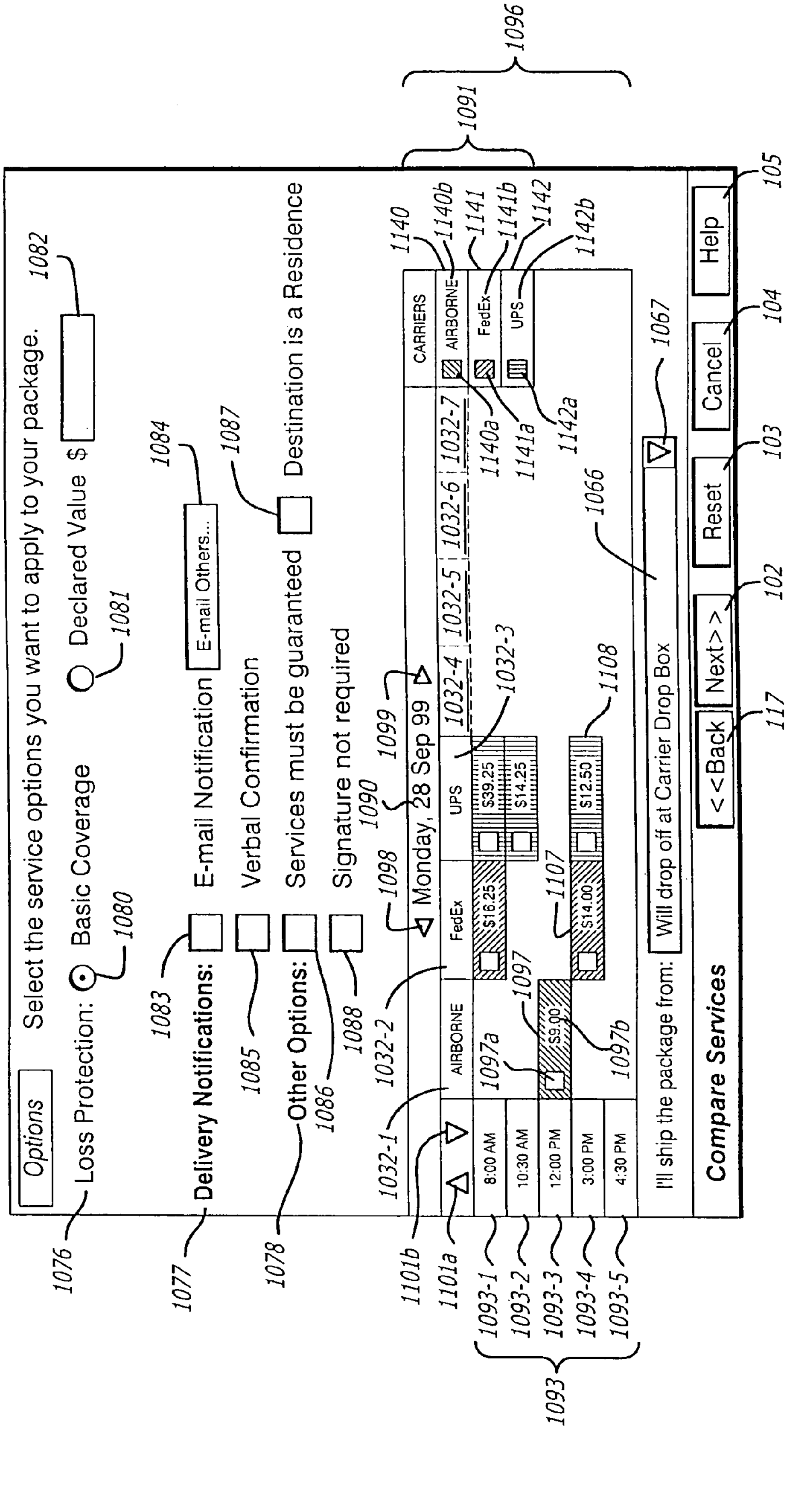
FIG. 28 is a graphic representation of an alternative online screen that collects supplemental user shipping specifications and preferences in an alternative exemplary embodiment of the System in an Internet environment.
Figure 29:
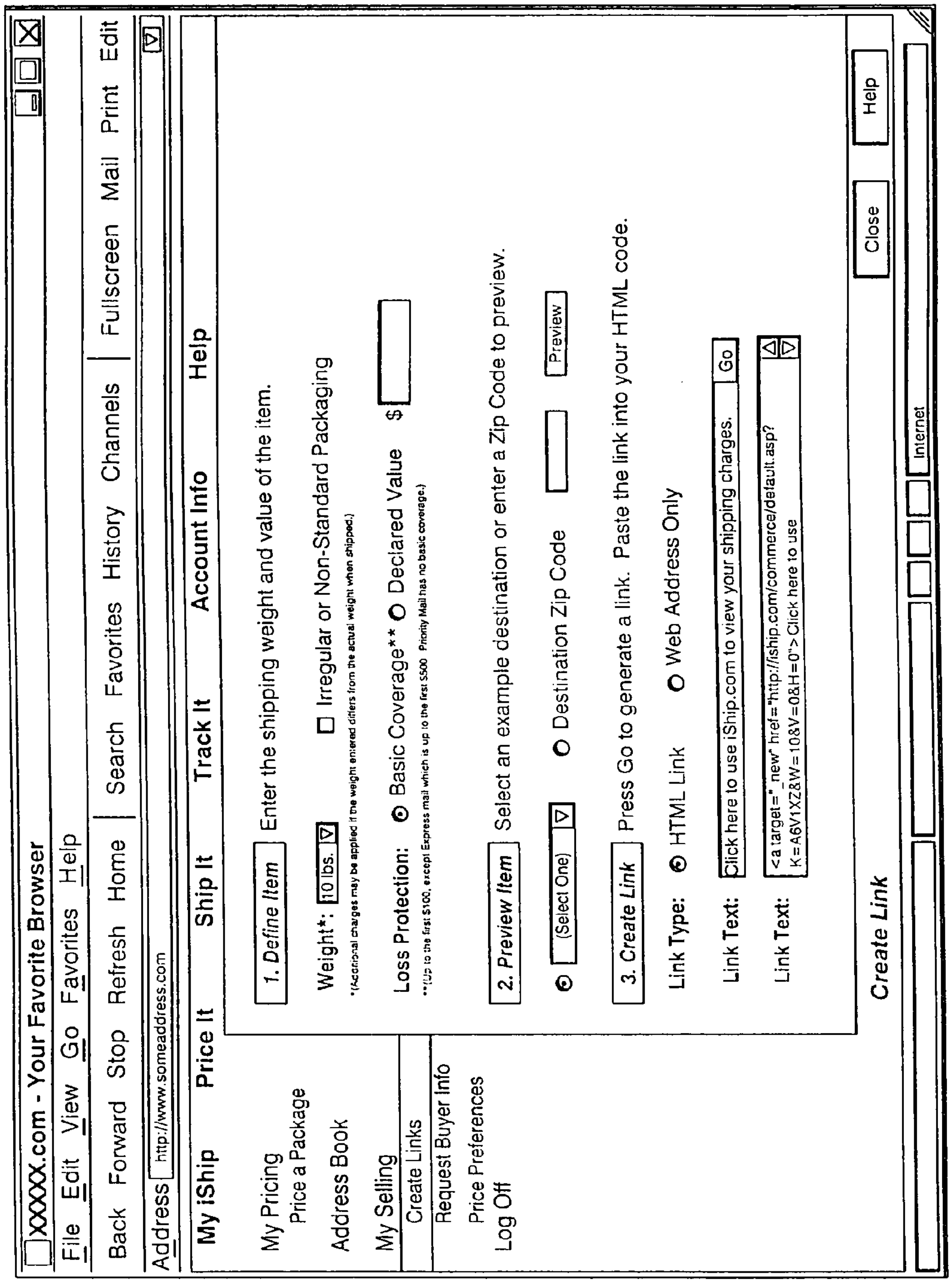
FIG. 29 is a graphic representation of an alternative embodiment of a Create a Seller's Link Screen in an exemplary embodiment of the System in an independent system eCommerce environment.

FIG. 28 depicts an exemplary further supplemental Shipper Parcel Specification Screen such as in a simplified Internet embodiment of the invention, which in the embodiment depicted is titled the Service Options Screen. The Service Options Screen provides for Shipper input of Service Option Selections (1076, 1077, 1078, 1083-1088) and displays a Single Day Rate Graphic Array. The Service Options supported in the depicted embodiment are: 1) Loss Protection (Declared Value) 1076; Delivery Notification 1077, namely 2) E-Mail Delivery Notification 1083; 3) Verbal Delivery Confirmation 1085; and other options 1078, namely 4) "Service must be guaranteed" 1086; 5) "Destination is a Residence" 1087; and 6) "Signature not Required" 1088. Selection of an option on the screen depicted in FIG. 28 is accomplished by the Shipper placing the cursor on the option selection mechanism and clicking the Shipper's user input device.

With respect to the Loss Protection (Declared Value) Service Option, if the Shipper selects the Declared Value Option 1081, the Shipper must enter a value 1082 of greater than $100.00, and equal to or less than $50,000.00. The default for Loss Protection is "Basic Coverage" 1080 which provides automatic coverage for the first $100.00 of Declared Value If the Declared Value option 1081 is selected and a value 1082 entered, the System will update the Single Day Rate Graphic Array 1096 with changes for each individual Carrier's rates, e.g., 1097.

Figure 38:
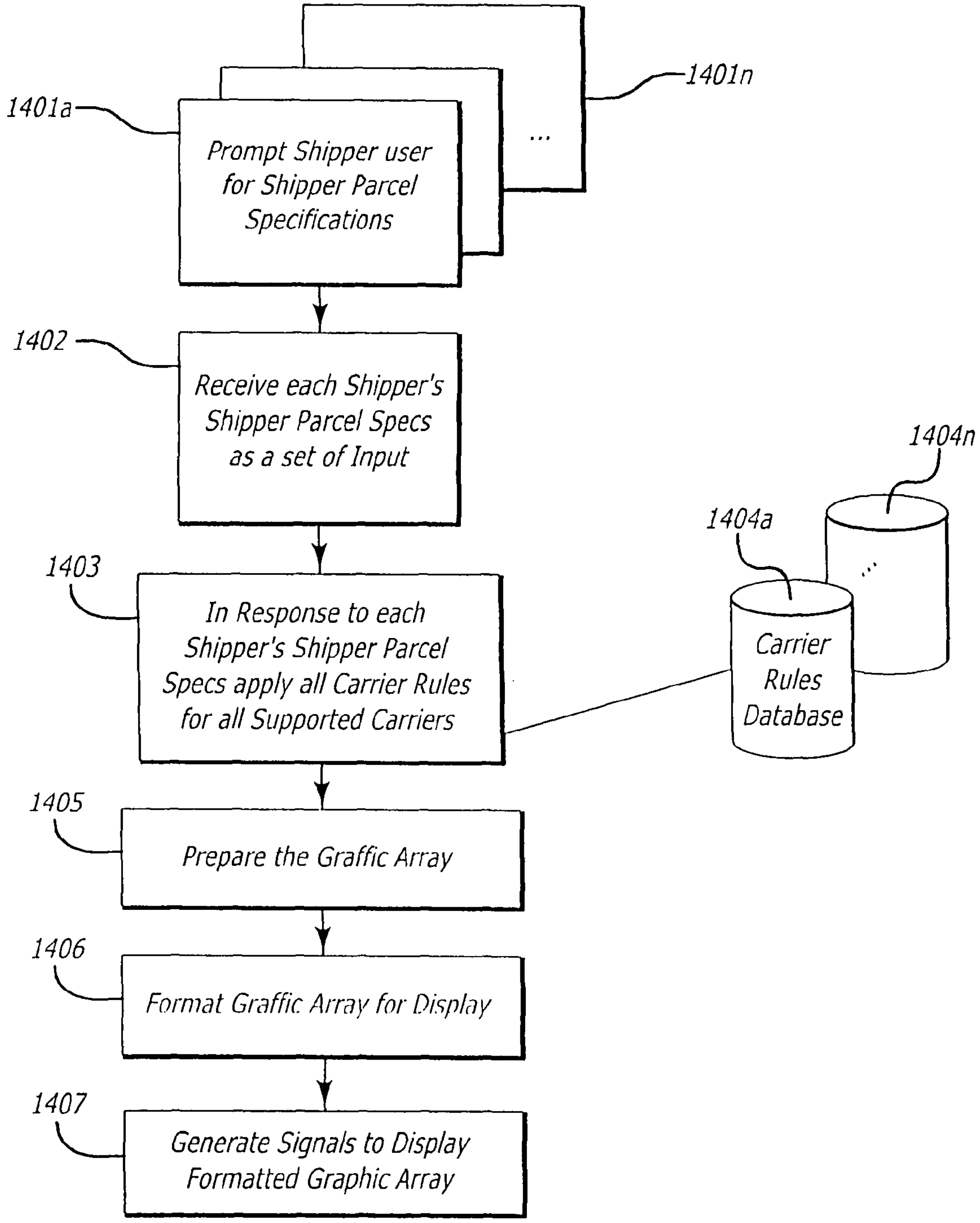
FIG. 38 is a high level flow diagram depicting an overview of the System logic to generate a dynamically dimensioned, multi-carrier, multi-service shipping rates comparison Graphic Array in an exemplary embodiment of the System in an Internet environment.

It should be noted that the Carrier Rules described herein, such as in the case of the defaults, threshold values, and the like concerning Loss Protection, are contained in the Carrier Rules database (e.g., 1404*a* through 1404*n* as depicted in FIG. 38), and for special cases, are programmed as part of the System. Carrier Rules vary from Carrier to Carrier; Carrier Rules are subject to change. The Carrier Rules described herein are therefore not a limitation of the invention.

Figure 60:
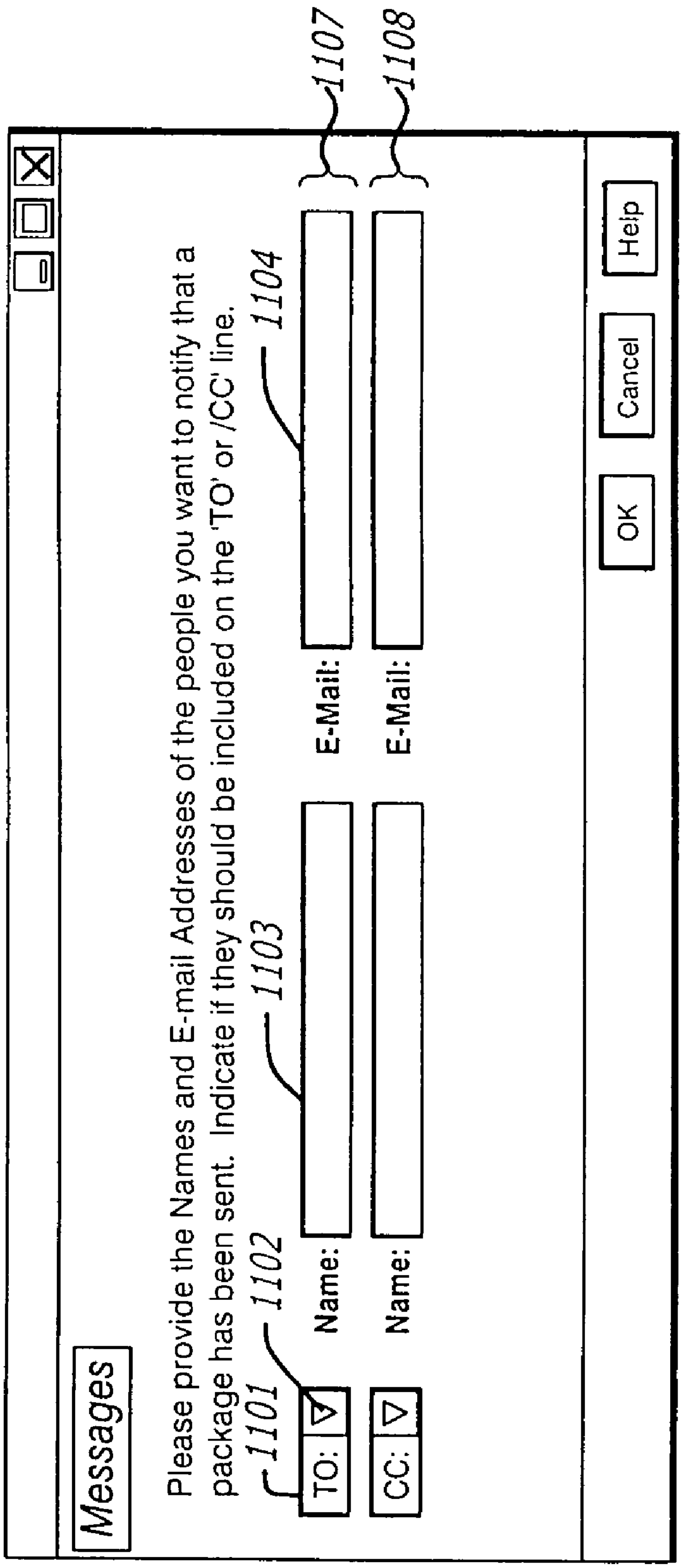
FIG. 60 is a graphic representation of an alternative exemplary embodiment of a Send Ship Notification screen in an alternative exemplary embodiment of the System in an Internet environment.

With respect to the E-Mail Delivery Notification Option, two controls are provided—a checkbox 1083 and an "E-Mail Others" button 1084. If the E-Mail Delivery Notification Option checkbox 1083 is checked the rates, such as those displayed in the Single Day Rate Graphic Array 1096, will be updated to reflect each Carrier's charges for the provision of E-Mail Notification services. If Shipper clicks the "E-Mail Others" button 1084, the following will occur: 1) If the checkbox 1083 has not already been checked, it will be checked by the System; and 2) an "E-Mail Others" pop-up window will be displayed by the System as depicted in FIG. 60 and described below.

With respect to the Verbal Delivery Confirmation Option, if the Verbal Delivery Confirmation Option checkbox 1085 is checked, the rates, such as those displayed in the Single Day Rate Graphic Array 1096, will be updated to reflect each Carrier's charges for the provision of Verbal Delivery Confirmation services. If the Verbal Delivery Confirmation Option checkbox 1085 is checked, the System will use the Shipper's Return Address Phone and Name as supplied by the Shipper during Account setup (not shown), as the information to be supplied to UPS.

With respect to the "Service must be guaranteed" Option, if the "Service must be guaranteed" Option checkbox 1086 is checked, the rates and Carrier/Service cells, such as those displayed in the Single Day Rate Graphic Array 1096, will be updated to remove any Carrier/Service cell for which service is not guaranteed.

With respect to the "Destination is a Residence" Option, if the "Destination is a Residence" Option checkbox 1087 is checked, the rates and Carrier/Service cells, such as those displayed in the Single Day Rate Graphic Array 1096, will be updated to remove any Carrier/Service cell which does not provide service to Residence Destinations.

With respect to the "Signature not Required" Option, in the embodiment depicted in FIG. 28, if the "Signature not Required" Option checkbox 1088 is checked, no change will be applied to the rate graphic. In the embodiment depicted in FIG. 28, the "Signature not Required" Option is a FedEx only flag and does not effect any other Carrier or any Carrier rate.

The Single Day Rate Graphic Array as displayed in FIG. 28 is similar to the Graphic Array described below as depicted in FIG. 36A in that the Single Day Rate Graphic Array is dynamically dimensioned and reflects the Carriers (1032-1 through 1032-7) that provide the delivery service requested by the Shipper for a particular Subject Parcel. As with the Graphic Array, the embodiment of the Single Day Rate Graphic Array depicted in FIG. 28 uses a color-coded legend 1091 and color (e.g., 1140*a*, 1141*a*, 1142*a*) to distinguish the rates for each Carrier (e.g., 1140*b*, 1141*b*, 1142*b*) from the rates for the other Carriers.

The Single Day Rate Graphic Array contains a number of elements. First, the selected delivery date 1090 is displayed at the top of Single Day Rate Graphic Array. The displayed date is bordered on the left 1098 and right 1099 with arrow buttons. If the Shipper clicks the left arrow button 1098, the date will go back one valid delivery date. If the Shipper clicks the right arrow button 1099, the date will move forward one valid delivery date. The range of valid delivery dates is determined by the System according to the Expected Ship Date (element 1060 as depicted in FIG. 36A).

Sorted, valid delivery times 1093-1 through 1093-5 for all valid dates are displayed down the left side of the Single Day Rate Graphic Array. Above the delivery times are up and down arrow buttons 1101*a* and 1101*b* respectively. If an up or down arrow button (1101*a* and 1101*b* respectively) is pressed, the list of available times 1093-1 through 1093-5 will scroll up or down appropriately, if and only if the list exceeds the Single Day Rate Graphic Array display area 1096.

A Ship Location Type field 1066 and Ship Location drop down menu activator 1067, are displayed below the Single Day Rate Graphic Array and operate in a manner as described in FIG. 36A. If the Shipper changes the Ship Location selection, the System will update the Single Day Rate Graphic Array to reflect any rate changes or surcharges that result from the change.

As with the Rates and Times Screen (described below as depicted in FIG. 36A), the Single Day Rate Graphic Array is color coded by Carrier in a color-coding legend 1091—that is, a distinct color is visually depicted in a legend as corresponding to each respective Carrier. Carrier cell entries, e.g., 1097, for each Carrier are presented in a color-coded display of the available rate, by date and time.

As depicted in FIG. 28, the color for the Carrier identified as "Airborne" 1140*b* is depicted in the color coding legend 1091 with a right-diagonal cross-hatch symbol 1140*a*. Accordingly, each Carrier cell entry, e.g., 1097, contained within the Single Day Graphic Array with a particular distinct color, in this case depicted with the right-diagonal cross-hatch symbol 1140*a*, corresponds to a delivery of the Subject Parcel supported by the Carrier "Airborne" 1140*b*.

Each Carrier cell entry, e.g., 1097, contains a graphic element, e.g., 1097*a*, which contains what is known as "ALT text". A Shipper viewing the Single Day Rate Graphic Array online can place the PC's cursor on the graphic element, e.g., 1097*a* of a particular Carrier cell entry, e.g., 1097, to display a pop-up screen (not shown) that displays the ALT text for that particular Carrier cell entry. The ALT text contains information about the Carrier, as described in FIG. 36A, such as the full Carrier name and the full Carrier service name. The contents of the ALT text described herein is exemplary and is not a limitation of the invention.

Appearing in each of each of the color-coded Carrier cell entries is a monetary value, e.g., 1097*b*, of the price that the corresponding Carrier would charge to deliver the Subject Parcel according to the time and date specified. For example, as depicted in FIG. 28, the Carrier cell entry 1097, depicted with the right-diagonal cross-hatch symbol 1140*a*, contains the amount $9.00 (1097*b*). Accordingly, the amount $9.00 (1097*b*) is the price that the Carrier Airborne would charge to deliver the Subject Parcel at the identified time of 12:00 p.m. 1093-3 on the identified date of Monday, Sep. 28, 1999 1090.

Similarly, as depicted in FIG. 28, the color for the Carrier identified as "FedEx" 1141*b* is depicted in the color coding legend 1091 with a left-diagonal cross-hatch symbol 1141*a*. Accordingly, each Carrier cell entry contained within the Graphic Array with the left-diagonal cross-hatch symbol, e.g., 1107, corresponds to a delivery of the Subject Parcel supported by the Carrier "FedEx."

Further, as depicted in FIG. 28, the color for the Carrier identified as "UPS" 1142*b* is depicted in the color coding legend 1091 with a vertical cross-hatch symbol 1142*a*. Accordingly, each Carrier cell entry contained within the Graphic Array with the vertical cross-hatch symbol, e.g., 1108, corresponds to a delivery of the Subject Parcel supported by the Carrier "UPS."

In the embodiment of the Service Options Screen depicted in FIG. 28, the navigational buttons operate much the same as has been previously described except that clicking the "Back" button 117 will display the previous screen, which in the embodiment depicted is the Rates and Times Screen (FIG. 36A); clicking the "Next" button 102 will display the next screen, which in the embodiment depicted is the Summary Screen (FIG. 48). The Shipper must select a Carrier cell entry before the System will display the Summary Screen. To select a Carrier cell entry, the Shipper places the cursor over the entry and clicks the user input device. In an alternative embodiment, the Shipper double clicks a Carrier cell entry to select the entry. Clicking the Reset button 103 will clear all fields in the Service Option Screen depicted in FIG. 28 and return the display of the Location and Package Screen (as described above with regard to FIGS. 15 and 26).

Returning to FIG. 25, once the User is satisfied with the previewed charges, the User can create a Seller's link. To do so, the User must choose the type of Link, HTML 199 or Web Address only 200, enter the Link Text 201 that will be displayed, and click the Go button 202.

Once the User clicks on the "Go" button 202, the System generates an HTML hyperlink and moves the HTML hyperlink in the "Link" box 203*a*. If the HTML hyperlink text exceeds the space available on the Create a Seller's Link Screen, the User can click on the up and down scroll buttons, 203*b*1 and 203*b*2 respectively.

Figure 30:
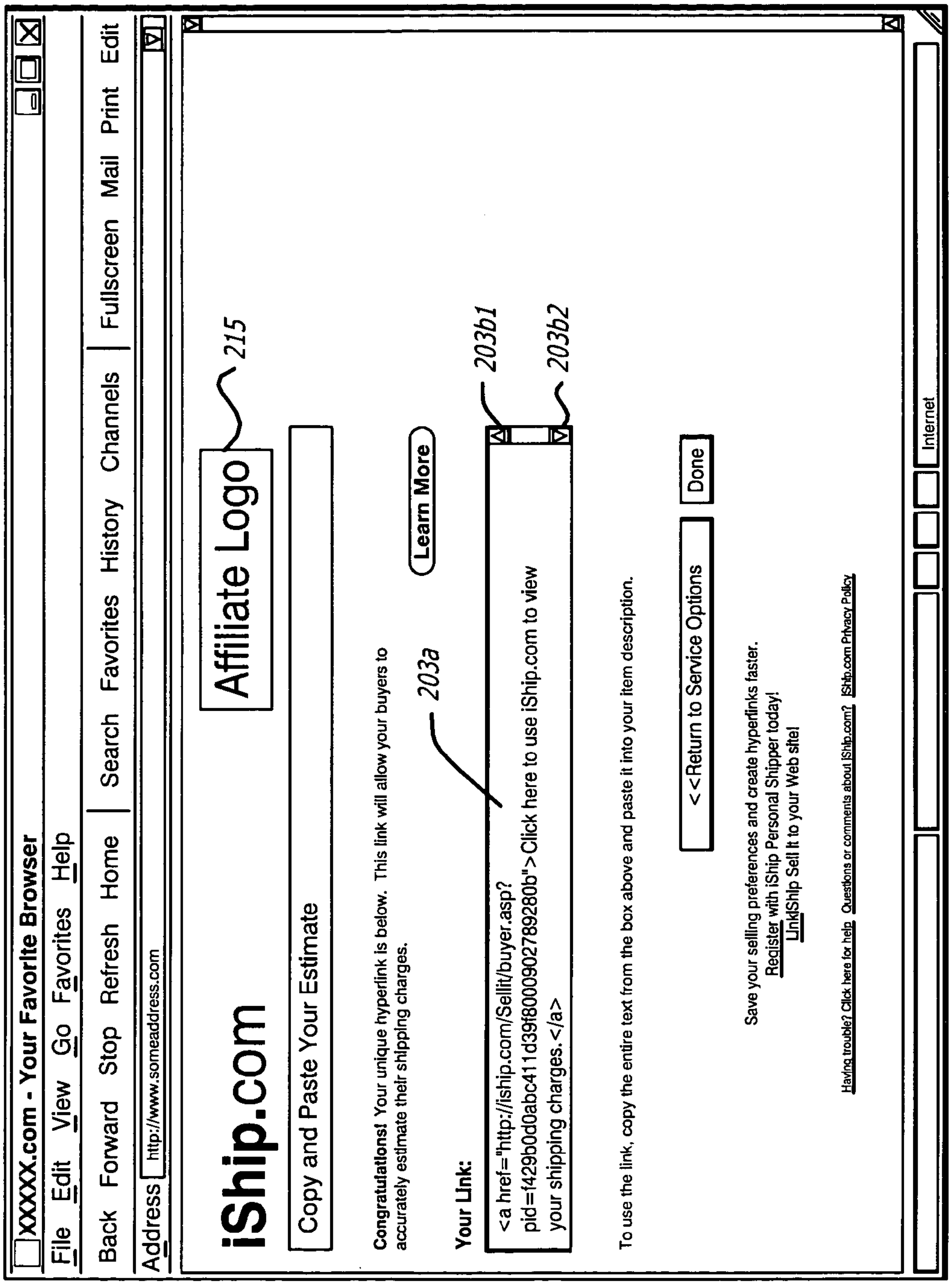
FIG. 30 depicts an exemplary alternative embodiment of the Create a Seller's Link screen in an exemplary embodiment of the System in an independent system eCommerce environment.

FIG. 30 depicts an exemplary alternative embodiment of the Create a Seller's Link screen. In this embodiment, the System collects the package specific information when the Seller enters the System and then presents the screen as depicted in FIG. 30 to display the generated hyperlink.

On the Seller's Link Screen depicted in FIG. 30, an Affiliate's Logo 215 is displayed. The Affiliate's Logo 215 represents the logo of an affiliated eCommerce/eAuction provider. When Affiliate co-branding is desired, an affiliate identifier is appended to the end of the URL that refers to the Sell It application as that URL is provided in the affiliate Provider's Web site. An affiliate identifier is an account number that begins with the prefix "AFF". When a Seller clicks on a logo or hyperlink for the System that has an affiliate identifier, the affiliate identifier is sent to the System with the hyperlink. If the System receives an affiliate identifier in a hyperlink, the System accesses the System database 22 as depicted in FIG. 5, retrieves the affiliate's logo and color scheme, and uses the affiliate's logo, page element specifications, and color scheme to alter page elements of the System screens.

In one embodiment, the System generates an HTML hyperlink by executing a JAVA script routine (in alternative embodiments, other scripts are used). The JAVA routine extracts the Seller's package-specific information from the Create a Seller's Link HTML page (i.e., Weight, Irregular or Non-Standard Packaging, Loss Protection, Destination Zip code, Link Type and Link Text) and integrates the information with a URL (Universal Resource Locator) that points to the address at which a System web page exists, or a series of System web pages exist, that will display shipping cost comparisons for a Buyer/Bidder. In one embodiment, the URL information is hard coded in the web page. The hyperlink built by the System contains data as well as an address. In an alternative embodiment, the URL is dynamically generated.

In order to create the Link, the System places the appropriate HTML tags and text in a sequence that can be rendered by a web browser. An example of a hypertext link, like the one generated in FIGS. 25 and 29, that the "Create Link" application creates is depicted in FIG. 31. Some of the text of the Link (a hyperlink) depicted in FIG. 31 is a template. However, several components are customized according to the Seller's and the specific item's information. For instance, the example hyperlink depicted in FIG. 31 contains a variable data item named "K" 210-1 which is set equal to the account number 210-2 ("A6V1XZ" in this case) of the Seller's account 210. The example hyperlink depicted in FIG. 31 also contains a variable named "W" which is set equal to the weight in pounds of the package to be shipped (in this case "10") 211; a variable named "V" set equal to the declared value for loss protection of the package (in this case "0") 212; and a variable named "H" which is set equal to an indicator, which if set to "1", the package has irregular or non-standard packaging, if set to "0" (as in this case"), the package is regular with standard packaging 213.

After the System generates the HTML hyperlink, the Seller can copy the HTML hyperlink text 203*a* as depicted in FIG. 30 using generally available text editing features such as click, drag and copy. The Seller then returns to the Seller's web site or to the eCommerce/eAuction Provider's from which the Seller entered the System and paste the Link text in the Seller's eCommerce/eAuction item description.

The Buyer's/Bidder's experience is described in detail below. However, for purposes of describing the Seller's Link, when the Buyer/Bidder clicks on the Seller's Link in the Seller's web page, the Buyer's/Bidder's Web Browser will use the URL to locate the System Web page that is addressed by the Link. The System will be presented with and receive as input the information in the hypertext link, including the variables and their respective contents as described above 210-213 in connection with FIG. 31.

With the Seller's account number 210, the System accesses the System database 22 as depicted in FIG. 5 and retrieves the following types of information about the Seller: 1) Package origin address; 2) Carriers and services that the Seller has chosen to use; 3) Custom and public carrier rates the Seller can use; 4) Additional handling charges that the Seller wants to imposes; and 5) Payment methods the Seller will allow the buyer to use. This type of information was collected by the System during the Seller's Registration process as was described above (e.g., in connection with FIGS. 9-14, 16-25).

With the Seller's information as collected through the Registration process and with the package specific information as provided by the hyperlink Seller's Link, the System, at the address provided by the URL, is programmed to interact with the Buyer, as will be described in detail below, to facilitate shipping of the package, payment information collection, and depending upon the previously provided (during Seller registration) instructions of the Seller, payment processing.

FIG. 32 depicts an alternative embodiment of a hyperlink generated by the System. Instead of the hyperlink explicitly containing the Seller's account number 210 and package specific information, e.g., 211-213, as depicted in FIG. 31, the hyperlink depicted in FIG. 32 provides a Package Identifier ("PID") 220. A PID hides Seller account information and package specific information from the Buyer/Bidder by replacing the explicit embedded information with a single string of facially meaningless characters. In an embodiment of the System that generates a HD for each package/Seller's Link, every time a Seller creates a URL with a PID, the System creates a new and unique HD. Without access to the iShip database, there is no information in a PID from which to determine a Seller's information.

The System stores the PID 220 in a PID table in the System database 22 (such as depicted in FIG. 5) and stores the Seller's account and package specific information, e.g., 210-213 (such as depicted in FIG. 31) with the PD.

In another embodiment, the details associated with the Seller's account, such as the Seller's various eCommerce and shipping preferences, are stored in detail with the PID 220. Storing detailed information with a PID 220 provides for additional flexibility in that new Seller information can be associated with the new PID while not influencing a previously generated PID and its associated set of information.

Figure 33A:
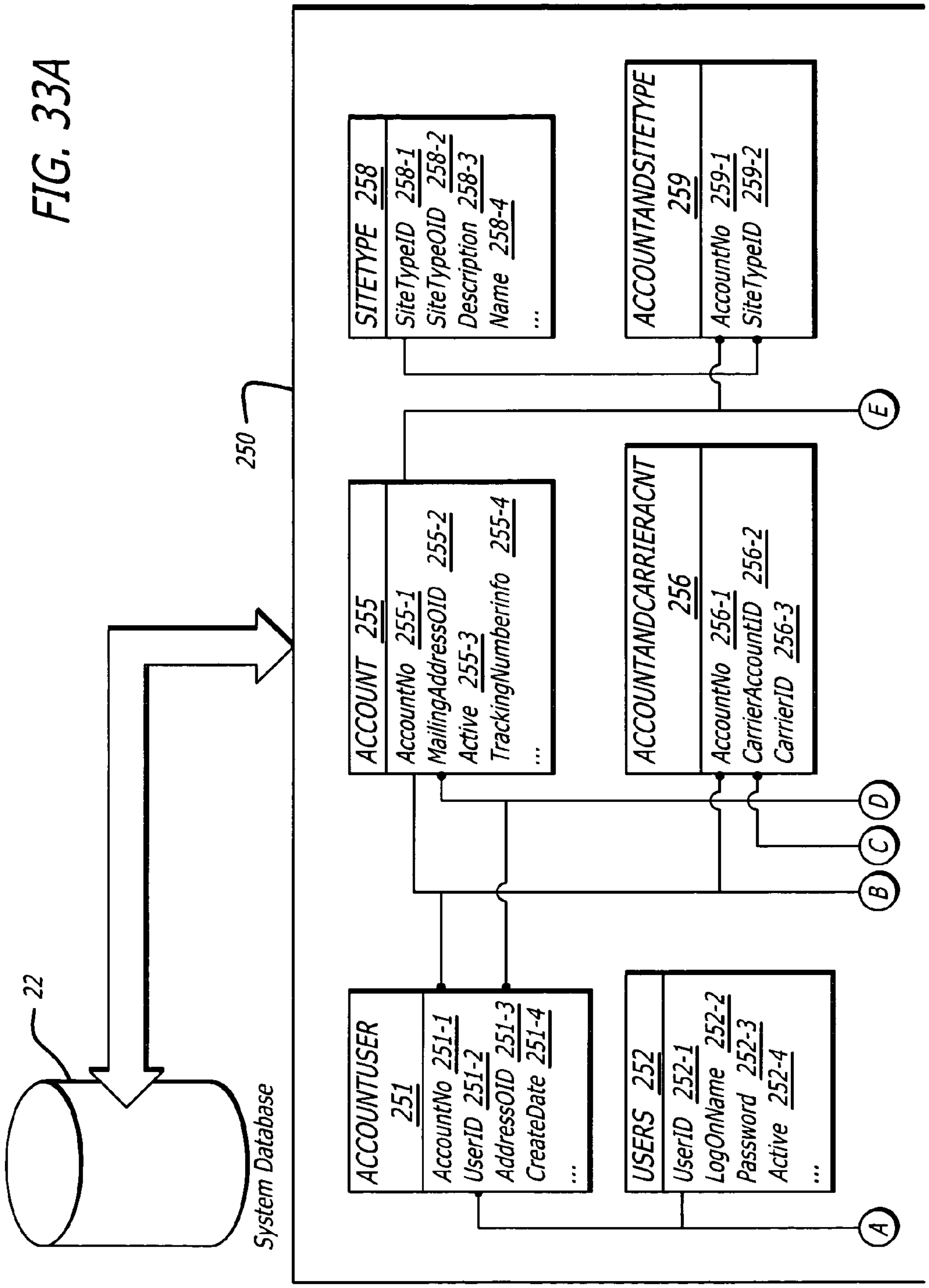
FIGS. 33A and 33B represent a database schema diagram that depicts an exemplary embodiment of tables in which data is stored by the System regarding a particular Seller Account in an exemplary embodiment of the System in an independent system eCommerce environment.
Figure 33B:
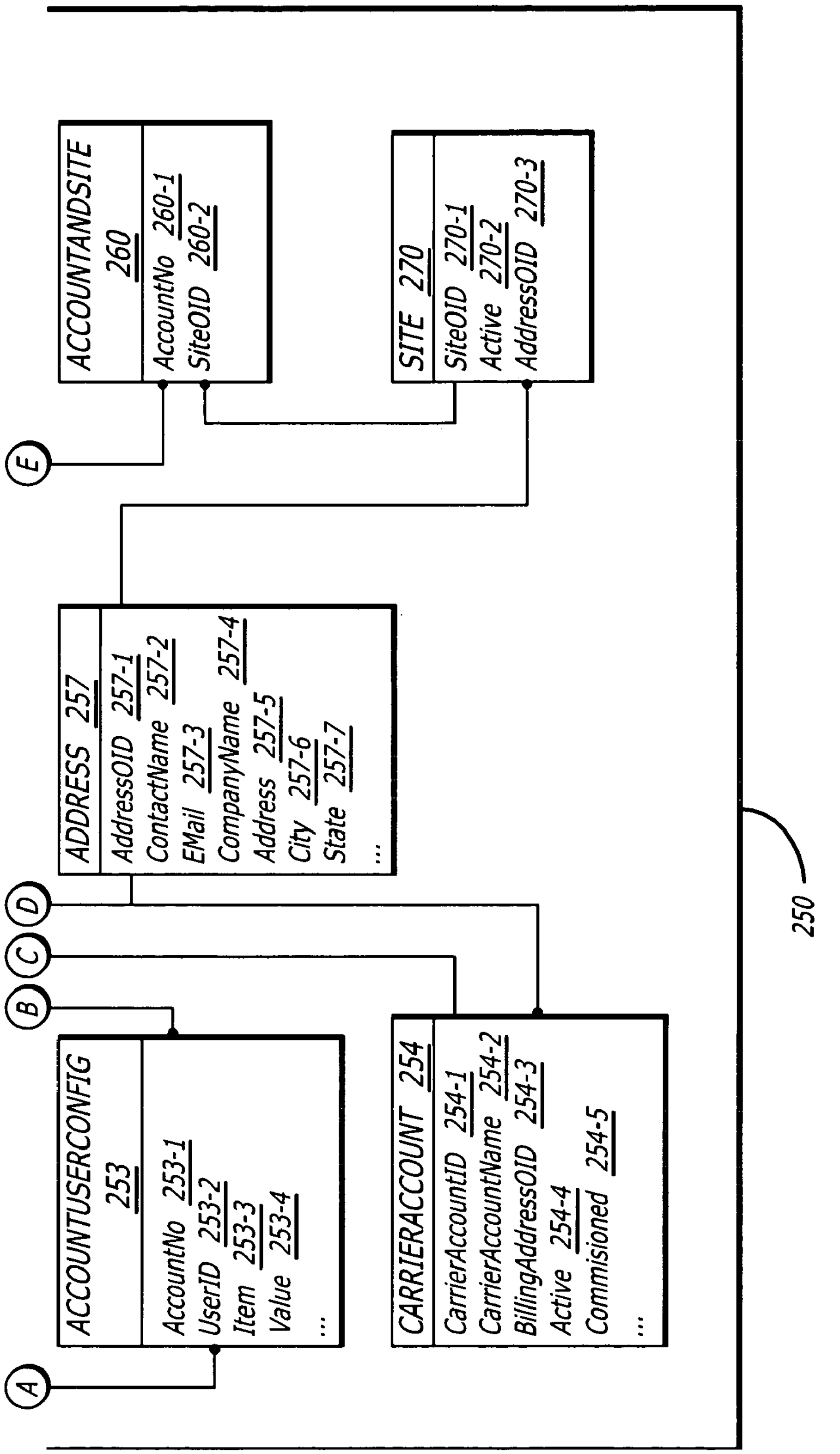

FIGS. 33A and 33B represent a database schema diagram that depicts an exemplary embodiment of tables in which data is stored by the System regarding a particular Seller Account, and from which information is retrieved in order to begin the process of presenting to the Buyer/Bidder a shipping cost multi-carrier, multi service comparison Graphic Display, which itself will be discussed in more detail below.

As depicted in FIGS. 33A and 33B, the database schema 250 is comprised of an Account User table 251 (comprising, e,g, 251-1, 251-2, 251-3, 251-4), a Users table 252 (comprising, e.g., 252-1, 252-2, 252-3, 252-4), an Account User Configuration table 253 (comprising, e.g., 253-1, 253-2, 253-3, 253-4), a Carrier Account table 254 (comprising, e.g., 254-1, 254-2, 254-3, 254-4, 254-5), an Account table 255 (comprising, e.g., 255-1, 255-2, 255-3, 255-4), an Account and Carrier Account table 256 (comprising, e.g., 256-1, 256-2, 256-3), an Address table 257 (comprising, e.g., 257-1, 257-2, 257-3, 257-4, 257-5, 257-6, 257-7), a Site Type table 258 (comprising, e.g., 258-1, 258-2, 258-3, 258-4), an Account and Site Type table 259 (comprising, e.g. 259-1, 259-2), an Account and Site table 260 (comprising, e.g., 260-1, 260-2), and a Site table 270 (comprising, e.g. 270-1, 270-2, 270-3). As depicted in FIGS. 33A and 33B, the Account User table 251 comprises, e.g., an account number ("AccountNo") 251-1, a user ID ("UserID") 251-2, an OLD Address ("AddressOID") 251-3, a date of creation ("CreateDate") 251-4, etc. Users table 252 comprises a user ID ("UserID") 252-1, a LogOnName 252-2, a Password 252-3, an active indicator ("Active") 252-4, etc. The Account User Configuration table 253 comprises, e.g., an account number ("AccountNo") 253-1, a UserID 253-2, an Item 253-3, a Value 253-4, etc. The Carrier Account table 254 comprises a Carrier Account ID 254-1, a Carrier Account Name 254-2, a Billing Address OID 254-3, an Active indicator 254-4, a Commissioned indicator 154-4, etc. The Account table 255 comprises, e.g., an Account Number 255-1, a Mailing Address OID 255-2, an Active indicator 255-3, Tracking Number information 255-4, etc. The Account and Carrier Account table 256 comprises, e.g., an Account Number 256-1, a Carrier Account ID 256-2 and a Carrier ID 256-3. The Address table 257 comprises, e.g., an Address OID 257-1, a Contact Name 257-2, an email address 257-3, a Company Name 257-4, an Address 257-5, a City 257-6, a State 257-7, etc. The Site Type table 258 comprises, e.g., a Site Type ID 258-1, a Site Type OID 258-2, a Description 258-3, a Name 258-4, etc. The Account and Site Type table 259 comprises an Account Number 259-1 and a Site Type ID 259-2. The Account and Site table 260 comprises, e.g., an Account Number 260-1 and a Site OID 260-2. The Site table 270 comprises a SiteOID 270-1, an Active indicator 270-2, and an Address OID 270-3.

The Account table 255 holds, among other things, information about each Seller's account. In preparing the multi-carrier shipping cost comparison Graphic Display, the System accesses the Account table in order to determine whether the Account number 210-2 contained in the hyperlink text is a valid Account number 255-1 and in an Active state 255-3.

The Account User table 251 is used, among other things, to associate the Seller's account information with the Seller's security and address information. An address pointer 251-3 into the Address table 257 is used 257-1 to retrieve the Seller's origin address.

The Account User Configuration table 253 contains the Seller's preference settings (not shown) as specified by the Seller. These include Seller's choice of carriers, services, payment options, type of drop-off/pickup option, and any handling charges the Seller wishes to impose on the buyer.

The Address table 257 holds all the addresses that are used in System applications. In addition to normal mailing address information, other items stored in this database table include the Seller's e-mail address and phone numbers.

The Carrier Account table 254 holds the carrier account information that the System uses when a Seller ships a package. As well, this table 254 contains information for generating each Seller's rates for each carrier.

The Account and Carrier Account table 256 ties the carrier accounts 254-1 from the carrier Account table 254 to the Carrier Accounts 256-2 with which the Seller has specified as a preferred Carrier to a particular Seller's account 256-1.

The Site Table 270 contains information about drop off and pickup site locations. The Site Type table 258 contains information about each type of site.

The Account and Site table 260 relates a particular Seller Account 260-1 to a particular site pointer 260-2 which in turn points to a particular site record 270-1 in the Site table 270.

The Account and Site Type table 259 relates a particular Account 259-1 to a particular site type 259-2 which in turn points to a particular site type record 258-1.

In one embodiment, once the Seller has decided upon the Seller's preferred options, the information in the Site Type, Account and Site Type, Account and Site and Site tables 258-270 are stored in the Account User Configuration table 253.

Most eCommerce web sites and eAuction sites allow the Seller to generate a custom Seller's web page for each item being sold. Typically, the Seller's web page utilizes HTML for the layout, and descriptions and pictures of the item sold or auctioned. During the process of establishing an eCommerce/eAuction web page, the Seller utilizes the System to register for the System's shipping management services, to enter the Seller's preferences as described above, and to enter parameters such as, for example, the weight and packaging, loss protection and value of the package, as described above that describe the particular item the Seller is selling/auctioning. The Seller then uses the Create a Seller's Link function of the System to create a hyperlink. The Seller then uses customary edit controls to copy the hyperlink and paste the hyperlink into the description of the item to be sold at the Seller's web site. The result is an HTML hyperlink to view the shipping charges from the auction item description field, an exemplary embodiment of which is depicted in FIG. 34.

Figure 34:
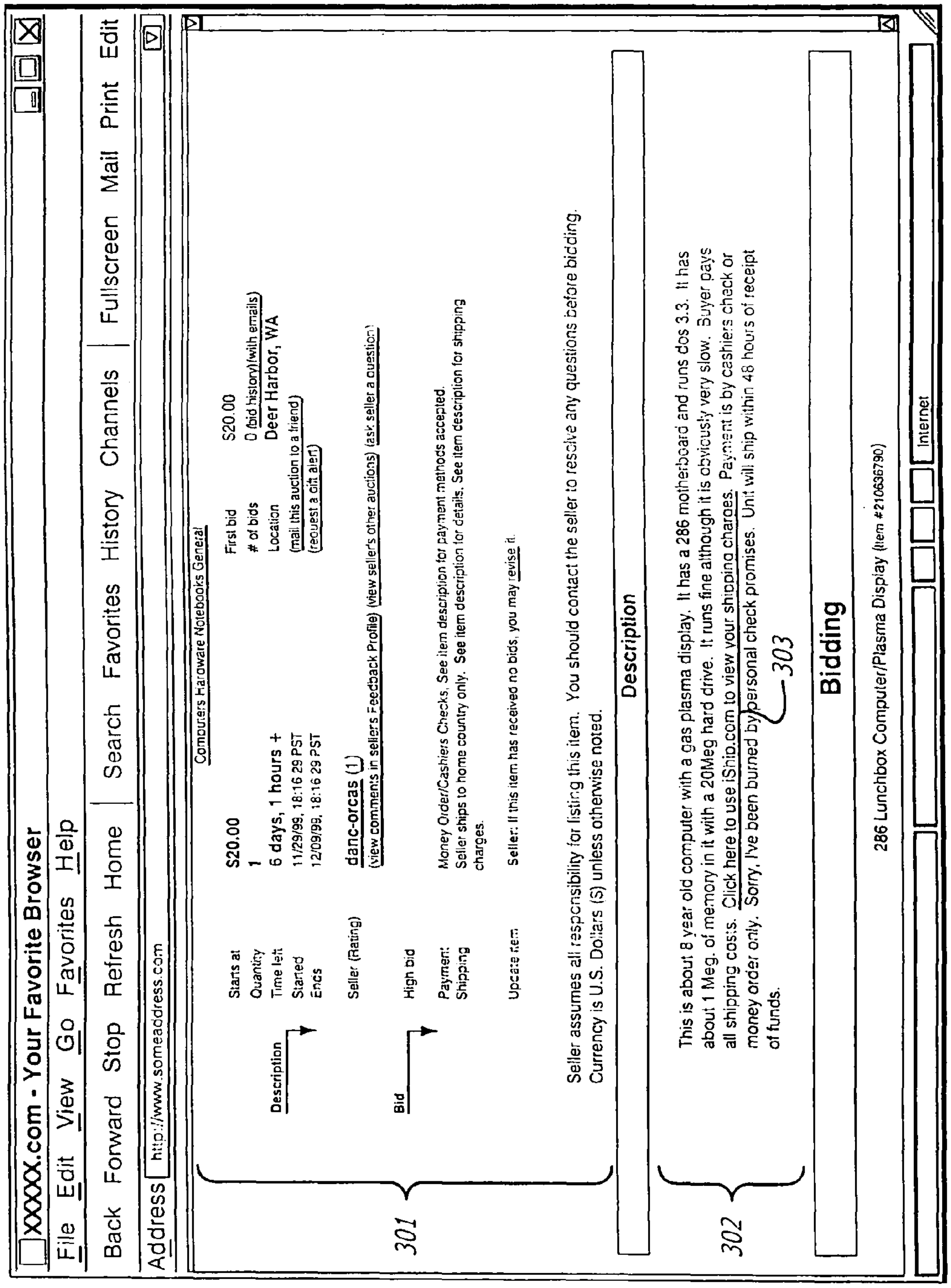
FIG. 34 is a graphic representation of an exemplary embodiment of a Seller's eCommerce/eAuction web site page in an exemplary embodiment of the System in an independent system eCommerce environment.

As depicted in FIG. 34, the exemplary item bidding requirements and circumstances 301 are described in the Seller's auction web site page. A description of the item available for bidding is provided 302. The Seller has used the System to copy the hyperlink 203*a* created by the system into the description 302 of the item. After returning to the Seller's auction web site page describing the particular item, the Seller used customary edit controls to paste the hyperlink into the description 302 of the item 303. The Seller's web site page 53 is depicted in FIG. 10C.

D. The Buyer's Experience in an Ecommerce Embodiment

In an eCommerce embodiment of the present invention, the Buyer/Bidder enters the Seller's eCommerce/eAuction web site page, such as the one depicted in FIG. 34, and reviews the Seller's description of the item to be sold/auctioned. If the Buyer/Bidder is interested in the item, the Buyer/Bidder may click on the System hyperlink 303 for that Seller's item shipping charges.

Figure 35:
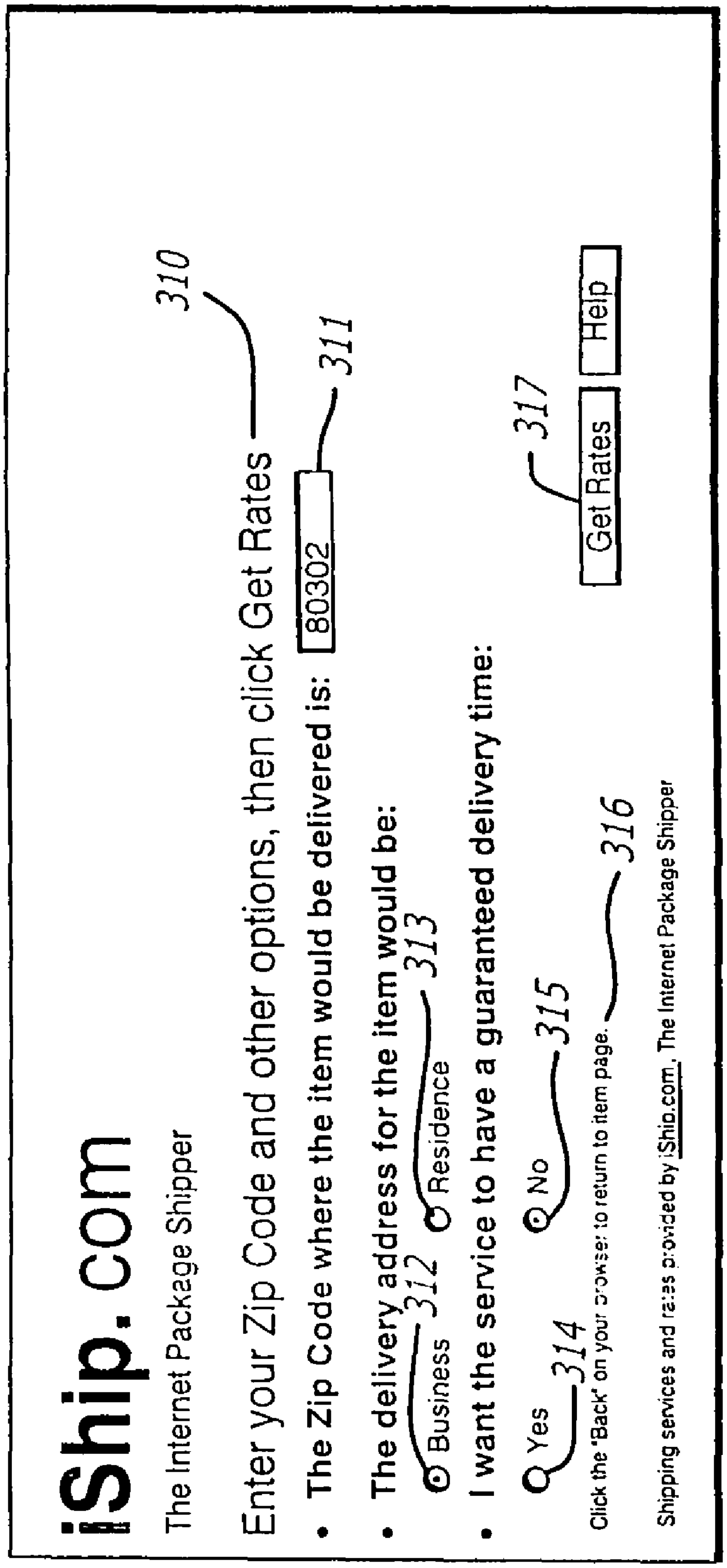
FIG. 35 is a graphic representation of an exemplary Buyer shipping rating information collection screen that the Buyer would see upon entry into the System in an exemplary embodiment of the System in an independent system eCommerce environment.

If the Buyer (80, e.g., FIG. 10C) clicks on the System hyperlink 303, as depicted in FIG. 10*c*, the Buyer/Bidder enters the System at the URL address supplied by the hyperlink. FIG. 35 is a graphic representation of an exemplary Buyer shipping rating information collection screen that the Buyer would see upon entry into the System. As depicted in FIG. 35, the System displays a Buyer data collection screen 55 (in FIG. 10C) to the Buyer, instructing the Buyer to enter the Buyer's zip code and other options, and to click on the Get Rates button 317 to get a comparison of rates 310. The Buyer enters the deliver-to zip code 311, identifies whether the delivery will be made to a business address 312 or a residence 313, and whether yes 314 or no 315 the Buyer wants the selected Carrier/service to guarantee a delivery time. The System instructs the Buyer to click the "Back" button on the Buyer's web browser to return to the Seller's item web site page 316.

Once the Buyer has supplied the necessary information, if the Buyer clicks the Get Rates button 317, the System validates the information supplied by the Buyer and then combines the information supplied by the Buyer with the information set for the Seller during the Seller's registration/eCommerce registration and calculates and displays a multi-carrier, multi-service rate and time shipping cost comparison Graphic Array 56 (as depicted in FIG. 10C).

An exemplary embodiment of a multi-carrier, multi-service rate and time shipping cost comparison Graphic Array in an exemplary simplified Internet embodiment of the invention is depicted in FIG. 36A.

a) The Graphic Array Display

FIG. 36A depicts an exemplary Dynamically Dimensioned Multi-Carrier, Multi-Service Graphic Array online display as part of an exemplary supplemental Shipper Parcel Specification Input Screen. FIG. 36A depicts a Graphic Array for an exemplary simplified Internet embodiment. In the embodiment of the Graphic Array depicted in FIG. 36A, the particular screen is titled the Rates and Times Screen.

As depicted in FIG. 36A, the exemplary Graphic Array contains the following information and display elements: 1) valid delivery dates 1063 (1063-1 through 1063-3) across the top of the graphic display for the selected Ship Date; 2) sorted, valid delivery times 1064 (1064-1 through 1064-6) for all valid dates down the left side of the graphic display; and 3) color coded by Carrier, Carrier cell entries, e.g., 1065, for each available rate, by date and time.

In the exemplary embodiment depicted in FIG. 36A the Graphic Array comprises an array of intersecting rows and columns. Each column corresponds to a day and date of parcel delivery. In FIG. 36A, the days and dates of delivery shown are "TUE 28 SEP 99" (1063-1), "WED 29 SEP 99" (1063-2) and "THU 30 SEP 99" (1063-3). As depicted in FIG. 36A, space for other columns (1063-4 through 1063-7) are available for display; in the case of the example depicted in FIG. 36A however, no dates are displayed in those columns.

Each row of the Graphic Array corresponds to a time of delivery. In FIG. 36A, the times of delivery are shown as "8:00 AM" (1064-1), "10:30 AM" (1064-2), "12:00 PM" (1064-3), "3:00 PM" (1064-4), "4:30 PM" (1064-5), and "5:00 PM" (1064-6).

At the intersection of each row (1064-1 through 1064-6) and column (1063-1 through 1063-7) of the Graphic Array is a "cell." In FIG. 36A, cells will be referred to by the element 1071, and by the intersecting row (1 through 6) and column (1 through 7) the intersection of which forms the space for each cell (1071-1-1, 1071-1-2, . . . 1071-6-7). Some of the cells depicted in FIG. 36A are empty, e.g., 1071-5-1, 1071-6-1, 1071-6-3, 1071-6-4. Empty cells represent the circumstances that none of the Carriers supported by the System (the "supported Carriers") support delivery of the Subject Parcel for the time and date for which that cell represents the intersection.

Some cells depicted in FIG. 36A have one or more cell entries. In FIG. 36A, each cell entry represents a particular Carrier. Each Carrier cell entry is color coded with a unique color, the unique color corresponding to a particular Carrier as is discussed in more detail below; each Carrier cell entry contains a graphic element, e.g., 1147*a*, and a monetary amount, e.g., 1147*b*, which represents the price for which the corresponding Carrier would deliver the subject parcel. For instance, cell 1071-1-1 contains a single Carrier cell entry 1148. Cell 1071-3-1 contains two Carrier cell entries 1065 and 1149.

A color-coding legend 1062 is displayed on the Screen to identify by a name (1140*b*, 1141*b*, 1142*b*, and 1143*b*) and a color-coding symbol (1140*a*, 1141*a*, 1142*a*, and 1143*a*), each of the supported Carriers (e.g., 1140, 1141, 1142, 1143) that provide the service according to the particular Shipper's Parcel Specifications for the particular Subject Parcel.

For purposes of this application, unique colors are depicted with graphic symbols. For example, a right-diagonal hash mark symbol 1140*a* is used herein to represent the color red; a left-diagonal hash mark symbol 1141*a* is used herein to represent the color purple; a vertical hash mark symbol 1142*a* is used to represent the color amber; and a horizontal hash mark symbol 1143*a* is used to represent the color blue. The particular hash mark symbols used herein and the colors mentioned herein are exemplary and are not a limitation of the invention.

Each cell of the Graphic Array that is not empty contains one or more color-coded Carrier cell entries. For example, in FIG. 36A, cell 1071-3-1 contains two Carrier cell entries, 1065 and 1149. Carrier cell entry 1065 is color-coded with the right-diagonal hash mark symbol (representing the color red) which, according to the color-coding legend 1062, corresponds 1140*a* with the Carrier identified as "Airborne" 1140*b*. Carrier cell entry 1149 is color coded with the horizontal hash mark symbol (representing the color purple)

which, according to the color-coding legend 1062, corresponds 1143*a* with the Carrier identified as "USPS" 1143*b*.

Each Carrier cell entry, e.g., 1065, contains a graphic element, e.g., 1065*a*, which contains what is known as "ALT text". As depicted in FIG. 36A, a Shipper viewing the Graphic Array online can place the PC's cursor on the graphic element, e.g., 1065*a* of a particular Carrier cell entry, e.g., 1065, to display a pop-up screen 1069 that displays the ALT text for that particular Carrier cell entry. In some embodiments, the ALT text will be displayed by merely placing the cursor over the graphic element for a particular Carrier cell entry and leaving the cursor in that position for a certain time interval. In alternative embodiments, the Shipper must click on the graphic element for a particular Carrier cell entry in order to display the ALT text. In the exemplary embodiment depicted in FIG. 36A, the displayed ALT text, e.g., the text displayed in pop-up screen 1069, contains the full Carrier name (in the depicted case, "Airborne Express") and the full Carrier service name (in the depicted case, "Express Overnight Service") for the Carrier 1140*b* (in this case, Airborne) to which that Carrier cell entry corresponds.

As depicted in FIG. 36A, the color for the Carrier identified as "Airborne" 1140*b* is depicted in the color coding legend 1062 with a right-diagonal cross-hatch symbol 1140*a*. Accordingly, each Carrier cell entry contained within the Graphic Array with the right-diagonal cross-hatch symbol, e.g., 1065, corresponds to a delivery of the Subject Parcel supported by the Carrier "Airborne." Appearing in each of the color-coded Carrier cell entries, e.g., 1065 is a graphic element, e.g., 1065*a*, and a monetary value, e.g., 1065*b*. The monetary value, e.g., 1065*b* corresponds to the price that the corresponding Carrier would charge to deliver the Subject Parcel according to the time 1064-3 and date 1063-1 specified according to the row and column of which the intersection (which, in the case described is cell 1071-3-1) contains the Carrier cell entry 1065. For example, as depicted in FIG. 36A, the Carrier cell entry 1065, depicted with the right-diagonal cross-hatch symbol, contains the monetary amount "$9.00." Accordingly, the amount $9.00 is the price that the Carrier Airborne would charge to deliver the Subject Parcel at the identified time of 12:00 p.m. 1064-3 on the identified date of Tuesday, Sep. 28, 1999 1063-1.

Similarly, as depicted in FIG. 36A, the color for the Carrier identified as "FedEx" 1141*b* is depicted in the color coding legend 1062 with a left-diagonal cross-hatch symbol 1141*a*. Accordingly, each Carrier cell entry contained within the Graphic Array with the left-diagonal cross-hatch symbol, e.g., 1147, corresponds to a delivery of the Subject Parcel supported by the Carrier "FedEx."

Further, as depicted in FIG. 36A, the color for the Carrier identified as "UPS" is depicted in the color coding legend 1062 with a vertical cross-hatch symbol 1142. Accordingly, each Carrier cell entry contained within the Graphic Array with the vertical cross-hatch symbol, e.g., 1148, corresponds to a delivery of the Subject Parcel supported by the Carrier "UPS."

Similarly, as depicted in FIG. 36A, the color for the Carrier identified as "USPS" is depicted in the color coding legend 1062 with a horizontal cross-hatch symbol 1143. Accordingly, each Carrier cell entry contained within the Graphic Array with the horizontal cross-hatch symbol, e.g., 1149, corresponds to a delivery of the Subject Parcel supported by the Carrier "UPS."

In the embodiment of the Graphic Array depicted in FIG. 36A, the Graphic Array is dynamically dimensioned. For instance, only the dates and days (1063-1 through 1063-3) for which delivery that conforms to the particular Shipper's Parcel Specifications for the particular Subject Parcel are displayed across the top of the graphic. For example, for the date Tuesday, Sep. 28, 1999 (1063-1), at the time 5:00 p.m. (1064-6), no Carrier supports delivery of the Subject Parcel.

Further, as depicted in FIG. 36A, only the times (1064-1 through 1064-6) during which at least one of the Carrier/Services identified as supporting the delivery are displayed along the viewer's left side of the Dynamically Dimensioned Multi-Carrier Graphic Array online display.

Still further, as depicted in FIG. 36A, a Carrier cell entry, e.g., 1065, is displayed for each of, but only for each of, the Carriers/Services that support delivery for a particular day and time in the cell of the Graphic Array that represents delivery on a particular day and at a particular time. When the circumstances require, the System displays one or more Carrier cell entries in a single cell. For instance, cell 1071-3-1 contains two entries, 1065 and 1149; whereas cell 1071-1-1 contains only a single cell. Accordingly, as depicted in FIG. 36A, the cell size expands vertically to accommodate multiple Carrier cell entries.

In the exemplary embodiment depicted in FIG. 36A, the color-coding legend 1062 for each of the Carriers/Services represented in the Graphic Array is displayed with color-coding graphic elements (1140*a* through 1143*a*) and identification labels (1140*b* through 1143*b*) for each relevant Carrier/Service along the viewer's right side of the rating and timing graphic. Alternatively, instead of the printed name, the logo for the particular Carrier/Service can be displayed. As another alternative, the Carrier/Service logo can be displayed in color in the color-coding legend 1062.

The particular arrangement of the color legend 1062 depicted in FIG. 36A and the particular colors used in the color legend depicted therein are exemplary and are not a limitation of the invention. In an alternative embodiment, instead of using color, other visually distinctive methods are used to differentiate between different Carriers/Services. For instance, other visually distinctive methods of Carrier/Service differentiation include but are not limited to: three-dimensional texture effects, other three-dimensional effects, two-dimensional markings (for instance, dots, cross-hatching, and the like), lighting effects, graphic symbols (for instance, the logos of the Carriers/Services) and any combination of the aforementioned features with color.

In the embodiment of the Graphic Array depicted in FIG. 36A, the exemplary Graphic Array is depicted as horizontally wide enough to accommodate seven delivery days (1063-1 through 1063-7) within a particular delivery timespan. The depiction in FIG. 36A of the Graphic Array as a fixed size accommodating up to seven delivery days is exemplary and is not a limitation of the invention. In alternative embodiments, the Graphic Array online display collapses or expands in total size to reflect the actual number of rows and columns that need to be present in order to display the Carrier cell entries for the Carriers/Services that support delivery of the Subject Parcel according to the Shipper's Parcel Specifications.

The arrangement as depicted in FIG. 36A of the parcel delivery days and dates (1063-1 through 1063-7) across the top and the parcel delivery times (1064-1 through 1064-6) along the left side of the Graphic Array is exemplary and is not a limitation of the invention. In one alternative embodiment, the parcel delivery days and dates are displayed across the bottom, and the parcel delivery times are displayed on the viewer's right side, of the Graphic Array. In other alternative embodiments, the parcel delivery days are arranged on one of the two sides of the Graphic Array and the parcel delivery times are arranged along the top or the bottom of the Graphic Array. In such an alternative embodiment, the cells of the Graphic Array are expandable horizontally to accommodate the appropriate number of relevant Carriers/Services.

As depicted in FIG. 36A, the Shipper is asked to input the Expected Ship Date 1060. In the exemplary embodiment depicted, a drop down menu activation mechanism 1061 provides the Shipper the ability to activate a pull down menu (not shown) of seven entries beginning with the current date and includes the six days immediately following the current date. The format used is "M/D/YY-Day name". "Today" and "Tomorrow" are displayed appropriately. The number of entries provided by the selection mechanism, the format of the Expected Ship Date, and other features described herein are exemplary and are not a limitation of the invention.

In the exemplary embodiment depicted in FIG. 36A, once the Shipper selects the Expected Ship Date, the System uses the Expected Ship date and the other information provided by the Shipper, as in the screens depicted in FIGS. 15 and 26 described above, to access the Carrier Rules, apply the Carrier Rules, and prepare the Graphic Array containing the delivery prices and delivery times for the Subject Parcel according to the Shipper's Parcel Specifications. The System will then generate the signals necessary to display the Graphic Array and cause the Graphic Array to be displayed on the Shipper's PC.

Once the Graphic Array is displayed, the Shipper can change previously input information and the System will automatically regenerate the Graphic Array with the delivery rates and delivery times that have been updated to reflect the new information. For instance, if the Shipper selects a new shipping date, the System will regenerate the Graphic Array with the appropriate new rates and times. The logic for regenerating the Graphic Array is described in more detail below.

In the exemplary embodiment depicted in FIG. 36A, a Ship Location Type drop down menu activator 1067 is located below the Graphic Array. The particular location of the Ship Location Type selection mechanism as described herein is exemplary and is not a limitation of the invention. The list of locations is the same as the Shipping Location Type drop down menu described above in the description of FIGS. 15 and 26. If the Shipping Location class is a "ship center", a "Find Location" button 1068 is displayed next to the drop down menu. In order to open the Drop Off Locator in a pop-up window, the Shipper places the Shipper's PC cursor on the "Find Location" button 1068 and clicking the Shipper's user input device. The Origin Zip Code and Ship Location type values supplied by the Shipper are used as parameters for the Drop Off Locator to locate a list possible Drop Off Location choices. The Shipper can select a Drop Off Location from the Drop Off Locator menu. The system dynamically responds to changes by the Shipper to Origin Zip Code and Ship Location type to present choices of Drop Off Location choices.

Navigational buttons appear at the bottom of the Rates and Times Screen depicted in FIG. 36A. Clicking the "Back" button 117 will return the Shipper to the previously displayed screen, which in the embodiment depicted is the Location and Package Screen as depicted in FIGS. 15 and 26. Clicking the "Next" button 102 will cause the next screen, which in the embodiment depicted is the Service Option Screen (FIG. 28), to be displayed but only if the Shipper has selected a particular Carrier cell entry. For example, if the Shipper click on a particular Carrier cell entry such as 1065, the System will allow the Shipper to then click on the "Next" button 102 and proceed to the Service Option Screen as depicted in FIG. 28.

If a user returns to the Rates and Times Screen (FIG. 36A) from the Service Option Screen (FIG. 28), any Service Options selected by the Shipper from the Service Option Screen (FIG. 28) will effect the displayed rates and will be displayed (not shown) as abbreviations below the Shipping Location field 1066.

The System in an exemplary eCommerce embodiment such as the one described here creates a multi-carrier, multi-service, shipping cost comparison Graphic Array in much the same way as is disclosed above with regard to the creation of the Graphic Array in an exemplary simplified Internet embodiment. The difference is that in an eCommerce embodiment, instead of collecting only Shipper input, the System collects origination data including origin zip code, subject parcel data, and Carrier/Service filtering data from the Seller, and then completes the Parcel Specifications for the subject parcel by collecting input from the Buyer, including destination zip code.

Using the subject parcel's Parcel Specifications, the System is programmed to access databases containing information about each supported Carrier. Each supported Carrier has a unique rating schedule, delivery and pickup rules and schedules, and certification requirements (the "Carrier Rules"). The System is further programmed to apply each supported Carrier's Rules to each Shipper's Parcel Specifications for the corresponding Subject Parcel. The System calculates the Shipping Charges based on zip-to-zip pricing where the Seller has provided the origin zip code and the Buyer has provided the destination zip code.

In an eCommerce embodiment, if the Seller selected as the Seller's preference, "Item cost includes shipping charges" (170, FIG. 21), then the rates displayed will be "FREE". If the Seller selected as the Seller's preference, "Buyer pays actual shipping charges" (171, FIG. 21), then the rates displayed with be the total shipping charge as calculated according to each Carrier's rules for each Service available according to the Seller's expressed preferences. If the Seller selected as the Seller's preference, "Buyer pays shipping and additional charges" (172, FIG. 21), then the System will calculate and display rates that are the sum of: 1) the shipping rate for the applicable service according to each Carrier's rules; 2) If the Seller checked "Add Percentage of Shipping Cost" (173, FIG. 21), the product of the percentage entered in the Percentage of Shipping Cost field (174, FIG. 21) and the total shipping rate calculated according to the Carrier's rules; 2) if the Seller checked "Add Fixed Handling Charge" (175, FIG. 21), the dollar value entered in the Fixed Handling Amount field (176, FIG. 21); and 4) if the Seller indicated "Add System Service Fee" (177, FIG. 21), then the System Service Fee amount as indicated in the System database 22.

The Dynamically Dimensioned Multi-Carrier, Multi-Service Graphic Array online display presents only rating and delivery timing information for the Carriers that offer shipping of the particular Subject Parcel according to the particular Shipper's Parcel Specifications and which conform with the Seller's Carrier/Service preferences as selected according to the available options as described above regarding e.g., FIGS. 19 and 20.

Figure 36B:
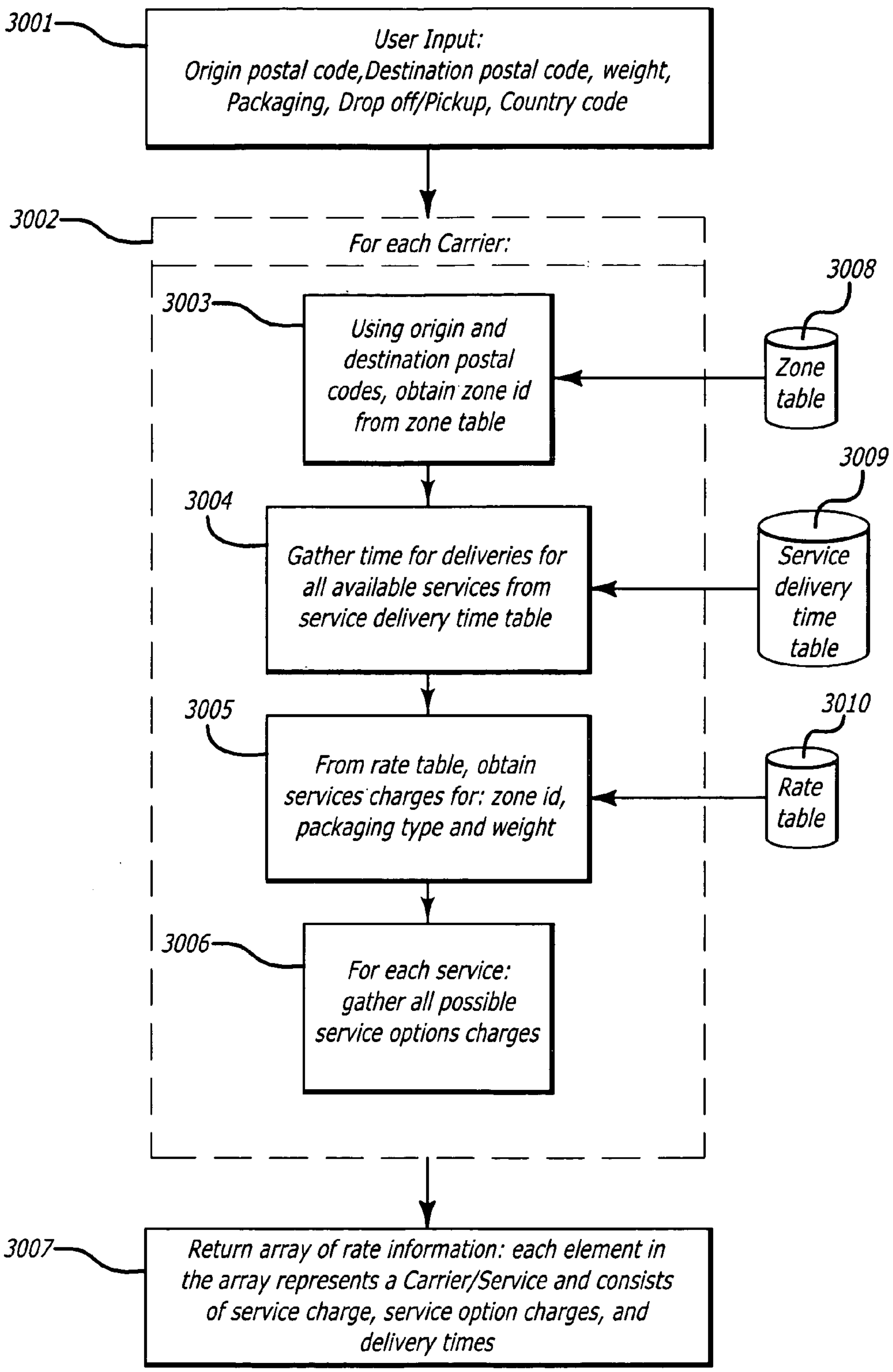
FIGS. 36B through 36E are high level data retrieval logic flow diagrams depicting the data and high level logic that the system uses to calculate a shipping rate.
Figure 36C:
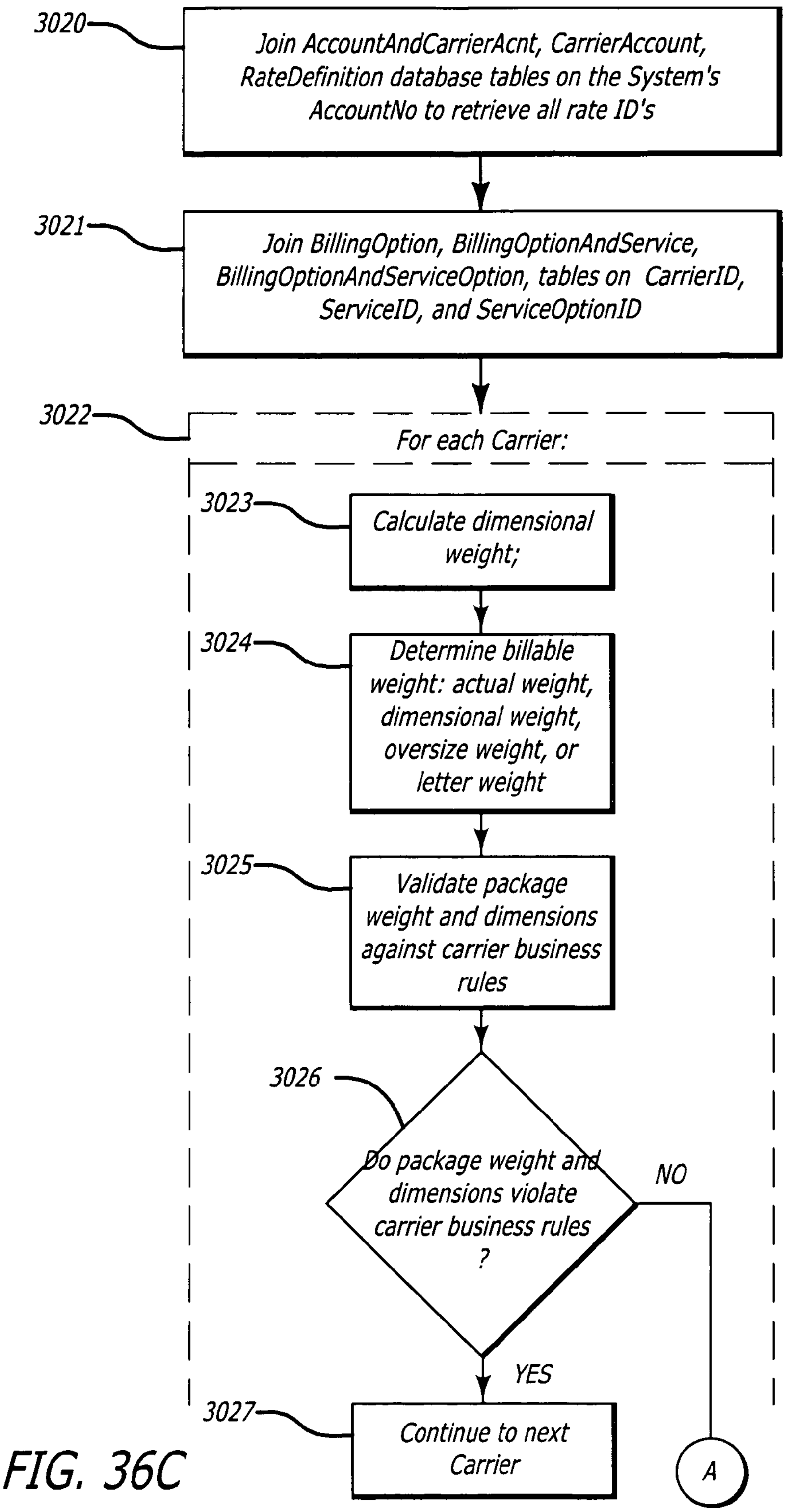
Figure 36D:
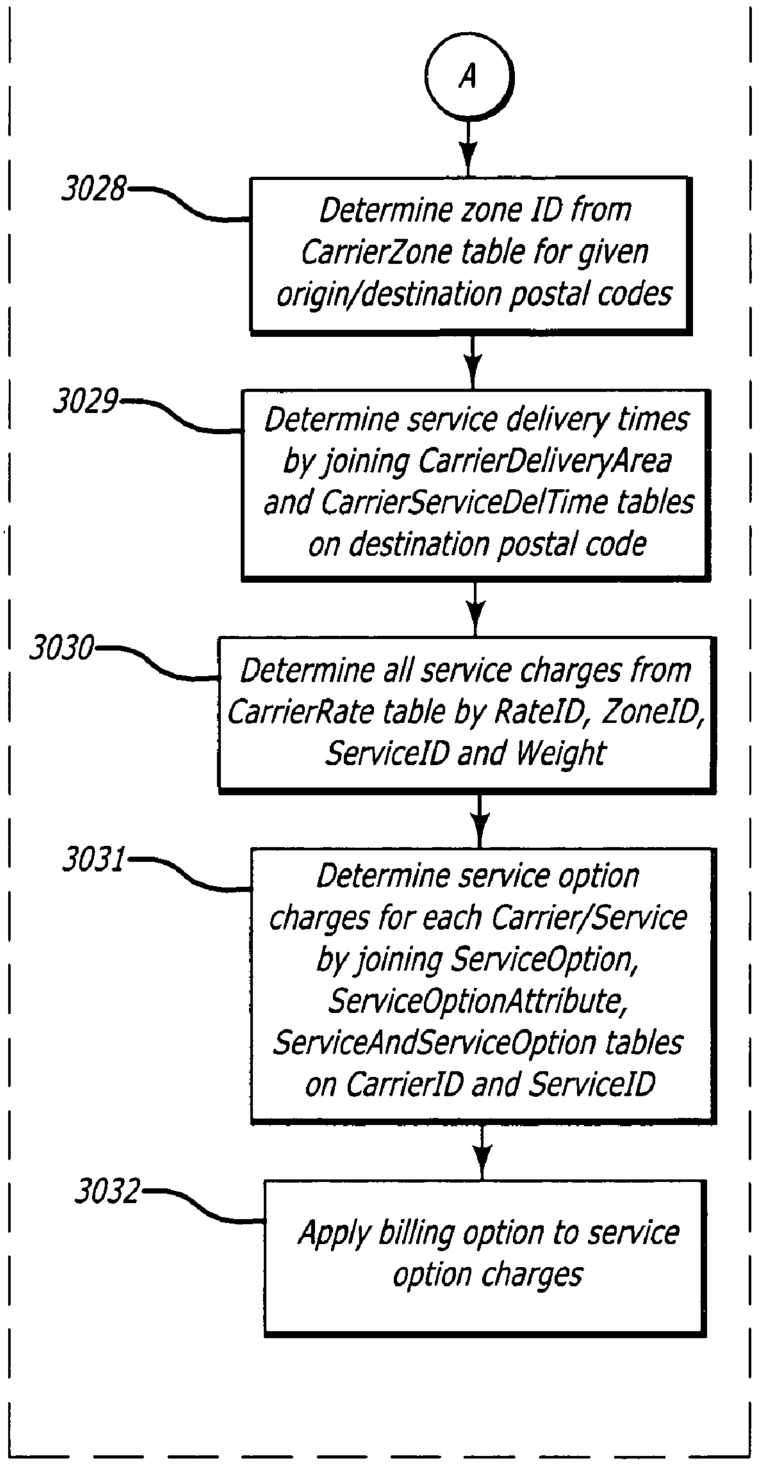
Figure 36E:
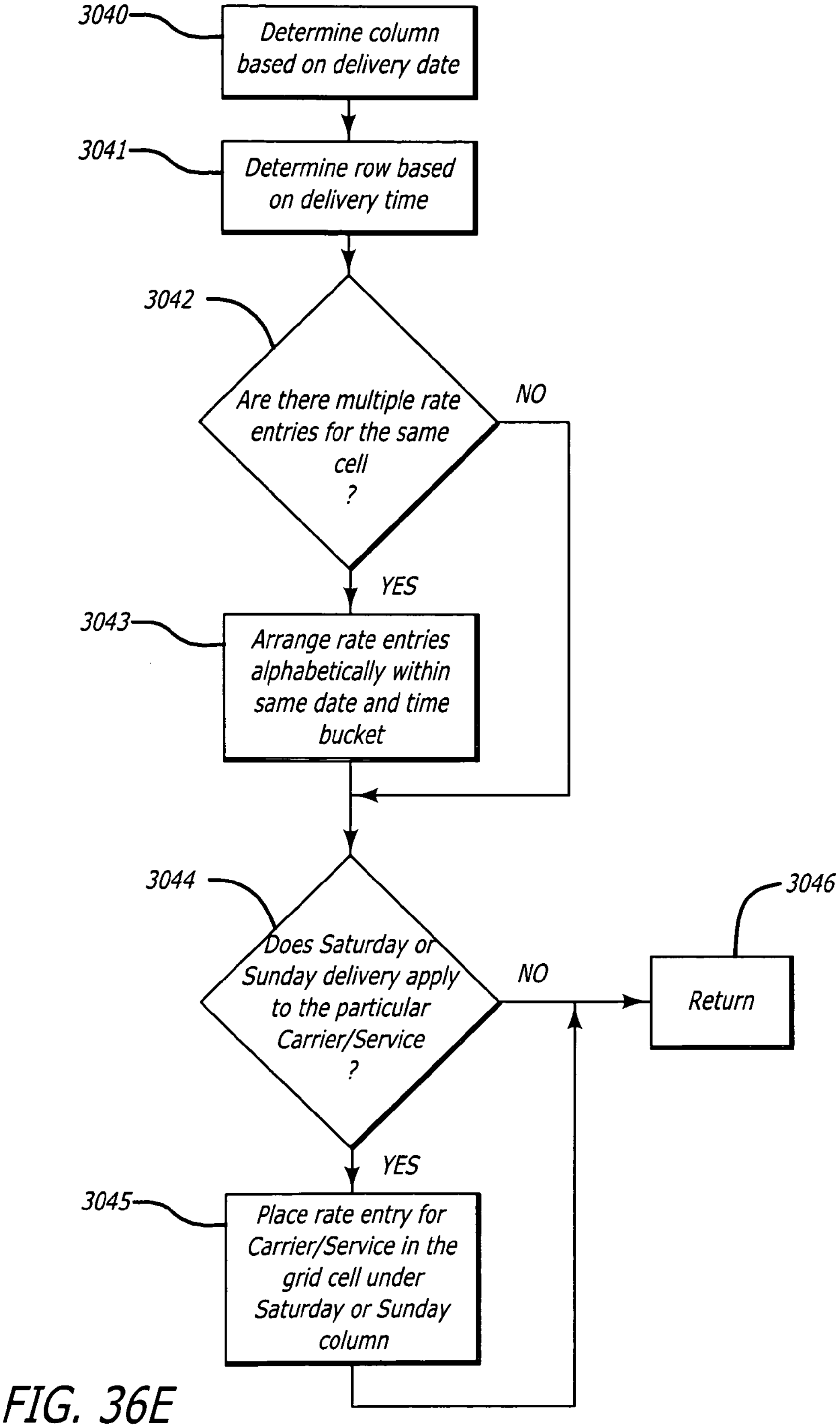
Figure 36F:
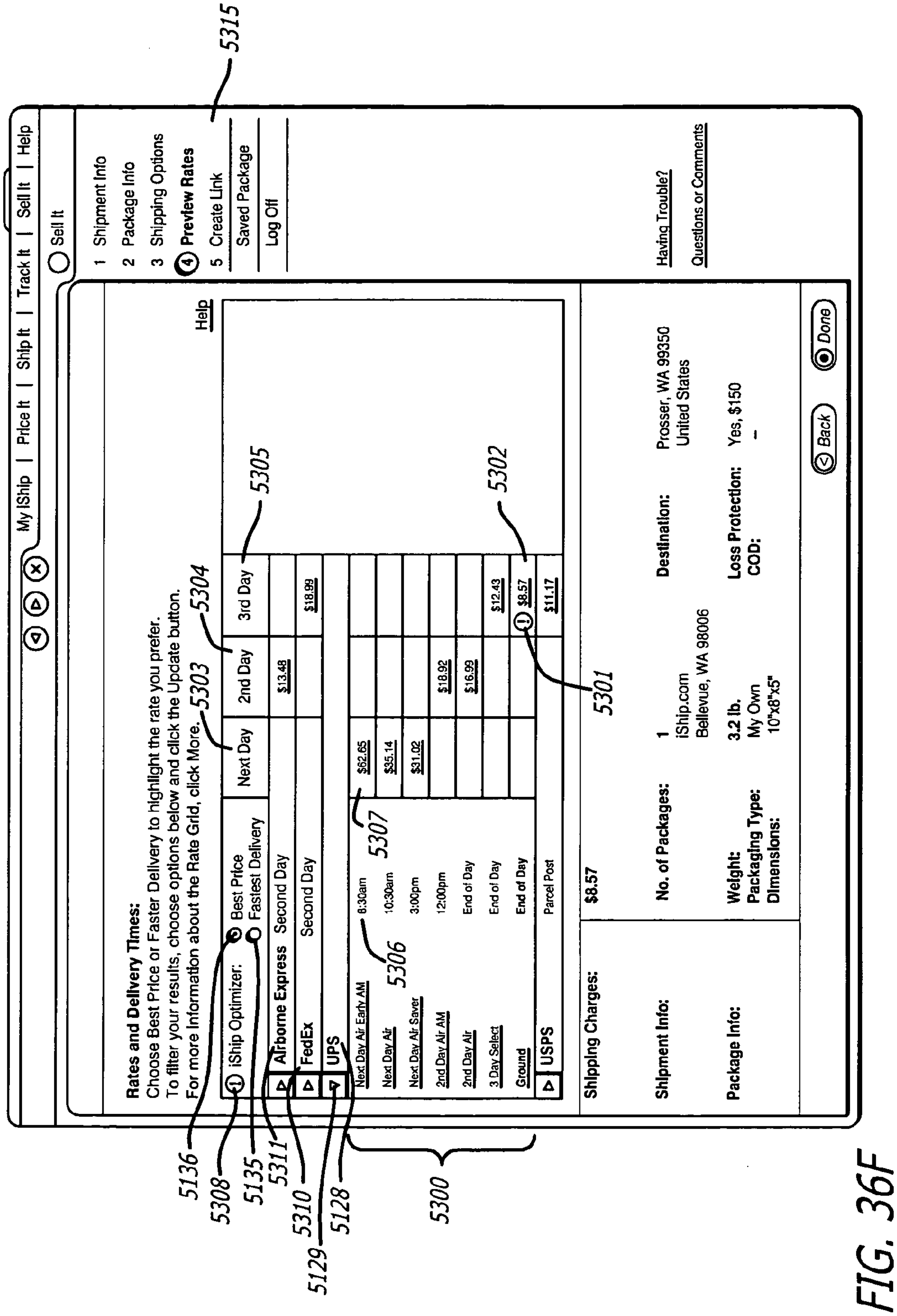
FIG. 36F is a graphic representation of an alternative exemplary Preview Rates Screen (also referred to in some embodiments as a Rates and Times Screen) in an alternative exemplary embodiment of the invention.

FIG. 36F is a graphic representation of an alternative exemplary Dynamically Dimensioned Multi-Carrier, Multi-Service Graphic Array online display as a Preview Rates Screen (also referred to in some embodiments as a Rates and Times Screen) in an alternative exemplary embodiment of the invention. The Graphic Array format of the Preview Rates Screen depicted in FIG. 36F is sortable by price (i.e., cheapest first), by delivery time (i.e., fastest is first), or preferred carrier, as governed by the enterprise and User preferences. The Preview Rates Screen provides the User with the capability to optimize the Rates 5308 according to the Best Price 5136, or the Fastest Delivery 5135.

The exemplary Preview Rates Screen depicted in FIG. 36F depicts an array of dates for delivery 5303-5305, multiple Carriers, e.g., 5128 (UPS), 5310 (FedEx), and 5311 (Airborne Express). If the Carriers that provide Services to ship the package according to the User's specifications provide such services on more days than space exists on a single screen display of the Rate Grid, left and right scroll buttons (not shown) are provided.

The exemplary Preview Rates Screen depicted in FIG. 36F is expandable for each Carrier to display multiple Services for that Carrier, e.g., 5300 for UPS. The Services for a Carrier can be displayed by the User by clicking a scroll down button, e.g., 5129 for UPS. Each listed Service for the Carrier identifies the time for delivery, e.g, 5306. When the Preview Rates Screen is displayed, the Carrier for which the User has specified a preference (if such a preference has been specified) is displayed in the expanded mode, such as is depicted in FIG. 36F for UPS so that all Services supporting shipment of the subject parcel according to the User's specifications are displayed 5300; Carriers for which no preference has been indicated are displayed in contracted mode, such as is the case for Fed Ex 5310, Airborne Express 5311 and UPS 5128.

In the embodiment depicted in FIG. 36F, only the Carriers and Services that support shipment of the subject parcel according to the User's specifications are displayed. In one embodiment of the invention, the User can limit the default display of Carrier and Service comparison to certain Carriers and certain Services. In one such embodiment of the invention, a Show All button (not shown) is provided. Clicking the Show All button causes the System to display all Carriers, Services, and Days of Delivery that support shipment of the subject parcel according to the User's specifications, even if the User has previously limited the available Carriers, Services and Days of Delivery.

A price is displayed in an Array cell, e.g., 5307, 5302, for Carrier/Service that supports delivery of the subject parcel on the specified day of delivery 5303-5305. According to the User's Optimization Selection 5135-5136, an Optimizer icon 5301 is displayed in the particular Graphic Array cell entry that reflects the optimal Carrier/Service.

As was described above, each Carrier is represented in the Graphic Array/Rate Grid by a different color. In the embodiment of the Rate Grid depicted in FIG. 36F, the optimally rated shipping entry for each Carrier is highlighted in the color for that Carrier; all other entries for that Carrier are in grey. The presence or absence of Carriers in the Graphic Array display is driven by User-specified preferences, if any, and by service choices the user has made (for example, by choosing a billing option that only certain Carriers support).

The rates calculated and displayed in the Graphic Array are customizable. Some Users may wish to see the iShip System transaction charge included in the rate quote. In one embodiment of the invention, a Rating button is provided on the same screen on which the Graphic Array is displayed, with which the User can toggle the rates displayed in the Graphic Array back and forth between the actual shipping rates (including all discounts and fees) and the rate that the Carrier charges for shipping.

b) Generation of the Graphic Array Display

To develop the rates for display in a Graphic Rates Comparison Array such as the ones depicted in FIGS. 36A and 36F, the System rating component is instantiated in the server-side script. The rating component's rate information method is invoked with the rate parameters embedded in the URL. Based on Carriers' business rules, the rates and their service option charges for all Carriers/Services are calculated from each respective Carrier's zone data, service/delivery time data and rate data.

The System keeps the Carrier data up-to-date in the System database 22. The application does not use any carriers' Application Program Interface (API) functions to get the rate information. All of carrier rate data is stored in the System database 22 and all business rules to calculate the rates are implemented within the System.

FIGS. 36B through 36E are high level data retrieval and logic flow diagrams depicting the data and high level logic that the system uses to calculate a shipping rate. As depicted in FIG. 36B, the following shipping information is used to calculate a shipping rate: Origin postal code, Destination postal code, Weight, Packaging, Drop off/Pickup, Country code 3001. For each Carrier 3002, the rating component of the System uses the origin and destination postal codes 3003. The rating component of the System obtains 3003 the zone id from the zone table 3008 and gathers 3004 the time for deliveries for all available services from the service delivery time table 3009. From the rate table 3010, the rating component obtains services charges for the zone id, packaging type and weight 3005. For each service, the rating component gathers all possible service options charges 3006. After gathering necessary information, the rating component returns an array of rate information 3007. Each element in the array represents a Carrier/Service and consists of service charge, service option charges, and delivery times.

The System calculates the rates according to the following overview logic as depicted in FIGS. 36C-36D. As depicted in FIGS. 36C through 36D, the System retrieves all rate IDs (published, net, and retail) by joining the following database tables on the System's AccountNo: AccountAndCarrierAcnt; CarrierAccount; RateDefinition 3020.

As depicted in FIGS. 36C through 36D, the System then determines the billing rules for all of the Carrier/Service combinations and their service options by joining the following tables on CarrierID, ServiceID, and ServiceOptionID: BillingOption; BillingOptionAndService; BillingOptionAndServiceOption 3021.

As depicted in FIGS. 36C through 36D, for each carrier 3022, the System performs the following procedures: 1) determine if the particular carrier supports the given billing option based on step 2) (through 3026). If not, continue with the next carrier 3027; 2) Apply carrier business rules, including: a) Calculate dimensional weight 3023; b) Determine billable weight 3024: actual weight, dimensional weight, oversize weight or letter weight; c) Validate package weight and dimensions 3025; (If the rate input violates carrier business rules 3026, continue to next carrier 3027); 3) If the answer to test process 3026 is "no" (package weight and dimensions do not violate carrier business rules), then determine the zone ID from CarrierZone table for the given origin/destination postal codes 3028; 4) Determine service delivery times 3029 (including Saturday/Sunday delivery times) by joining the following tables on destination postal code: a) CarrierDeliveryArea; b) CarrierServiceDelTime; 5) Determine all service charges from CarrierRate table by RateID, ZoneID, ServiceID and Weight 3030; 6) Determine the service option charges for each Carrier/Service 3031 by joining the following tables on CarriedID and ServiceID: ServiceOption; ServiceOptionAttribute ServiceAndServiceOption; and 7) Apply billing options to service option charges 3032 (different service option charges could be billed to different parties for various billing options).

As depicted in FIG. 36E, the expected delivery times for each Carrier/Service returned in the rate information determine the placement of the rate grid for the particular Carrier/Service cell: the delivery date determines the columns 3040 while the delivery time resolves the rows 3041. In the event that multiple rate entries collide (yes to test 3042), the alphabetical order of the particular Carrier's name is further used to determine the Graphic Array entry order within the same date and time bucket 3043. If there is no collision or once a collision is resolved 3043, the same Carrier/Service can be placed in a second time slot in the grid under Saturday or Sunday column 3045 if the Saturday or Sunday delivery is applicable to the particular Carrier/Service 3044. If Saturday or Sunday delivery does not apply (no to test 3044), or once a Saturday/Sunday time slot is indicated 3045, the System returns 3046.

Figure 37A:
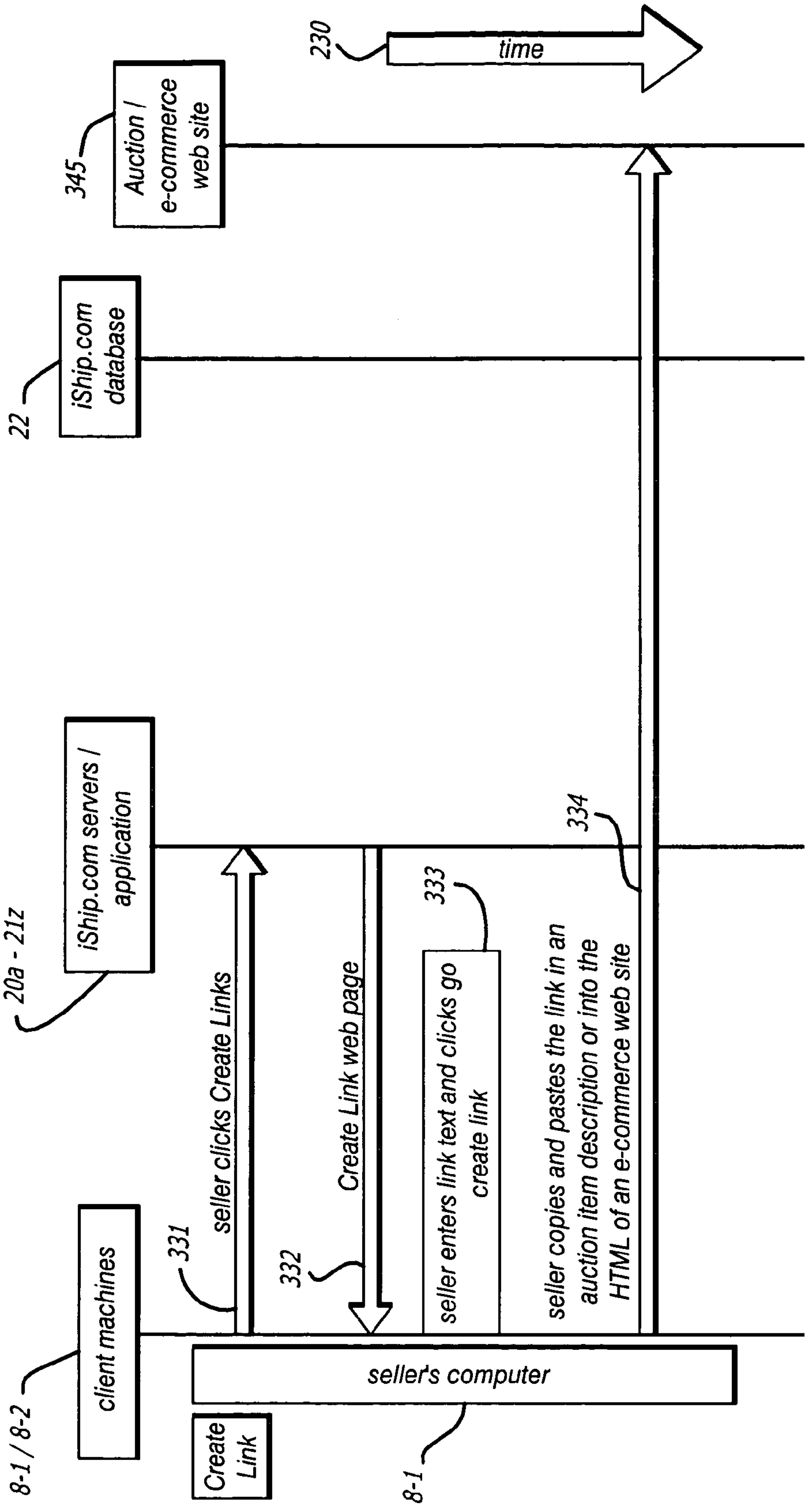
FIGS. 37A and 37B represent a System interactivity data and logic flow diagram depicting an exemplary embodiment of the Create Link and the Buyer's Preview Shipping Rates functionality in an exemplary embodiment of the System in an independent system eCommerce environment.
Figure 37B:
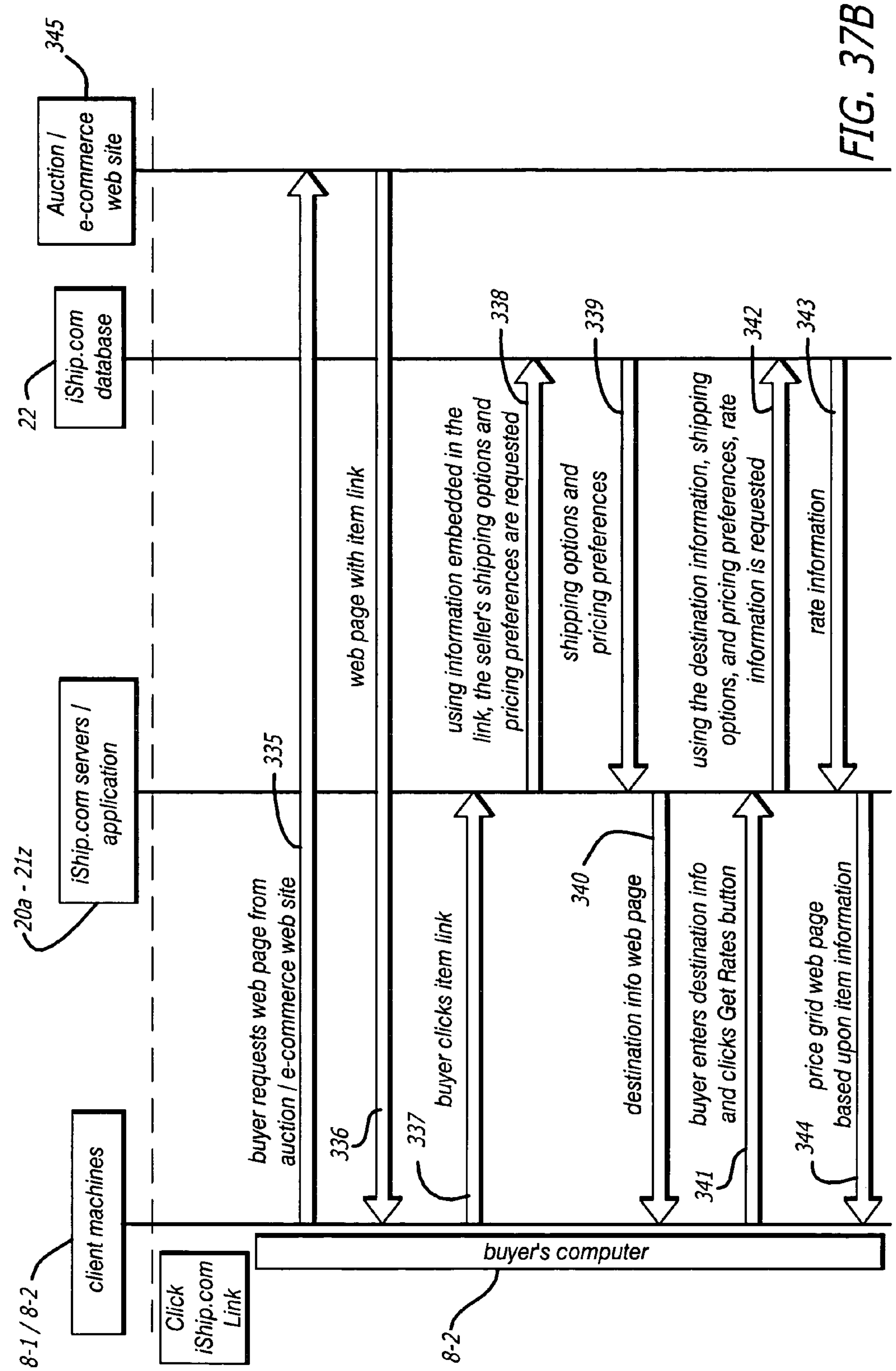

In an eCommerce embodiment of the invention, a Shipper/Seller can preview a shipping rate comparison Graphic Array prior to copying the System-created Link, e.g., 203*a* as depicted in FIG. 25, for the Seller's eCommerce site. To preview the Graphic Array comparison of shipping costs, the Seller clicks on the Preview button 198, such as is depicted in FIG. 25. FIGS. 37A and 37B represent a System interactivity data and logic flow diagram depicting an exemplary embodiment of the Create Link and the Buyer's Preview Shipping Rates functionality in an eCommerce embodiment of the present invention. FIGS. 37A and 37B depict the interactivity between the Seller's 8-1 and Buyer's 8-2 client computers and the System's server computers 20*a*-21*z* regarding this functionality. Also depicted are the data accesses to the System database 22. An arrow 230 extending from the top of the diagram and pointing down towards the bottom of the figure graphically represents the passage of time.

As depicted in FIGS. 37A and 37B, the Seller, using the Seller's computer 8-1, clicks on the Create a Seller's Link selection option 331 notifying the System servers, e.g., 21*a*-21*z*, to generate a display of the Create a Seller's Link screen 332 for display on the display monitor of the Seller's computer 8-1. In one embodiment, the Servers 21*a*-21*z* send 332 the necessary information and instructions to build the hyperlink to the Seller's computer 8-1. The Seller enters the link text and clicks the go button and the Seller's computer 8-1 creates the Link 333. The Seller then copies the link, returns to the Seller's web page, and pastes the link 334 in the description of the item to be sold at the eCommerce/eAuction Provider's web site 345.

The Buyer, using the Buyer's computer 8-2, enters the Seller's web page 335 at the eCommerce/eAuction Provider's web site 345. The Seller's web page at the eCommerce/eAuction Provider's web site 345 displays the item description with the hyperlink to the System 336 to the Buyer's computer 8-2. The Buyer clicks on the hyperlink 337, causing the System's servers 20*a*-20*z* to access 338 the System database 22 to retrieve 339 the Seller's account and eCommerce shipping preference information. The System servers 21*a*-21*z* send a screen to the Buyer's computer 8-2 requesting delivery destination information 340. The Buyer at the Buyer's computer 8-2 enters the delivery destination information and clicks on the Get Rates button 341 which signals the System Servers 20*a*-21*z* to prepare the multi-carrier, multi-service Graphic Array. The System Servers 20*a*-20*n* access 342 the System data base 22 and retrieve 343 the Seller's preferences and account information. The System Servers 21*a*-21*z* calculate the rates and prepare the Graphic Array 344 for display on the display monitor of the Buyer's computer 8-2.

Whether or not the Buyer/Bidder (sometimes simply referred to herein as the Buyer) uses the hyperlink 303 to preview the shipping charges, if the Buyer buys (or is the high bidder), the Seller is provided with the Buyer's (or high bidder's) email address and name 54 (as depicted in FIG. 10C) either directly or by the sponsoring Provider. At that point, the Seller enters the System to supply the System with Buyer information (57 and 58 as depicted on FIG. 10D) so that the System can contact the Buyer (80, e.g., FIG. 10D) for details and to facilitate the purchase and shipping of the item.

In contrast to the collection of both Seller and Buyer information in an eCommerce embodiment, the generation of the Graphic Array in the exemplary simplified Internet embodiment is accomplished using input from the Shipper only. FIG. 38 is a simplified flow diagram depicting an exemplary high level overview logic flow of the System and the interaction with the Shipper/User such as in an exemplary simplified Internet embodiment of the invention. As depicted in FIG. 38, at least one of the Servers 20*a*-21*z* are programmed to provide a User Interface ("UI") that prompts each Shipper user for information about a particular parcel (the "Subject Parcel") and the Shipper's shipping and delivery requirements ("Shipper Parcel Specifications") 1401*a*-1401*n*. At least one of the Servers 20*a*-21*z* is programmed to receive as a set of input data a particular Shipper's Shipper Parcel Specifications for a particular Subject Parcel 1402. In response to each Shipper's Shipper Parcel Specifications, at least one of the Servers 20*a*-21*z* accesses 1403 one or more databases of information concerning, among other things, the Carrier Rules for each of the Carriers supported by the System (the "Supported Carriers") 1404*a* through 1404*n*. The Carrier Rules for each of the Supported Carriers are contained in one or more databases 1404*a* through 1404*n*.

As further depicted in FIG. 38, the System then applies the Carrier Rules for all Supported Carriers to each particular set of Shipper Parcel Specifications 1403. From the result of the application by the System of the Carrier Rules to a particular set of Shipper Parcel Specifications, the System prepares a Graphic Array that displays a rating and timing comparison of the delivery services by the supporting Carriers that are available to provide the delivery of the Subject Parcel according to the Shipper's Parcel Specifications 1405. The System then formats the Graphic Array for display on the Shipper's PC 1406, and generates the signals to the Shipper's PC to display the formatted Graphic Array 1407.

In one embodiment of the invention, the System provides multiple modes of operation, among which are the Service Comparison Mode and the Shipping Mode. The Service Comparison Mode requires origin and destination zip codes but does not require full address information. The purpose of the Service Comparison Mode is to provide the Shipper with multi-Carrier comparisons of rates, and shipping and delivery options and requirements for each of multiple Carriers. In the Shipping Mode, the Shipper must provide the full address and contact information. The purpose of the Shipping Mode is to print a shipping label or otherwise provide the information necessary to prepare a shipping manifest document. Shipper Parcel Specifications are input in both the Service Comparison Mode and the Shipping Mode.

Figure 39A:
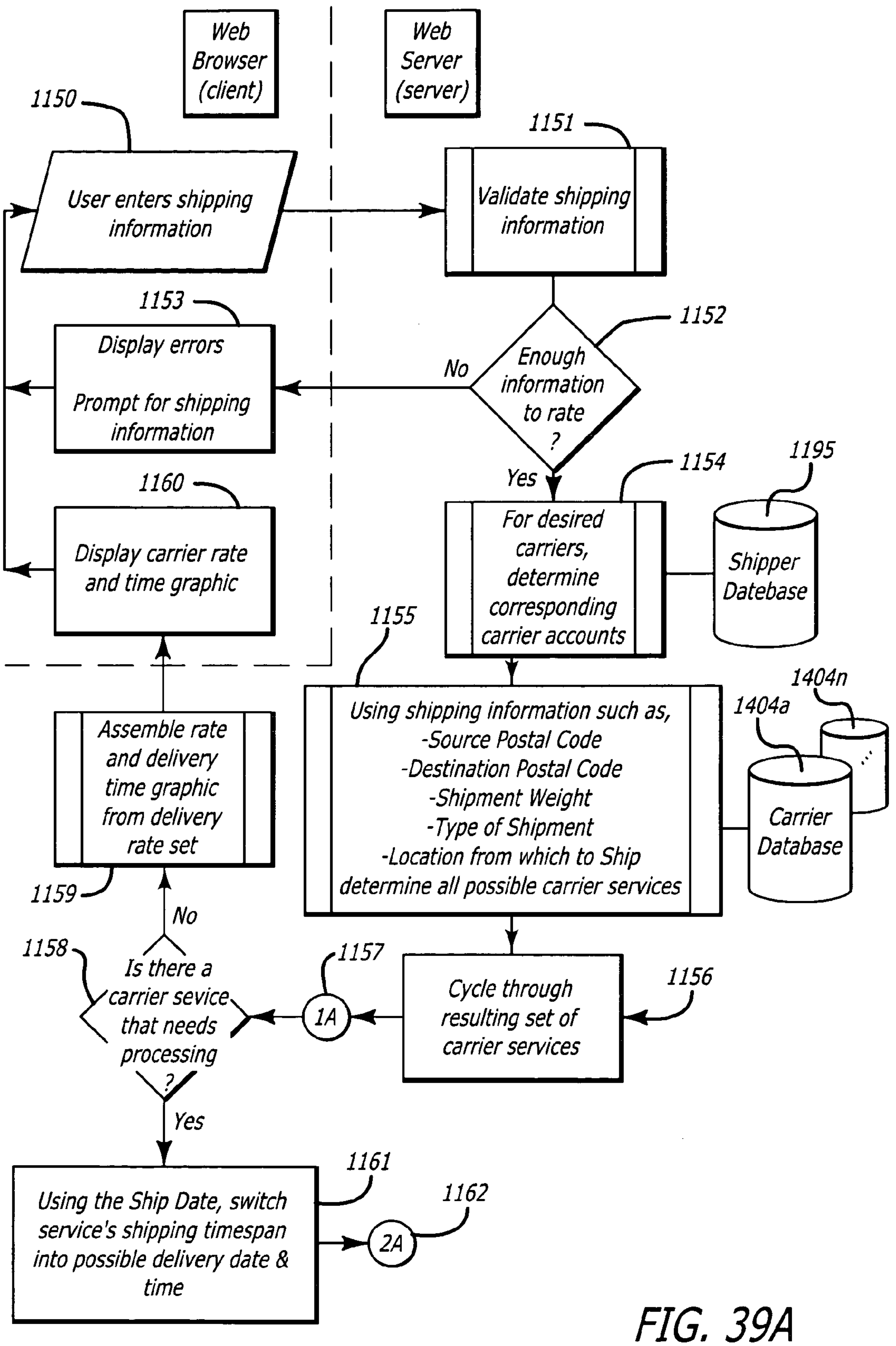
FIGS. 39A through 39C are high level flow diagrams depicting the initial timing and rating logic to develop a dynamically dimensioned, multi-carrier, multi-service shipping rates comparison Graphic Array in an exemplary embodiment of the System in an Internet environment.
Figure 39B:
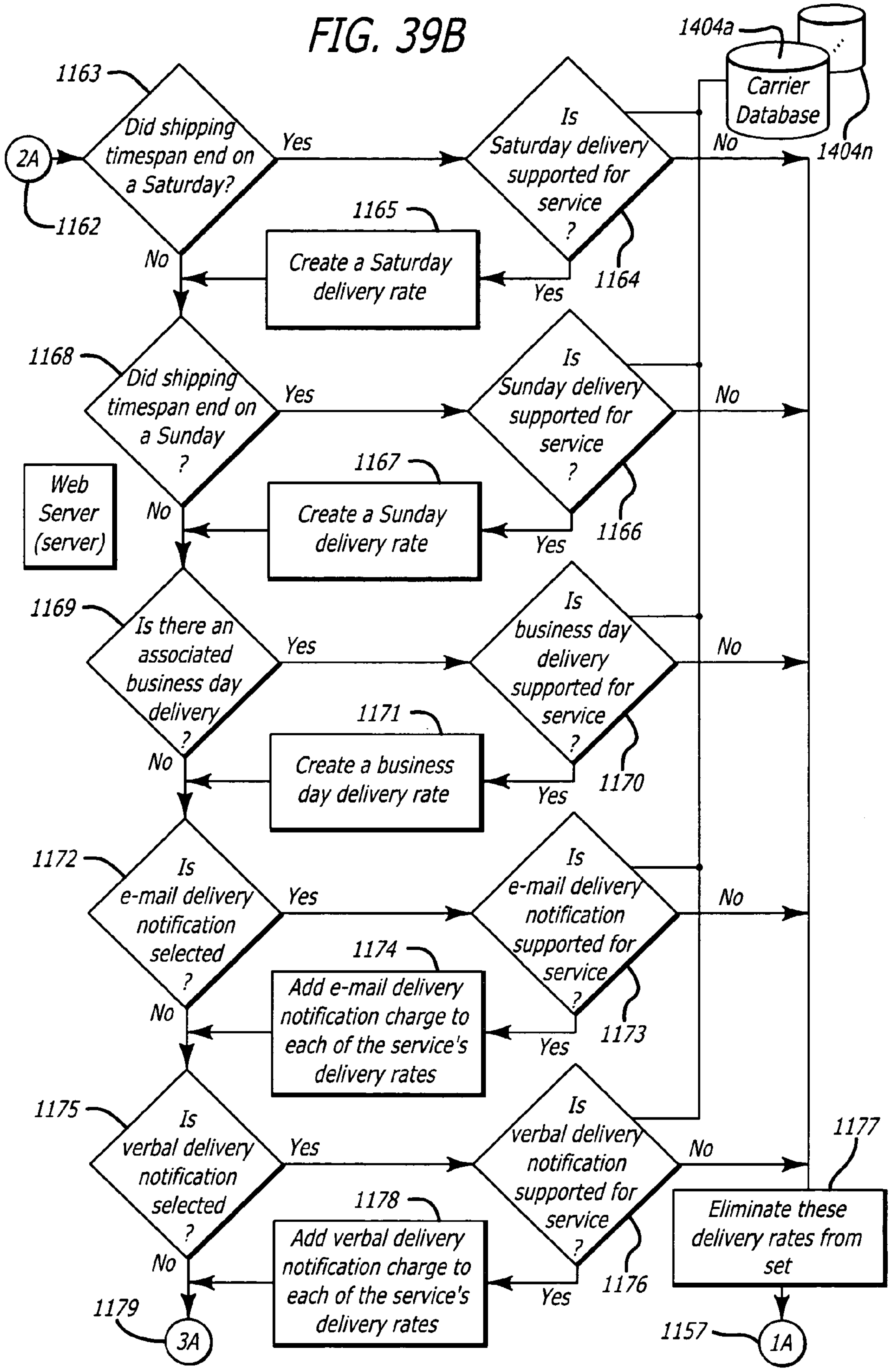
Figure 39C:
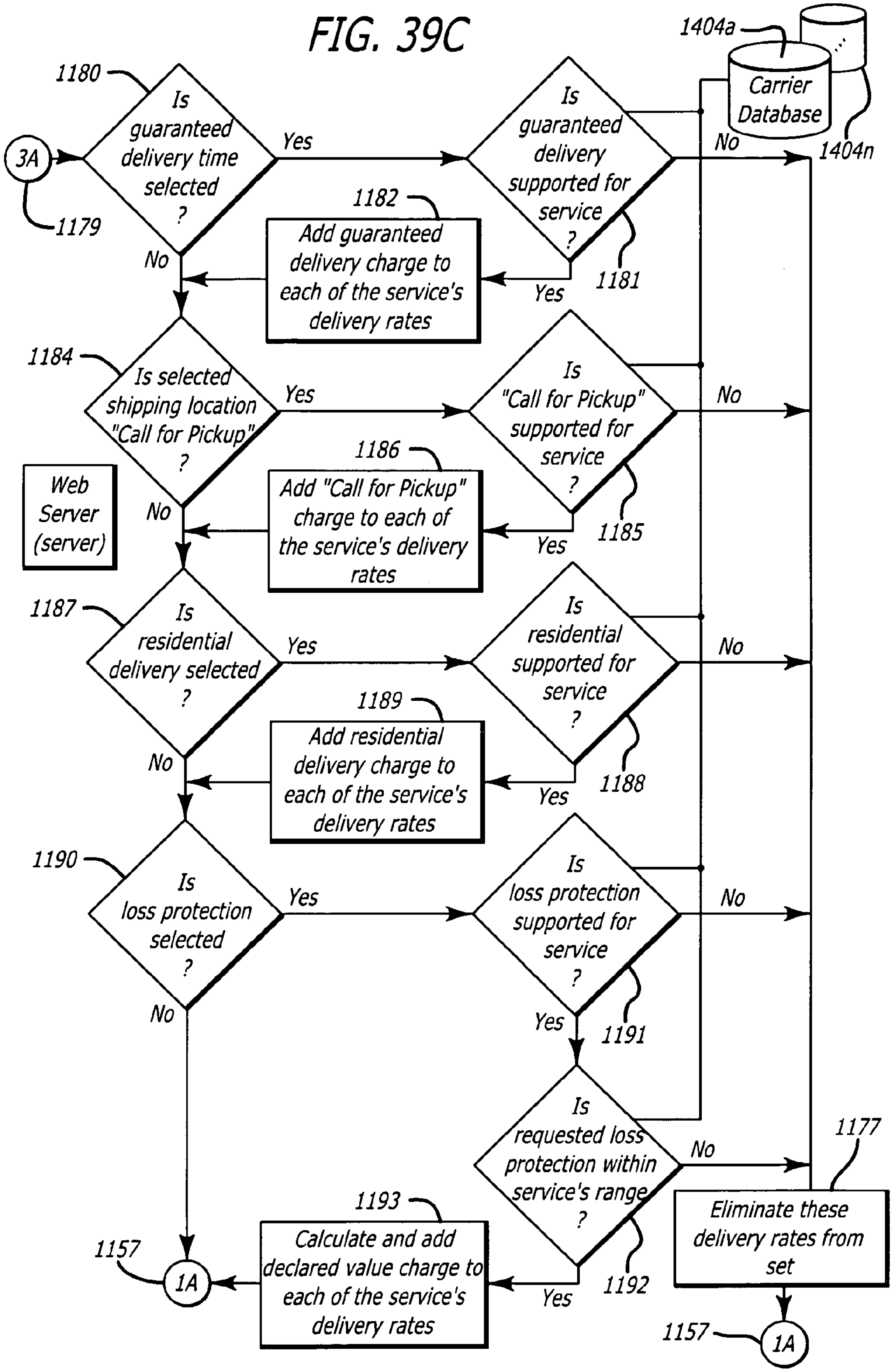

FIGS. 39A through 39C are simplified flow diagrams depicting the initial Timing and Rating procedure to generate a Graphic Array in an exemplary simplified Internet embodiment of the invention. In the embodiment of the invention depicted in FIGS. 39A through 39C, the functions of the Shipper entering shipping information 1150, displaying errors to the Shipper that insufficient shipping information has been provided and prompting the Shipper for additional information 1153, and displaying the Carrier/Service rate and time graphic 1160, are all processed by the Web Browser at the Client. In the embodiment depicted, all other functions and processes depicted in FIGS. 39A through 39C are performed by one or more of the NOC Servers.

It should be noted that the depicted separation of functions between the Web Browser at the Client on the one hand and the NOC Servers on the other hand represents an initial procedure to construct the Graphic Array in response to initial Shipper input of Shipper Parcel Specifications. As is explained in more detail below, after the initial construction of the Graphic Array, the System can distribute certain of the functions for supplemental regeneration of the Graphic Array to the Web Browser Client.

As depicted in FIGS. 39A through 39C, the Shipper (User) enters shipping information (Shipper Parcel Specifications) 1150. The System validates the shipping information 1151.

In the embodiment depicted, at a minimum, the System requires Source Postal Code, Destination Postal Code, Parcel Weight, Type of Shipment, and the Shipping Location in order to determine a timing schedule and rates for each supported Carrier. If at 1152 the Shipper has not provided at least these minimum specifications, then the System displays error messages 1153 prompting the Shipper to input further Shipper Parcel Specifications 1150.

Continuing with FIGS. 39A through 39C, if the Shipper has supplied the minimum required specifications, then the System accesses the Shipper Database 1195 to identify any user-specified Carrier designations and to determine the Carrier accounts for the appropriate Shipper 1154. Using the Shipper Parcel Specifications, the System then accesses the Carrier Databases (1404*a* through 1404*n*) and determines all possible Carrier/Services that support shipping of the subject parcel 1155.

It should be noted that in some embodiments, the Shipper can restrict the identity of Carriers to be used in the construction of the Graphic Array. A Shipper may choose to restrict the System to certain Carriers, for instance, if the Shipper prefers to work only with certain Carriers.

Continuing with FIGS. 39A through 39C, the System then examines each Carrier/Service in the set of supporting Carrier/Services 1156. The next step 1157 is a juncture for return of control from a number of points in the System logic and is performed for each Carrier/Service in the set of supporting Carrier/Services.

If the System has examined all possible supporting Carrier/Services 1158, the System assembles the Graphic Array from the delivery rate set 1159 and displays the Graphic Array to the user 1160. As was previously explained, the dimensions of the Graphic Array are dynamic.

As long as there are further Carrier/Services that remain to be examined in the set of supporting Carrier Services, the System continues to perform the process described below.

Using the Expected Shipping Date, the System switches the Carrier/Service's shipping timespan into possible delivery dates and times 1161. Next 1162, the System determines whether the shipping timespan ends on a Saturday 1163. If so, the System accesses the Carrier Database (1404*a* through 1404*n*) to determine whether the particular Carrier/Service supports Saturday Delivery 1164. If the particular Carrier/Service does not support Saturday Delivery, then the particular Carrier/Service is eliminated 1177 from the delivery rate set and the System proceeds with the next Carrier/Service in the delivery rate set 1157.

If the particular Carrier/Service supports Saturday Delivery, the System determines the appropriate Saturday delivery rate for the particular Carrier/Service 1165.

Continuing with FIGS. 39A through 39C, next (continuing after process 1165, or if the answer to test process 1163 is "no" (shipping timespan does not end on a Saturday)), the System determines whether the shipping timespan ends on a Sunday 1168. If the shipping timespan ends on a Sunday, the System accesses the Carrier Database (1404*a* through 1404*n*) to determine whether the particular Carrier/Service supports Sunday delivery 1166. If the particular Carrier/Service does not support Sunday delivery, then the particular Carrier/Service is eliminated from the delivery rate set 1177 and the System proceeds with the next Carrier/Service in the delivery rate set 1157.

If the particular Carrier/Service supports Sunday Delivery, the System determines the appropriate Sunday delivery rate for the particular Carrier/Service 1167.

The System then (continuing after process 1167, or if the answer to test process 1168 is "no" (shipping timespan does not end on a Sunday)) determines whether there is a business day delivery within the shipping timespan 1169. If so, the System accesses the Carrier Database (1404*a* through 1404*n*) to determine whether the particular Carrier/Service supports business day delivery 1170. If the particular Carrier/Service does not support business day delivery, then the particular Carrier/Service is eliminated from the delivery rate set 1177 and the System proceeds with the next Carrier/Service in the delivery rate set 1157.

If the particular Carrier/Service supports business day delivery, the System determines the appropriate business day delivery rate for the particular Carrier/Service 1171.

Continuing with FIGS. 39A through 39C, the System next (continuing after process 1171, or if the answer to test process 1169 is "no" (there is no associated business day delivery)) determines whether the Shipper has requested E-Mail delivery notification 1172. If so, the System accesses the Carrier Database (1404*a* through 1404*n*) to determine whether the particular Carrier/Service supports E-Mail delivery notification 1173. If the particular Carrier/Service does not support E-Mail delivery notification, then the particular Carrier/Service is eliminated from the delivery rate set 1177 and the System proceeds with the next Carrier/Service in the delivery rate set 1157.

If the particular Carrier/Service supports E-Mail delivery notification, the System adds the appropriate charge for the E-Mail delivery notification service to each of the particular Carrier/Service's delivery rates 1174.

Continuing with FIGS. 39A through 39C, the System then (continuing after process 1174, or if the answer to test process 1172 is "no" (e-mail delivery notification not selected)) determines whether the Shipper has requested verbal delivery notification 1175. If so, the System accesses the Carrier Database (1404*a* through 1404*n*) to determine whether the particular Carrier/Service supports verbal delivery notification 1176. If the particular Carrier/Service does not support verbal delivery notification, then the particular Carrier/Service is eliminated from the delivery rate set 1177 and the System proceeds with the next Carrier/Service in the delivery rate set 1157.

If the particular Carrier/Service supports verbal delivery notification, the System adds the appropriate charge for the verbal delivery notification service to each of the particular Carrier/Service's delivery rates 1178.

Next 1179 (continuing after process 1178, or if the answer to test process 1175 is "no" (verbal delivery notification no selected)), the System determines whether the Shipper has requested that the Carrier/Service guarantee delivery time 1180. If so, the System accesses the Carrier Database (1404*a* through 1404*n*) to determine whether the particular Carrier/Service supports guaranteed delivery times 1181. If the particular Carrier/Service does not support guaranteed delivery times, then the particular Carrier/Service is eliminated from the delivery rate set 1177 and the System proceeds with the next Carrier/Service in the delivery rate set 1157.

If the particular Carrier/Service supports guaranteed delivery times, the System adds the appropriate charge for the guaranteed delivery times service to each of the particular Carrier/Service's delivery rates 1182.

Continuing with FIGS. 39A through 39C, the System then (continuing after process 1182, or if the answer to test process 1180 is "no" (guaranteed delivery time not selected)) determines whether the Shipper has requested a "Call for Pickup" shipping location 1184. If so, the System accesses the Carrier Database (1404*a* through 1404*n*) to determine whether the particular Carrier/Service supports "Call for Pickup" services 1185. If the particular Carrier/Service does not support "Call for Pickup" services, then the particular Carrier/Service is eliminated from the delivery rate set 1177 and the System proceeds with the next Carrier/Service in the delivery rate set 1157.

If the particular Carrier/Service supports "Call for Pickup" services, the System adds the appropriate charge for the "Call for Pickup" service to each of the particular Carrier/Service's delivery rates 1186.

Continuing with FIGS. 39A through 39C, the System next (continuing after process 1186, or if the answer to test process 1184 is "no" (selected shipping location is not "Call for Pickup")) determines whether the Shipper has requested a "Residential Delivery" 1187. If so, the System accesses the Carrier Database (1404*a* through 1404*n*) to determine whether the particular Carrier/Service supports "Residential Delivery" services 1188. If the particular Carrier/Service does not support "Residential Delivery" services, then the particular Carrier/Service is eliminated from the delivery rate set 1177 and the System proceeds with the next Carrier/Service in the delivery rate set 1157.

If the particular Carrier/Service supports "Residential Delivery" services, the System adds the appropriate charge for the "Residential Delivery" service to each of the particular Carrier/Service's delivery rates 1189.

The System then (continuing after process 1189, or if the answer to test step 1187 is "no" (residential delivery no selected)) determines whether the Shipper has requested a "Loss Protection" services 1190. If the answer to test process 1190 is "no" (Loss Protection not selected), then the System proceeds with the next Carrier/Service in the delivery rate set 1157. If Loss Protection is selected, the System accesses the Carrier Database (1404*a* through 1404*n*) to determine whether the particular Carrier/Service supports "Loss Protection" services 1191. If the particular Carrier/Service does not support "Loss Protection" services, then the particular Carrier/Service is eliminated from the delivery rate set 1177 and the System proceeds with the next Carrier/Service in the delivery rate set 1157. The System then determines 1192 whether the requested loss protection is within the service's range; if not, the System proceeds with the next Carrier/Service in the delivery rate set 1157.

Continuing with FIGS. 39A through 39C, if the particular Carrier/Service supports "Loss Protection" services, and if the requested loss protection is within the service's range, the System calculates the appropriate charge for the "Loss Protection" service and adds the appropriate charge to each of the particular Carrier/Service's delivery rates 1193 before proceeding with the next Carrier/Service in the delivery rate set 1157.

FIG. 40 is a graphic representation depicting an exemplary embodiment of a multi-carrier, multi-service shipping rates comparison Graphic Array 320 in an exemplary eCommerce embodiment of the invention.

c) Automatic Dynamic Regeneration of Display

In the exemplary embodiments of the invention described here, the System automatically and dynamically regenerates the display of the Graphic Array and certain portions of other screens when the Shipper makes online changes to Shipper input. To do this, the System generates executable code which it distributes with certain displayable frames to the Web Browser Client. This distribution of code for purposes of regenerating the Graphic Array differs from the initial generation of the Graphic Array as was described above. For example, in the embodiment of the invention depicted in FIGS. 39A through 39C, in the initial development of the Graphic Array, the System distributes the functions that initially generate the Graphic Array as follows: the Shipper entering shipping information 1150, displaying errors to the Shipper that insufficient shipping information has been provided and prompting the Shipper for additional information 1153, and displaying the Graphic Array 1160, are all processed by the Web Browser at the Client; all other functions and processes depicted in FIGS. 39A through 39C are performed by one or more of the NOC Servers 20*a*-21*z*.

Distribution to the Web Browser Client by the System of executable code that regenerates the Graphic Array provides the capability to dynamically reflect in the Graphic Array any changes that the Shipper may enter to the various Shipper Parcel Specifications; the Graphic Array immediately displays the new information without requiring the Shipper to request a recalculation, such as by clicking on a "Regenerate" button or the like.

To facilitate regeneration of the Graphic Array, the System generates executable code which it distributes with the frame, such as the frame that is displayed to the user for collecting the Parcel Specifications, to the Web Browser Client. A displayable frame is a set of information for display on the client display device. For example, in FIG. 36A, in one embodiment of the invention, a first frame of the screen depicted in FIG. 36A comprises the Title "Rates & Times" 1109*a*, the instruction "Click on the price to select a delivery date, time and carrier." 1109*b*, the legend "Date you expect to ship your package:" 1109*c*, the input field for the Expected Shipping Date 1060, the legend "I'll ship the package from:" 1109*d* and the input field for the Shipping Location 1066; a second frame of the screen depicted in FIG. 36A comprises the Graphic Array.

As the System generates the display of each frame, the System generates executable code which it distributes with, e.g., the Rate & Times frame, to the Web Browser Client. Thereafter, the Web Browser Client uses the executable code to automatically regenerate the display of the Graphic Array each time the Shipper makes changes to the Shipper Parcel Specifications: In one embodiment of the dynamic regeneration aspect of the invention, the executable code distributed to the Web Browser Client uses JavaScript.

In some cases, the executable code sent to the Web Browser Client provides the information and the capability to regenerate the Graphic Array without any further communication with the Server. In other cases, the Web Client Browser must return control to the Server so that the Server can access data maintained by or accessible by the Server; the Server then regenerates the Graphic Array or otherwise provides the Web Browser Client with the information necessary to regenerate the Graphic Array.

In an exemplary embodiment of the automatic dynamic regeneration aspect of the invention, the executable code distributed to the Web Browser Client contains the logic to apply Carrier Rules to Shipper Parcel Specification changes. For instance, Shipper changes to the Service Options screen as depicted in FIG. 28 would be automatically processed by the Web Client Browser and the Web Client Browser would regenerate the Single Day Rate Graphic Array depicted therein to reflect the Shipper changes. In one such automatic dynamic regeneration embodiment, only those functions that do not require further access to the relevant Carrier's database are distributed to the Web Browser Client.

It should be noted that, according to the automatic dynamic regeneration aspect of the invention, if after the Shipper views the Graphic Array the Shipper enters changes to any of the factors with which the System calculates the rates and develops the Graphic Array, the System uses a similar logic flow to regenerate the Graphic Array as was explained above in relation to FIGS. 39A through 39C.

The dynamic regeneration capability is used to automatically regenerate response screens in many places throughout the System. For instance, as was mentioned above, as in the case of FIG. 36A, if the Shipper changes Origin Zip Code and/or Ship Location Type, the System will automatically regenerate a list of possible Drop Off Location choices.

d) Completing Parcel Specifications and the Buyer's Information

In an eCommerce embodiment of the invention, the System collects information from both a Seller (the Shipper) and a Buyer (the Recipient). The Seller (Shipper) inputs information about the parcel to be shipped and initial information about the Buyer. The Buyer then inputs information such as shipping address and payment information. Depending upon the Seller's preferences, the Buyer may also be asked to choose one of multiple carriers and multiple shipping services.

Figure 41:
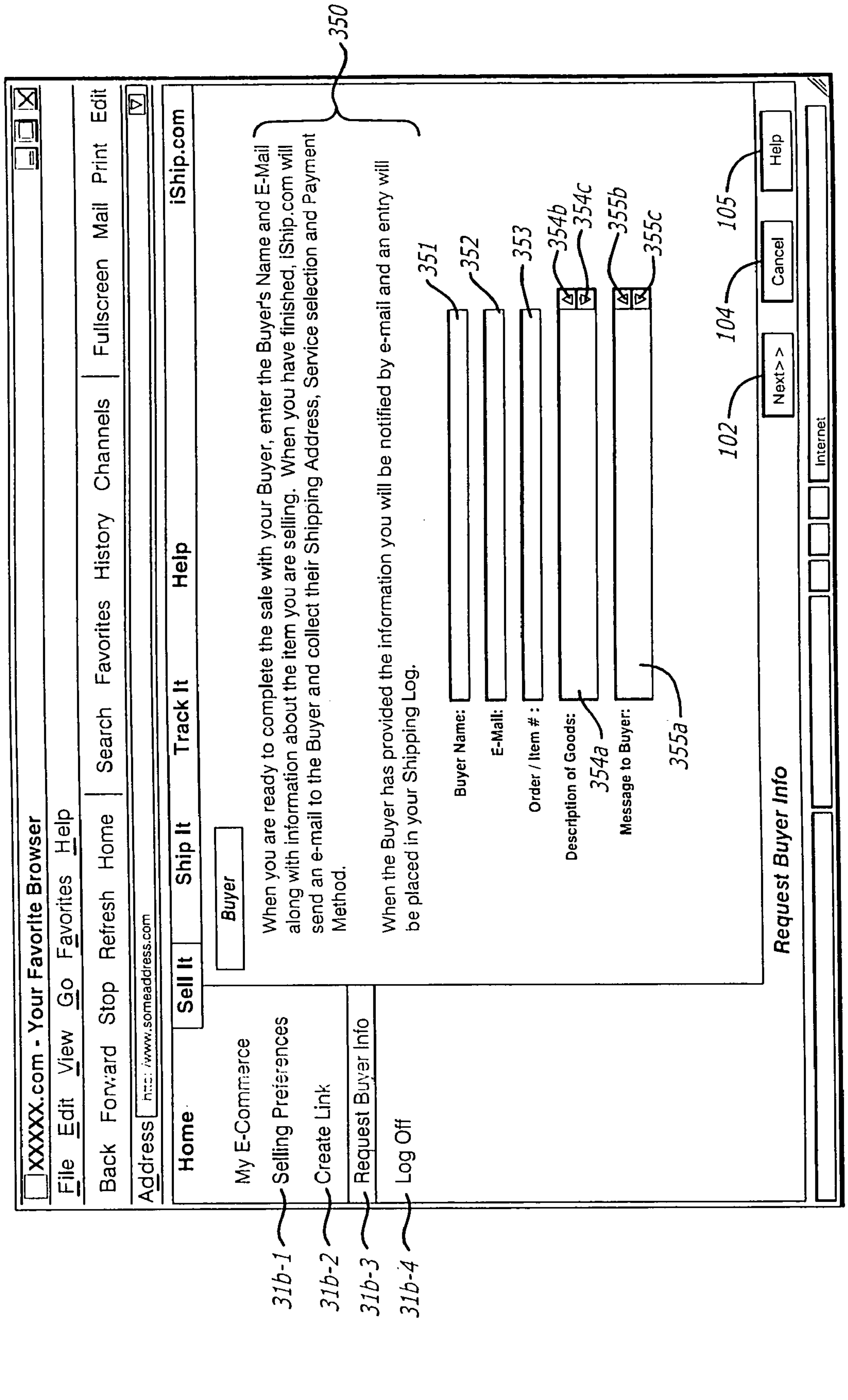
FIG. 41 is a graphic representation of a Seller's Buyer Information Screen in an exemplary embodiment of the System in an independent system eCommerce environment.

FIG. 41 is a graphic representation of a Seller's Buyer Information Screen (57, FIG. 10D) in an eCommerce embodiment of the invention. The Seller enters the screen in one embodiment by logging in to the System and then selecting the Sell It option 31*a* and by selecting the Request Buyer Info submenu option 31*b*-3. The System provides the Seller with instructions to complete the requested data 350. The Seller inputs the Buyer's Name 351, the Buyer's e-mail address 352, an Order/Item number 353, a Description of the Goods to be Shipped 354*a* (the Seller may scroll through the description using the scroll buttons 354*b* and 354*c* if the description exceeds the online screen window for the description text), and a message to the buyer 355*a* (the Seller may scroll through the message using the scroll buttons 355*b* and 355*c* if the message exceeds the online screen window for the message text).

Buyer information and package/item information is mapped by the System into the appropriate shipping data fields (i.e., Buyer name is mapped to Recipient Company/name; Buyer e-mail is mapped to Recipient e-mail, item/order number is mapped to reference number, etc.).

Figure 42:
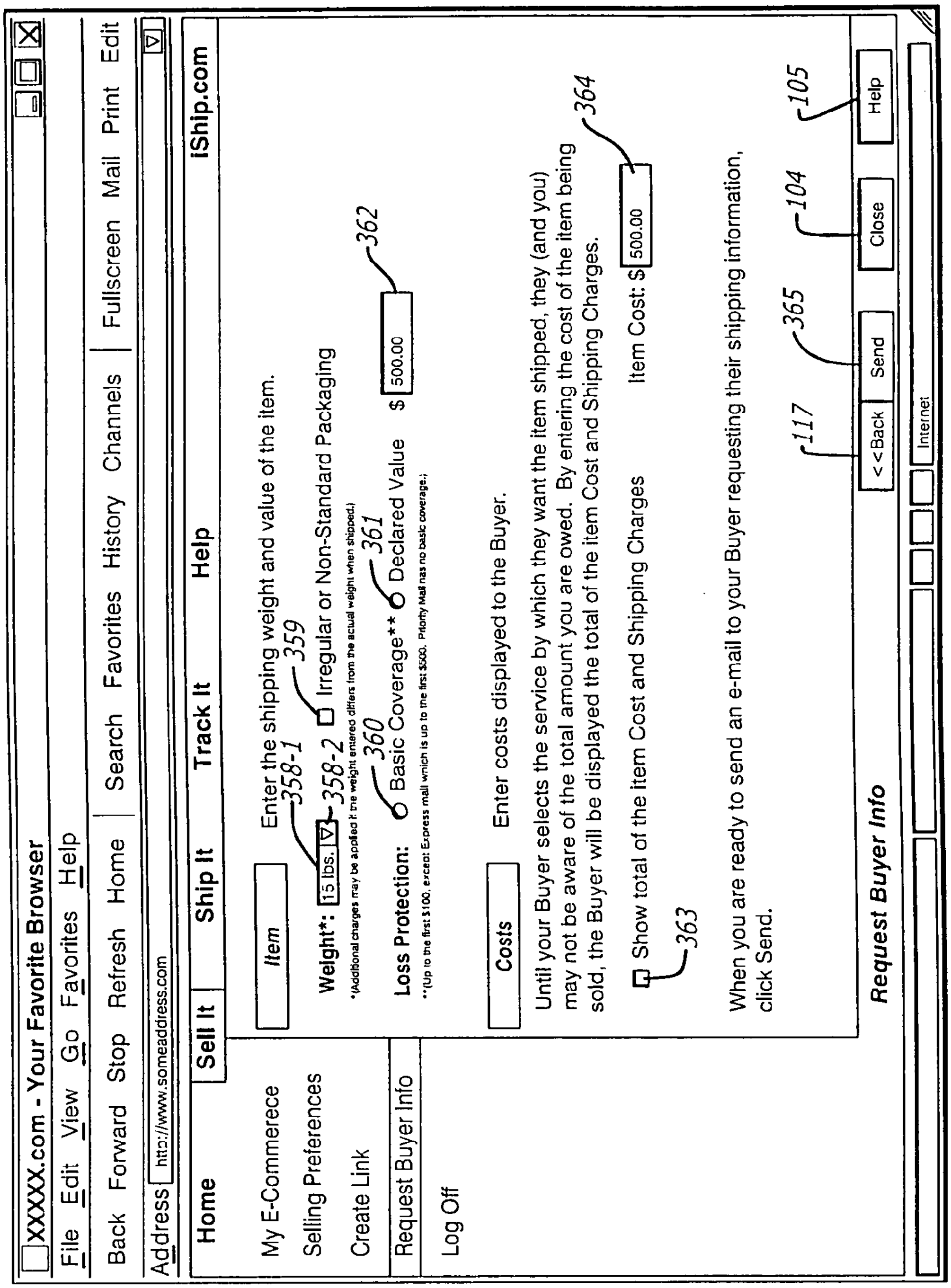
FIG. 42 is a graphic representation of an exemplary embodiment of a Subject Parcel data screen in an exemplary embodiment of the System in an independent system eCommerce environment.

Clicking on the Next button 102 will cause the System to display the Next screen, which in this case is the package specific information screen (58, FIG. 10D) as depicted in FIG. 42.

FIG. 42 is a graphic representation of an exemplary embodiment of a Subject Parcel data screen. The Seller inputs the weight by clicking on the weight pull down menu button 358-2 and selecting a weight 358-1 from the list. An "Irregular or Non-Standard Packaging" indicator 359 is provided. The Seller selects Loss Protection, the default being Basic Coverage 360, or Declared Value 361. If the Seller selects Declared Value 361, the Seller must enter a value 362 greater than $0.00 and less than or equal to $50,000.00. The Seller also enters the Item Cost to be displayed to the Buyer 364 and indicates whether or not the System should show the Buyer the total of the Item Cost and Shipping Charges 363. Once the Seller has entered the information, if the Seller clicks on the Send button 365, the System validates the information input and prepares an e-mail to the Buyer (59, FIG. 10D).

At this point, the System generates a System package tracking number. A System tracking number is a unique number generated internally by the System to identify a particular package shipped using the System. One embodiment of the way in which the System generates a System package tracking number is disclosed below in the Tracking section of the disclosure of the present invention.

Figure 43:
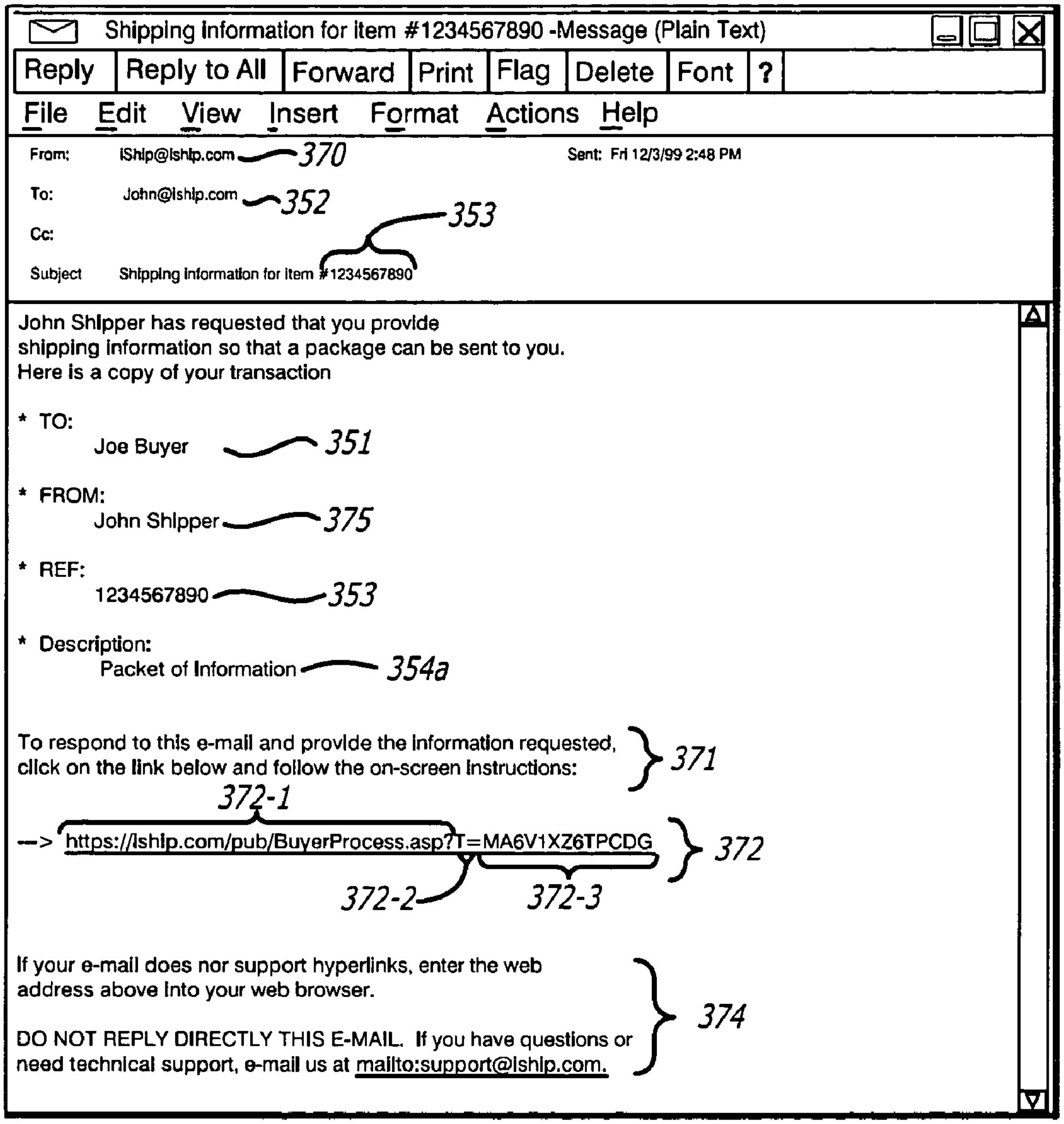
FIG. 43 is a graphic representation of an exemplary embodiment of a System-prepared e-mail to the Buyer in an exemplary embodiment of the System in an independent system eCommerce environment.

FIG. 43 is a graphic representation of an exemplary embodiment of a System-prepared e-mail to the Buyer. The System builds the e-mail to contain the identification of the System as the sender 370, the e-mail of the Buyer 352 as supplied by the Seller, a Subject identification containing the item number 353 as supplied by the Seller, the Buyer name 351 as supplied by the Seller, the Seller name 375 as retrieved from the Seller's account information retrieved after the Seller logged into the System before entering Request Buyer Info 31*b*-3 (e.g., as depicted in FIG. 24), a Reference number as provided by the Seller 353, instructions to the Buyer 371 to click on the embedded hyperlink 372, and some further instructions to the Buyer 374. The System builds the hyperlink 372 according to a preset URL location 372-1 as provided from the System database 22, and specifying the System package tracking number 372-3 as the value for a variable named "T=" 372-2.

If the Buyer's e-mail program is integrated with the Buyer's web browser, then the Buyer can click on the hyperlink/URL 372 contained in the e-mail. Otherwise, the Buyer must copy the hyperlink/URL 372 into the Address/Location field of the web browser. When the Buyer clicks on the hyperlink/URL 372, the System displays the first screen (60, FIG. 10D) in the Buyer Response process.

Figure 44:
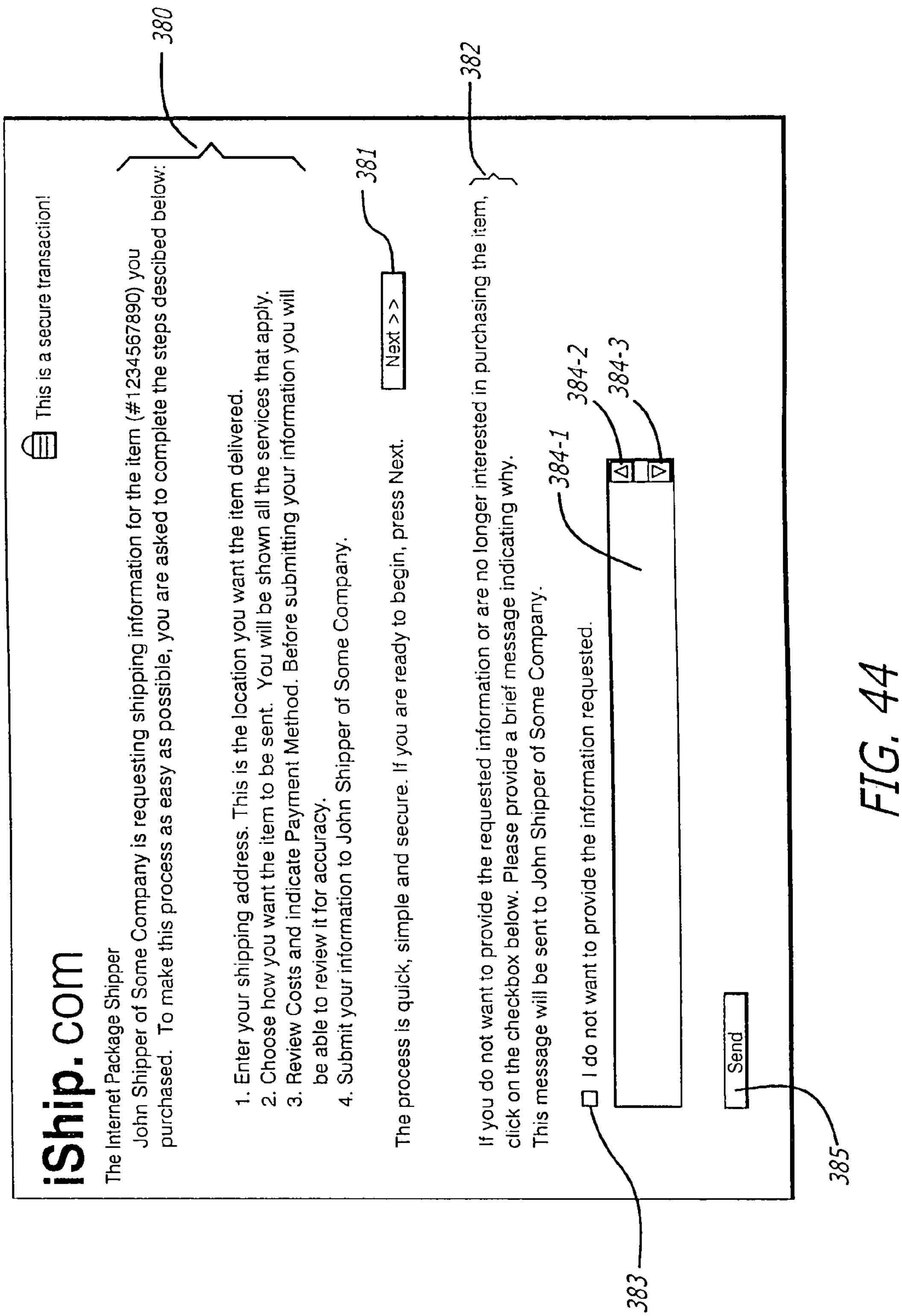
FIG. 44 is a graphic representation of an exemplary embodiment of the Buyer Response Introduction screen in an exemplary embodiment of the System in an independent system eCommerce environment.

FIG. 44 is a graphic representation of an exemplary embodiment of the Buyer Response Introduction screen. The System provides the Buyer with instructions 380. The System instructs the Buyer 382 to indicate 383 the Buyer's choice not to supply the requested shipping information and an explanation as to why 384-1. The Buyer can scroll through the explanation using the up and down scroll keys 384-2 and 384-3 if the text of the description exceeds the online screen window for the text. The Buyer sends the refusal notification and message by clicking the Send button 385. Otherwise, if the Buyer wishes to proceed, the Buyer clicks the Next button 381 which will cause the System to display a Buyer Shipping Information Collection screen (61, FIG. 10D).

Figure 45:
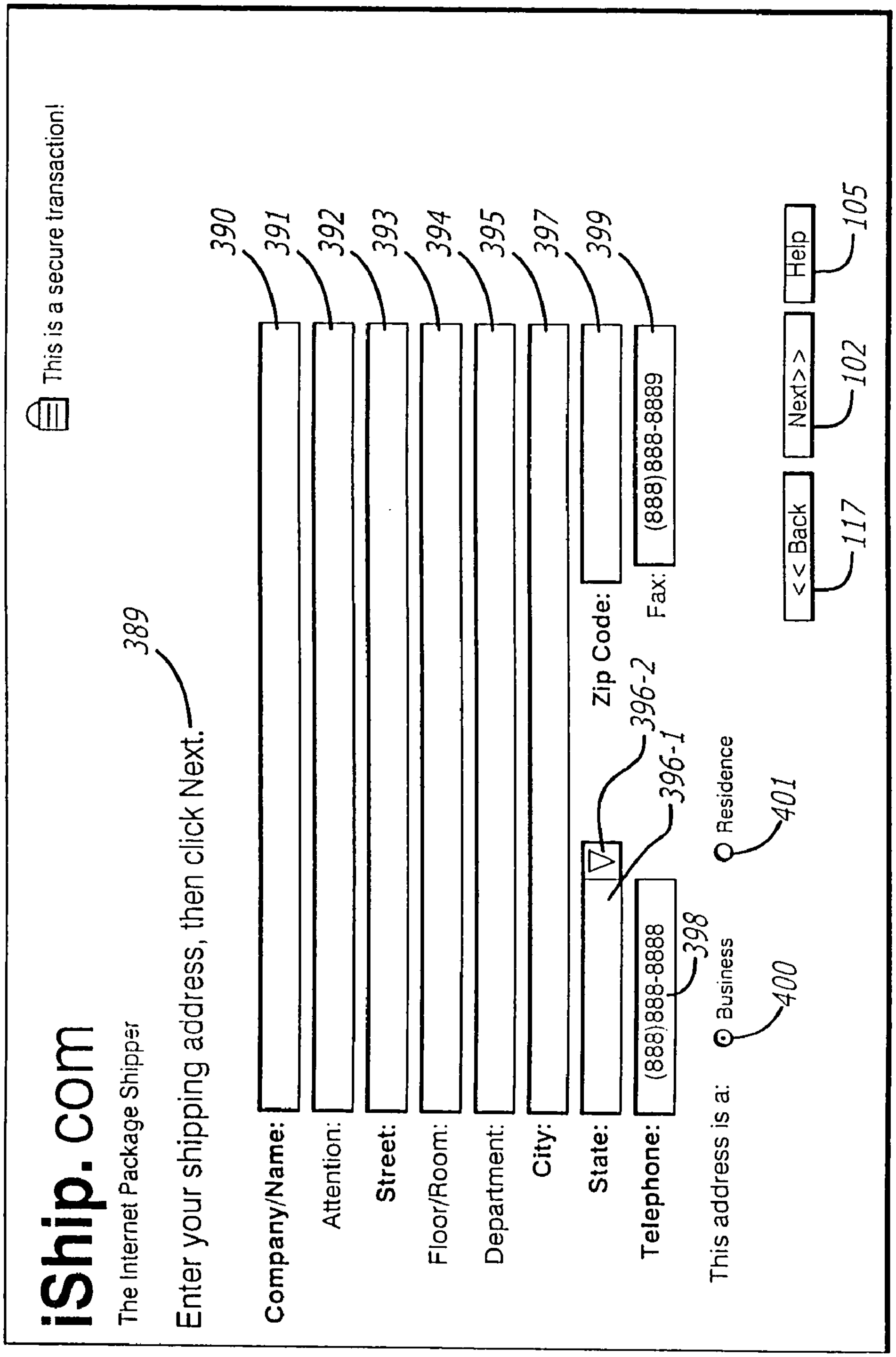
FIG. 45 is a graphic representation of an exemplary embodiment of the Buyer Shipping Information Collection screen in an exemplary embodiment of the System in an independent system eCommerce environment.
Figure 46:
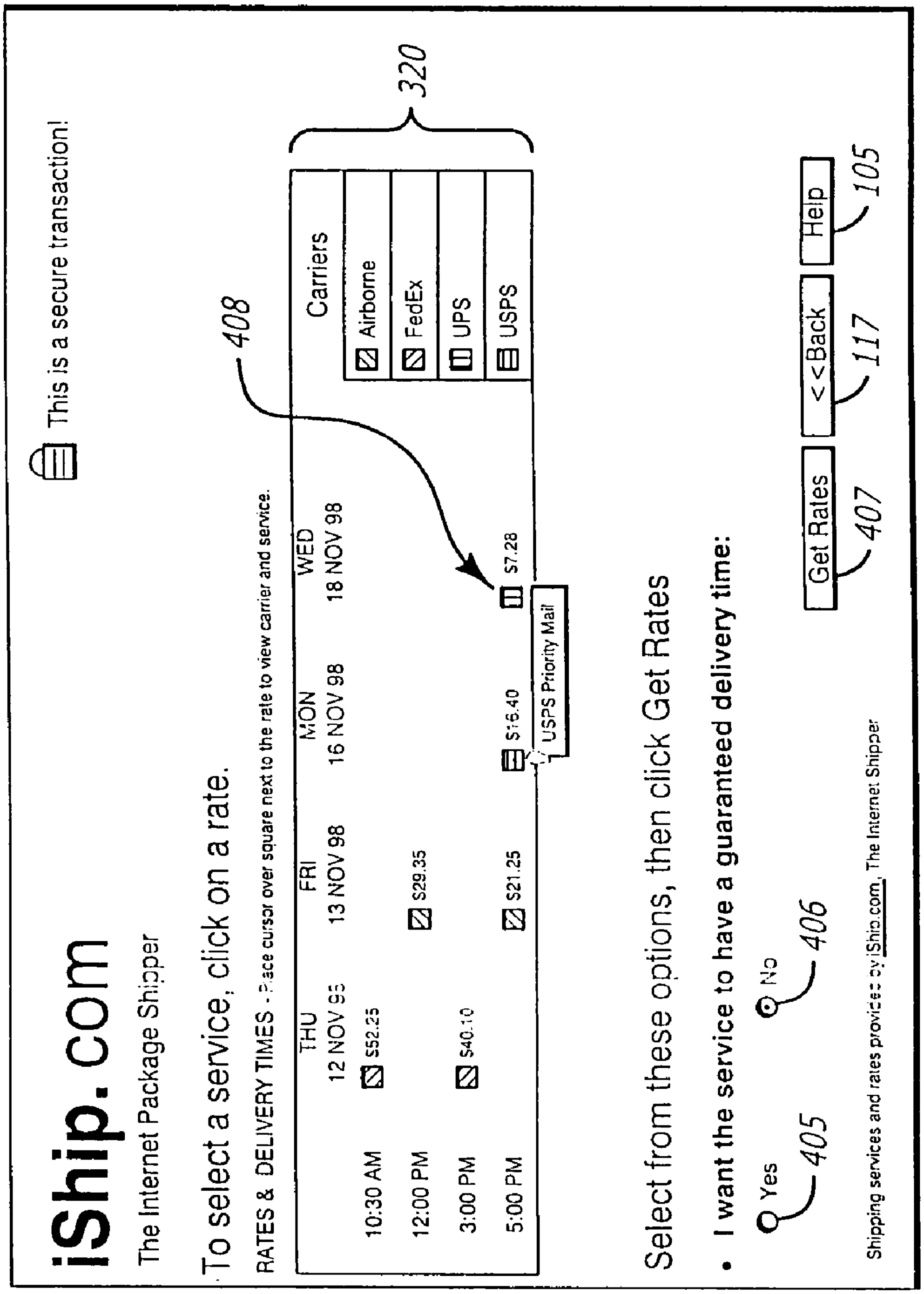
FIG. 46 is a graphic representation depicting an alternative exemplary embodiment of a dynamically dimensioned, multi-carrier, multi-service shipping rates comparison Graphic Array in an alternative exemplary embodiment of the System in an independent system eCommerce environment.

FIG. 45 is a graphic representation of an exemplary embodiment of the Buyer Shipping Information Collection screen (61, FIG. 10D). The System requests that the Buyer input the Buyer's delivery address information and then click the Next button 389. The Buyer inputs the delivery address information including the Company/Name 390, the Attention to name 391, the street address 392, the floor/room number 393, the department 394, the city 395, the state 396-1 using the pull down menu button 396-2, the zip code 397, the telephone number 398, the fax number 399, and whether the delivery address is a business 400 or a residence 401. If the Buyer then clicks the Next button 102, the System validates the information supplied by the Buyer and displays a screen (62, FIG. 10D) as depicted in FIG. 46 containing a selection as to whether yes 405 or no 406 the Buyer wants a guaranteed delivery time. Once the Buyer selects the guarantee choice, then the Buyer clicks the Get Rates button 407 to request that the System prepare and display the multi-carrier, multi-service shipping rates comparison Graphic Array 320.

An exemplary embodiment of the Graphic Array 320 in an exemplary eCommerce embodiment of the invention is depicted in FIG. 46. The Graphic Array 320 presents a multi-carrier, multi service rate and time shipping cost comparison as similarly disclosed above and described with respect to FIG. 36A.

The System creates the Graphic Array in much the same way as is disclosed above with respect to FIG. 36A except that, with respect to the eCommerce embodiment, instead of only Shipper input, the System collects origination data including origin zip code, subject parcel data, and Carrier/Service filtering data from the Seller, and then completes the Parcel Specifications for the subject parcel by collecting input from the Buyer, including destination zip code.

Using the subject parcel's Parcel Specifications, the System 1 is programmed to access databases containing information about each supported Carrier. Each supported Carrier has a unique rating schedule, delivery and pickup rules and schedules, and certification requirements (the "Carrier Rules"). The System 1 is further programmed to apply each supported Carrier's Rules to each Shipper's Parcel Specifications for the corresponding Subject Parcel. The System calculates the Shipping Charges based on zip-to-zip pricing where the Seller has provided the origin zip code and the Buyer has provided the destination zip code.

The System provides an online display of a Dynamically Dimensioned Multi-Carrier Graphic Array such as is depicted in FIG. 46. If the Seller selected as the Seller's preference, "Item cost includes shipping charges" (170, FIG. 21), then the rates displayed will be "FREE". If the Seller selected as the Seller's preference, "Buyer pays actual shipping charges" (171, FIG. 21), then the rates displayed with be the total shipping charge as calculated according to each Carrier's rules for each Service available according to the Seller's expressed preferences. If the Seller selected as the Seller's preference, "Buyer pays shipping and additional charges" (172, FIG. 21), then the System will calculate and display rates that are the sum of: 1) the shipping rate for the applicable service according to each Carrier's rules; 2) If the Seller checked "Add Percentage of Shipping Cost" (173, FIG. 21), the product of the percentage entered in the Percentage of Shipping Cost field (174, FIG. 21) and the total shipping rate calculated according to the Carrier's rules; 2) if the Seller checked "Add Fixed Handling Charge" (175, FIG. 21), the dollar value entered in the Fixed Handling Amount field (176, FIG. 21); and 4) if the Seller indicated "Add System Service Fee" (177, FIG. 21), then the System Service Fee amount as indicated in the System database 22.

The Dynamically Dimensioned Multi-Carrier, Multi-Service Graphic Array online display presents only rating and delivery timing information for the Carriers that offer shipping of the particular Subject Parcel according to the particular Shipper's Parcel Specifications and which conform with the Seller's Carrier/Service preferences as selected according to the available options as described above regarding FIGS. 19 and 20.

The Buyer uses a user input device such as a mouse, track ball, or the like, to pick a Carrier and Service. To make the selection, the Buyer, for instance, places the cursor of the Buyer's PC on the displayed Carrier cell entry (e.g., 408 as depicted in FIG. 46; e.g., 1065 as depicted in FIG. 36A) in the Graphic Array and clicks the Buyer's user input device (the "Selected Carrier").

Once the Shipper selects a particular Graphic Array Carrier cell element, (e.g., 408 as depicted in FIG. 46; e.g., 1065 as depicted in FIG. 36A) the System then processes the shipping transaction. In an exemplary simplified Internet embodiment of the invention, the System processes the Shipper's shipping transaction using Shipper information from the Shipper Database 1195 (e.g., as depicted in FIG. 39A) and information for the Selected Carrier from the Carrier Database 1404*a* through 1404*n* (e.g., as depicted in FIG. 39A). In an exemplary eCommerce embodiment of the invention, the System processes the shipping transaction using information supplied by both the Seller/Shipper and the Buyer/Recipient and information for the Selected Carrier.

In an eCommerce embodiment of the invention, once the Buyer selects a Carrier and Service, the System prepares a Shipping Summary Screen (63, FIG. 10D) an exemplary embodiment of which is depicted in FIG. 47. The System reports a summary of the Shipping information including the delivery address 410, the Carrier/Service 411 and the itemized and total charges for the item and shipping 412. In addition, if the Seller requested the System to collect payment information, the System provides a drop down selection menu button 413-2 which when clicked will display a list of the methods of payment 413-1 previously selected by the Seller (e.g., 179*a*-179*g*, and 180, as depicted in FIG. 21). If a credit card payment method is indicated, the Buyer is required to supply a credit card number 414, and the expiration date month 415-1 (using a drop down menu button 415-2) and year 416-1 (using a drop down menu button 416-2). The Buyer is instructed to click the Cardholder Information button 417 if the cardholder name and address are different than the shipping name and address 419. If the Cardholder and shipping information match, the Buyer clicks the Send button 418 to send the payment information to processing.

In an exemplary simplified Internet embodiment of the invention, the System generates a Shipping Summary Screen once the Shipper has picked a particular Carrier/Service entry from a Graphic Array comparison. FIG. 48 depicts an alternative exemplary embodiment of a Shipping Summary Screen such as in an exemplary simplified Internet embodiment of the invention. In the embodiment depicted in FIG. 48, the Shipper has picked a particular Carrier/Service entry from a Graphic Array comparison (e.g., 1065 as depicted in FIG. 36A). The Shipping Summary Screen depicted in FIG. 48 displays the Shipper Parcel Specifications 1110 and provides a detailed list and total, of the selected Carrier's charges 1111. Clicking on the "Next" button 102 causes the display of the first of a series of several screens (not shown) requesting the necessary Shipper and Recipient information. Once the Shipper has input all of the necessary information, the Shipper is presented with a final Summary and Payment Screen (not shown), which in addition to the fields depicted in FIG. 48, further requests Payment information, such as Payment Method, Credit Card No., Expiration Date, and Credit Card Type.

Figure 49:
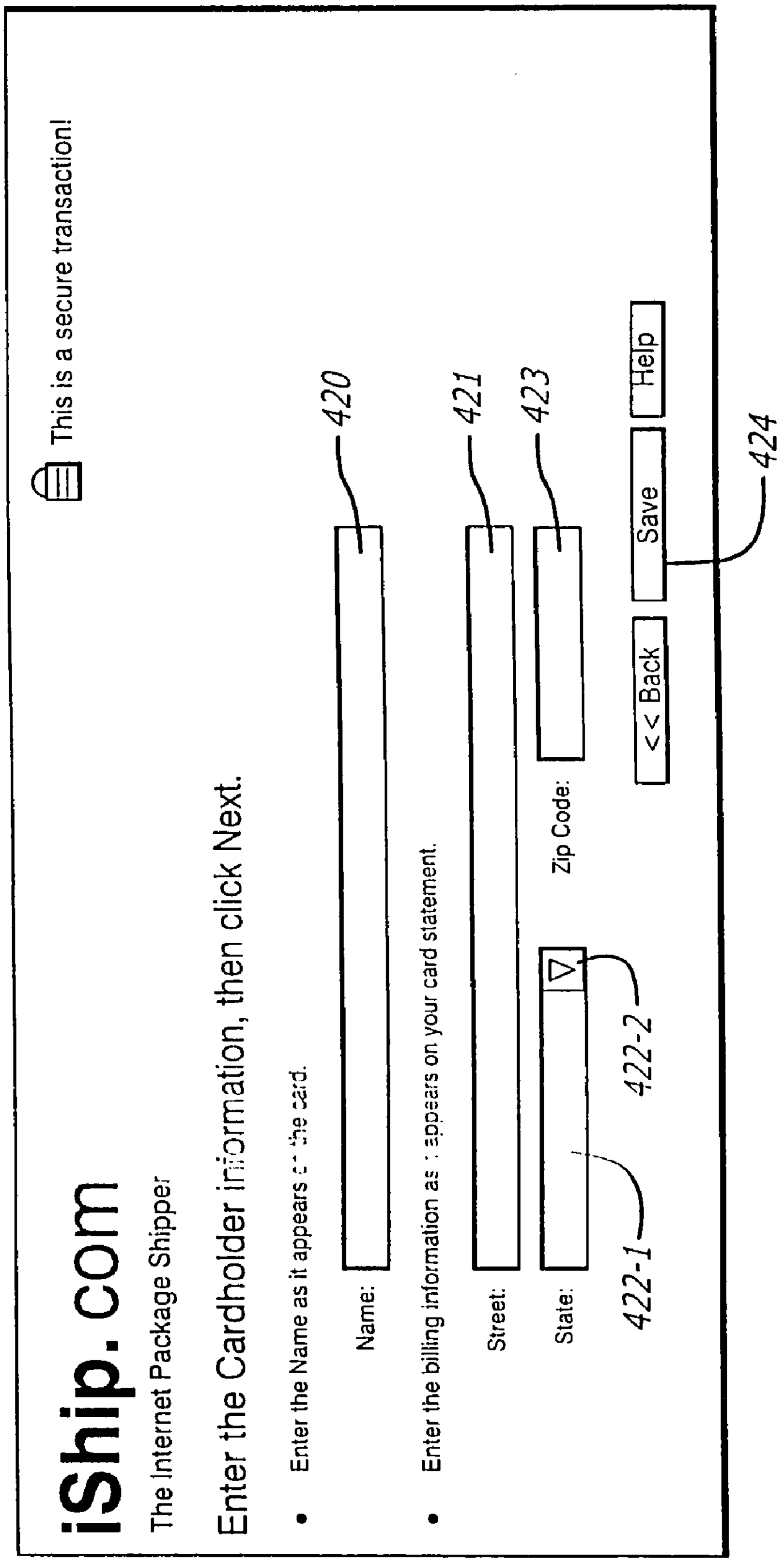
FIG. 49 is a graphic representation depicting an exemplary embodiment of a Cardholder Information collection screen in an exemplary embodiment of the System in an independent system eCommerce environment.

Returning to the eCommerce embodiment depicted in FIG. 47, if the Buyer clicks the Cardholder Information button 417, the System displays a Cardholder Information collection screen (64, FIG. 10*d*), an exemplary embodiment of which is depicted in FIG. 49. The Buyer is asked to supply the Cardholder name 420, Street address 421, State 422-1 (using a pull down menu button 422-2), and zip code 423. The Buyer clicks the Save button 424 to save the cardholder information.

Figure 50:
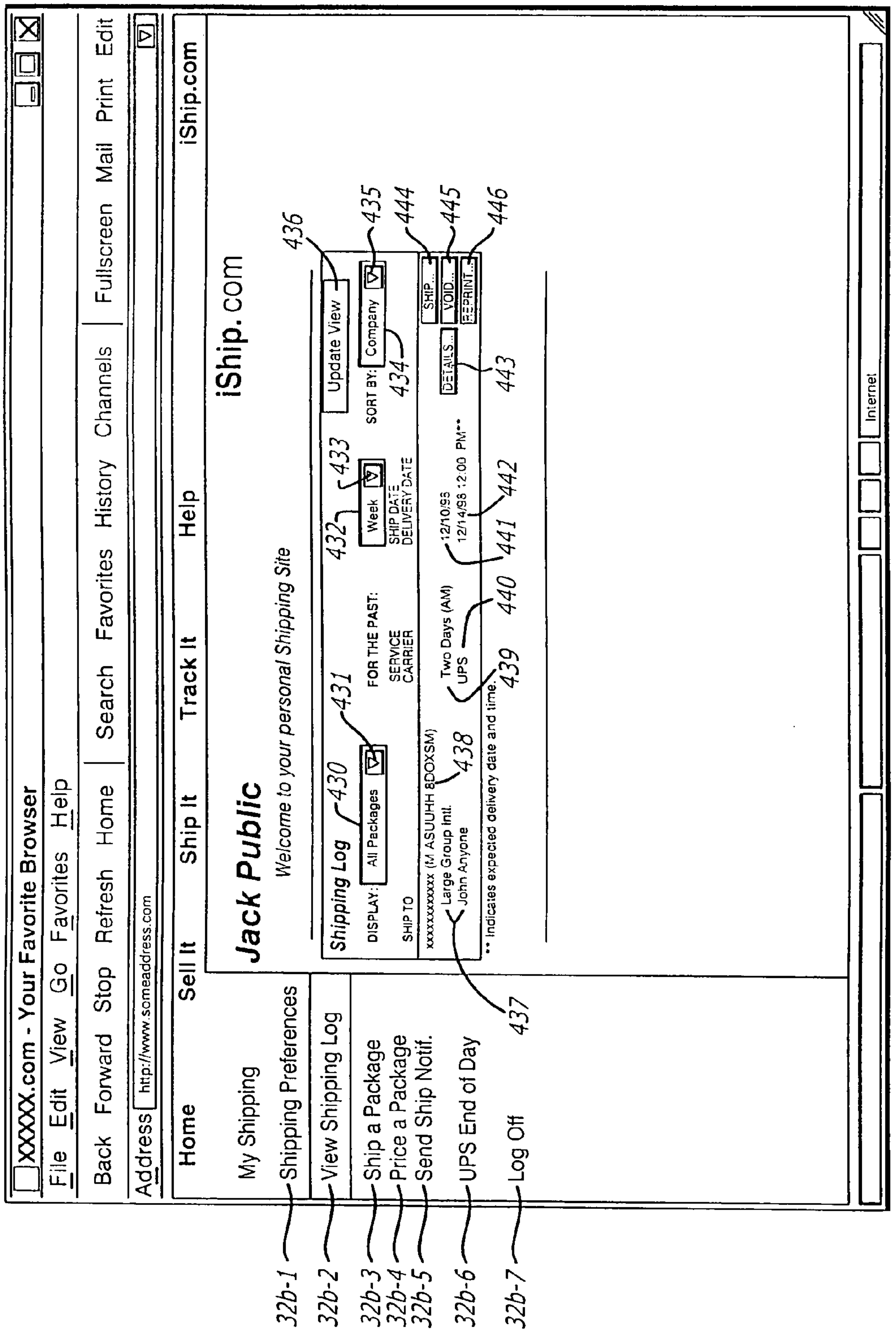
FIG. 50 is a graphic representation depicting an exemplary embodiment of a System's Shipping Log in an exemplary embodiment of the System in an independent system eCommerce environment.

As depicted in FIG. 10D, once the Buyer in an eCommerce embodiment has completed all Buyer Response screens, the System enters the System package tracking number in the System's Shipping Log for the Seller, an exemplary embodiment of which is depicted in FIG. 50. The System also notifies the Seller via e-mail (66, FIG. 10D) that the Buyer has completed all of the necessary shipping and payment information.

E. Shipping the Package

Figure 51:
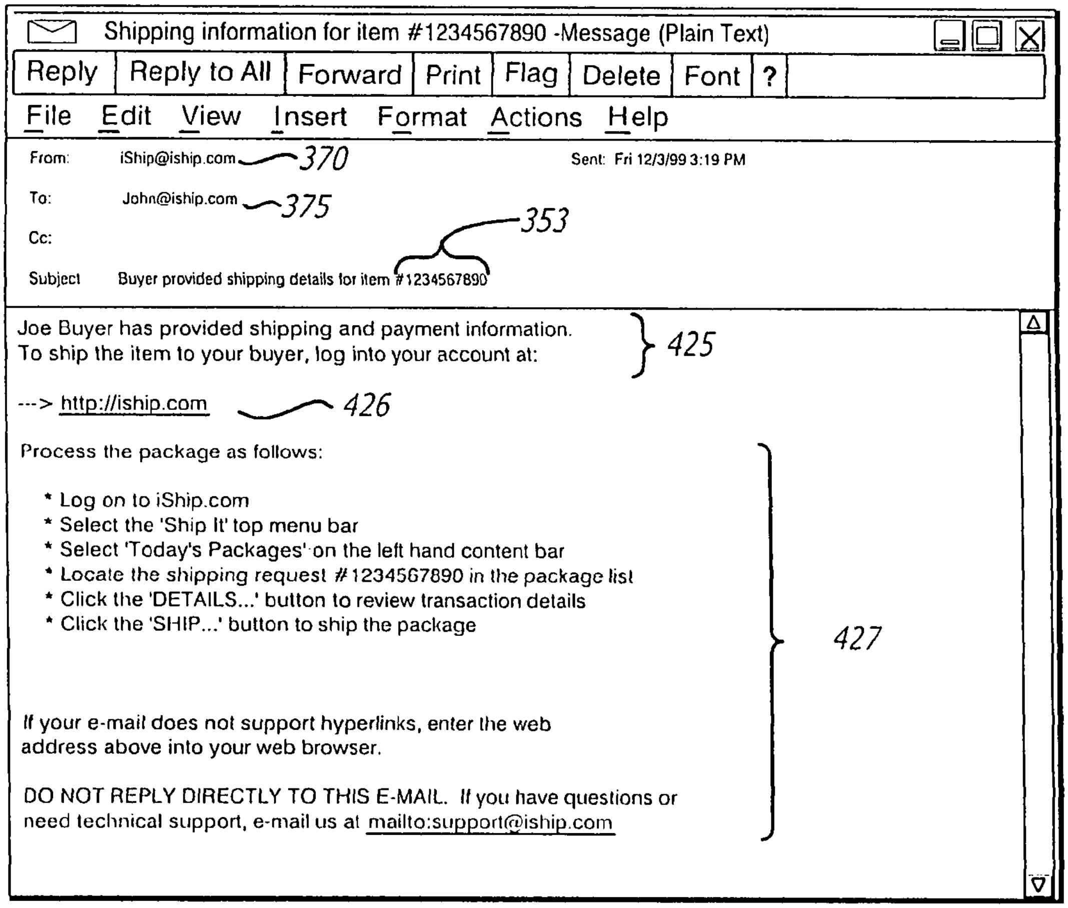
FIG. 51 is a graphic representation depicting an exemplary embodiment of a Seller notification e-mail in an exemplary embodiment of the System in an independent system eCommerce environment.

In an exemplary eCommmerce embodiment of the invention, the System notifies the Seller via e-mail (66, FIG. 10D) once the Buyer has completed all of the necessary shipping and payment information. An exemplary embodiment of a Seller notification e-mail is depicted in FIG. 51. In the Seller notification e-mail, the System identifies the System as the sender 370, the Seller's e-mail 107 (e.g., as depicted in FIG. 12) as the recipient 375, and the item number 353. The e-mail contains a message 425 and instructions 427 to log on to the System 426 to view a Shipping Log. The Shipping Log provides a platform with which the Shipper/Seller controls the shipping and attendant functions for all packages shipped or to be shipped by the particular Shipper/Seller.

The Seller can view the Shipping Log by selecting the View Shipping Log submenu option 32*b*-2 from the Ship It menu option 32*b* (which provides various submenu options including Shipping Preferences 32*b*-1, View Shipping Log 32*b*-2, Ship a Package 32*b*-3, Price a Package 32*b*-4, Send Shipment Notification 32*b*-5, UPS End of Day 32*b*-6 and Log Off 32*b*-7). The Shipper/Seller can control the display order of the Shipping Log by selecting from a choice of several reporting controls. The Shipping Log (65, FIG. 10D) as depicted in FIG. 50 provides reporting controls such as Display selection 430 (with a pull down menu button 431), time period 432 (with a pull down menu button 433), and sort by 434 (with a pull down menu button 435). The Seller can click on the Update View button 436 to request an up-to-date report. Each Shipping log line item contains the System tracking number 438, the addressee name 437, the Carrier 440 and Service 439, the Ship date 441 and delivery date 442, and control buttons that allow the Seller to request details 443, instruct the system to ship the item 444, void the shipment 445, or reprint a label 446.

FIG. 52 is a graphic representation of an exemplary embodiment of a Void Package screen that the System displays if the Seller clicks on the Void button 445 on the Shipping Log. The Void Package screen provides a summary report of the information about the particular package 452, provides a View Details button 451 if the Seller wants additional detailed information about the package, and a Void Package button 453 if the Seller finally decides to void the identified package.

FIG. 53 is a graphic representation of an exemplary embodiment of a Reprint Label screen which provides a report about the package 454, a View Details button 451, and a Generate Label button 455. If the User clicks the Generate Label button 455, the System will generate and print a shipping label (69, FIG. 10E) for according to the appropriate Carrier and Service, as limited by the Seller and as finally selected by the Buyer.

As mentioned above, in some embodiments, the Shipper can use the System to locally print on the Shipper's printer device a bar-coded shipping label according the Selected Carrier's certification standards. In some embodiments, the bar-coded shipping label, including two dimensional bar code labels, and other types of shipping labels, can be printed on either a thermal label printer or on a laser printer. The Shipper specifies the type of printer to the system during initial setup procedures. Thereafter, the System uses, as appropriate, the thermal printer or laser printer module to prepare the label image for printing on the Shipper's printer.

Figure 54:
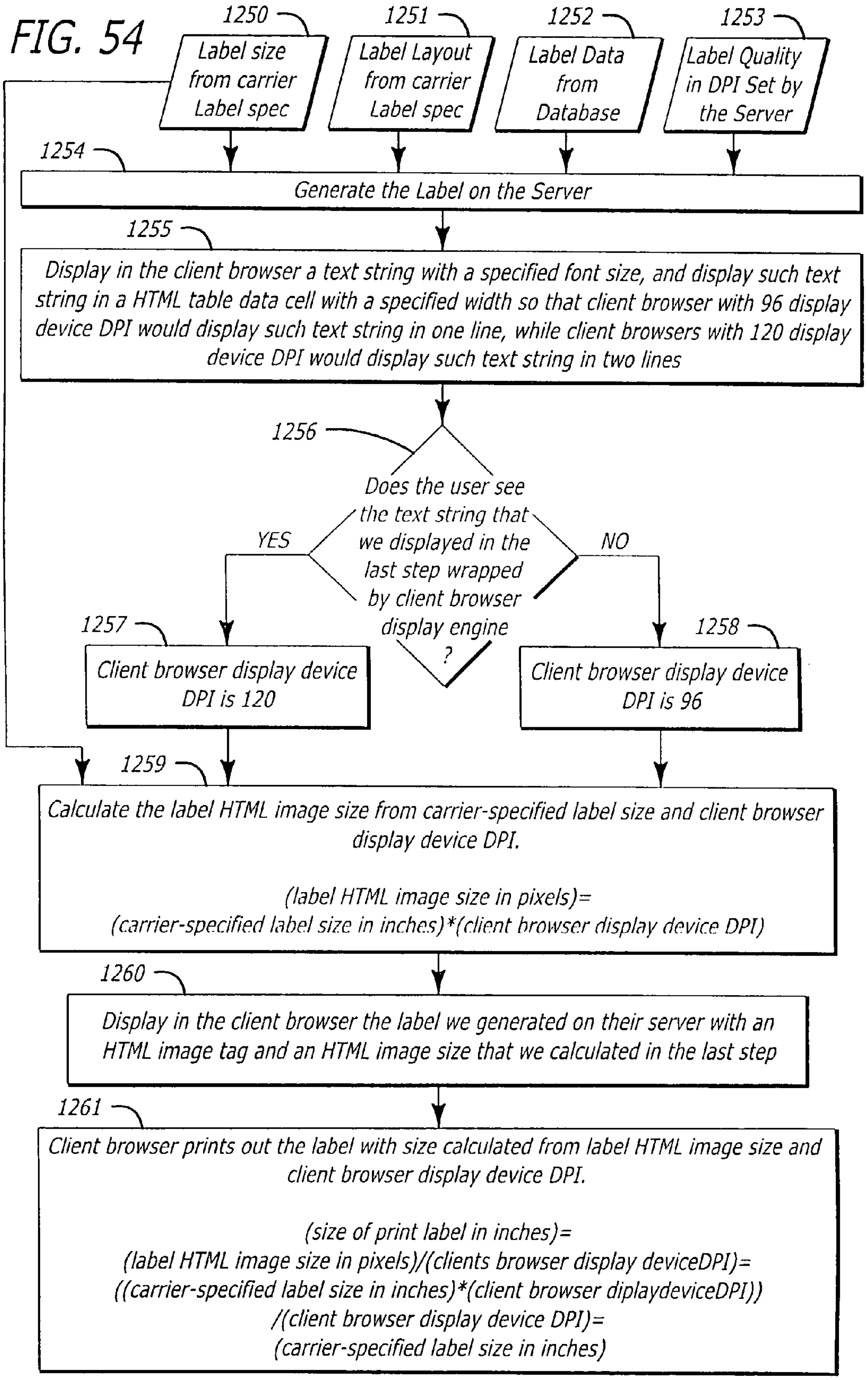
FIG. 54 is a high level flow diagram depicting an exemplary embodiment of Label Printing in an exemplary embodiment of the System in an Internet environment.

FIG. 54 depicts a flow diagram of one embodiment of the aspect of the invention that provides printing of bar-coded shipping labels on printer devices which are compatible with the client system on which the web browser is running, such as an HP-compatible laser printer. As depicted in FIG. 54, one of the NOC Servers, for instance, the Shipping Server, e.g., 21*t* as depicted in FIG. 7, gets the Label Size from the Carrier Label Specification 1250, the Label Layout from the Carrier Label Specification 1251, Label Data from the Shipper Database 1252, and the Label Quality in Dots Per Inch ("DPI") as set by the Server 1253, and uses this information to Generate the Label 1254.

The Server then creates, and causes the display on the client browser's display device of, a text string with a specified font face and in a specified font size in an HTML table data cell with a specified width 1255. If the client browser is using a 096 display device DPI, the display device will display said text string in the HTML table data cell in a single line. If on the other hand, the client browser is using a 120 display device DPI, the display device will display said text string in the HTML table data cell in two lines.

In creating the display of the text string, the Server also sends a message to the Shipper asking the Shipper to answer the following question: do you see the text string displayed on your screen as a single line or as wrapped text in multiple lines? The Server receives the Shipper's response and determines from the response whether the Shipper's display device has displayed the text as a single line or as wrapped text in multiple lines 1256. If the text is displayed as a single line, then the client browser 1258 display device DPI is 96. Otherwise, the client browser 1257 display device DPI is 120.

Next, the Server calculates the shipping label HTML image size in pixels 1259 by multiplying the Carrier-specified label size from the Carrier Label Specification times the client browser display device DPI as determined by the previous step.

Next, the System displays the generated label image in the client browser 1260 with an HTML image tag and an HTML image size in pixels as calculated in the prior step.

The client browser calculates the size of the label to be printed in inches by dividing the label HTML image size in pixels as calculated in a prior step by the client browser display device DPI 1261; the client browser then prints out the label with the size calculated 1261.

Figure 55:
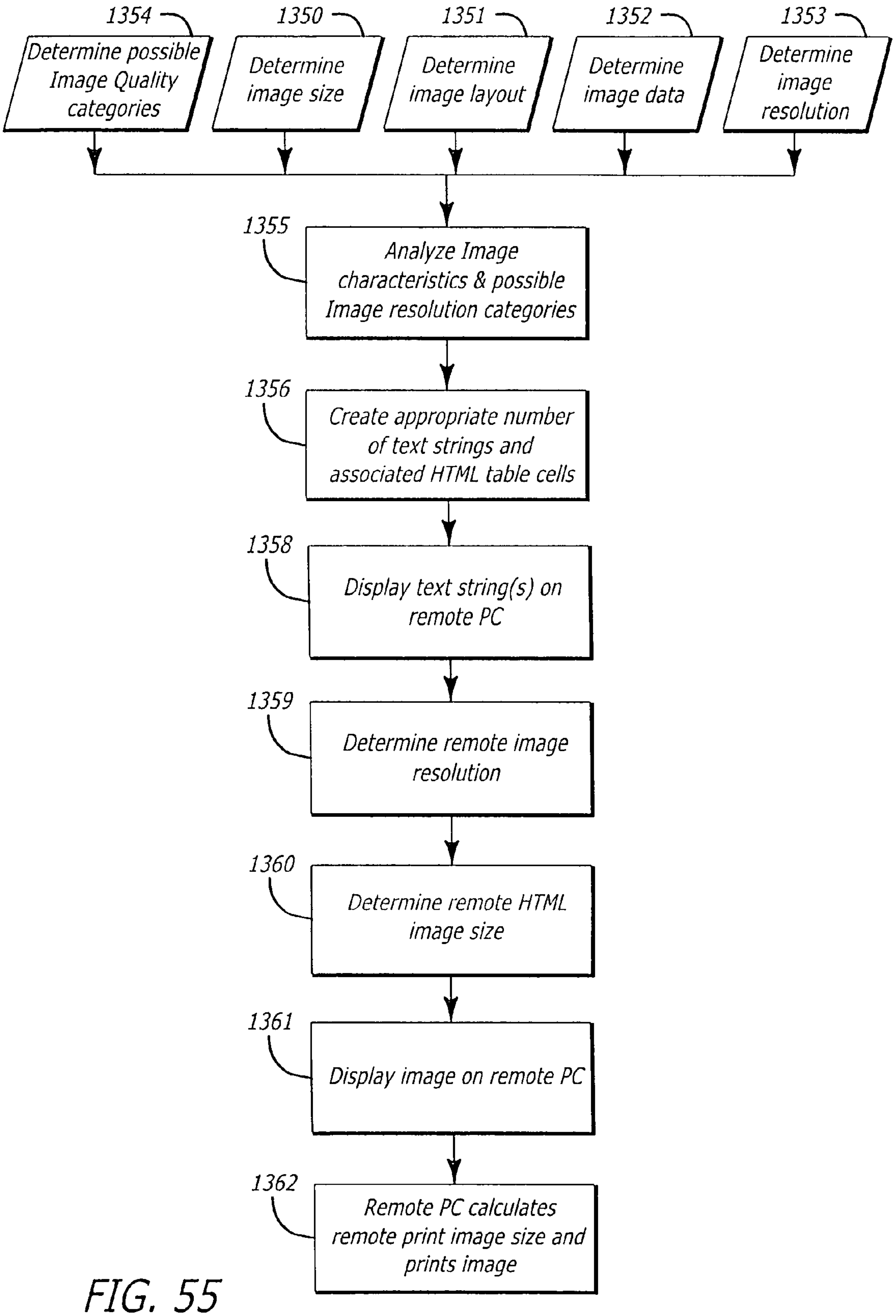
FIG. 55 is a high level flow diagram depicting an exemplary embodiment of Image Printing in an exemplary embodiment of the System in an Internet environment.

FIG. 55 depicts a flow diagram of an exemplary embodiment of the aspect of the invention that provides printing of dimensionally accurate images, such as dimensionally sensitive symbologies including two-dimensional bar codes and other two-dimensional machine readable symbologies. This aspect of the invention provides the printing of such dimensionally accurate images on various types of printer devices including among others HP-compatible laser printers. The printer devices can be configured with remote computers, such as PC's, that will receive signals to print the dimensionally accurate image over a communications network such as the Internet. Each PC having a client browser or executing like software, and each PC being configured with a pre-established Image Resolution that applies to the display device and the printer device configured with the PC.

As depicted in FIG. 55, a computer, such as Server 20*t* as depicted in FIG. 7, determines the Image Size 1350, the Image Layout 1351, any relevant Image Data 1352, and the Image Resolution in Dots Per Inch ("DPI") or in any other measure of Image Resolution 1353. The Server 20*t* uses this information to Generate the Image.

Alternatively, the Image has previously been created; the Server 20*t* determines from the Image, the Image Size 1350, the Image Layout 1351, any relevant Image Data 1352, and the Image Resolution in DPI or in any other measure of Image Resolution 1353 (collectively referred to hereinafter as the "Image Characteristics").

The Server 20*t* determines the possible Image Resolution Categories and associated values for client PC's 1354. Image Resolution Categories and associated values include information such as the number of text strings, and the length of and characteristics (font face, font size, and HTML table cell width) of each of the identified number of, text strings that must be used to determine the Image Resolution of client display devices 1355-1356.

An HTML table cell width is fixed in that the physical width of the display of the HTML table cell does not change depending upon the resolution of the client device; a text string comprised of characters having a particular font and font size has a scalable width, depending upon the resolution of the client device resolution. Use of an HTML table cell to measure the resolution of client devices is not a limitation of the invention. In an alternative embodiment, a graphic element other than an HTML table cell, having a fixed width, is used to measure the resolution of client devices.

The possible Image Resolution Categories and values are stored in the memory of the Server 20*t* and updated on some basis. In an alternative embodiment, the possible Image Resolution Categories and values are input into the Server computer.

The Server 20*t* then analyzes the Image Characteristics, and the possible Image Resolution categories and/or values 1355, and creates the appropriate number of text strings and associated HTML table cells 1356. Each text string is created to have a specified font face, a specified font size, and an associated HTML table cell with a specified width 1356. The computer then causes the display of the text strings in the associated HTML table cells on the remote client PC's display device 1358.

In creating the display of the text string, the Server also sends a message to the recipient PC asking the user to answer the following question: is the first text string displayed on your screen as a single line or as wrapped text in multiple lines? The Server 20*t* receives the remote user's response and determines from the response whether the remote user's PC's display device has displayed each of the text strings as a single line or as wrapped text in multiple lines 1256. The Server 20*t* then sets the PC's Remote Image Resolution for printing the Image 1359 according to the results of the user's PC's display of the text strings.

Next, the Server calculates the Remote HTML Image Size in pixels 1360 by multiplying the Image Size times the PC's Remote Image Resolution as determined by the previous step.

Next, the Server displays the generated image on the display device of the remote PC 1361 with an HTML image tag and the Remote HTML Image Size in pixels as calculated in the prior step.

The client browser of the remote PC calculates the size of the Image to be printed ("Remote Print Image Size") in inches by dividing the Remote HTML Image Size in pixels by the Remote Image Resolution 1362; the client browser then prints out the Image with the Remote Print Image Size 1362.

Figure 56:
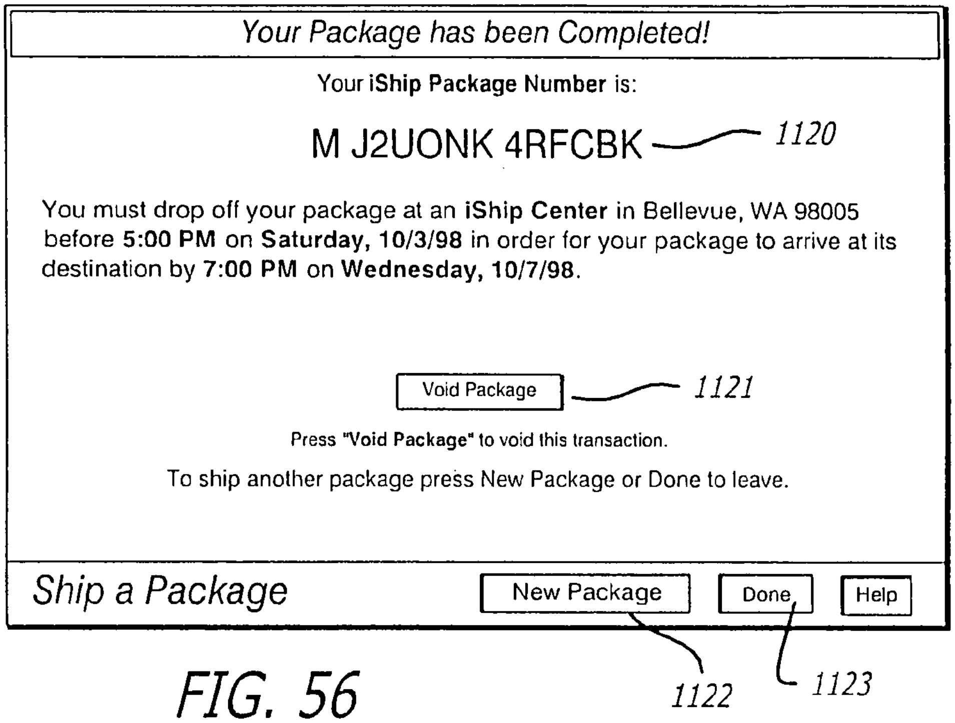
FIGS. 56 through 58 are graphic representations of exemplary online screens with which a user controls the final shipping and label printing for a particular package in an alternative exemplary embodiment in an Internet environment.

In one embodiment of the invention, instead of printing a shipping label at the Shipper's printer, a Package Number 1120 is displayed online on a Package Number Screen with notification that the label will be printed at a shipping location previously designated by the Shipper. FIG. 56 depicts an exemplary embodiment of a Package Number Screen. The Shipper can Void the Package Label at this point by clicking the Void Package button 1121. The Shipper can request shipping of a new parcel by clicking the "New Package" button 1122 or can indicate completion of shipping instructions by clicking the "Done" button 1123.

Figure 57:
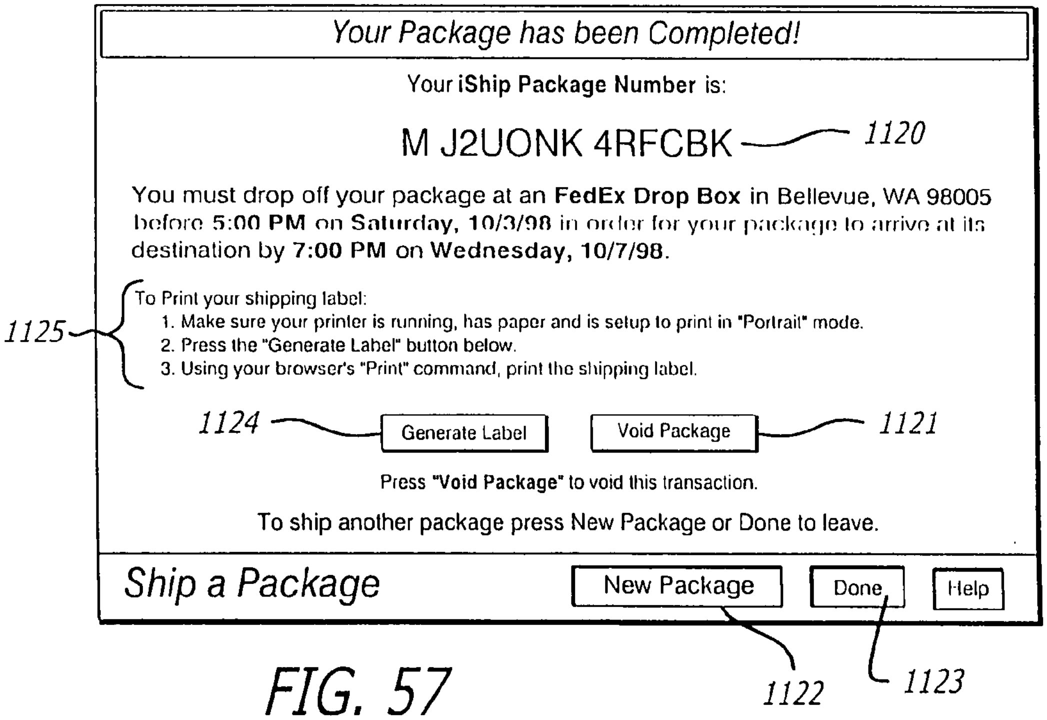

FIG. 57 depicts an exemplary embodiment of a Generate Shipping Label Screen in an exemplary simplified Internet embodiment of the invention. The Shipper is given instructions 1125 as to how to print the label. Clicking the "Generate Label" button 1124 causes the bar-coded label to be generated.

Figure 58:
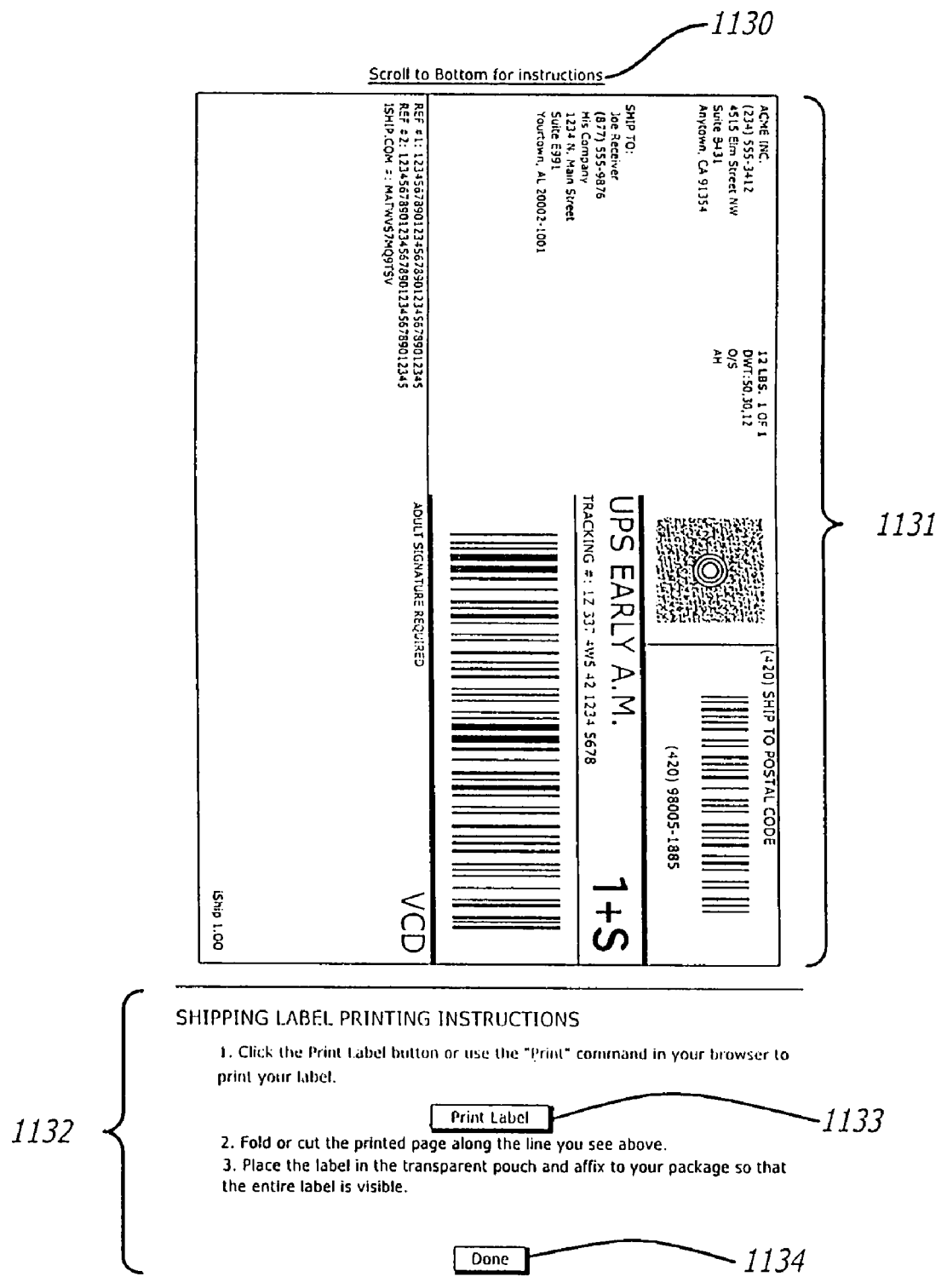

FIG. 58 depicts an exemplary embodiment of a Print Label Screen in an exemplary simplified Internet embodiment of the invention. At the top of the Screen, an instruction 1130 is displayed to scroll to the bottom of the screen for instructions. The generated label 1131 is displayed in the main body of the screen. Instructions for printing the label 1132 are displayed at the bottom of the screen. Clicking the "Print Label" button 1133 (visible only for supported web browsers) will cause the label to be printed. Clicking the "Done" button 1134 will close the web browser window.

Figure 59:
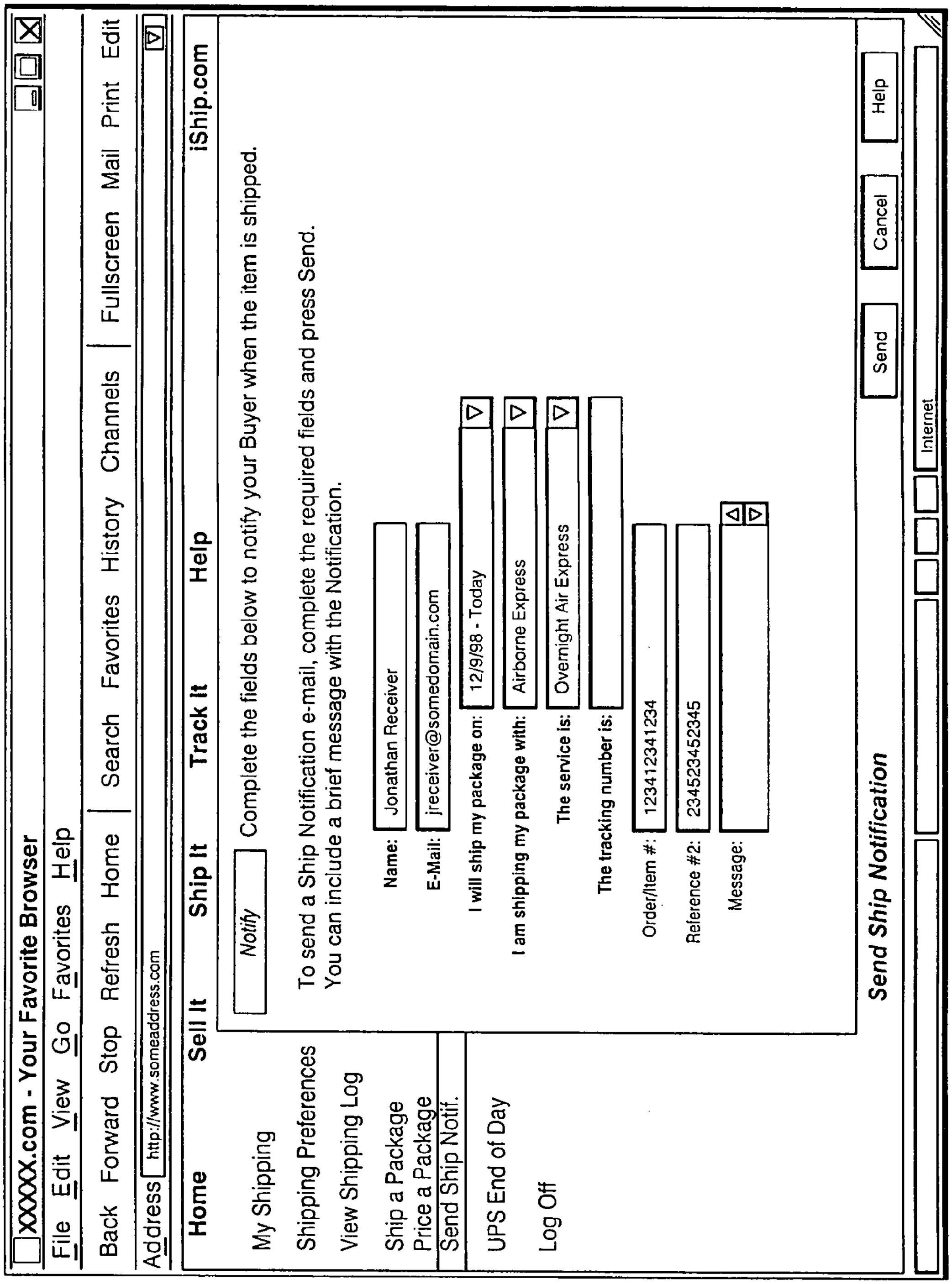
FIG. 59 is a graphic representation of an exemplary embodiment of a Send Ship Notification screen in an exemplary embodiment of the System in an independent system eCommerce environment.

Returning to the exemplary eCommerce embodiment, if the Seller chooses to ship a specified package, e.g., by clicking on the Ship button 444 as depicted in FIG. 50, the System requests the Seller to input information to e-mail a notification to the Buyer that the package is being shipped. FIG. 59 is a graphic representation of an exemplary embodiment of a Send Ship Notification screen (67, as depicted in FIG. 10E). In one eCommerce embodiment, this information is automatically prepared by the System and an e-mail (e.g., 70 as depicted in FIG. 10E) is automatically sent to the Buyer (80, e.g., FIG. 10E) when the Seller ships the package. In one embodiment, the Seller completes the information in this screen only if the Seller ships the package with a Carrier or a service that is not supported by the System.

In an exemplary FIG. 60 depicts an exemplary E-Mail Others "Messages" pop-up Window in an exemplary simplified Internet embodiment which allows the Shipper to identify the "To" or "cc" status of the desired notification 1101 using a drop down menu activator 1102 and which allows the user to enter each e-mail recipient's Name 1103 and E-Mail Address 1104. FIG. 60 depicts two Recipients 1107 and 1108; the screen is exemplary and is not a limitation of the invention.

Figure 61:
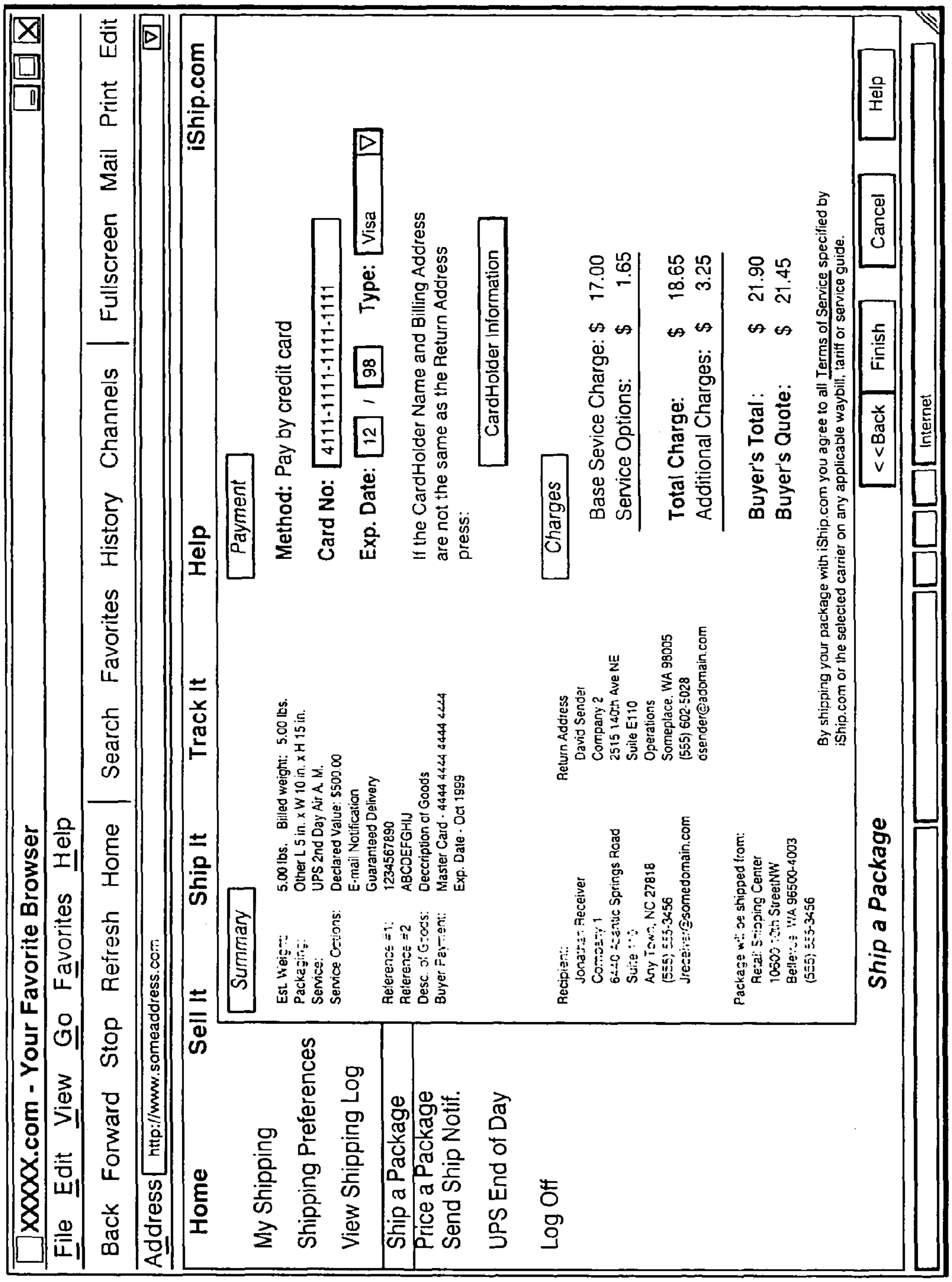
FIG. 61 is a graphic representation depicting an exemplary embodiment of a Ship a Package Summary online report in an exemplary embodiment of the System in an independent system eCommerce environment.

Returning to the exemplary eCommerce embodiment, when the Seller chooses to ship a specified package, the System prepares and displays a Ship a Package Summary report (68, FIG. 10E) an exemplary embodiment of which is depicted in FIG. 61.

Figure 62:
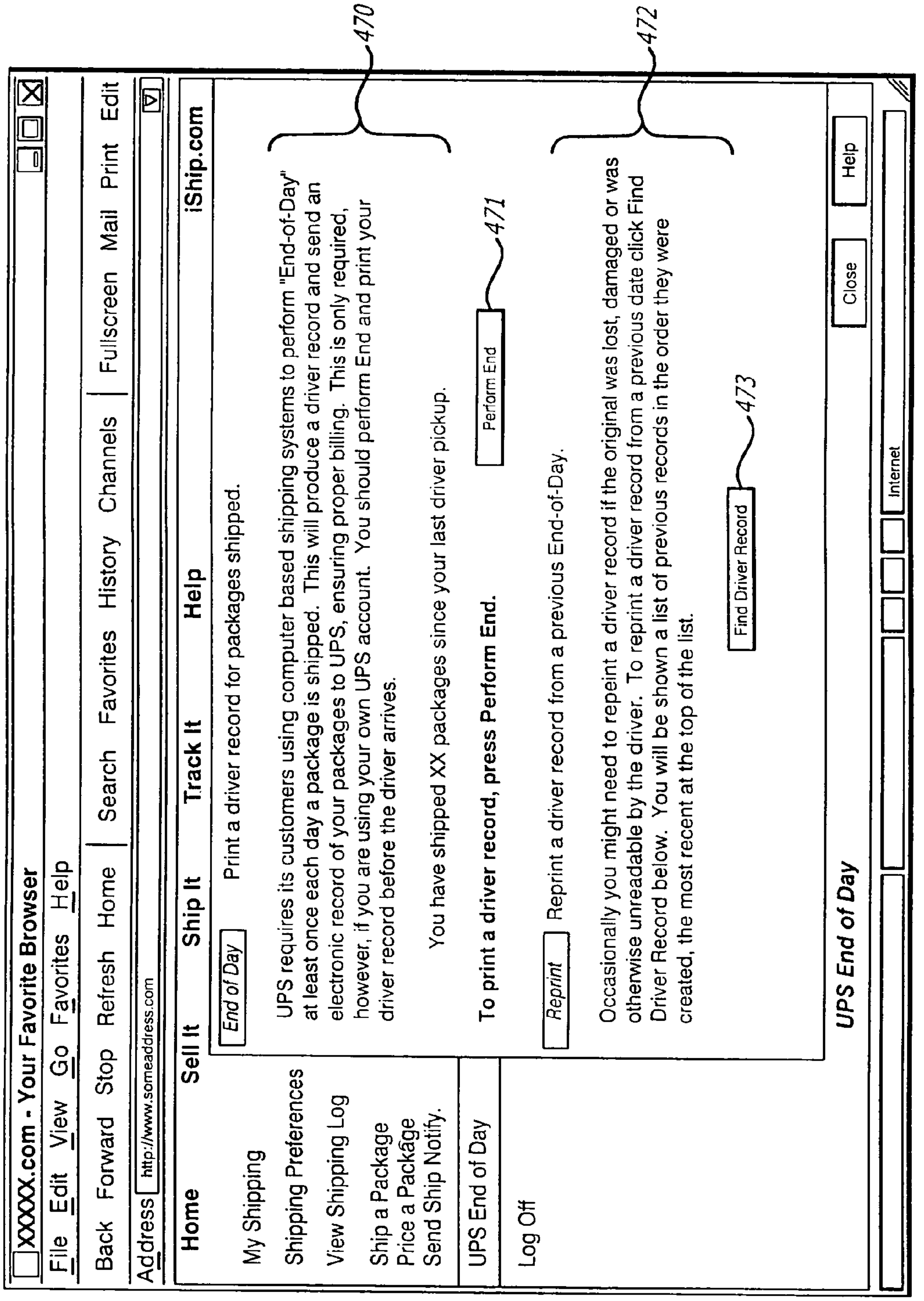
FIG. 62 is a graphic representation depicting an exemplary embodiment of a UPS End-of-Day Screen in an exemplary embodiment of the System in an independent system eCommerce environment.

If the Seller/Shipper ships packages using UPS, the Seller will need to run UPS End of Day processing (71, FIG. 10E) at least once each day a package is shipped using UPS. FIG. 62 is an exemplary embodiment of the UPS End of Day screen. The System provides instructions 470 and a Perform End-of-Day button 471. The System also provides Reprint instructions to reprint a driver record from a previous End-of-Day process 472 and a Find Driver Record button 473.

Figure 63:
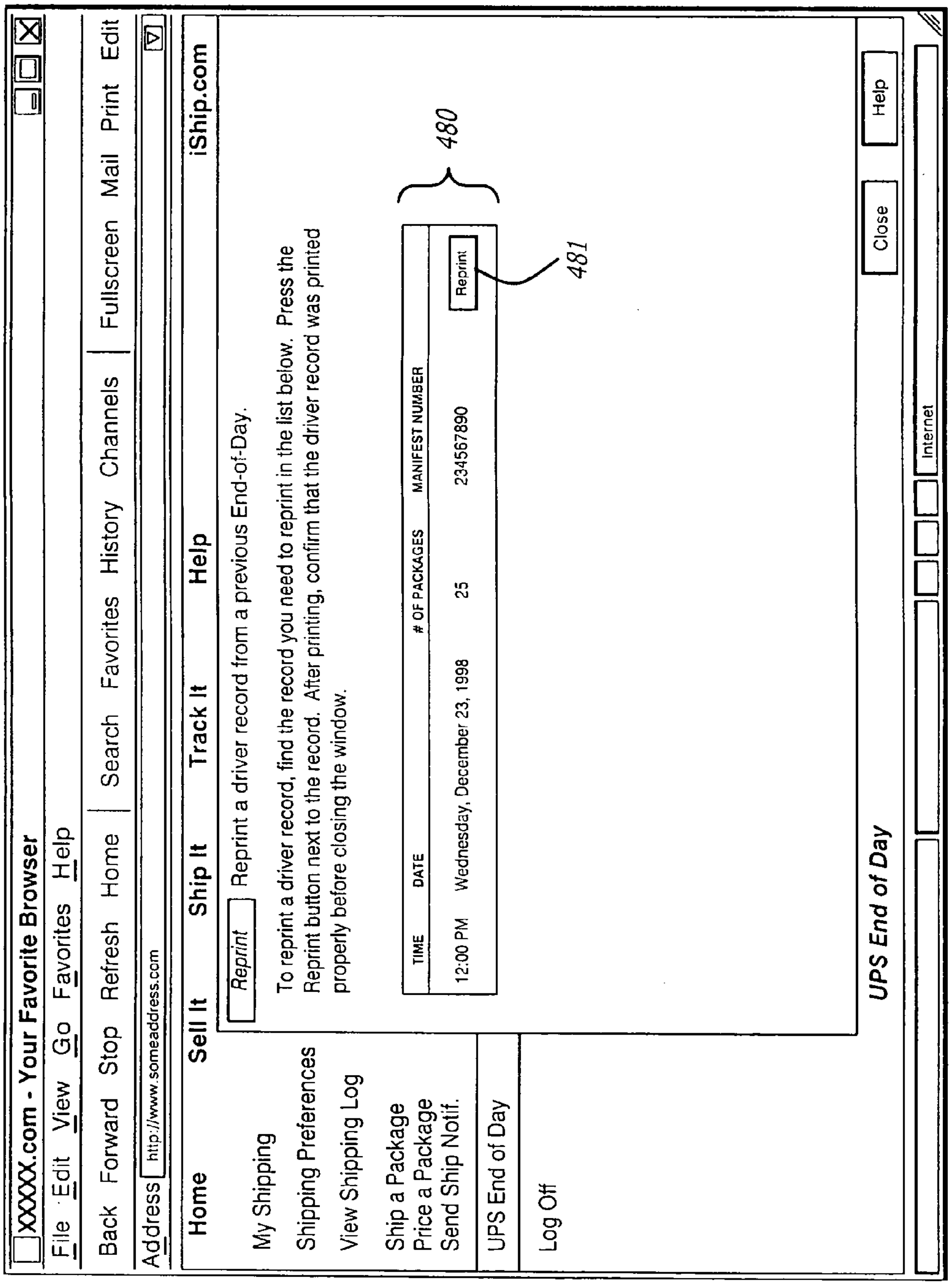
FIG. 63 is a graphic representation of an exemplary embodiment of a Reprint Driver Record Screen in an exemplary embodiment of the System in an independent system eCommerce environment.
Figures 1, 64A:
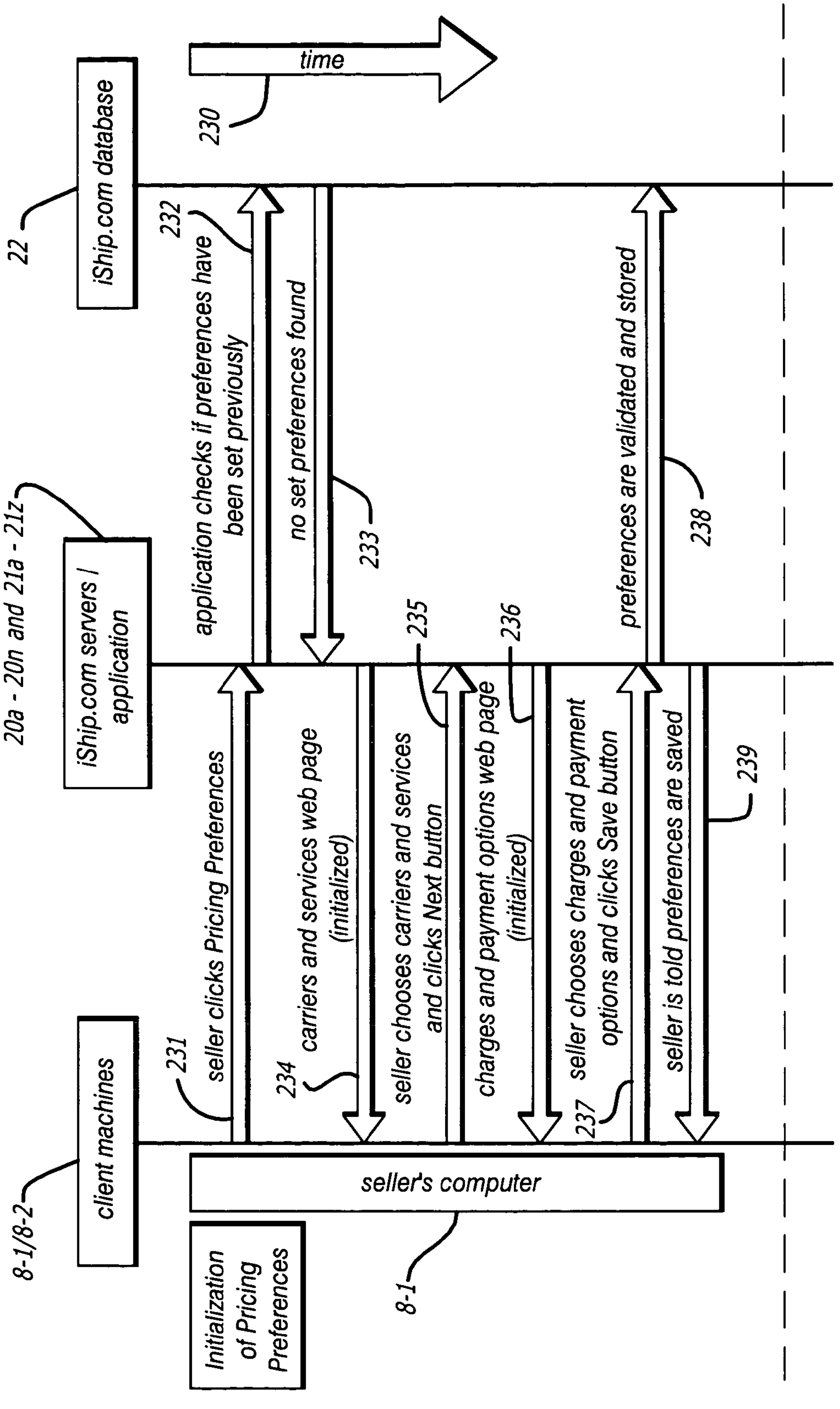
Figures 2, 64A:
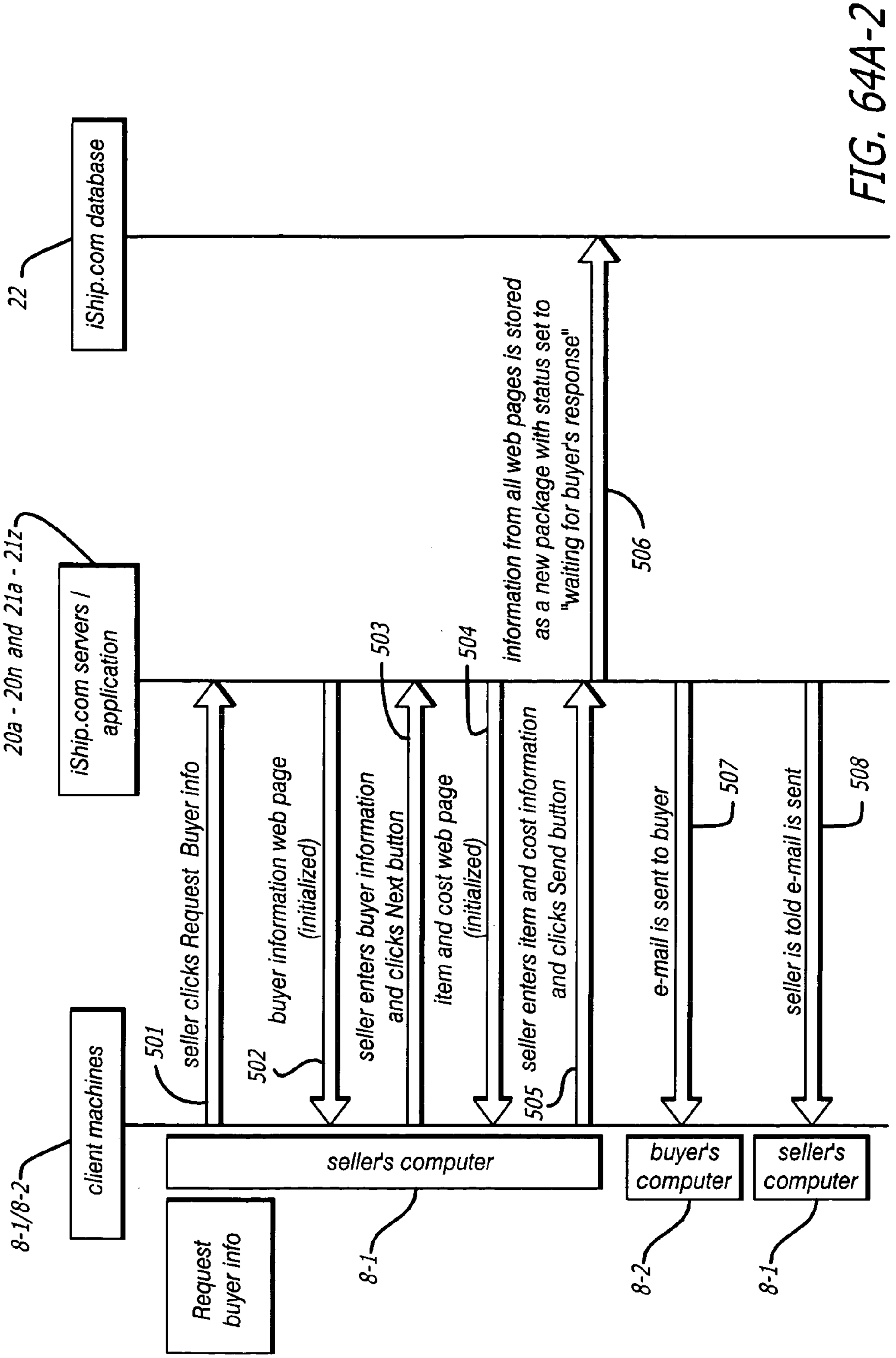
Figures 1, 64B:
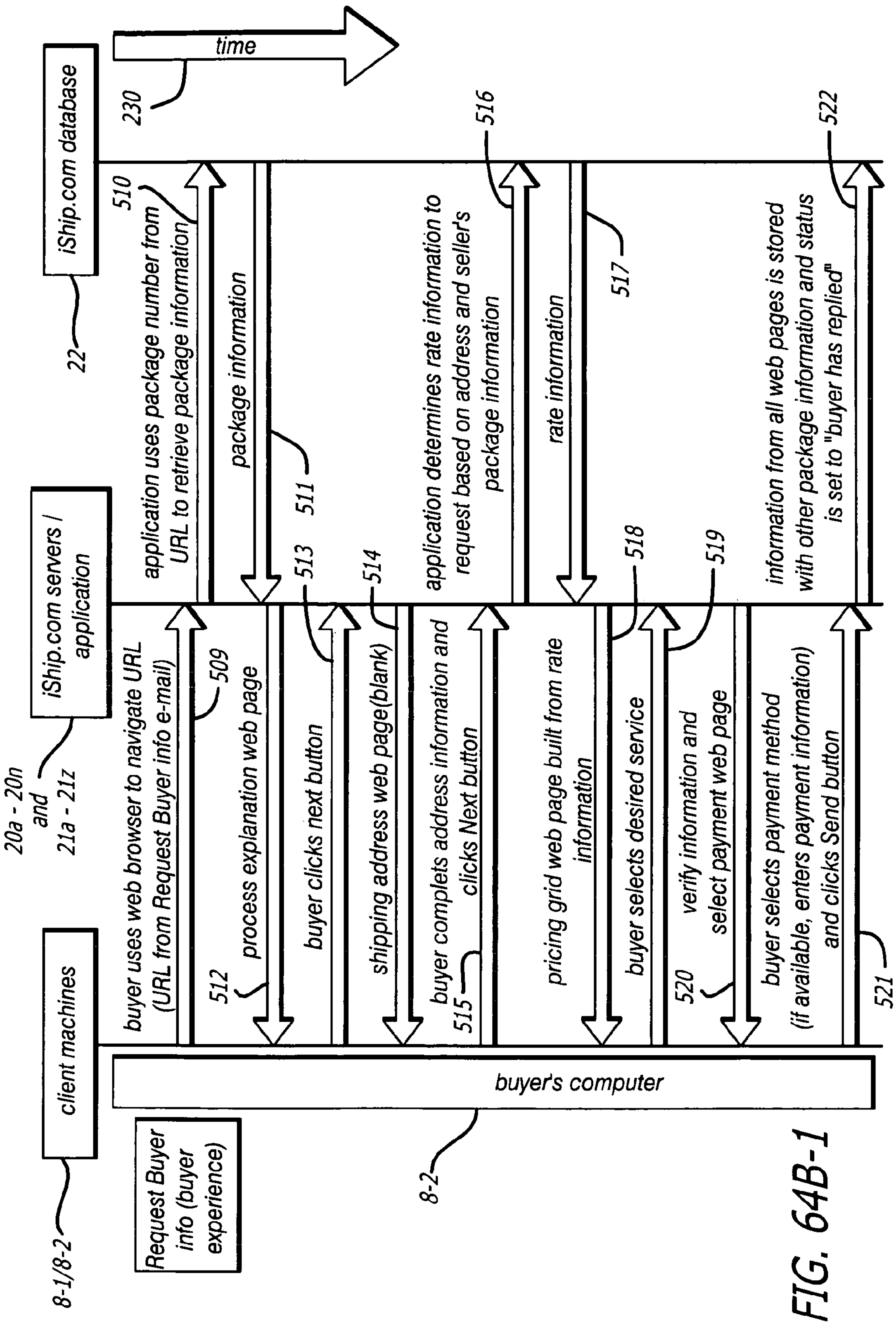
Figures 2, 64B:
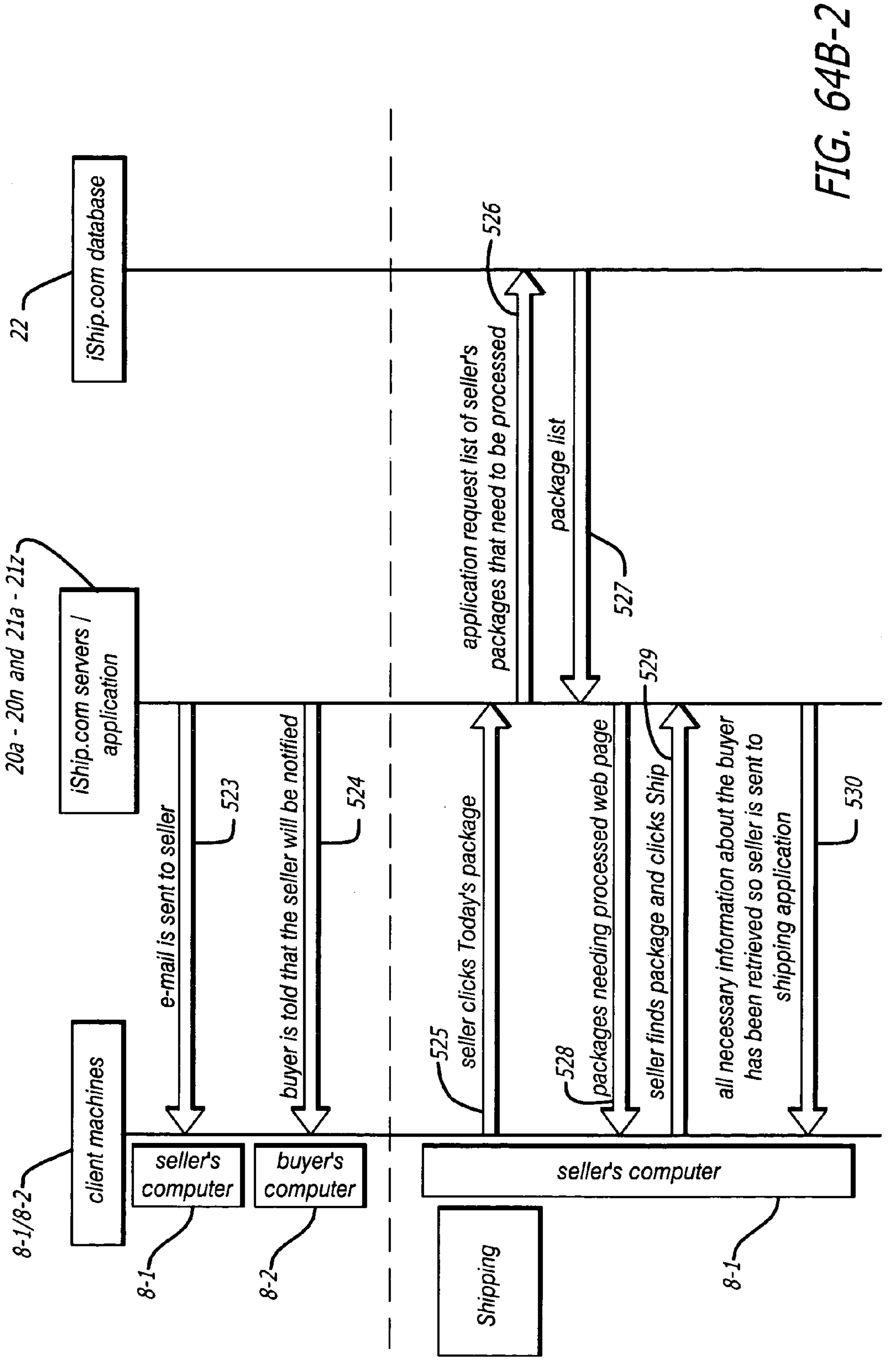

FIG. 63 is a graphic representation of an exemplary embodiment of a Reprint Driver Record Screen that lists prior driver records 480, each record provides a Reprint button 481 which when clicked will reprint the driver record (72, FIG. 10E).

After the Seller has completed printing the label, the Seller must give the package to the Carrier (73, FIG. 10E) so that it can be delivered via the Carrier (74, FIG. 10E).

The System provides complete tracking and reporting capabilities for packages shipped through it, and for packages for which a Carrier tracking number is known as described below and as disclosed in U.S. Provisional Patent Application Ser. No. 60/170,186, the disclosure of which has previously been incorporated for all purposes herein by reference.

FIGS. 64A-1, 64A-2, 64B-1 and 64B-2 are System interactivity data and logic flow diagrams depicting an exemplary eCommerce embodiment of the process by which the System completes the information necessary to ship a package. References in the explanation and description of FIGS. 64A-1, 64A-2, 64B-1 and 64B-2 to the Buyer mean to the Buyer and the Buyer's computer 8-2; references to the Seller mean to the Seller and the Seller's computer 8-1; references to the System mean the System servers, 20*a*-20*n* (the database servers) and 21*a*-21*z* (the other System servers); references to the System database mean to the entire logical System database 22.

The Seller eCommerce Preference setup Processes 231 through 239 have been previously described herein above. After the Seller has completed setting up eCommerce preferences, and after the Seller is notified of a sale, the Seller enters the System and prepares to enter Buyer information by clicking on the Buyer information submenu option 501. The System then displays a Buyer Information screen 502 to the Seller. The Seller then enters Buyer information and clicks the Next button 503. The System responds by displaying the Item and Cost screen 504. The Seller enters the item and cost information and sends the information to the System 505.

The System uses the information provided by the Seller to create a new package record in the System database and sets the status of the package to "waiting for buyer's response" 506. The System prepares and sends an e-mail to the Buyer requesting information to complete the shipment and including a URL hyperlink to the System web site page that is available to intake the Buyer's information, the URL containing a System package tracking number for the specified package 507. The System also prepares and sends an e-mail to the Seller informing the Seller that the e-mail has been sent to the Buyer 508.

The Buyer upon receipt of the System e-mail, uses a web browser to navigate the URL in the System e-mail and enter the System 509. The System retrieves the System package tracking number from the URL provided by the user's browser to access 510 and retrieve 511 the package information from the System database. The System provides the Buyer with an introduction and instructions to complete the process 512. If the Buyer chooses to proceed, the Buyer clicks the Next button 513. The System then requests Buyer shipping information 514. The Buyer completes the Buyer shipping information and clicks the Next button 515. The System accesses 516 and retrieves 517 from the System database rating information, including the Seller's preferences. The System uses the rating information and prepares and displays for the Buyer a multi-carrier, multi-service shipping cost comparison Graphic Array 518. The Buyer selects a Carrier/Service entry from the Graphic Array to ship the package 519. The System verifies the information and requests payment information from the Buyer in accordance with the Seller's preferences 520. The Buyer selects a payment method, enters payment information and Sends the information to the System 521. The System stores all Buyer information and associates that information with the package, and updates the package status to "buyer has replied" 522. The System sends an e-mail to the Seller notifying the Seller that the Buyer has replied 523. The System in some embodiments sends an e-mail to the Buyer notifying the Buyer that the System has informed the Seller that the Buyer has replied 524.

The Seller requests a Shipping Log of "Today's Packages" 525. The System accesses the System database 526 to retrieve 527 a Shipping Log of the Seller's packages that need to be processed. The System displays the Shipping Log to the Seller 528. The Seller locates the package to which the Buyer responded and clicks the Ship button 529. The System displays the Shipping screen to the Seller 530.

Figure 65A:
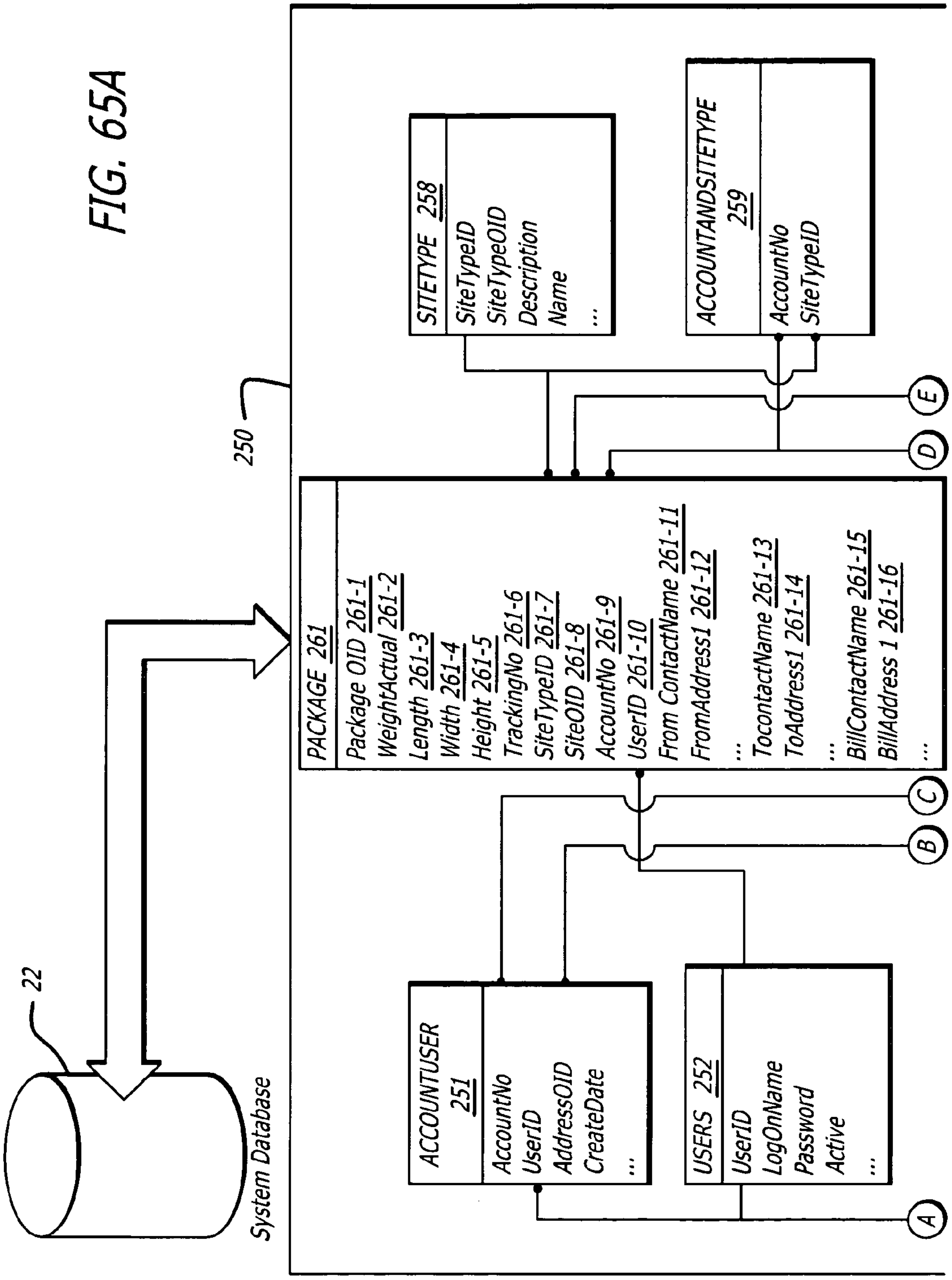
FIGS. 65A and 65B represent a database schema diagram that depicts an exemplary embodiment of tables in which data is stored by the System regarding a particular package and a particular Seller's Account in an exemplary embodiment of the System in an independent system eCommerce environment.
Figure 65B:
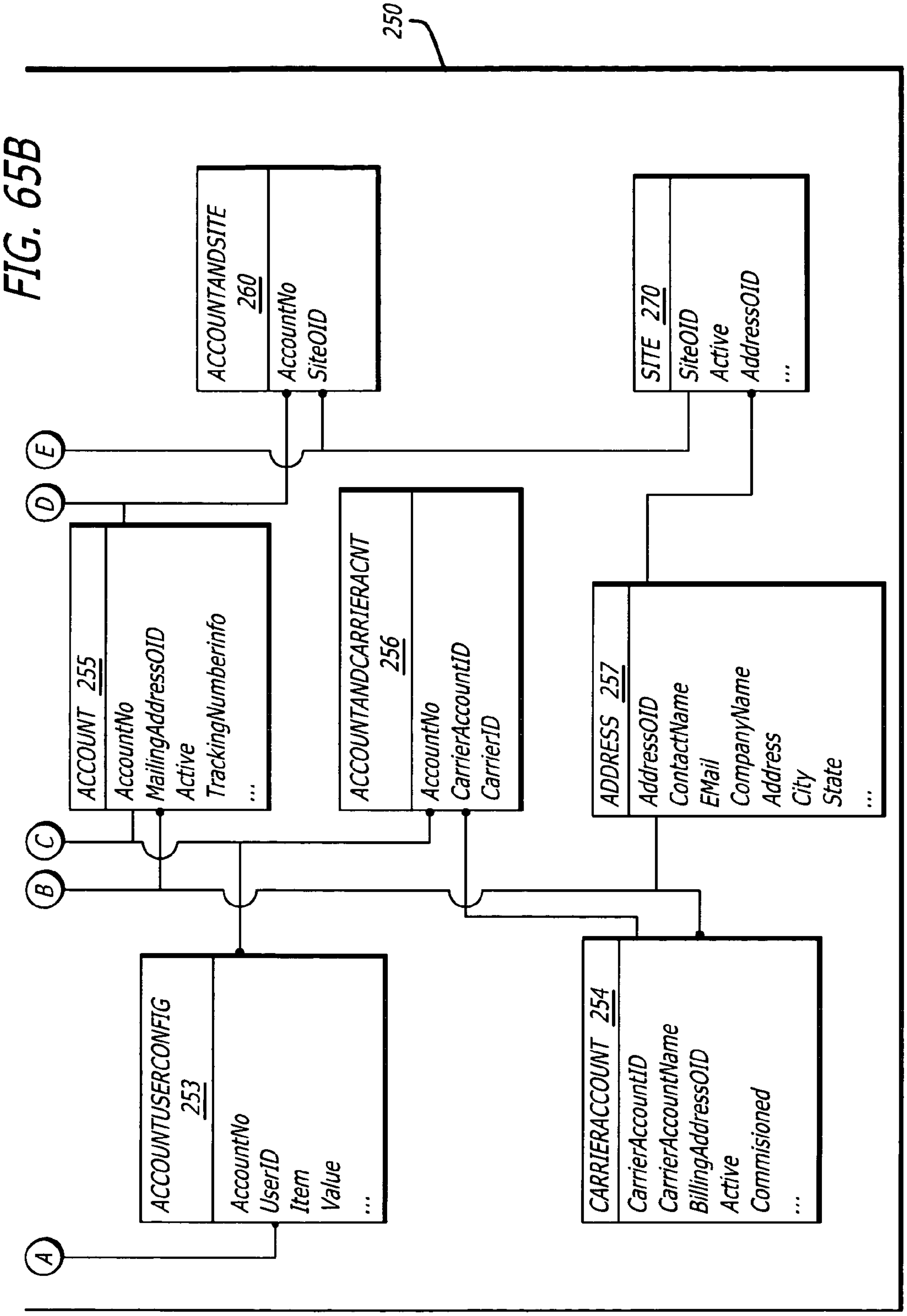

FIGS. 65A and 65B represent a database schema diagram that depicts an exemplary embodiment of tables in which data is stored by the System regarding a particular package and a particular Seller's Account, and from which information is retrieved in order to facilitate the shipment of a package. The database schema depicted in FIGS. 65A and 65B provides an Account User table 251, a Users table 252, an Account User Configuration table 253, a Carrier Account table 254, an Account table 255, an Account and Carrier Account table 256, an Address table 257, a Site Type table 258, an Account and Site Type table 259, an Account and Site table 260, and a Site table 270, all of which were previously described herein above with respect to FIGS. 33A and 33B. The database schema with respect to package information further provides the Package Table 261. The Package Table 261 contains for each package, among other things, a Package OID (a pointer) 261-1, the actual weight 261-2, length 261-3, width 261-4, height 261-5, System package tracking number 261-6, site type ID 261-7, Site OID (a pointer) 261-8, Account number 261-9, User ID 261-10, From contact name 261-11, From address 1 261-12, To contact name 261-13, To address 1 261-14, Bill contact name 261-15, and the Bill address 1 261-16.

F. Tracking

The tracking features described below apply similarly to both an exemplary simplified Internet embodiment and to an exemplary eCommerce embodiment of the invention.

1) User Requested Tracking

In order to track a particular package using the System, a Shipper identifies a tracking number for that package to the System and requests that the System report the status of the package. Two types of tracking numbers are used to track packages: 1) Carrier tracking numbers and 2) System tracking number.

Each Carrier assigns each package a tracking number that uniquely identifies each package and which is used to trace packages as the package moves through the particular Carrier's system to the package's destination. The Shipper or the package recipient uses the tracking number for a particular package to track, locate, and verify delivery of the particular package.

A System tracking number is a unique number generated internally by the System to identify a particular package shipped using the System. The Shipper inputs the Shipper's Parcel Specifications for the Subject Parcel. Using each Shipper's Parcel Specifications, the System is programmed to access databases containing information about each supported Carrier. Each supported Carrier has a unique rating schedule, delivery and pickup rules and schedules, and certification requirements (the "Carrier Rules"). The System is further programmed to apply each supported Carrier's Rules to each Shipper's Parcel Specifications for the corresponding Subject Parcel. The System provides an online display of a Dynamically Dimensioned Multi-Carrier, Multi-Service Graphic Array as depicted, e.g., in FIGS. 36A and 46 described above.

The Shipper in this case uses a user input device to pick the preferred Carrier, by for instance placing the cursor of the Shipper's PC on the displayed Carrier cell entry, e.g. 1065*a*, in the Graphic Display as depicted in FIG. 36A and clicking the Shipper's user input device (the "Selected Carrier").

As a result of the Shipper selecting a Carrier cell entry in the Graphic Display to ship a package, the System assigns the package a System package tracking number and adds a record containing all of the pertinent information about the package to the System database 22. Following are exemplary Shipping tracking numbers: MAGGY841VRY50; MAGGY84B496RF; MAGGY84X0FJ45. In one embodiment, the System Tracking Number is based on a Base-33 number system. The characters available are: Zero (0) through nine (9) and A through Z excluding “I” (i), “L” (l), and “O” (o). Each letter represents a value, as depicted in the table below:

A=10 F=15 M=20 S=25 X=30
B=11 G=16 N=21 T=26 Y=31
C=12H=17 P=22 U=27 Z=32
D=13 J=18 Q=23 V=28
E=14 K=19 R=24 W=29

Each System Tracking Number is 13 alphanumeric characters. Position 1 is the letter ‘M’. Positions 2-7 are a System Account number. Positions 8-12 are a five-digit ID. Position 13 is a Check Digit.

To calculate the Check Digit, the System performs the following steps: 1) Consecutively multiply the numeric value of each of positions 2-7; 2) Consecutively multiply the numeric value of each of positions 8-12; 3) Add both results; 4) Divide by 31; 5) Convert the remainder value to a Base-33 number. The converted value is the Check Digit.

Referring to FIG. 5 once again, when a Shipper/User ships a package using the System, one or more of the System’s Servers, e.g., 21*a*-21*n* create a new System tracking number. When a new System tracking number is created, one of the System’s Database Servers, e.g., 20*a*-20*n*, adds a new package record with the newly created System tracking number to a Package Table 28.

The Package Table 28 resides in the System database 22 and contains package records for System processed packages. An exemplary embodiment of the Package Table contains the following information: 1) Package Tracking State ID; 2) Package Shipping State ID; 3) Actual Delivery Time; 4) Delivered To information; 5) Shipping Date; 6) Carrier Tracking Number; 7) System Tracking Number; 8) Carrier ID; 9) Actual Package Weight; 10) Service Description; and 11) Package OID. The content of these fields are described further below.

The Package Tracking State ID specifies the tracking state of the package. In an exemplary embodiment of the invention, there are four different tracking states: 1) Null (New Packages or Shipped Packages); 2) Manifested (at the end of each day, package information is moved to the Package History Table for tracking purposes); 3) In Transit (The Carrier has picked up packages); 4) Delivered (Packages have been delivered to the shipping destination).

The Package Shipping State ID specifies the shipping state of a package. In an exemplary embodiment of the invention, there are two different shipping states: 1) Shipped (New Packages or Shipped Packages); 2) Manifested (at the end of each day, package information is moved to the Package History Table for tracking purposes).

The Actual Delivery Time specifies the Date/Time that the package was actually delivered. The Delivered To information identifies the person or place to which the package was delivered (e.g., left with receptionist, receptionist front desk, or guard). The Ship Date specifies the date on which the Carrier picked up the package. The Carrier Tracking Number identifies the Carrier-specific package tracking number. The System Tracking Number specifies the unique Package tracking number internally generated by the System (each System tracking number corresponds to exactly one Carrier-specific tracking number). The Carrier ID specifies an identification code for the particular Carrier. The Actual Package Weight specifies the actual weight of the package as opposed to the billed weight. The Service Description describes the type of services used to ship the package e.g., Overnight, 3 Day Ground, Second Day Air, etc. The Package OID contains a Globally Unique Identifier (“GUID”) for each package.

When the System creates a new package record, the record remains in the Package Table 28 during an initial period of time, for example, the first day during which the record is created, so that the Shipper/User can modify information about the package or void the package record as appropriate. In an exemplary embodiment of invention, the System performs certain processing on a periodic basis, such as at the end of each business day. This type of processing is referred to herein as “End Of Day” processing. In an exemplary embodiment of the invention, during “End of Day” processing, the System removes all new package records from the Package Table 28 and moves the records to a Package History Table 29 which also resides on the System Database 22. In an exemplary embodiment, Package History Table 29 records contain the same data fields as described above regarding Package Table 28 records.

Figure 68:
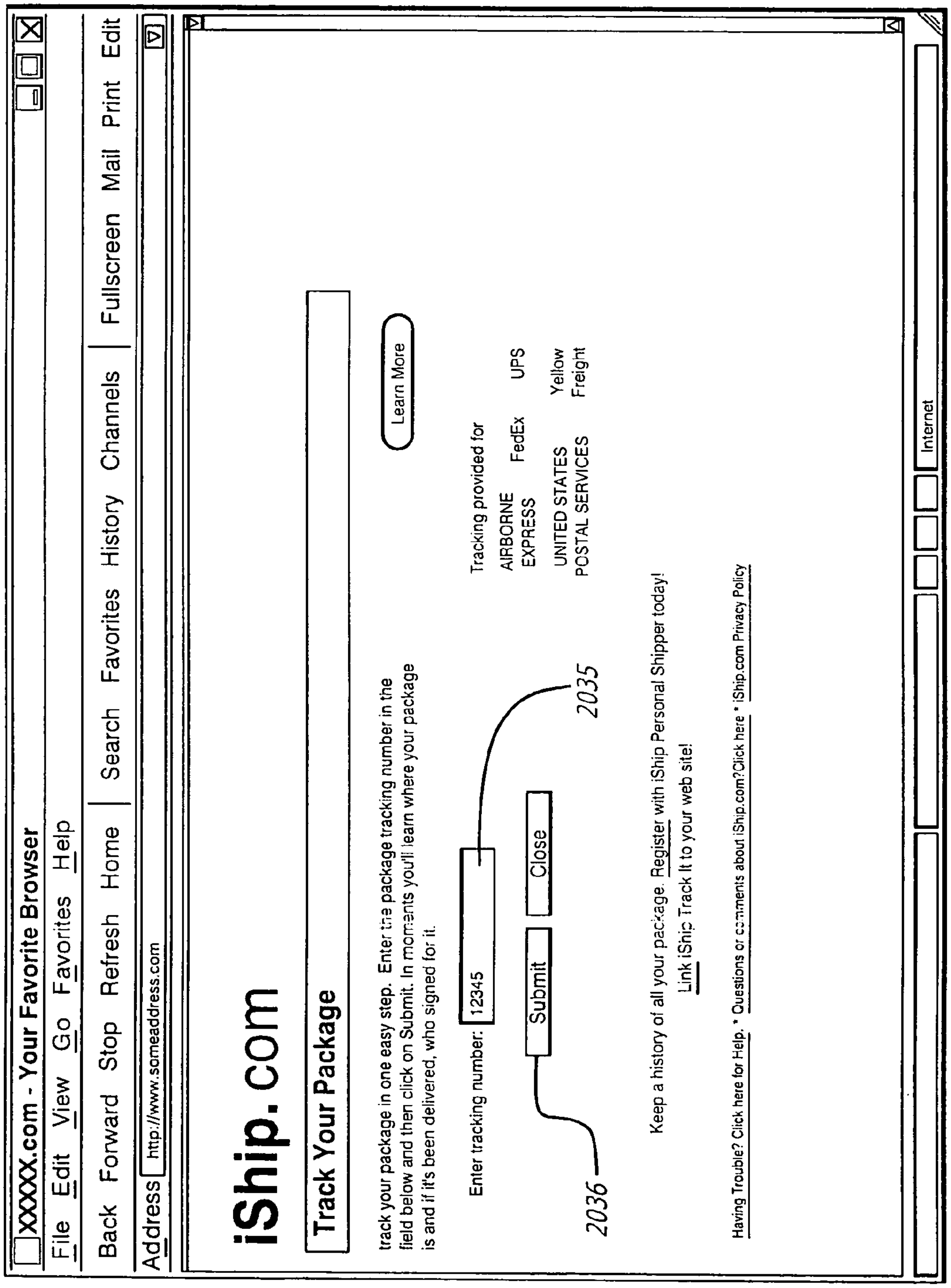
FIG. 68 is a graphic representation of a Shipper online user input screen that is displayed on the Shipper's display screen in an exemplary embodiment of the System in an Internet environment.

FIG. 68 is a graphic representation of a Shipper online user input screen that is displayed on the Shipper’s display screen 10. If a Shipper/User wants to track a particular package, the Shipper/User enters the tracking number that identifies the particular parcel package of interest in the “Enter tracking number” field 2035. It should be understood by those with ordinary skill in the art that the User may be someone other than the Shipper. For instance, the User may be a Recipient who wishes to track a package being sent to the user. Once the User has entered a tracking number, the User submits a request to track the particular package identified by clicking on the Submit button 2036.

Figure 69:
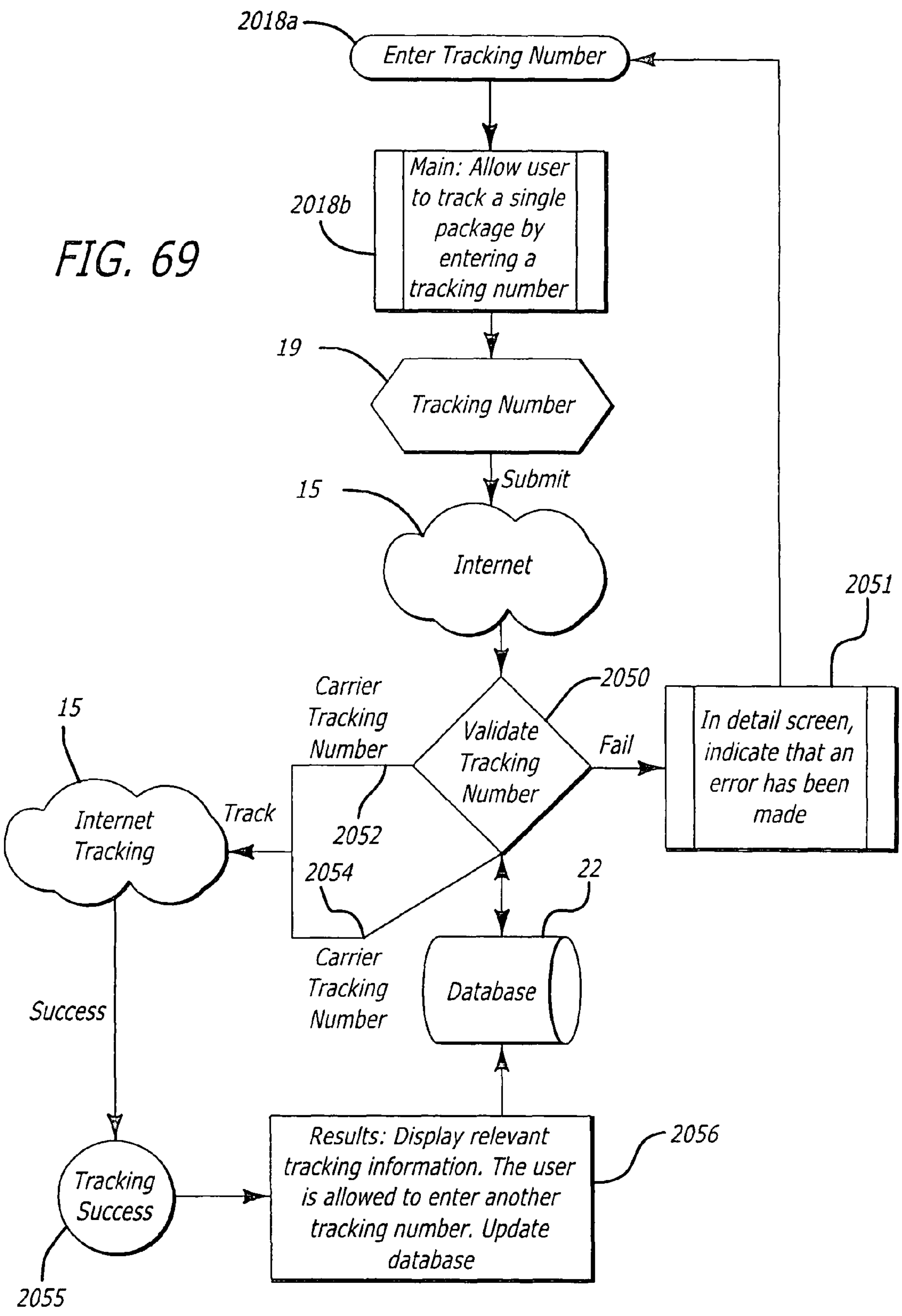
FIG. 69 is a logic flow diagram that depicts the high level logic for tracking the status of a particular package in an exemplary embodiment of the System in an Internet environment.

FIG. 69 is a logic flow diagram that depicts the high level logic for tracking the status of a particular package. The User enters 2018*a* and 2018*b* a tracking number 19 in the tracking number field 2035 (as was shown in FIG. 68). The System first validates 2050 the tracking number 19. The System performs the validation process by attempting to access the record on the System database 22 that is associated with the tracking number 19. To do this, the System requests that a System database server, e.g., 20*a* (as depicted in FIG. 5) locate and retrieve the package record that is associated with the tracking number 19. The System database server, e.g., 20*a* as depicted in, e.g., FIG. 5, uses the entered tracking number 19 to search the System database 22 to locate and retrieve the specified package record. In one embodiment, the System database server, e.g., 20*a* as depicted in, e.g., FIG. 5, is programmed to perform database accesses using Sequel 7.0.

Through the validation process, the System determines whether the tracking number 19 is a System tracking number or a Carrier tracking number. Below are examples of Carrier tracking numbers.

UPS—1z8595610344113190
Airborne—3918984344
FedEx—811152682326
USPS—ej585489546us
Yellow Freight—2100003475

If a user enters a Carrier tracking number as the tracking number 19, then depending upon the status of the package, or the number of times that the package was tracked, there may be no information in the System database 22 for the Carrier tracking number. In such a case, the System then uses algorithms provided by each Carrier to determine the Carrier identification.

If the System determines that there is information about the package on the System database 22, then the System analyzes the Package Shipping State. If the Package Shipping State of the retrieved record is "Manifested" or "In Transit" and the Package Tracking State is not "Delivered", then the System prepares to track the package using the appropriate Carrier system. If the Package Shipping State of the retrieved record is "Delivered", or other final status, then the System reports the status of the package to the user.

If the tracking number 19 is a valid System tracking number, then the System extracts the Carrier's tracking number and Carrier's ID from the package record retrieved from the System database 22 before issuing a request 2054. Otherwise, if the tracking number 19 is a Carrier tracking number, then the System extracts the Carrier's ID from the package record before issuing a request 2052 to the Carrier's Internet system. The System uses the Carrier's ID to retrieve from the System database 22 the Internet URL for the Carrier's Internet web site. The URL information is configurable.

Returning for a moment to FIG. 5, using the Carrier's Internet URL, the System then makes an HTTP connection to the Carrier's web server, e.g., 23-2, 24-2, 25-2, 26-2, or 27-2, using the URL information for the particular Carrier's web server. Depending upon the Carrier, the System's 1 request and report interface with the Carrier's web server is programmed in HyperText Markup Language ("HTML") (e.g., 24-1, 25-1, 27-1), Extensible Markup Language ("XML") (e.g., 26-1), or both HTML and XML (e.g., 23-1). FIG. 66 depicts an exemplary XML formatted request for submitting a tracking request to a Carrier. FIG. 67 depicts an exemplary successful tracking response, also in XML format, returned by the Carrier.

Then, as depicted in FIG. 69, the System transmits the Carrier's tracking number over the HTTP connection (2052 or 2054). The System instructs the Carver's web server as to what information is requested based on the connection made using the URL.

If the Carrier's web server successfully responds 2055 to the System's 1 tracking request, the System disconnects from the Carrier's web server and parses the response data. Some Carriers' response data contains unnecessary text information. The System strips out all of the unnecessary text in order to parse the relevant information.

If the System database 22 does not have any previous record of the package, such as would be the case if the package had not been shipped using the System shipping application, then the System does not store any data about the package in the Package Table or the Package History Table.

Otherwise, the System then updates the System database 22 and reports the information to the Shipper/User 2056. If the package is reported as delivered, the System populates the Package History Table 29 in the System database. As was previously mentioned, in an exemplary embodiment, Package History Table 29 records contain the same data fields as described above regarding Package Table 28 records.

Figure 70:
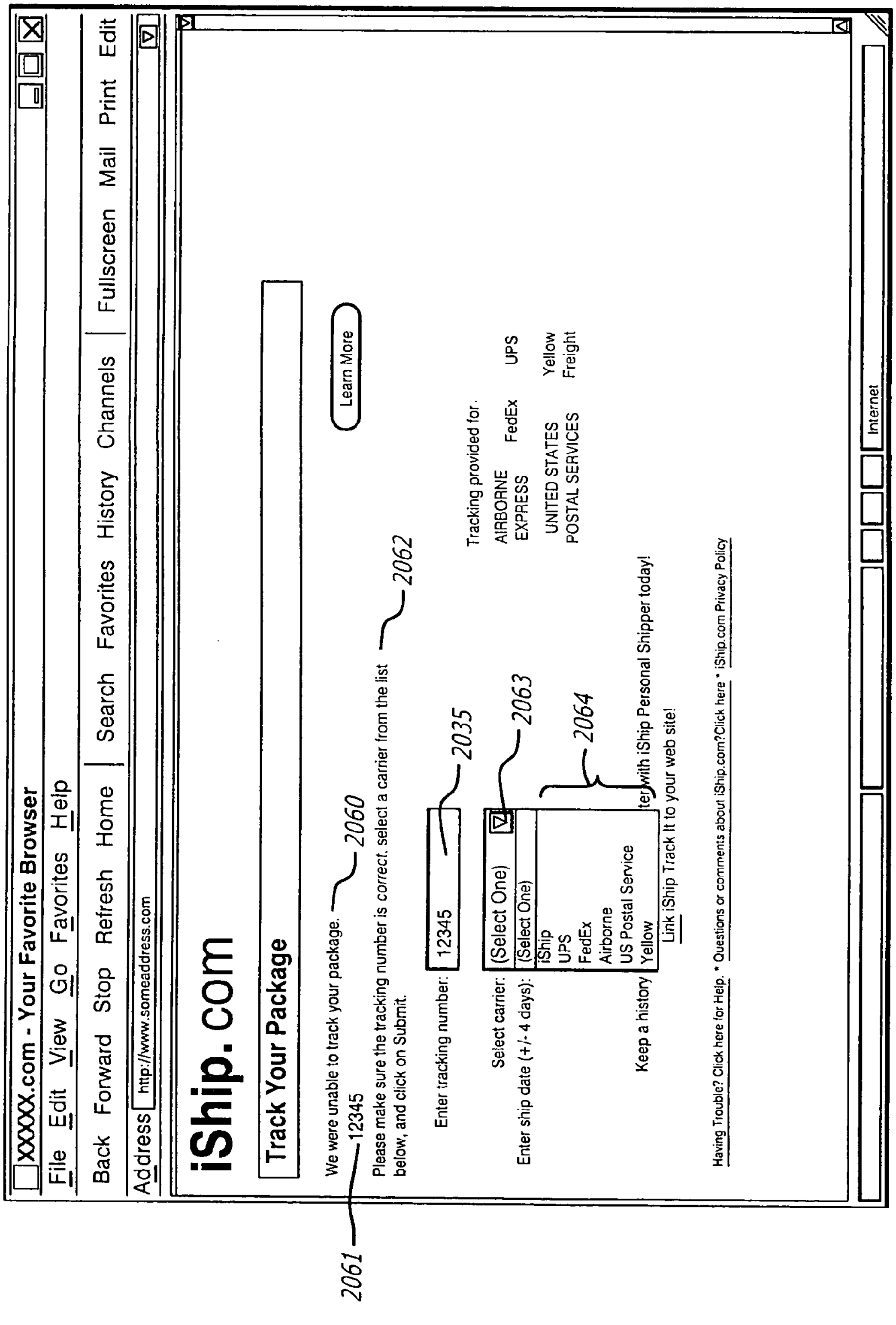
FIG. 70 is a graphic representation of an exemplary embodiment of a Tracking Failure Report Screen in an exemplary embodiment of the System in an Internet environment.

If on the other hand, the Carrier's Internet web server returns an unsuccessful report from test 2050, the System reports the failure 2051 to the User. FIG. 70 is a graphic representation of an exemplary unsuccessful tracking report to the User. The Tracking Failure Report Screen as depicted in FIG. 70 informs the User that the System was unable to track the package 2060 and displays 2061 the package tracking number 19 that the User previously entered. The Tracking Failure Report Screen asks the User to verify the accuracy of the tracking number and to specify a Carrier by name 2062. The Tracking Failure Report Screen provides a pull down menu button 2063, that when clicked, displays a list 2064 of the supported Carriers. The user enters a new tracking number 19 in the tracking number field 2035 and specifies the Carrier by highlighting one of the Carriers displayed in the list 2064. The user submits the request by clicking on the Submit button 2036 (covered by the pull down selection list 2064 in FIG. 70).

Figure 71:
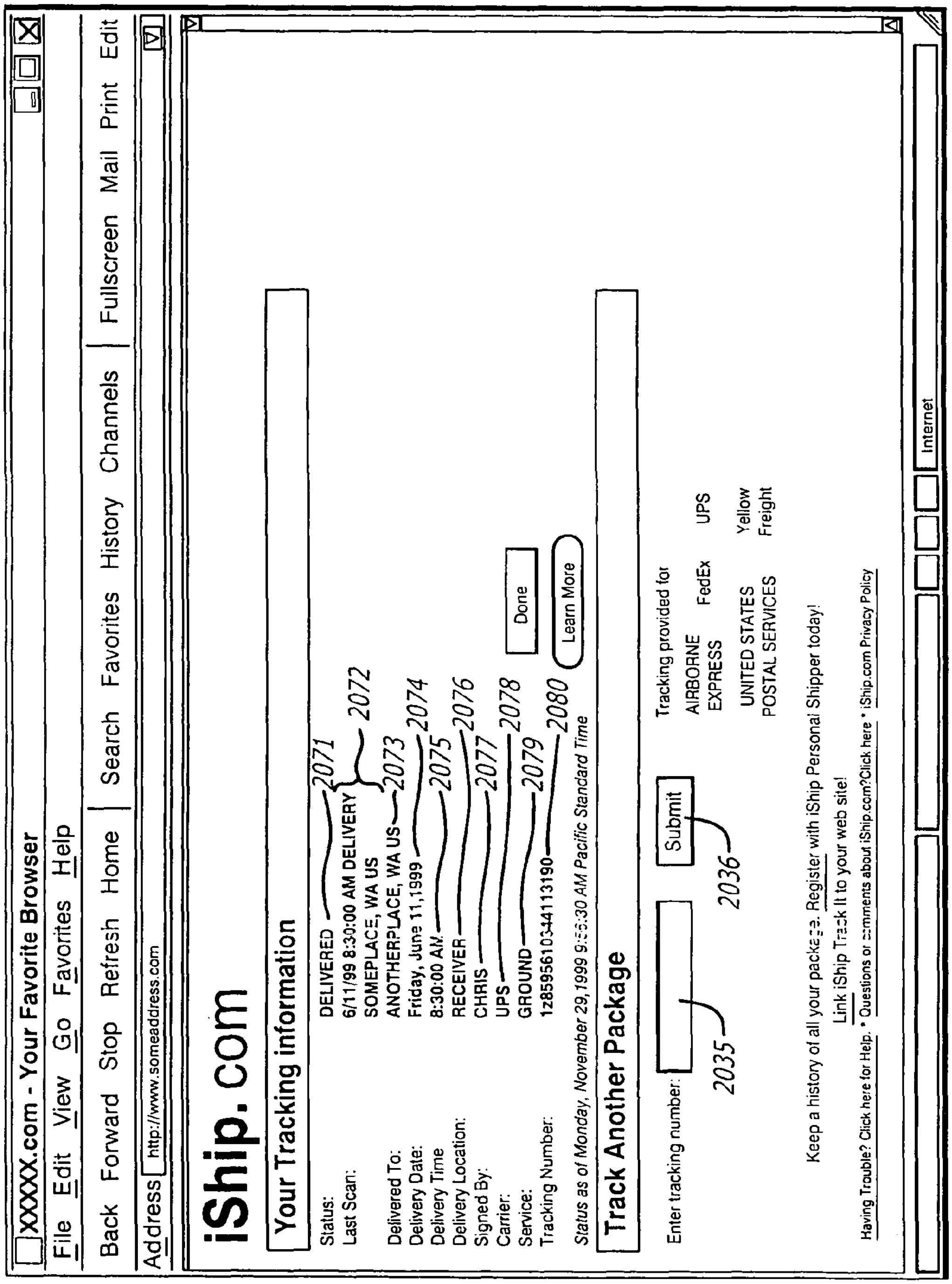
FIG. 71 is a graphic representation of an exemplary embodiment of a Successful Tracking Report Screen for a package with Delivered status in an exemplary embodiment of the System in an Internet environment.

If the Carrier's system successfully returns tracking information, then the System displays the package's current status. As depicted in FIG. 71, if the package has a "Delivered" status, the System reports the Status 2071; status as of Last Scan including date time and location 2072; Delivered To location 2073; Delivery Date 2074; Delivery Time 2075; Delivery Location 2076; Signed by 2077; Carrier Name 2078; Service 2079 and Tracking Number 2080.

Status 2071 reports the Delivery Status, also referred to as the Track, or Tracking, State. Last Scan 2072 reports Last scan information for the particular package. When a package is moved from one location to another, the label of the package is scanned according to each Carrier's processing requirements. Also, many Carriers scan package labels when packages are received by the recipients. Delivered To 2073 reports the person or place to which the package was delivered (e.g., left with receptionist, receptionist front desk, or guard). Delivery Date 2074 reports the date on which the package was delivered. Delivery Location 2076 reports, for most carriers, the city, zip code, and state information for the location to which the package was delivered. However, for some carriers, such as UPS, the delivery location reports where the package was dropped off (e.g., front porch, front door). Signed By 2077 reports the name of the person who signed the package after receiving it. Carrier 2078 reports the name of the Carrier that delivered the package. Service 2079 reports the type of shipping service (i.e., Ground). Tracking Number 2080 reports the System tracking number or carrier tracking number entered by the User.

The User is invited to enter another tracking number 19 in the tracking number field 2035 and click the Submit button 2036 to submit the next tracking request.

As depicted in FIG. 72, if the package has not yet been delivered, the System reports the information available, e.g., the Status 2071, Last Scan 2072, Carrier 2078 and Tracking number 2080. In such a case, the System asks the User if the User want to be notified 2090 when the identified package is delivered. The System provides the User with input fields to register to receive, and have sent, e-mail notification after the package is delivered. A user can enter up to three names, 2091, 2093 and 2095, and up to three e-mail addresses, 2092, 2094, and 2096, to receive the delivery confirmation. The User submits the e-mail notification (with message 2097) by clicking on the Submit button 2036-1.

If the User completes the e-mail notification input fields with at least one e-mail name and address, e.g., 2091 and 2092, the System creates an entry in a Track Response Table 30 which is a table contained in the System Database 22 as depicted in FIG. 5. The Track Response Table entry contains the tracking number 19 earlier specified by the User and displayed 2080 in the Tracking Report Screen depicted in FIG. 72. The System uses the Track Response Table 30. The System performs Automatic Tracking for all of the package tracking numbers contained in the Track Response Table 30 at the time that the Automatic Tracking procedure is executed. Automatic Tracking is described in more detail below.

The User can then enter another tracking number 19 in the tracking number field 2035 and submit the new request by clicking on the Submit button 2036-2. When the Carrier delivers the package, the System detects the delivery through one of several ways, as will be further explained below, and then sends e-mail with a link to the web page with the most up to date package status.

In an alternative embodiment, if the tracking number 19 is a Carrier tracking number, the Server will validate the Carrier tracking number is a valid tracking number. If the Carrier tracking number is not a valid number, the Server will return an invalid tracking number error. If the Carrier tracking number is a valid number, the Server will not attempt to match the number to a manifested package; the Server will track the package using the particular Carrier's Internet tracking routine; and will return the tracking response to the Web Client of the requesting Shipper/User.

In an alternative embodiment, if the tracking number 19 is a System tracking number, then the System validates the System tracking number to ensure that it is a valid System tracking number. If the System tracking number is not a valid tracking number, the Server will return an invalid tracking number error. If the System tracking number is a valid tracking number the Server queries the System database 22 to find the Carrier tracking number which corresponds to the System tracking number. If no package record is found for the System tracking number, then the Server will return an error to the Web Client of the requesting Shipper. The error message will indicate that no package record was found; it will request the user to verify that the tracking number was from a package which had been dropped off notify the user that a package be tracked on the same day it shipped. If the package record is found and the actual ship date is the same as the current date, the Server will return an error to the Web Client of the requesting Shipper indicating that the user/Shipper cannot track the package on the same day it is shipped.

In this alternative embodiment, once the Server has identified the Carrier tracking number, the Server will track the package using the Carrier's Internet tracking routine. If the tracking response from the Carrier's Internet tracking routing indicates an error, the Server will make another attempt to track the package through the Carrier's Internet tracking routine. If the second tracking request results in an error, the Server will notify the Web Client of the requesting Shipper that the Carrier is unable to track the package, and will log a tracking request error containing the Error Log number, the System tracking number, the Carrier tracking number, the time and date the tracking request occurred, the error response reported by the Carrier, and the Account Name of the user/Shipper making the tracking request, if that information is available.

If, on the other hand, the Carrier returns a valid tracking response, the Server will update the package status in the Server Database with the tracking response and will return the detailed package information to the Web Client of the requesting user/Shipper from the System Database as described below.

If the user supplied a Carrier tracking number, the Web Client will display the basic tracking information provided by the particular Carrier's Internet tracking function. In one embodiment of the invention, when the user provides a Carrier tracking number to track a package, the user/Shipper's Web Client requires the user/Shipper to identify the Carrier.

If the user/Shipper provides a System tracking number, then if the user/Shipper is logged on to the account, or otherwise enters valid logon information, that information must correspond to the Account which shipped the package. In that case, the user/Shipper's Web Client will display the following information: System tracking number; recipient address; drop off location; Carrier and service; Carrier tracking number if available; actual ship date if available; delivery address if available; delivery location if available; delivery date if available; delivery time if available; signed for by information if available; package rate; package weight; package dimensions; packaging; customer reference information; all scan activity.

If on the other hand, the user/Shipper is not logged on to the account, fails to enter valid logon information, or is logged on to an Account which does not correspond to the Account which shipped the package; the user/Shipper's Web Client will display the following information: System tracking number; recipient contact name; recipient company name; Carrier and service; Carrier tracking number if available; actual ship date if available; delivery address if available; delivery location if available; delivery date if available; delivery time if available; signed for by information if available; package weight; customer reference information; all scan activity.

2) Automatic Tracking

Automatic Tracking of packages with Priority Delivery Notification is performed when the package meets the following criteria: the package is a manifested package; the package was shipped using Priority Delivery Notification; The actual ship date of the package is the earlier than the current date; the package does not have the status of Delivered or Lost.

Automatic Tracking of a particular package can be requested by the User, as depicted in FIG. 72 and as was described above If the package fulfills all of the above-described automatic tracking criteria, the System places a record in the Track Response Table 30 and thereafter tracks the package on some regular periodic time interval, for example, every four hours beginning at a staggered start time. The start time is determined randomly and is staggered to occur at regular intervals every four hours.

The System tracks the package using the specified Carrier's Internet tracking routine as was previously described above. If the Carrier's Internet tracking routine returns a tracking response that the tracking request is an error, the Server will track the package at the next staggered tracking time. If the second tracking request response is also an error, the Server will track the package at the next scheduled four hour interval. If the third tracking request fails, the Server will log a tracking request error containing the following information: error log number; System tracking number; Carrier tracking number; time and date the tracking request occurred; and the error response from the Carrier. In the event that the third tracking request fails, the Server will issue an Automatic Tracking Alert, for instance, to System Support, containing the error log number.

If the tracking request results in a successful tracking response, the Server will update the package status in the Package History Table 29 in the System Database 22 with the tracking response information. If the package status returned is Delivered, the Server will send delivery notification via e-mail to the notification address(e), e.g., 2091-2096 as depicted in FIG. 72, as previously supplied by the Shipper/User. For a Delivered package, the Server will update the Package History Table 29 in the System Database 22 to indicate that the package has been delivered, that a delivery notification e-mail has been sent, and the date and time that the e-mail was sent.

If the manifest package was shipped without Priority Delivery Notification, then on any day after the actual ship date, as long as the status of the package is not Delivered or Lost, the System will track the package every day at a non-peak period. If the tracking response is an error, the Server will not attempt a second tracking request. If the tracking response is successful, the System will update the package status in the System Database 22 with the tracking response information.

The System will verify that all packages with a status of Delivered were delivered within the guaranteed delivery time. For each Delivered package for which delivery was not made with the guaranteed delivered time, the Server will generate a Delivery Exception containing the following information: Carrier account number for the Drop Off Location; Carrier tracking number; date of shipment; complete destination address information; delivery exception ID number.

In one embodiment of the invention, there are four types of scripts, or procedures, that run regularly to update the Package History Table 29 and the Track Response Table 30 in the System database 22: 1) Track All Scripts, 2) Track Inbound Script, 3) Inbound Confirmation Mail Script and 4) Delivery Confirmation Script. Each is described further below.

Track All Scripts are run on a regular basis. There is a Track All script for each Carrier (e.g., FedEx, UPS, Airborne, and Yellow Freight). Each Track All script executes a set of instructions that enumerate the package records in the Package History Table 29 to get updated information from a specific Carrier's database. If a System tracking number has a delivered tracking state, then the next time a user tries to get tracking information for this particular tracking number, the System will not need to connect to the Carrier's web server to get the package status information.

Track Inbound Script is run on a regular basis. Track Inbound Script searches the Track Response Table 30 and enumerates all entries in the table to get updated information from multiple Carriers' databases. If a tracking number has a delivered tracking state, then Users are notified via e-mail that their packages have been delivered. Also, if the tracking number is a System tracking number then the Package History Table 29 gets updated with this delivered tracking state information for optimization purposes. By updating the Package History Table 29, the System does not need to re-connect to carriers' web servers to get information about a package that has been already delivered.

Inbound Confirmation Mail Script is run on a regular basis. It searches the Track Response Table 30 for packages that have a delivered track state. When the script finds delivered packages for Users who requested to receive e-mail notifications, it sends e-mail notifications to them with delivery information.

Delivery Confirmation Script is run on a regular basis. It searches the Package History Table 29 and enumerates all entries in the table for which the User has requested delivery notification when the subject package has been delivered to destination. When the script finds delivered packages in the Package History Table 29 for Users who requested to receive e-mail notifications, it sends e-mail notifications to them with delivery information.

3.) Counter Manifest System (CMS) Tracking

As an alternative to using an Internet embodiment of the invention, a user can track packages by using the counter Manifest System CMS feature of the invention. In such an embodiment, CMS is a standalone-dedicated system that uses a connection to one of the System's servers (the "CMS Server") to track packages. CMS can be connected to one of the System servers in many different ways, including among others, DSL dial-up, ISDN dial-up, Modems, T1 line, Hughes VSAT link or other communications systems.

In the CMS environment, a company maintains a connection for the CMS to the CMS Server to track packages for customers. The CMS User track packages for the CMS User's customers by entering a tracking number in the CMS tracking page. CMS tracking allows a customer to register for a delivery confirmation to receive e-mail notifications when packages are delivered. Also, customers can register using the System's Internet embodiment to receive inbound delivery notifications for the packages that are shipped using the CMS.

Figure 73:
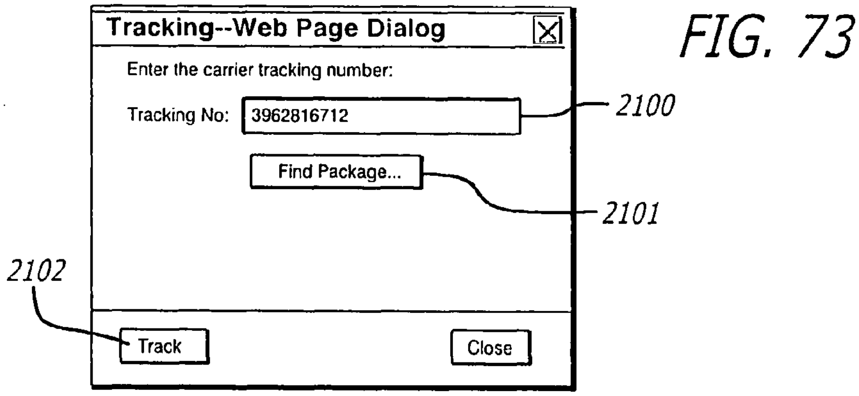
FIG. 73 is a graphic representation of an exemplary CMS online user input screen in an exemplary embodiment of the System in an Internet environment.

FIG. 73 is a graphic representation of an exemplary CMS online user input screen. The User inputs a tracking number 19 in the input tracking number field 2100 and submits a request to the System to track the package associated with the input tracking number 19 by clicking on the "Track" button 2102 or the "Find Package" button 2101.

Figure 74:
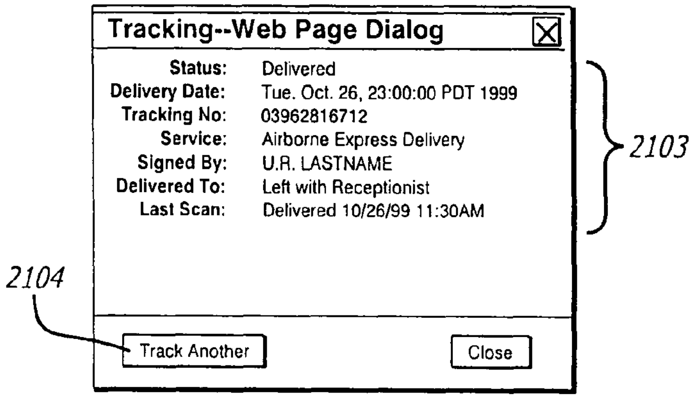
FIG. 74 is a graphic representation of an exemplary CMS display screen that reports a successful tracking result in an exemplary embodiment of the System in an Internet environment.

FIG. 74 is a graphic representation of an exemplary CMS display screen that reports a successful tracking result 2103. After reading the tracking report, the User can request that another package be tracked by clicking the 'Track Another" button 2104.

Figure 75:
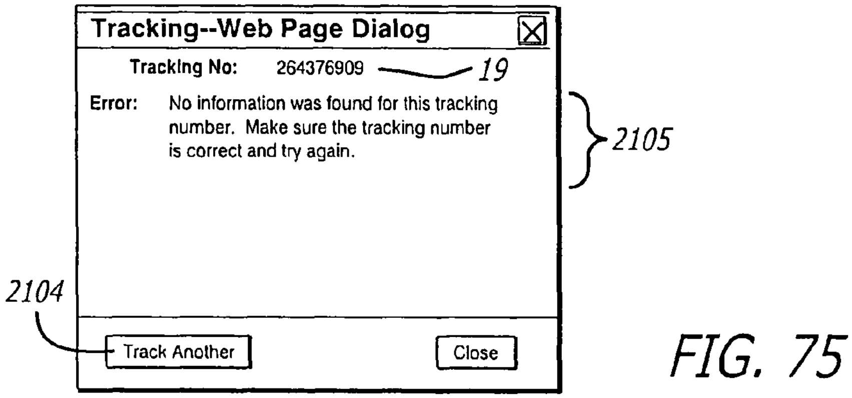
FIG. 75 is a graphic representation of an exemplary CMS error tracking report display screen in an exemplary embodiment of the System in an Internet environment.

FIG. 75 is a graphic representation of an exemplary CMS error tracking report display screen. The tracking number 19 is displayed with an error message 2105. The user can request that another package be tracked by clicking the "Track Another" button 2104.

4.) Manifest and Inbound Tracking

A User can register with the System to establish a shipping account. Once a User has established an account, the System will record in the System database 22 information for every package shipped under the User's account. The information contained in the System database 22 under the User's account is referred to as the User's Shipping Log.

Figure 76:
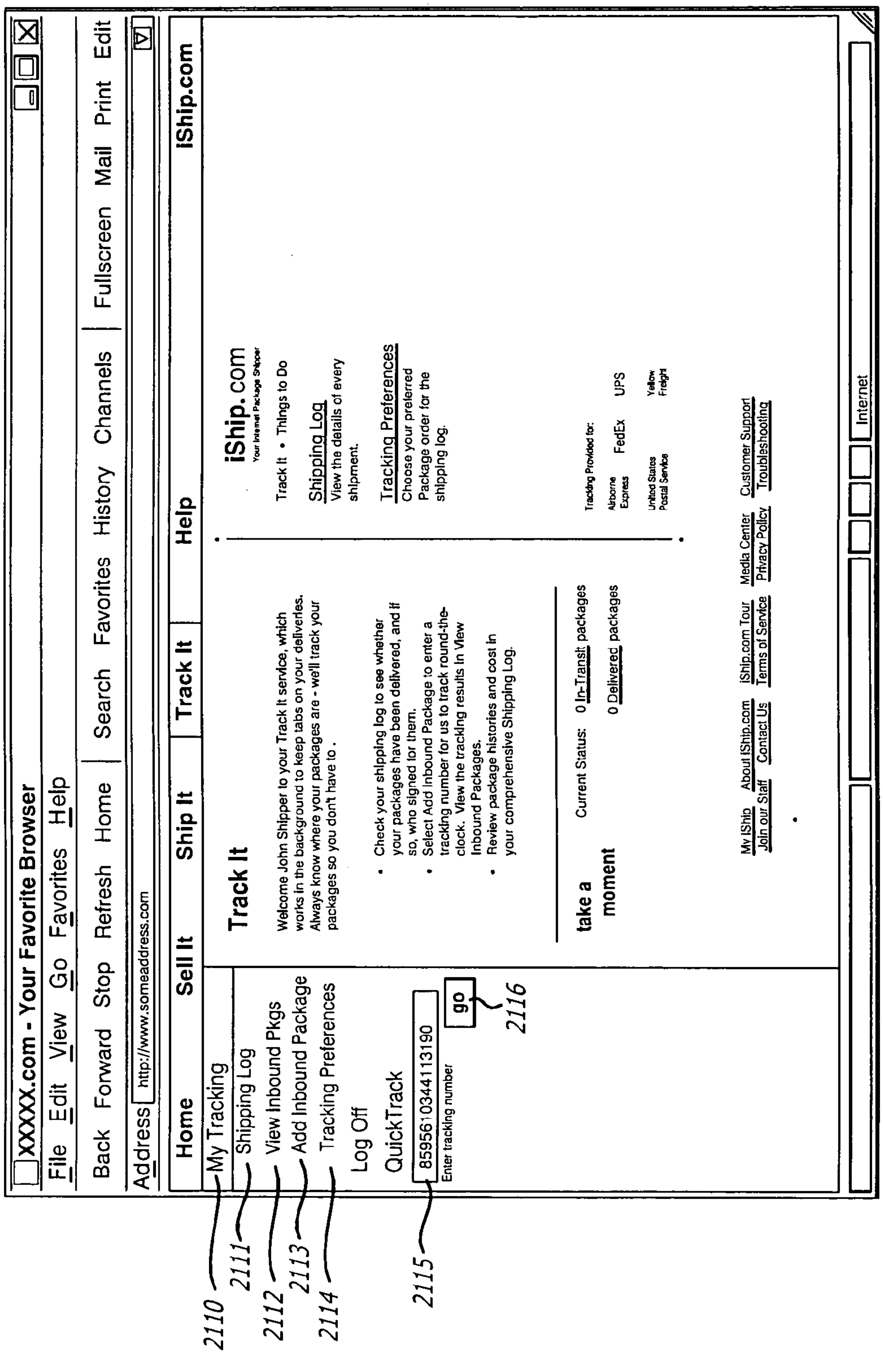
FIG. 76 is a graphic representation of an exemplary embodiment of a "My Tracking" Screen in an exemplary embodiment of the System in an Internet environment.

The System provides the User with online capability to request information about the User's Shipping Log. FIG. 76 is a graphic representation of an exemplary embodiment of a "My Tracking" Screen. On the viewer's left side of the My Tracking Screen display, a "My Tracking submenu 2110 is provided to allow the User to select options. By clicking on and highlighting one of the My Tracking submenu 2110 options, the User can select to view the User's Account's Shipping Log 2111, to View Inbound Packages 2112, to Add Inbound Packages 2113, and to indicate Tracking Preferences 2114. The User can also input a tracking number 19 into the Quick Track input field 2115 and request that the System track the identified package by clicking the "go" button 2116.

Figure 77:
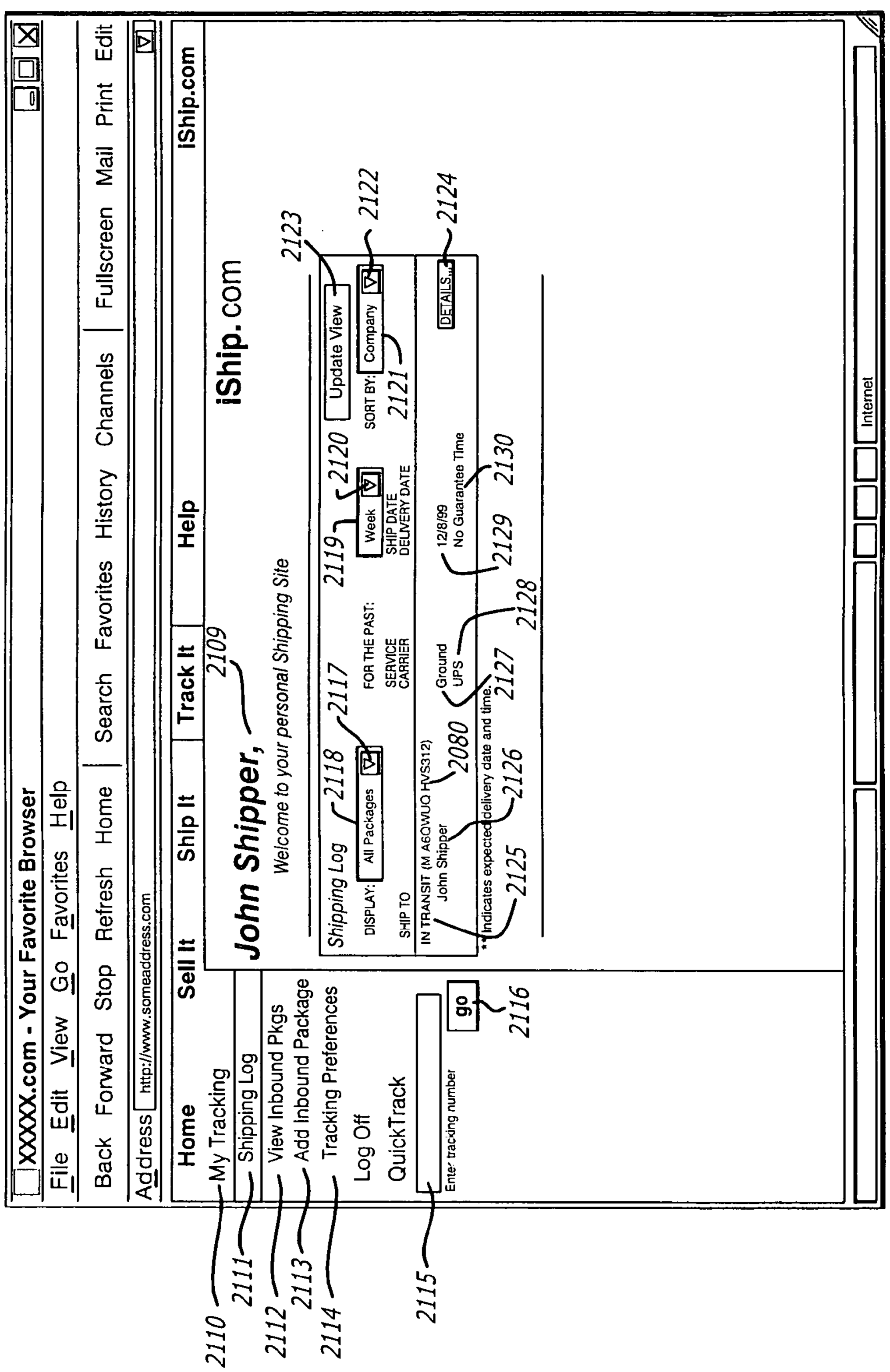
FIG. 77 is a graphic representation of an exemplary embodiment of a Shipping Log Screen.

FIG. 77 is a graphic representation of an exemplary embodiment of a Shipping Log Screen. A logged on registered User enters this display screen by clicking on the My Tracking submenu 2110 User's Account's Shipping Log option 2111. If the User is both logged on and registered, then in response to the User clicking on the My Tracking submenu 2110, User's Account's Shipping Log option 2111, the System presents a Shipping Log Screen with certain selection criteria. In the embodiment depicted in FIG. 77, the System initializes selection criteria fields with certain default values. For instance, the Shipping Log will search the system database 22 for the name of the individual to whom the particular account belongs and displays the name of the person 2109. Further, the Shipping Log application will search the System database 22 for all packages shipped under the User's account that conform to the criteria specified in the input fields of the FIG. 77 screen.

The Shipping Log Screen provides for User selection of the Type of package, e.g., "All Packages" from the Display option 2118 and Display option pull-down menu button 2117; "For the Past" time period 2119 with a pull-down menu button 2120, e.g., for the past "Month" during which packages were shipped; and "Sort By" 2121-2122 which allows the User to select the order of the Shipping Log report entries.

In response to the Shipping Log request, the System creates a list and displays an online Shipping Log record for the packages shipped under the User's account and which fit the selection criteria. For each such package, the System displays: the Status of the package 2125 and the tracking number 2080, the name of the shipper 2126, the Carrier Service 2127, the name of the Carrier 2128, the Ship Date 2129, and the Delivery Date and time 2129-2130. If the User wants more information for a particular package in the Shipping Log, the User highlights the appropriate record in the list and clicks the "Details" button 2124. An "Update View" button 2123 is also provided.

Figure 78:
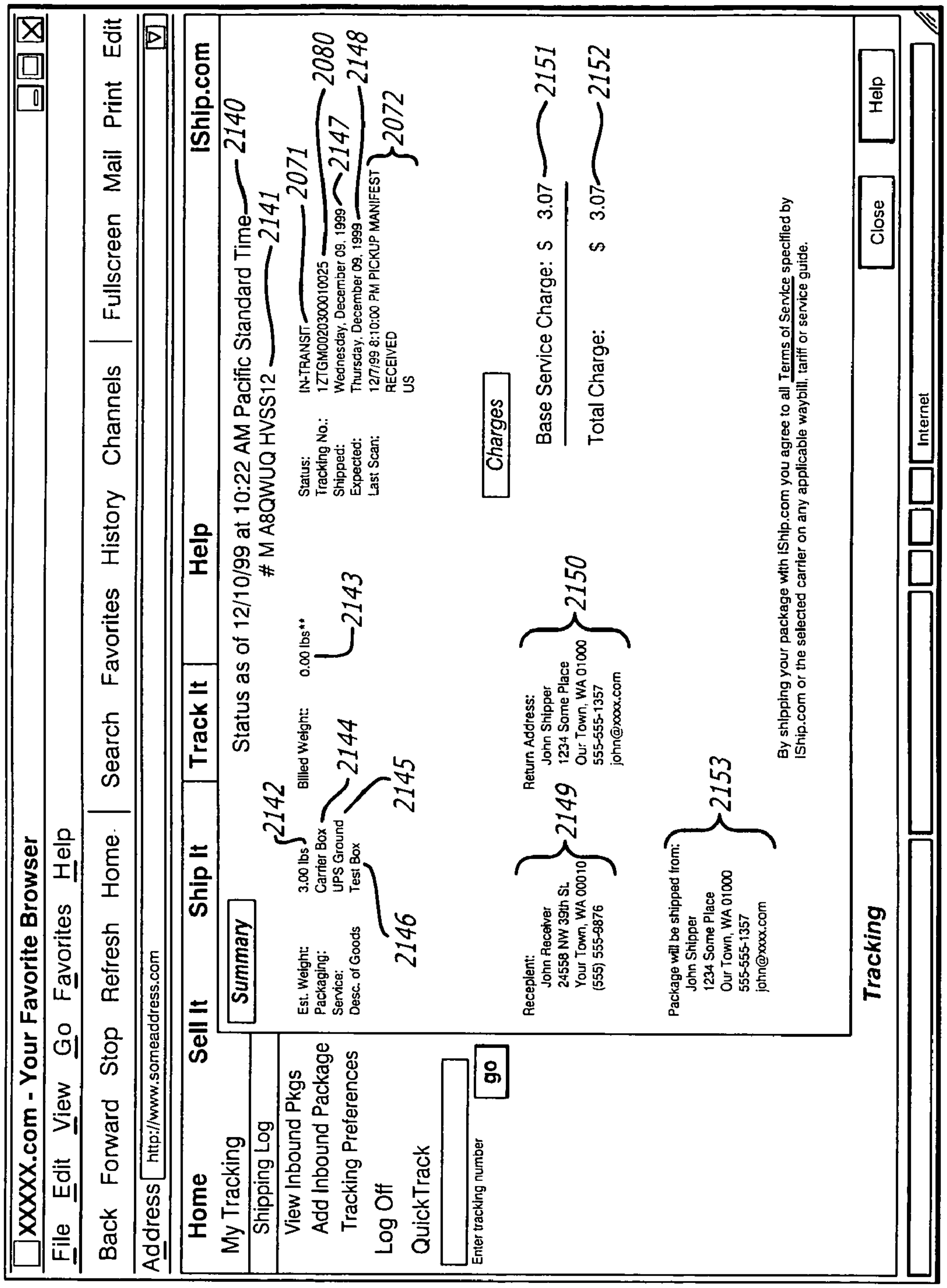
FIG. 78 is a graphic representation of an exemplary embodiment of a Detailed Shipping Log Entry Screen in an exemplary embodiment of the System in an Internet environment.

FIG. 78 is a graphic representation of an exemplary embodiment of a Detailed Shipping Log Entry Screen which is displayed if the User highlights the appropriate record in the Shipping Log list and clicks the "Details" button 2124. The System displays the Shipping Log date and time 2140, the System tracking number 2141, the estimated weight of the package 2142, the billed weight of the package 2143, the Packaging type 2144, the Carrier and Service 2145, a description of the goods shipped 2146, the shipping status 2071, the Carrier tracking number 2080, the Shipped Date 2147, the Expected data of arrival 2148, the Last Scan information 2072, the Recipient's name and address 2149, the Return name and address 2150, the Ship from location 2153, the base shipping service charge 2151, and the total shipping charge 2152.

Figure 79:
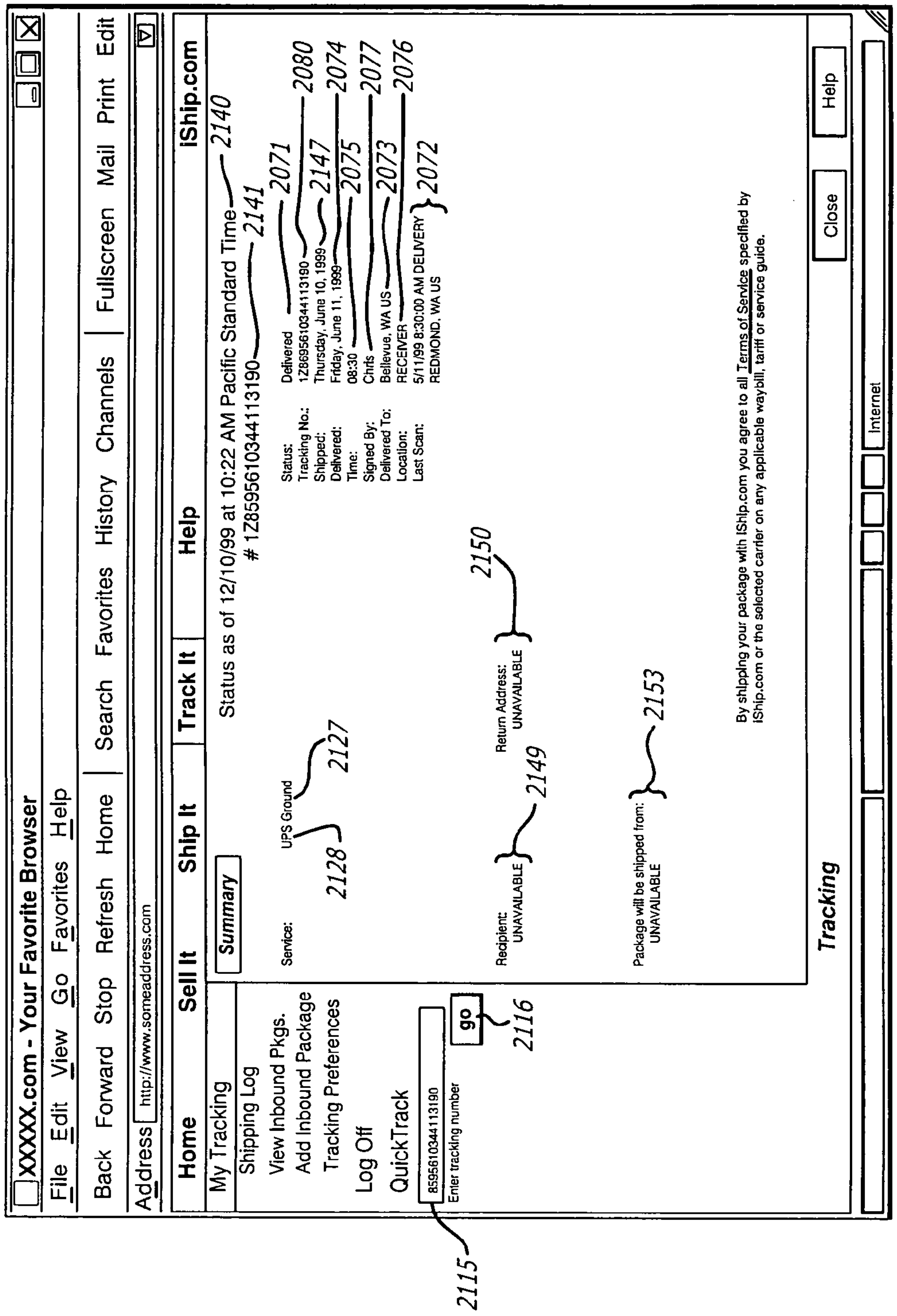
FIG. 79 is a graphic representation of an exemplary embodiment of a detailed "Quick Track" result screen in an exemplary embodiment of the System in an Internet environment.

FIG. 79 is a graphic representation of an exemplary embodiment of a detailed "Quick Track" result screen which displays the same type of information described above for FIG. 78. The way that a User obtains this display is to enter a tracking number 19 into the Quick Track input field 2115, and by then clicking on the "go" button 2116.

Figure 80:
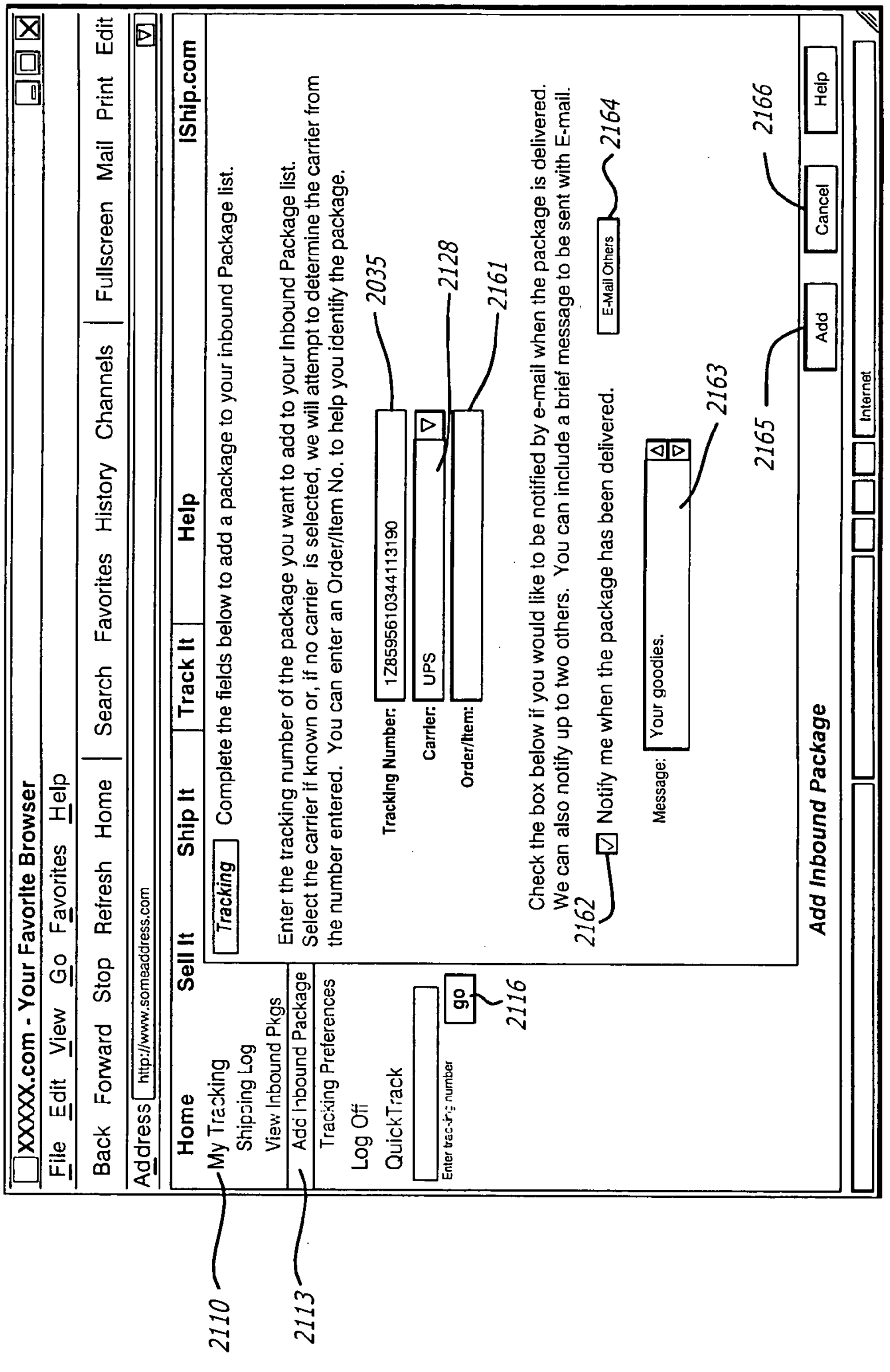
FIG. 80 is a graphic display of an exemplary embodiment of an "Add Inbound Packages" Screen in an exemplary embodiment of the System in an Internet environment.

A registered logged on User can view inbound packages if the User first identifies to the System package tracking numbers for each of the packages the status of which the User is interested in monitoring. FIG. 80 is a graphic display of an exemplary embodiment of an "Add Inbound Packages" Screen. The User requests this screen by clicking on the "Add Inbound Package" option 2113 of the "My Tracking" submenu 2110. The User inputs identification information, such as the tracking number 19 in the input tracking number field 2035, the Carrier 2128, and the Order/Item 2161. The User can also specify that the System is to provide e-mail notification 2162 with an e-mail message 2163. By clicking on the "E-mail Others" button 2164, the User can request an "E-mail Others" screen providing input similar to that, items 2091-2097, and 2036-1, described above for the tracking screen depicted in FIG. 72. By clicking on the "Add" button 2165, the User requests that the record identified in the User's input be added to a list for that User of Inbound Packages to be monitored. A "Cancel" button 2166 is also provided.

Figure 81:
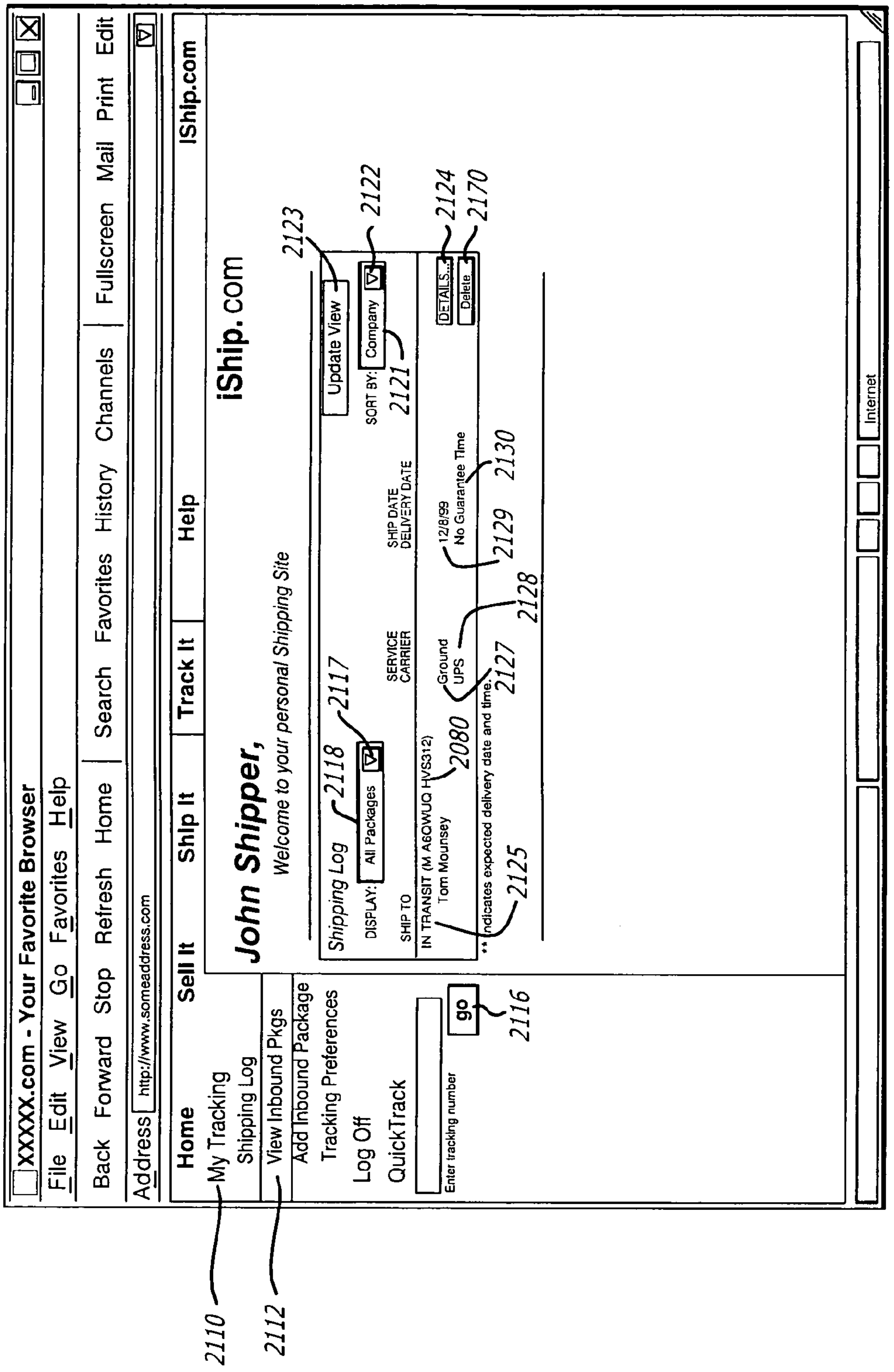
FIG. 81 is a graphic representation of an exemplary embodiment of a "View Inbound Packages" Summary Screen in an exemplary embodiment of the System in an Internet environment.

Once the User has input the identification information for the packages the status of which the User wants to monitor, and added all such records to the User's Inbound Tracking List, the User can then view the status of those identified Inbound packages. To do so, the user clicks on the "View Inbound Packages" option 2112 of the "My Tracking" submenu 2110. FIG. 81 is a graphic representation of an exemplary embodiment of a "View Inbound Packages" Summary Screen. Similar to the Shipping Log Screen as discussed above in relation to FIG. 77, the View Inbound Packages Summary Screen displays information about packages identified by the User as Inbound Packages. As depicted on FIG. 81, the User can specify reporting criteria such as Display limitations 2117-2118, and sorting requests 2121-2122. The User can request details about a particular package by highlighting the reporting line on the screen and clicking the "Details" button 2124. The User can delete a particular package from Inbound Package Tracking by highlighting the reporting line on the screen and clicking the "Delete" button 2170. An "Update View" button 2123 is also provided.

Figure 82:
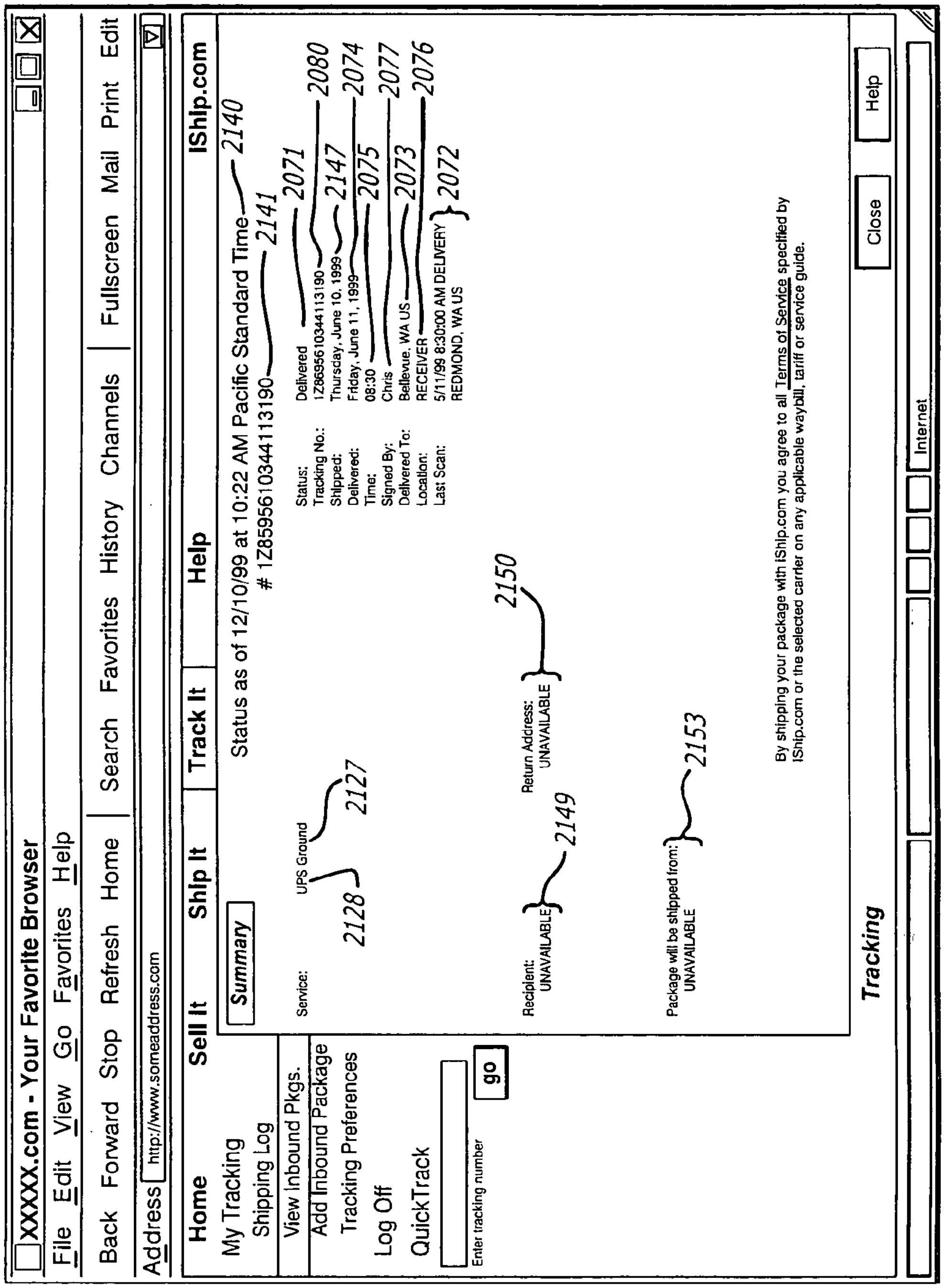
FIG. 82 is a graphic representation of a View Inbound Packages Detail Screen in an exemplary embodiment of the System in an Internet environment.

FIG. 82 is a graphic representation of a View Inbound Packages Detail Screen. The type of information displayed on this screen is similar to the type of information described with respect to the Shipping Log Detail Screen as depicted in FIG. 78 and discussed above.

Illustrative Embodiments

Although this invention has been described in certain specific embodiments, many additional modifications and variations would be apparent to those skilled in the art. It is, therefore, to be understood that this invention may be practiced otherwise than as specifically described. Thus, the embodiments of the invention described herein should be considered in all respects as illustrative and not restrictive, the scope of the invention to be determined by the appended claims and their equivalents rather than the foregoing description.

What is claimed is:

1. A centralized computer system for managing shipping of a plurality of parcels by a plurality of users using a plurality of carriers, said centralized computer system comprising:

a plurality of functionally aligned server computer devices, wherein the plurality of functionally aligned server computer devices are adapted to communicate cooperatively, wherein each server computer device of the plurality of functionally aligned server computer devices is programmed to perform at least one particular shipping management function of a plurality of shipping management functions, wherein each particular shipping management function contributes to managing shipping of the plurality of parcels;

at least a first server computer device of the plurality of functionally aligned server computer devices that is adapted for concurrent remote access by the plurality of users via a communications network, wherein the first server computer device is adapted for communicating an access of the first server computer device by one or more users of the plurality of users to at least one functionally aligned server computer device of the plurality of functionally aligned server computer devices;

at least a second server computer device of the plurality of functionally aligned server computer devices that is programmed to perform a first particular shipping management function, wherein said first particular shipping management function comprises rating each respective request by each respective user of the plurality of users to ship a respective parcel, wherein rating for a respective parcel is performed by the second server computer device according to a respective shipping input from a respective user via a respective client computer device, and wherein rating for the respective parcel is performed by the second server computer device for each delivery service offered by each carrier of a plurality of carriers that would ship the respective parcel; and at least a third server computer device of the plurality of functionally aligned server computer devices that is programmed to perform a second particular shipping management function, wherein said second particular shipping management function comprises providing tracking information to a respective user regarding a respective shipping status corresponding to a respective parcel that was shipped by the respective user using a respective carrier of the plurality of carriers, wherein the third server computer device is programmed to:

receive a respective request from a respective user of the plurality of users for a shipment status of a respective parcel, wherein the respective request comprises an identifier of the respective parcel, determine a carrier associated with the identifier, establish an online connection with a respective carrier system associated with the carrier, and obtain from the respective carrier system through the online connection, shipment status information for the respective parcel according to the identifier.

2. The centralized computer system of claim 1, wherein at least the second server computer device of the plurality of functionally aligned server computer devices is further programmed to generate a respective simultaneous cross-comparison display of respective shipping rates for each delivery service offered by each carrier of the plurality of carriers that would ship the respective parcel, wherein said simultaneous cross-comparison display is generated for display to a respective display device associated with a respective client computer used by a respective user to access the centralized computer system.

3. The centralized computer system of claim 1, wherein at least a fourth server computer device of the plurality of functionally aligned server computer devices is programmed to perform a third particular shipping management function, wherein said third particular shipping management function comprises accessing data regarding at least one aspect of facilitating shipping management of the respective parcel, wherein said data is accessed from at least one database, wherein the fourth server computer device does not provide tracking information regarding the respective shipping status corresponding to the respective parcel, and wherein the fourth server computer device does not perform rating for the respective parcel.

4. The centralized computer system of claim 1, wherein each said respective shipping input comprises: a first respective item of information characterizing the respective parcel to be shipped by the respective user, a first respective location from which the respective parcel is to be shipped by the respective user, and a second respective location to which the respective parcel is to be shipped by the respective user.

5. A centralized computer system for managing shipping of a plurality of parcels by a plurality of users using a plurality of carriers, wherein each user accesses the centralized computer system over a communications network using a respective client computer device, and wherein each respective user client computer device is adapted for communications with the centralized computer system via the communications network, said centralized computer system comprising:

a plurality of functionally aligned server computer devices, wherein the plurality of functionally aligned server computer devices are adapted to communicate cooperatively, wherein each server computer device of the plurality of functionally aligned server computer devices is programmed to perform at least one particular shipping management function of a plurality of shipping management functions, wherein each particular shipping management function contributes to managing shipping of the plurality of parcels;

at least a first server computer device of the plurality of functionally aligned server computer devices that is programmed to communicate with each of the plurality of users over multiple telecommunications connections over the communications network at one time, wherein the first server computer device is adapted for communicating an access of the first server computer device by one or more users of the plurality of users to at least one other functionally aligned server computer device of the plurality of functionally aligned server computer devices; and at least a second server computer device of the plurality of functionally aligned server computer devices that is programmed to receive a respective access by one or more respective users of the plurality of users via the first server computer device wherein at least one respective access comprises a respective input by a respective user of a respective tracking number, wherein the second server computer is further programmed to respond to the respective input of the respective tracking number by determining a carrier associated with the respective tracking number, wherein the second server computer is further programmed to further respond to the respective input of the respective tracking number by accessing a respective carrier computer system of a plurality of carrier computer systems through a respective online connection with the respective carrier computer system over the communications network, wherein the respective carrier computer system is associated with the tracking number, and by obtaining carrier tracking information corresponding to the tracking number from the respective carrier computer system through the respective online connection with the respective carrier computer system, and wherein the second server computer is further programmed to further respond to the respective input of the respective tracking number by displaying the carrier tracking information to the respective user.

6. A method of configuring a plurality of functionally aligned server computer devices for managing shipping of a plurality of respective parcels by a plurality of respective users using any carrier of a plurality of carriers, wherein each server computer device of the plurality of functionally aligned server computer devices is adapted for communication with at least one other functionally aligned server computer device of the plurality of functionally aligned server computer devices, wherein at least a first server computer device of the plurality of functionally aligned server computer devices is adapted for concurrent remote access by the plurality of respective users via a communications network, said method comprising:

programming at least a second server computer device of the plurality of functionally aligned server computer devices to concurrently receive via the first server computer device a respective shipping input from each respective user of a first subset of the plurality of respective users via a respective client computer device accessed by each respective user of the first subset of the plurality of respective users, wherein each said respective shipping input comprises: a first respective item of information characterizing a respective parcel to be shipped by the respective user, a first respective location from which the respective parcel is to be shipped by the respective user, and a second respective location to which the respective parcel is to be shipped by the respective user;

programming at least one server computer device of the plurality of functionally aligned server computer devices to calculate a first respective shipping rate for, and determine a first date and time by, which a first carrier would deliver the respective parcel via a first delivery service, to calculate a second respective shipping rate for, and determine a second date and time by, which a second carrier would deliver the respective parcel via a second delivery service, and to calculate a third respective shipping rate for, and determine a third date and time by, which the first carrier would deliver the respective parcel via a third delivery service;

programming at least one server computer device of the plurality of functionally aligned server computer devices to simultaneously display the first respective shipping rate, the first date and time, the second respective shipping rate, the second date and time, the third respective shipping rate, and the third date and time, to a respective display device in communication with a respective client computer device used by the respective user to input the respective request; and programming at least a third server computer device of the plurality of functionally aligned server computer devices to receive a respective access by a respective user of the plurality of users via the first server computer device wherein at least one respective access comprises a respective input by a respective user of a respective tracking number, the third server computer being further programmed to respond to the respective input of the respective tracking number by determining a carrier associated with the respective tracking number, the third server computer being further programmed to further respond to the respective input of the respective tracking number by accessing a respective carrier computer system of a plurality of carrier computer systems through a respective online connection with the respective carrier computer system over the communications network, wherein the respective carrier computer system is associated with the tracking number, and by obtaining carrier tracking information corresponding to the tracking number from the respective carrier computer system through the respective online connection with the respective carrier computer system, and the third server computer being further programmed to further respond to the respective input of the respective tracking number by displaying the carrier tracking information to a respective display device in communication with a respective user computer device used by the respective user that input the respective tracking number.

7. The method of claim 6, said method further comprising:

programming at least a third server computer device of the plurality of functionally aligned server computer devices to receive via the first server computer device a respective tracking input from each respective user of a second subset of the plurality of respective users via a respective client computer device, wherein each said respective tracking input comprises a respective identifier of a respective parcel that has been shipped by the respective user using a respective carrier of the plurality of carriers; and programming at least a fourth server computer device of the plurality of functionally aligned server computer devices to access a respective carrier system through a respective online connection and to obtain respective carrier tracking information from the respective carrier system through the respective online connection regarding a respective shipping status corresponding to the respective identifier and to display the respective carrier tracking information to the respective display device in communication with a respective client computer device used by the respective user.

8. A centralized computer system for managing shipping of a plurality of respective parcels by a plurality of respective users using any carrier of a plurality of carriers, said centralized computer system comprising:

at least a first server computer device that is dedicated for concurrent remote access by a plurality of respective client computer devices via a communications network, and for communicating an access of the first server computer device by one or more users of the plurality of users to at least one other functionally aligned server computer device of a plurality of functionally aligned server computer devices;

at least a second server computer device that is dedicated to a delivery scheduling and rating function, said delivery scheduling and rating function comprising computer program instructions to receive a respective shipping input via the first server computer from each respective user of the plurality of respective users via a respective client computer device, wherein each said respective shipping input comprises: a first respective item of information characterizing a respective parcel to be shipped by the respective user, a first respective location from which the respective parcel is to be shipped by the respective user, and a second respective location to which the respective parcel is to be shipped by the respective user, wherein the second server computer device is further programmed to use each respective shipping input from each respective user to calculate at least a first respective shipping rate for, and determine a first date and time by, which a first carrier would deliver the respective parcel via a first delivery service, to calculate at least a second respective shipping rate for, and determine a second date and time by, which the first carrier would deliver the respective parcel via a second delivery service, and to calculate at least a third respective shipping rate for, and determine a third date and time by, which a second carrier would deliver the respective parcel via a third delivery service, and wherein the second server computer device is further programmed to simultaneously display at least the first respective shipping rate, at least the first date and time, at least the second respective shipping rate, at least the second date and time, at least the third respective shipping rate, and at least the third date and time, to a respective display device in communication with the respective client computer device used by the respective user to input the respective shipping input and at least a third server computer device that is dedicated to perform a tracking function, said tracking function comprising computer program instructions to receive a respective tracking request input via the first server computer from a respective user of the plurality of respective users via a respective user computer device, said respective tracking request input comprising a respective carrier-specific tracking number, said tracking function further comprising computer program instructions to:

determine a carrier associated with the respective carrier-specific tracking identifier, access a respective carrier system through a respective online connection, obtain respective carrier tracking information from the respective carrier system through the respective online connection associated with the respective carrier-specific tracking identifier, and facilitate a display of the respective carrier tracking information to a respective display device in communication with the respective user computer device.

* * * * *